(12) United States Patent
Shen et al.

(10) Patent No.: US 11,281,972 B2
(45) Date of Patent: Mar. 22, 2022

(54) OPTOELECTRONIC COMPUTING SYSTEMS

(71) Applicant: Lightelligence, Inc., Boston, MA (US)

(72) Inventors: Yichen Shen, Cambridge, MA (US); Li Jing, Cambridge, MA (US); Rumen Dangovski, Cambridge, MA (US); Peng Xie, Dublin, CA (US); Huaiyu Meng, Medford, MA (US); Matthew Khoury, Cambridge, MA (US); Cheng-Kuan Lu, Littleton, MA (US); Ronald Gagnon, North Grafton, MA (US); Maurice Steinman, Marlborough, MA (US); Jianhua Wu, Quincy, MA (US); Arash Hosseinzadeh, Andover, MA (US)

(73) Assignee: Lightelligence PTE. Ltd., Singapore (SG)

( * ) Notice: Subject to any disclaimer, the term of this patent is extended or adjusted under 35 U.S.C. 154(b) by 0 days.

(21) Appl. No.: 16/852,628

(22) Filed: Apr. 20, 2020

(65) Prior Publication Data

US 2020/0250532 A1    Aug. 6, 2020

Related U.S. Application Data

(63) Continuation of application No. 16/431,167, filed on Jun. 4, 2019.
(Continued)

(51) Int. Cl.
*G06N 3/08* (2006.01)
*G06E 1/04* (2006.01)
(Continued)

(52) U.S. Cl.
CPC ............... *G06N 3/08* (2013.01); *G02F 1/00* (2013.01); *G02F 3/024* (2013.01); *G06E 1/045* (2013.01);
(Continued)

(58) Field of Classification Search
CPC ........ G06N 3/08; G06N 3/0675; G06N 20/00; G06N 3/0635; G06N 3/084; G06N 10/00;
(Continued)

(56) References Cited

U.S. PATENT DOCUMENTS

| 3,944,820 A | 3/1976 | Stotts |
| 4,567,569 A | 1/1986 | Caulfield et al. |

(Continued)

FOREIGN PATENT DOCUMENTS

| CN | 1713027 | 12/2005 |
| CN | 101630178 | 1/2010 |

(Continued)

OTHER PUBLICATIONS

Taiwan Office Action for Taiwan Application No. TW 108119388 dated May 13, 2020 (with English Translation).
(Continued)

*Primary Examiner* — Collin X Beatty
(74) *Attorney, Agent, or Firm* — Fish & Richardson P.C.

(57) ABSTRACT

Systems and methods that include: providing input information in an electronic format; converting at least a part of the electronic input information into an optical input vector; optically transforming the optical input vector into an optical output vector based on an optical matrix multiplication; converting the optical output vector into an electronic format; and electronically applying a non-linear transformation to the electronically converted optical output vector to provide output information in an electronic format.
In some examples, a set of multiple input values are encoded on respective optical signals carried by optical waveguides. For each of at least two subsets of one or more optical signals, a corresponding set of one or more copying modules splits the subset of one or more optical signals into two or more copies of the optical signals. For each of at least two
(Continued)

copies of a first subset of one or more optical signals, a corresponding multiplication module multiplies the one or more optical signals of the first subset by one or more matrix element values using optical amplitude modulation. For results of two or more of the multiplication modules, a summation module produces an electrical signal that represents a sum of the results of the two or more of the multiplication modules.

30 Claims, 60 Drawing Sheets

Related U.S. Application Data

(60) Provisional application No. 62/820,562, filed on Mar. 19, 2019, provisional application No. 62/792,144, filed on Jan. 14, 2019, provisional application No. 62/744,706, filed on Oct. 12, 2018, provisional application No. 62/680,944, filed on Jun. 5, 2018.

(51) Int. Cl.
| | |
|---|---|
| *G06F 17/14* | (2006.01) |
| *G06F 17/16* | (2006.01) |
| *G02F 1/00* | (2006.01) |
| *G02F 3/02* | (2006.01) |
| *G06E 3/00* | (2006.01) |
| *G02F 1/225* | (2006.01) |
| *G06N 3/067* | (2006.01) |

(52) U.S. Cl.
CPC ............ *G06E 3/005* (2013.01); *G06E 3/006* (2013.01); *G06E 3/008* (2013.01); *G06F 17/14* (2013.01); *G06F 17/16* (2013.01); *G02F 1/225* (2013.01); *G06N 3/0675* (2013.01)

(58) Field of Classification Search
CPC ...... G06N 3/0445; G06N 3/049; G06N 20/10; G06N 3/04; G06N 3/0454; G06N 3/0481; G06N 3/063; G06N 7/005; G02F 1/00; G02F 3/024; G02F 2201/063; G02F 2202/32; G02F 1/0018; G02F 1/0136; G02F 1/0327; G02F 1/035; G02F 1/095; G02F 1/0955; G02F 1/1326; G02F 1/13342; G02F 1/1335; G02F 1/218; G02F 1/2255; G02F 1/29; G02F 1/291; G02F 1/3132; G02F 1/3133; G02F 1/3526; G02F 1/365; G02F 2201/122; G02F 2201/125; G02F 2201/126; G02F 2201/30; G02F 2201/34; G02F 2201/58; G02F 2203/055; G02F 2203/06; G02F 2203/12; G02F 2203/28; G02F 2203/48; G02F 2/002; G06E 1/045; G06E 3/005; G06E 3/008; G06E 1/00; G06E 3/001; G06E 3/003; G06E 3/006; G06F 17/14; G06F 17/16; G06F 15/7825; G06F 30/00; G06F 30/39; G06F 13/4022; G06F 15/17375; G06F 15/7807; G06F 17/12; G06F 30/30; G06F 30/327; G06F 30/392; G06F 30/394; G06F 9/3001; G06F 9/30036; G06F 9/3016; G06J 1/005; G06J 1/02

See application file for complete search history.

(56) References Cited

U.S. PATENT DOCUMENTS

| | | | |
|---|---|---|---|
| 4,588,255 A | 5/1986 | Tur et al. | |
| 4,603,398 A * | 7/1986 | Bocker | G06E 3/005 |
| | | | 706/40 |
| 4,633,428 A | 12/1986 | Byron | |
| 4,809,204 A | 2/1989 | Dagenais et al. | |
| 5,004,309 A | 4/1991 | Caulfield et al. | |
| 5,008,833 A | 4/1991 | Agranat et al. | |
| 5,077,619 A | 12/1991 | Toms | |
| 5,095,459 A | 3/1992 | Ohta et al. | |
| 5,333,117 A * | 7/1994 | Ha | G06E 1/04 |
| | | | 708/191 |
| 5,428,711 A | 6/1995 | Akiyama et al. | |
| 5,699,449 A | 12/1997 | Javidi | |
| 5,784,309 A | 7/1998 | Budil | |
| 6,005,998 A | 12/1999 | Lee | |
| 6,178,020 B1 | 1/2001 | Schultz et al. | |
| 6,493,483 B2 | 12/2002 | Gomes et al. | |
| 6,529,276 B1* | 3/2003 | Myrick | G01J 3/02 |
| | | | 356/419 |
| 7,173,272 B2 | 2/2007 | Ralph | |
| 7,251,386 B1 | 7/2007 | Dickinson et al. | |
| 7,259,031 B1 | 8/2007 | Dickinson et al. | |
| 7,536,431 B2 | 5/2009 | Goren et al. | |
| 7,660,533 B1 | 2/2010 | Meyers et al. | |
| 7,667,995 B1 | 2/2010 | Leuenberger et al. | |
| 7,876,248 B2 | 1/2011 | Berkley et al. | |
| 7,985,965 B2 | 7/2011 | Barker et al. | |
| 8,018,244 B2 | 9/2011 | Berkley | |
| 8,023,828 B2 | 9/2011 | Beausoleil et al. | |
| 8,027,587 B1 | 9/2011 | Watts | |
| 8,035,540 B2 | 10/2011 | Berkley et al. | |
| 8,129,670 B2 | 3/2012 | Laycock et al. | |
| 8,190,553 B2 | 5/2012 | Routt | |
| 8,213,751 B1 | 7/2012 | Ho et al. | |
| 8,223,414 B2 | 7/2012 | Goto et al. | |
| 8,386,899 B2 | 2/2013 | Goto et al. | |
| 8,560,282 B2 | 10/2013 | Macready et al. | |
| 8,604,944 B2 | 12/2013 | Berkley et al. | |
| 8,620,855 B2 | 12/2013 | Bonderson | |
| 8,837,544 B2 | 9/2014 | Santori et al. | |
| 8,953,950 B2* | 2/2015 | Nazarathy | H03M 1/46 |
| | | | 398/203 |
| 9,159,861 B2 | 10/2015 | Zhang et al. | |
| 9,250,391 B2 | 2/2016 | McLaughlin et al. | |
| 9,354,039 B2 | 5/2016 | Mower et al. | |
| 9,391,708 B2 | 7/2016 | Fincato et al. | |
| 9,594,394 B2 | 3/2017 | New | |
| 9,791,258 B2 | 10/2017 | Mower et al. | |
| 9,858,531 B1 | 1/2018 | Monroe et al. | |
| 9,900,096 B2 | 2/2018 | Hajimiri et al. | |
| 10,009,135 B2* | 6/2018 | Tait | H04B 10/80 |
| 10,268,232 B2 | 4/2019 | Carolan et al. | |
| 10,359,272 B2 | 7/2019 | Mower et al. | |
| 10,608,663 B2 | 3/2020 | Gould et al. | |
| 10,634,851 B2* | 4/2020 | Steinbrecher | G02B 6/3542 |
| 10,908,634 B1 | 2/2021 | Chang et al. | |
| 10,985,777 B2* | 4/2021 | Baraniuk | G06K 9/6274 |
| 11,017,309 B2* | 5/2021 | Roques-Carmes | G06N 3/0675 |
| 11,073,658 B2* | 7/2021 | Perez Lopez | G02B 6/12004 |
| 2003/0086138 A1 | 5/2003 | Pittman et al. | |
| 2003/0235363 A1 | 12/2003 | Pfeiffer | |
| 2004/0223768 A1 | 11/2004 | Shastri et al. | |
| 2004/0243657 A1 | 12/2004 | Goren et al. | |
| 2007/0180586 A1 | 8/2007 | Amin | |
| 2008/0031566 A1 | 2/2008 | Matsubara et al. | |
| 2008/0212186 A1 | 9/2008 | Zoller et al. | |
| 2008/0273835 A1 | 11/2008 | Popovic | |
| 2009/0024816 A1 | 1/2009 | Thibadeau et al. | |
| 2009/0028554 A1 | 1/2009 | Anderson | |
| 2012/0045162 A1 | 2/2012 | Li | |
| 2012/0171619 A1 | 7/2012 | Heyderman et al. | |
| 2013/0011093 A1 | 1/2013 | Goh et al. | |
| 2013/0046716 A1 | 2/2013 | Chan et al. | |
| 2014/0241657 A1 | 8/2014 | Manouvrier | |
| 2014/0299743 A1 | 10/2014 | Miller | |

(56) References Cited

U.S. PATENT DOCUMENTS

| | | |
|---|---|---|
| 2015/0009548 A1 | 1/2015 | Bienstman et al. |
| 2015/0354938 A1 | 12/2015 | Mower et al. |
| 2015/0382089 A1 | 12/2015 | Mazed |
| 2016/0103281 A1 | 4/2016 | Matsumoto |
| 2016/0118106 A1 | 4/2016 | Yoshimura et al. |
| 2016/0162798 A1 | 6/2016 | Marandi et al. |
| 2017/0116514 A1* | 4/2017 | Abel ............. G06N 3/0675 |
| 2017/0285373 A1 | 10/2017 | Zhang et al. |
| 2017/0351293 A1 | 12/2017 | Carolan et al. |
| 2017/0351950 A1* | 12/2017 | Nakano ............. G02B 6/3596 |
| 2018/0024299 A1 | 1/2018 | Leijtens et al. |
| 2018/0107237 A1* | 4/2018 | Andregg ............. G06G 7/16 |
| 2018/0211158 A1* | 7/2018 | Shainline ............. G06N 3/0472 |
| 2018/0267937 A1 | 9/2018 | Pelc et al. |
| 2018/0274900 A1 | 9/2018 | Mower et al. |
| 2018/0284834 A1* | 10/2018 | Abel ............. G02F 1/35 |
| 2018/0335574 A1 | 11/2018 | Steinbrecher et al. |
| 2019/0019100 A1 | 1/2019 | Roques-Carmes et al. |
| 2019/0049680 A1 | 2/2019 | Sharma et al. |
| 2019/0266508 A1 | 8/2019 | Bunyk et al. |
| 2019/0319633 A1* | 10/2019 | Zou ............. H03M 1/08 |
| 2019/0370652 A1 | 12/2019 | Shen et al. |
| 2019/0371226 A1 | 12/2019 | Iwaki |
| 2020/0018193 A1 | 1/2020 | Neiser |
| 2020/0052183 A1* | 2/2020 | Shainline ............. G06N 3/049 |
| 2020/0228077 A1 | 7/2020 | Harris et al. |

FOREIGN PATENT DOCUMENTS

| | | | |
|---|---|---|---|
| CN | 102023672 | 4/2011 | |
| CN | 102164017 | 8/2011 | |
| CN | 102866876 | 1/2013 | |
| CN | 103473213 | 12/2013 | |
| CN | 105046325 | 11/2015 | |
| CN | 109477938 | 3/2019 | ............. G02B 6/26 |
| DE | 102004014658 | 7/2010 | |
| EP | 0 330 710 | 9/1989 | |
| KR | 1020170117557 | 10/2017 | ............. G02B 6/30 |
| TW | 200912905 | 3/2009 | ............. G11B 20/10 |
| TW | I522935 | 2/2016 | ............. G06N 3/063 |
| TW | 201837894 | 10/2018 | ............. G09G 5/02 |
| WO | WO 2005029404 | 3/2005 | |
| WO | WO 2006023067 | 3/2006 | |
| WO | WO 2008069490 | 6/2008 | |
| WO | WO 2018098230 | 5/2018 | |

OTHER PUBLICATIONS

International Search Report and Written Opinion of the International Searching Authority for International Application No. PCT/US2019/064554, dated Jun. 23, 2020.

International Search Report and Written Opinion of the International Searching Authority for International Application No. PCT/US2020/023674 dated Jul. 8, 2020.

Tahersima, M. et al., "Deep Neural Network Inverse Design of Integrated Photonic Power Splitters", *Scientific Reports*, Article No. 9:1368, (Feb. 4, 2019).

Xu, K. et al., "All passive photonic power divider with arbitrary split ratio", *arXiv*, 1609.03823v1 (Sep. 13, 2016).

Abdeldayem et al., "Optical Computing: Need and Challenge", *Communications of the ACM*, vol. 50, No. 9. pp. 60-62 (Sep. 2007).

International Search Report and Written Opinion of the International Searching Authority for International Application No. PCT/US2019/035403 dated Sep. 18, 2019.

Guha et al., "Architectural Issues in Designing Symbolic Processors in Optics", *ISCA '87 Proceedings of the 14th annual international symposium on Computer architecture*, pp. 145-151 (1987).

Hamerly et al., "Large-Scale Optical Neural Networks based on Photoelectric Multiplication", arXiv:1812.07614v1 (cs.ET] (Nov. 12, 2018).

Harris et al., "Linear programmable nanophotonic processors", *Optica*, vol. 5, No. 12, pp. 1623-1631 (Dec. 2018).

Hughes et al., "Training of photonic neural networks through in situ backpropagation", *Optica*, vol. 5, Issue 7, pp. 864-871 (2018).

Ishihara et al., "An Integrated Nanophotonic Parallel Adder", *ACM Journal on Emerging Technologies in Computing Systems*, vol. 14, No. 2, Article 26, pp. 26:1-26:20 (Jul. 2018).

Jing et al., "Tunable Efficient Unitary Neural Networks (EUNN) and their application to RNNs", https://arxiv.org/abs/1612.05231v3, (Dec. 15, 2016).

Lin et al., "All-Optical Machine Learning Using Diffractive Deep Neural Networks", *Science*, vol. 361, Issue 6406, pp. 1004-1008, DOI: 10.1126/science.aat8084 (Sep. 7, 2018).

Peurifoy et al., "Nanophotonic particle simulation and inverse design using artificial neural networks", Science Advances, vol. 4, eaar4206, pp. 1-7 (2018).

Saade et al., "Random Projections through multiple optical scattering: Approximating kernels at the speed of light", *Proceedings of the 2016 IEEE International Conference on Acoustics, Speech and Signal Processing (ICASSP)*, pp. 6215-6219 (Oct. 2015).

Sahni et al., "Models and Algorithms for Optical and Optoelectronic Parallel Computers", *International Journal of Foundations of Computer Science*, vol. 12, No. 3, (Nov. 2011).

Shen et al., "Deep learning with coherent nanophotinic circuits", Nature Photonics, DOI: 10.1038/NPHOTON.2017.93 (Jun. 12, 2017).

Tamir et al., "High-speed and low-power electro-optical DSP coprocessor", *J. Opt. Soc. Am. A*, vol. 26, No. 8, pp. A11-A20 (Aug. 2009).

Yang et al., "On-chip CMOS-compatible optical signal processor", *Optics Express*, vol. 20, No. 12, pp. 13560-13565 (Jun. 4, 2012).

Younger et al., "Computing by Means of Physical-Based Optical Neural Networks", *EPTCS 26*, pp. 159-167 (2010).

Huang, K., "A Digital Optical Cellular Image Processor (DOCIP): Theory, Architecture and Implementation", A Dissertation Presented to the Faculty of the Graduate School University of Southern California, (Sep. 1988).

Aaronson, S. et al., "Computational complexity of linear optics", in *Proceedings of the 43rd Annual ACM Symposium on Theory of Computing* (ACM, New York, NY, USA, 2011), STOC '11, pp. 333-342, ISBN 978-1-4503-0691-1.

Abu-Mostafa et al., "Optical Neural Computers," *Scientific American*, vol. 256, Issue 3 (1987), pp. 88-95.

Albert et al., "Statistical mechanics of complex networks", *Reviews of Modern Physics*, vol. 74, pp. 47-97, Jan. 2002.

Almeida, V. R., et al., "All-optical control of light on a silicon chip", *Nature*, vol. 431, (Aug. 6, 2004), pp. 1081-1084.

Amir, A. et al., "Classical diffusion of a quantum particle in a noisy environment", *Physical Review*, E 79, 050105 (Feb. 5, 2009), 5 pages.

Amit et al., "Spin-glass models of neural networks", *Physical Review A*, vol. 32, No. 2, pp. 1007-1018, Aug. 1985.

Anitha et al., "Comparative Study of High performance Braun's Multiplier Using FPGAs", *IOSR Journal of Electronics and Communication Engineering (IOSRJECE)*, vol. 1, Issue 4, pp. 33-37 (May-Jun. 2012).

Appeltant et al., "Information processing using a single dynamical node as complex system", *Nature* Communications, 6 pages (2011).

Arjovsky et al., "Unitary Evolution Recurrent Neural Networks", *arXiv:1511.06464*, 9 pages (2015).

Aspuru-Guzik A. et al., "Simulated Quantum Computation of Molecular Energies", *Science*, vol. 309, Issue 5741, pp. 1704-1707 (2005).

Aspuru-Guzik, A. et al., "Photonic quantum simulators", *Nature Physics*, vol. 8, No. 4, pp. 285-291 (2012).

Atabaki et al., "Integrating photonics with silicon nanoelectronics for the next generation of systems on a chip", *Nature*, vol. 556, pp. 349-358 (2018).

Baehr-Jones et al., "A 25 GB/s Silicon Photonics Platform", *arXiv reprints*. URL http://adsabs.harvard.edu/ abs/2012arXiv1203.0767B, 1203.0767, 11 pages (2012).

Bao et al., "Atomic-Layer Graphene as a Saturable Absorber for Ultrafast Pulsed Lasers", *Advanced Functional Materials*, vol. 19, pp. 3077-3083 (2009).

Bao et al., "Monolayer graphene as a saturable absorber in a mode-locked laser", *Nano Res.*, vol. 4, No. 3, pp. 297-307 (2011).

(56) References Cited

OTHER PUBLICATIONS

Barahona, "On the computational complexity of Ising spin glass models", *Journal of Physics A: Mathematical and General*, vol. 15, pp. 3241-3253, (Oct. 1982).
Bertsimas et al., "Robust optimization with simulated annealing", *Journal of Global Optimization*, vol. 48, pp. 323-334 (2010).
Bewick, "Fast multiplication: algorithms and implementation". Ph.D. Thesis, Stanford University (1994), 170 pages.
Bonneau et al., "Quantum interference and manipulation of entanglement in silicon wire waveguide quantum circuits", *New Journal of Physics*, vol. 14 (2012): 045003, 13 pages.
Brilliantov, "Effective magnetic Hamiltonian and Ginzburg criterion for fluids", *Physical Review E*, vol. 58, No. 2, pp. 2628-2631, (Aug. 1998).
Bromberg, Y. et al., "Bloch oscillations of path-entangled photons", *Phys. Rev. Lett.*, vol. 105, (May 18, 2011), 5 pages.
Bromberg, Y. et al., "Quantum and Classical Correlations in Waveguide Lattices", *Phys. Rev. Lett.*, vol. 102, (Jun. 26, 2009), pp. 253904-1-253904-4.
Broome, M. A. et al., "Photonic Boson Sampling in a Tunable Circuit", *Science*, vol. 339, pp. 794-798, (Jan. 12, 2013).
Bruck et al., "On the power of neural networks for solving hard problems", *Journal of Complexity*, vol. 6, pp. 129-135, (Jun. 1990).
Canziani et al., "Evaluation of neural network architectures for embedded systems", *2017 IEEE International Symposium on Circuits and Systems (ISCAS)*, (May 28-31, 2017).
Cardenas et al., "Low loss etchless silicon photonic waveguides", *Optics Express*, vol. 17, No. 6, pp. 4752-4757 (2009).
Carolan et al., "Universal linear optics", *Science*, vol. 349, Issue 6249, pp. 711-716, (Aug. 14, 2015).
Caves, "Quantum-mechanical noise in an interferometer", *Physical Review D*, vol. 23, No. 8, pp. 1693-1708 (Apr. 15, 1981).
Centeno et al., "Optical bistability in finite-size nonlinear bidimensional photonic crystals doped by a microcavity", *Physical Review B*, vol. 62, No. 12, pp. R7683-R7686 (Sep. 15, 2000).
Chan, "Optical flow switching networks", *Proceedings of the IEEE*, vol. 100, No. 5, pp. 1079-1091, (May 2012).
Chen et al., "DianNao: A small-footprint high-throughput accelerator for ubiquitous machine-learning", *ASPLOS '14: Proceedings of the 19th international conference on Architectural support for programming languages and operating systems*, pp. 269-284 (Feb. 2014).
Chen, J. et al., "Efficient photon pair sources based on silicon-on-insulator microresonators", *SPIE*, vol. 7815, pp. 78150H-1-78150H-9, (2010).
Chen, J. et al., "Frequency-bin entangled comb of photon pairs from a Silicon-on-Insulator micro-resonator", *Optics Express*, vol. 19, No. 2, (Jan. 17, 2011), pp. 1470-1483.
Chen, L. et al., "Compact, low-loss and low-power 8×8 broadband silicon optical switch," *Optics Express*, vol. 20, No. 17, pp. 18977-18985 (Aug. 13, 2012).
Chen, Q. et al., "A Universal method for constructing N-port non-blocking optical router based on 2×2 optical switch", *Progress in Electromagnetics Research Symposium Proceedings*, Guangzhou, China, Aug. 25-28, 2014, pp. 357-361.
Cheng et al., "In-Plane Optical Absorption and Free Carrier Absorption in Graphene-on-Silicon Waveguides," *IEEE Journal of Selected Topics in Quantum Electronics*, vol. 20, No. 1, pp. 43-48, (Jan./Feb. 2014).
Chetlur et al., "cuDNN: Efficient primitives for deep learning", *arXiv preprint arXiv:1410.0759* (2014). 9 pages.
Childs, A. et al., "Spatial search by quantum walk", *Physical Review A*, vol. 70, Issue 2, (Aug. 23, 2004), 12 pages.
Chung et al., "A monolithically integrated large-scale optical phased array in silicon-on-insulator CMOS", *IEEE Journal of Solid-State Circuits*, vol. 53, No. 1, pp. 275-296 (Jan. 2018).
Cincotti, "Prospects on planar quantum computing", *Journal of Lightwave Technology*, vol. 27, No. 24, pp. 5755-5766 (Dec. 15, 2009).

Clements et al., "Optimal design for universal multiport interferometers," *Optica*, vol. 3, No. 12, pp. 1460-1465 (Dec. 2016).
Chinese Office Action and English Translation in Chinese Patent Application No. 201780043808.X dated Feb. 3, 2020, 12 pages.
Crespi, A. et al., "Integrated multimode interferometers with arbitrary designs for photonic boson sampling", *Nature Photonics*, vol. 7, pp. 545-549 (May 26, 2013).
Crespi, et al., "Anderson localization of entangled photons in an integrated quantum walk", *Nature Photonics*, vol. 7, Issue 4, pp. 322-328 (Apr. 2013).
Dai, D. et al., "Novel concept for ultracompact polarization splitter-rotator based on silicon nanowires", *Optics Express*, vol. 19, No. 11, (May 23, 2011 ), pp. 10940-10949.
Di Giuseppe, G. et al., "Einstein-Podolsky-Rosen Spatial Entanglement in Ordered and Anderson Photonic Lattices", *Physical Review Letters*, PRL 110, (Apr. 12, 2013), pp. 150503-1-150503-5.
Dunningham et al., "Efficient comparison of path-lengths using Fourier multiport devices", *Journal of Physics B: Atomic, Molecular and Optical Physics*, vol. 39 (2006), pp. 1579-1586.
EP Extended European Search Report in European Patent Application No. 17807562.8, dated May 6, 2020, 14 pages.
EP Partial Supplemental European Search Report in European Patent Application No. 17807562.8 dated Jan. 17, 2020, 12 pages.
Esser et al., "Convolutional networks for fast, energy-efficient neuromorphic computing", *Proceedings of the National Academy of Sciences*, vol. 113, No. 41, pp. 11441-11446 (Oct. 2016).
Farht et al., "Optical implementation of the Hopfield model", *Applied Optics*, vol. 24, No. 10, pp. 1469-1475 (May 15, 1985).
Feinberg et al., "Making memristive neural network accelerators reliable", *2018 IEEE International Symposium on High Performance Computer Architecture (HPCA)*, pp. 52-65 (2018).
Fushman, I. et al., "Controlled Phase Shifts with a Single Quantum Dot", *Science*, vol. 320, (May 9, 2008), pp. 769-772.
George et al., "A programmable and configurable mixed-mode FPAA Soc", *IEEE Transactions on Very Large Scale Integration (VLSI) Systems*, vol. 24, No. 6, pp. 2253-2261 (Jun. 2016).
Gilmer et al., "Neural message passing for quantum chemistry", *arXiv preprint arXiv: 1704.01212* (2017). 14 pages.
Golub et al., "Calculating the singular values and pseudo-inverse of a matrix", *Journal of the Society for Industrial and Applied Mathematics Series B Numerical Analysis*, vol. 2, No. 2, pp. 205-224 (1965).
Graves et al., "Hybrid computing using a neural network with dynamic external memory," *Nature*, vol. 538, (Oct. 27, 2016), 21 pages.
Green, W. et al., "CMOS Integrated Silicon Nanophotonics: Enabling Technology for Exascale Computational System", IBM Corporation, Invited Talk at SEMICON Dec. 1, 2010, Tokyo, (2010) 30 pages.
Grote et al., "First long-term application of squeezed states of light in a gravitational-wave observatory", *Physical Review Letters*, PRL 110, 181101 (May 3, 2013). 5 pages.
Gruber et al., "Planar-integrated optical vector-matrix multiplier", *Applied Optics*, vol. 39, No. 29, p. 5367-5373 (Oct. 10, 2000).
Gullans et al., "Single-Photon Nonlinear Optics with Graphene Plasmons", *Physical Review Letters*, PRL 111, pp. 247401-1-247401-5 (Dec. 13, 2013) 7 pages.
Gunn, C., "CMOS photonics for high-speed interconnects", *IEEE Micro*, (Mar.-Apr. 2006), pp. 58-66.
Haffner et al., "Low-loss plasmon-assisted electro-optic modulator", *Nature*, vol. 556, pp. 483-486 (2018).
Halasz et al., "Phase diagram of QCD", *Physical Review D*, vol. 58, pp. 096007-1-096007-11, (1998).
Hamerly et al., "Scaling advantages of all-to-all connectivity in physical annealers: the Coherent Ising Machine vs. DWave 2000Q", *arXiv:1805.05217*, (May 2018), 17 pages.
Harris et al. "Integrated source of spectrally filtered correlated photons for large-scale quantum photonic systems", *Physical Review X*, vol. 4, Issue 4, pp. 041047-1-041047-10 (2014).
Harris et al., "Bosonic transport simulations in a large-scale programmable nanophotonic processor", *arXiv:1507.03406v2*, 8 pages (2015).

(56) References Cited

OTHER PUBLICATIONS

Harris et al., "Efficient, compact and low loss thermos-optic phase shifter in silicon", *Optics Express*, vol. 22, No. 9, pp. 10487-10493 (2014).
Hinton et al., "Reducing the dimensionality of data with neural networks", *Science*, vol. 313, pp. 504-507 (Jul. 28, 2006).
Hochberg, M. et al., "Silicon Photonics: The Next Fabless Semiconductor Industry", *IEEE Solid-State Circuits Magazine*, pp. 48-58 (Winter 2013).
Honerkamp-Smith et al., "An introduction to critical points for biophysicists; observations of compositional heterogeneity in lipid membranes", *Biochimica et Biophysica Acta 1788*, pp. 53-63, (2009).
Hong, C. K. et al., "Measurement of subpicosecond time intervals between two photons by interference", *Physical Review Letters*, vol. 59, No. 18, (Nov. 2, 1987), pp. 2044-2046.
Hopefield et al., "Neural computation of decisions in optimization problems", *Biological Cybernetics*, vol. 52, No. 3, pp. 141-152 (1985).
Hopefield, "Neural networks and physical systems with emergent collective computational abilities", *Proceedings of the National Academy of Sciences of the United States of America*, vol. 79, pp. 2554-2558 (Apr. 1982).
Horowitz, M., "Computing's energy problem (and what we can do about it)", *2014 IEEE International Solid-State Circuits Conference*, Digest of Technical Papers, ISSCC 2014, Session 1, Plenary / 1.1 (Feb. 2014).
Horst, F. et al., "Cascaded Mach-Zehnder wavelength filters in silicon photonics for low loss and flat pass-band WDM (de-)multiplexing", *Optics Express*, vol. 21, No. 10, pp. 11652-11658 (2013).
Humphreys, P. C. et al., "Linear Optical Quantum Computing in a Single Spatial Mode", *arXiv:1305.3592*, (Nov. 21, 2014), 7 pages.
Inagaki et al., Large-scale Ising spin network based on degenerate optical parametric oscillators, *Nature Photonics*. vol. 10, pp. 415-419 (Jun. 2016).
Isichenko, "Percolation, statistical topography, and transport in random media", *Reviews of Modern Physics*, vol. 64, No. 4, pp. 961-1043, (Oct. 1992).
Ising, "Beitrag zur Theorie des Ferromagnetismus," *Z. Phys.*, pp. 253-258 (Dec. 1924).
Jaekel et al., "Quantum limits in interferometric measurements", *Europhysics Letters*, vol. 13, No. 4, pp. 301-306 (Oct. 1990).
Jalali, B. et al., "Silicon Photonics", *Journal of Lightwave Technology*, vol. 24, No. 12, pp. 4600-4615 (Dec. 2006).
Jia et al., "Caffe: Convolutional architecture for fast feature embedding", Proceedings of the 22nd ACM International Conference on Multimedia (Multimedia 2014), Orlando, Florida, pp. 675-678 URL http://doi.acm. org/1 O.1145/264 7868 .2654889 (2014).
Jiang, L. et al., "A planar ion trapping microdevice with integrated waveguides for optical detection", *Optics Express*, vol. 19, No. 4, pp. 3037-3043 (Feb. 2011).
Jonsson, "An empirical approach to finding energy efficient ADC architectures", *2011 International Workshop on ADC Modelling, Testing and Data Converter Analysis and Design and IEEE 2011 ADC Forum* Jun. 30-Jul. 1, 2011. Orvieto, Italy (2011).
Jouppi et al. "In-datacenter performance analysis of a tensor processing unit", *2017 ACM/IEEE 44th Annual International Symposium on Computer Architecture (ISCA)* (Jun. 24-28, 2017).
Kahn et al., "Communications expands its space", *Nature Photonics*, vol. 11, pp. 5-8 (Jan. 2017).
Kardar et al., "Dynamic Scaling of Growing Interfaces", *Physical Review Letters*, vol. 56, No. 9, pp. 889-892 (Mar. 3, 1986).
Karpathy, A., "CS231n: Convolutional Neural Networks for Visual Recognition", Class notes. Jan. 2018, http://cs231 n.github.io/. Accessed Oct. 31, 2018. 2 pages.
Keckler et al., "GPUs and the future of parallel computing", *IEEE Micro*, pp. 7-17 (2011).
Kieling, K. et al., "On photonic Controlled Phase Gates", *New Journal of Physics*, vol. 12, (2010), 9 pages.
Kilper et al., "Optical networks come of age", *Optics and Photonics News*, vol. 25, pp. 50-57, (Sep. 2014).
Kim et al., "A functional hybrid memristor crossbar-array/CMOS system for data storage and neuromorphic applications" *Nano Letters*, vol. 12, pp. 389-395 (2012).
Kirkpatrick et al., "Optimization by simulated annealing", *Science*, vol. 220, No. 4598, pp. 671-680 (May 13, 1983).
Knill et al., "The Bayesian brain: the role of uncertainty in neural coding and computation", *Trends in Neurosciences*, vol. 27, No. 12, pp. 712-719 (Dec. 2004).
Knill, E. et al., "A scheme for efficient quantum computation with linear optics", *Nature*, vol. 409, pp. 46-52 (Jan. 4, 2001).
Knill, E., "Quantum computing with realistically noisy devices", *Nature*, vol. 434, pp. 39-44 (Mar. 3, 2005).
Kok et al. "Linear optical quantum computing with photonic qubits", Reviews of Modern Physics, vol. 79, pp. 135-174 (2007).
Koos et al., "Silicon-organic hybrid (SOH) and plasmonic-organic hybrid (POH) integration", *Journal of Lightwave Technology*, vol. 34, No. 2, pp. 256-268 (2016).
Krizhevsky et al., "ImageNet classification with deep convolutional neural networks", *NIPS'12: Proceedings of the 25th International Conference on Neural Information Processing Systems*, pp. 1097-1105, (Dec. 2012).
Kucherenko, S. et al., "Application of Deterministic Low-Discrepancy Sequences in Global Optimization", *Computational Optimization and Applications*, vol. 30, pp. 297-318, (2005).
Kwack, M-J et al., "Monolithic InP strictly non-blocking 8×8 switch for high-speed WDM optical interconnection", *Optics Express*, vol. 20, No. 27, pp. 28734-28741, (Dec. 2012).
Lahini, Y. et al., "Anderson Localization and Nonlinearity in One Dimensional Disordered Photonic Lattices", *Physical Review Letters*, vol. 100, (Feb. 2008), 4 pages.
Lahini, Y. et al., "Quantum Correlations in Two-Particle Anderson Localization", *Physical Review Letters*, Phys. Rev. Lett. 105, pp. 163905-1-163905-4 (Oct. 15, 2010).
Laing, A. et al., "High-fidelity operation of quantum photonic circuits", *Applied Physics Letters*, vol. 97, No. 21, (Apr. 2010), 5 pages.
Landauer, "Irreversibility and heat generation in the computing process", *IBM Journal of Research and Development*, pp. 183-191, (Jul. 1961).
Lanyon, B. P. et al., "Towards quantum chemistry on a quantum computer", *Nature Chemistry*, vol. 2, pp. 106-111, (May 8, 2009).
Lawson et al., "Basic linear algebra subprograms for Fortran usage", *ACM Transactions on Mathematical Software*, vol. 5, No. 3, pp. 308-323, (Sep. 1979).
Lecun et al., "Deep learning", *Nature*, vol. 521, pp. 436-444, (May 2015).
Lecun et al., "Gradient-based learning applied to document recognition", *Proceedings of the IEEE*, vol. 86, No. 11, pp. 2278-2324 (Nov. 1998).
Levi, L. et al., "Hyper-transport of light and stochastic acceleration by evolving disorder", *Nature Physics*, vol. 8, pp. 912-917 (Dec. 2012).
Li et al., "Efficient and self-adaptive in-situ learning in multilayer memristor neural networks", *Nature Communications*, vol. 9, No. 1, (Jun. 2018), 8 pages.
Little, "The existence of persistent states in the brain", *Mathematical Biosciences*, vol. 19, Nos. 101-120, pp. 145-165 (1974).
Lu et al., "16×16 non-blocking silicon optical switch based on electro-optic Mach-Zehnder interferometers", *Optics Express*, vol. 24, No. 9, pp. 9295-9307, (2016).
Ma et al., "Optical switching technology comparison: optical MEMS vs. Other technologies", *IEEE Optical Communications*, vol. 41, No. 11, pp. S16-S23 (2003).
Macready et al., "Criticality and Parallelism in Combinatorial Optimization", *Science*, vol. 271, pp. 56-59, (Jan. 1996).
Marandi et al., "Network of time-multiplexed optical parametric oscillators as a coherent Ising machine", *Nature Photonics*, vol. 8, pp. 937-942 (Dec. 2014).
Martin-Lopez, E. et al., "Experimental realization of Shor's quantum factoring algorithm using qubit recycling", Nature Photonics, vol. 6, (Oct. 24, 2012), 7 pages.

(56) References Cited

OTHER PUBLICATIONS

McMahon et al., "A fully programmable 100-spin coherent Ising machine with all-to-all connections.," *Science*, vol. 354, Issue 6312, pp. 614-617, (Nov. 2016).
Mead, "Neuromorphic electronic systems", *Proceedings of the IEEE*, vol. 78, No. 10, pp. 1629-1636 (Oct. 1990).
Migdall, A. L. et al., "Tailoring single and multiphoton probabilities of a single photon on-demand source", *Physical Review A*, vol. 66, pp. 053805-1-053805-4 (2002).
Mikkelsen, J.C. et al., "Dimensional variation tolerant silicon-on-insulator directional couplers", *Optics Express*, vol. 22, No. 3, pp. 3145-3150 (2014).
Miller, "Are optical transistors the logical next step?", *Nature Photonics*, vol. 4, pp. 3-5 (2010).
Miller, "Attojoule optoelectronics for low-energy information processing and communications", *Journal of Lightwave Technology*, vol. 35, No. 3, pp. 346-396 (Feb. 2017).
Miller, D. A. B., "Perfect optics with imperfect components", *Optica*, vol. 2, No. 8, pp. 747-750 (Aug. 2015).
Miller, D. A. B., "Reconfigurable add-drop multiplexer for spatial modes", *Optics Express*, vol. 21, No. 17, pp. 20220-20229, (Aug. 2013).
Miller, D. A. B., "Self-aligning universal beam coupler", *Optics Express*, vol. 21, No. 5 (Aug. 2013), 6 pages.
Miller, D. A. B., "Self-configuring universal linear optical component [invited]", *Photonics Research*, vol. 1, No. 1, pp. 1-15 (Jun. 2013).
Miller, "Energy consumption in optical modulators for interconnects", *Optics Express*, vol. 20, No. S2, pp. A293-A308 (2012).
Misra et al., "Artificial neural networks in hardware: A survey of two decades of progress", *Neurocomputing*, vol. 74, pp. 239-255 (2010).
Mohseni, M. et al., "Environment-assisted quantum walks in energy transfer of photosynthetic complexes", *The Journal of Chemical Physics*, vol. 129, (2008), 8 pages.
Moore, "Cramming more components onto integrated circuits", *Proceedings of the IEEE*, vol. 86, No. 1, pp. 82-85 Jan. 1998).
Mower et al., "High-fidelity quantum state evolution in imperfect photonic integrated circuits", *Physical Review A*, vol. 92, No. 3, pp. 032322-1-032322-7 (2015).
Mower, J. et al., "Efficient generation of single and entangled photons on a silicon photonic integrated chip", *Physical Review A*, vol. 84, (2011), 8 pages.
Nagamatsu et al., "A 15 NS 32×32-bit CMOS multiplier with an improved parallel structure", *Custom Integrated Circuits Conference*, Proceedings of the IEEE 1989, (1989), 4 pages.
Najafi, F. et al., "On-Chip Detection of Entangled Photons by Scalable Integration of Single-Photon Detectors", *arXiv:1405.4244 [physics.optics]* (May 16, 2014), 27 pages.
Nozaki et al., "Sub-femtojoule all-optical switching using a photonic-crystal nanocavity", *Nature Photonics*, vol. 4, pp. 477-483 (2010).
O'Brien, J. L. et al., "Demonstration of an all-optical quantum controlled-NOT gate", Nature, vol. 426, (2003), 5 pages.
Onsager, "Crystal Statistics. I. A Two-Dimensional Model with an Order-Disorder Transition", *Physical Review*, vol. 65, Nos. 3 and 4, pp. 117-149 (Feb. 1944).
Orcutt, J. S. et al., "Nanophotonic integration in state-of-the-art CMOS foundries", *Optics Express*, vol. 19, No. 3, pp. 2335-2346 (2011).
Patel et al., "Silicon Photonic Segmented Modulator-Based Electro-Optic DAC for 100 GB/s PAM-4 Generation", *IEEE Photonics Technology Letters*, vol. 27, No. 23, pp. 2433-2436 (Dec. 1, 2015).
PCT International Preliminary Report on Patentability for International Application No. PCT/US2019/035403 dated Dec. 8, 2020, 10 pages.
PCT International Search Report and Written Opinion in PCT/US2018/041640 dated Nov. 7, 2018, 10 pages.
PCT International Search Report and Written Opinion dated Sep. 28, 2017 from International Application No. PCT/US2017/035668, 19 pages.

Pelissetto et al., "Critical phenomena and renormalization-group theory", *Physics Reports*, vol. 368, pp. 549-727, (2002).
Peng, "Implementation of AlexNet with Tensorflow", https://github.com/ykpengba/AlexNet-A-Practical-Implementation (2018), Accessed Dec. 3, 2018, 2 pages.
Peretto, "Collective properties of neural networks: A statistical physics approach", *Biological Cybernetics*, vol. 50, pp. 51-62 (1984).
Pernice, W. et al., "High-speed and high-efficiency travelling wave single-photon detectors embedded in nanophotonic circuits", *Nature Communications*, vol. 3, (2012), 23 pages.
Peruzzo, A., et al., "Quantum walk of correlated particles", *Science*, vol. 329, Issue 5998 (2010), 8 pages.
Politi, A. et al., "Integrated Quantum Photonics", *IEEE Journal of Selected Topics in Quantum Electronics*, vol. 5, Issue 6, (2009), 12 pages.
Politi, A. et al., "Silica-on-Silicon Waveguide Quantum Circuits", *Science*, vol. 320, (2008), 5 pages.
Poon et al., "Neuromorphic silicon neurons and large-scale neural networks: challenges and opportunities", *Frontiers in Neuroscience*, vol. 5, Article 108, 3 pages (2011).
Prucnal et al., "Recent progress in semiconductor excitable lasers for photonic spike processing", *Advances in Optics and Photonics*, vol. 8, No. 2, pp. 228-299 (Jun. 2016).
Psaltis et al., "Holography in artificial neural networks", *Nature*, vol. 343, pp. 325-330 (Jan. 1990).
Qiao et al., "16×16 non-blocking silicon electro-optic switch based on Mach Zehnder interferometers", *2016 Optical Fiber Communications Conference and Exhibition (OFC)*, (2016), 3 pages.
Ralph, T. C. et al., "Linear optical controlled-NOT gate in the coincidence basis", *Physical Review A*, vol. 65, pp. 062324-1-062324-5 (2002).
Ramanitra et al., "Scalable and multi-service passive optical access infrastructure using variable optical splitters", *Optical Fiber Communication Conference. Optical Society of America*, (2006), 3 pages.
Raussendorf, R. et al., "A one-way quantum computer", *Physical Review Letters*, vol. 86, No. 22, pp. 5188-5191 (2001).
Rechtsman et al., "Photonic floquet topological insulators", *Optical Society of America*, Technical Digest, 2 pages (2013).
Reck et al., "Experimental realization of any discrete unitary operator," *Physical Review Letters*, vol. 73, No. 1, pp. 58-61 (1994).
Reed, G. T. et al., "Silicon optical modulators", *Nature Photonics*, vol. 4, pp. 518-526 (2010).
Rendl et al., "Solving Max-Cut to optimality by intersecting semidefinite and polyhedral relaxations", *Mathematical Programming*, vol. 121, pp. 307-335, (2010).
Rios et al., "Integrated all-photonic non-volatile multilevel memory", *Nature Photonics*, vol. 9, pp. 725-732 (Nov. 2015).
Rogalski, "Progress in focal plane array technologies", *Progress in Quantum Electronics*, vol. 36, pp. 342-473 (2012).
Rohit, A. et al., "8×8 space and wavelength selective cross-connect for simultaneous dynamic multi-wavelength routing", *Optical Fiber Communication Conference/National Fiber Optic Engineers Conference 2013*, (2013), 3 pages.
Rosenblatt, "The perceptron: a probabilistic model for information storage and organization in the brain", *Psychological Review*, vol. 65, No. 6, (1958) 23 pages.
Russakovsky et al. "ImageNet Large Scale Visual Recognition Challenge", *International Journal of Computer Vision (IJCV)*, vol. 115, pp. 211-252 (2015).
Salandrino, A. et al., "Analysis of a three-core adiabatic directional coupler", *Optics Communications*, vol. 282, pp. 4524-4526 (2009).
Schaeff et al., "Scalable fiber integrated source for higher-dimensional path-entangled photonic quNits", *Optics Express*, vol. 20, No. 15 pp. 16145-16153 (2012).
Schell et al., "DAC-free Generation of M-QAM Signals with InP Segmented Mach-Zehnder Modulators", *Optical Fiber Communication Conference*, OSA Technical Digest (online) (Optical Society of America, 2017), paper W4G.4.
Schirmer et al., "Nonlinear mirror based on two-photon absorption", *Journal of Optical Society of America B*, vol. 14, Issue 11, pp. 2865-2868 (1997).

(56) References Cited

OTHER PUBLICATIONS

Schmidhuber, J., "Deep learning in neural networks: An overview", *Neural Networks*, vol. 61, pp. 85-117 (2015).
Schreiber, A. et al., "Decoherence and Disorder in Quantum Walks: From Ballistic Spread to Localization", *Physical Review Letters*, vol. 106, (2011), 5 pages.
Schwartz, T. et al., "Transport and Anderson localization in disordered two-dimensional photonic lattices", *Nature*, vol. 446, pp. 52-55 (Mar. 1, 2007).
Selden, "Pulse transmission through a saturable absorber", *British Journal of Applied Physics*, vol. 18, (1967) 7 pages.
Shafiee et al., "ISAAC: A convolutional neural network accelerator with in-situ analog arithmetic in crossbars," *2016 ACM/IEEE 43rd Annual International Symposium on Computer Architecture*, (2016) 13 pages.
Shoji, Y. et al., "Low-crosstalk 2×2 thermo-optic switch with silicon wire waveguides", *Optics Express*, vol. 18, No. 9, pp. 9071-9075, (Apr. 2010).
Silver et al. "Mastering chess and shogi by self-play with a general reinforcement learning algorithm", *arXiv preprint arXiv:1712.01815* (2017) 19 pages.
Silver et al., "Mastering the game of GO with deep neural networks and tree search", *Nature*, vol. 529, pp. 484-489 (2016).
Silverstone, J. et al., "On-chip quantum interference between silicon photon-pair sources", *Nature Photonics*, vol. 8, pp. 104-108 (2014).
Smith et al., "Phase-controlled integrated photonic quantum circuits", *Optics Express*, vol. 17, No. 16, pp. 13516-13525 (2009).
Soljacic et al., "Optimal bistable switching in nonlinear photonic crystals", *Physical Review E*, vol. 66, pp. 055601-1-055601-4 (2002).
Solli et al., "Analog optical computing", *Nature Photonics*, vol. 9, pp. 704-706 (Nov. 2015).
Spring, J. B. et al., "Boson sampling on a photonic chip", *Science*, vol. 339, (2013), 24 pages.
Srinivasan et al., "56 GB/s germanium waveguide electro-absorption modulator", *Journal of Lightwave Technology*, vol. 34, No. 2, pp. 419-424 (Jan. 15, 2016).
Steinkraus et al., "Using GPUs for machine learning algorithms", *Proceedings of the 2005 Eight International Conference on Document Analysis and Recognition (ICDAR'05)*, pp. 1115-1120 (2005).
Suda et al., "Quantum interference of photons in simple networks", *Quantum Information Processing*, vol. 12, pp. 1915-1945 (2013).
Sun et al., "Large-scale nanophotonic phased array", *Nature*, vol. 493, pp. 195-199 (2013).
Sun et al., "Single-chip microprocessor that communicates directly using light", *Nature*, vol. 528, pp. 534-538 (2015).
Suzuki, K. et al., "Ultra-compact 8×8 strictly-non-blocking Si-wire PILOSS switch", *Optics Express*, vol. 22, No. 4, pp. 3887-3894 (2014).
Sze et al., "Efficient processing of deep neural networks: A tutorial and survey", *Proceedings of the IEEE*, vol. 105, No. 12, pp. 2295-2329 (2017).
Tabia, "Experimental scheme for qubit and qutrit symmetric informationally complete positive operator-valued measurements using multiport devices", *Physical Review A*, vol. 86, pp. 062107-1-062107-8 (2012).
Tait et al., "Broadcast and weight: An integrated network for scalable photonic spike processing", *Journal of Lightwave Technology*, vol. 32, No. 21, pp. 3427-3439, (2014).
Tait et al., "Photonic Neuromorphic Signal Processing and Computing", *Nanophotonic Information Physics*, pp. 183-222, Springer, Berlin, Heidelberg, (2014).
Tait et al., "Neuromorphic photonic networks using silicon photonic weight banks", *Scientific Reports*, vol. 7, Article No. 7430 (2017), 10 pages.
Tanabe et al., "Fast bistable all-optical switch and memory on a silicon photonic crystal on-chip", *Optics Letters*, vol. 30, No. 19, pp. 2575-2577 (Oct. 1, 2005).
Tanizawa, K. et al., "Ultra-compact 32×32 strictly-non-blocking Si-wire optical switch with fan-out LGA interposer", *Optics Express*, vol. 23, No. 13, pp. 17599-17606 (2015).
Thompson, M. G. et al., "Integrated waveguide circuits for optical quantum computing", *IET Circuits, Devices & Systems*, vol. 5, Issue 2, pp. 94-102 (2011).
Timurdogan et al., "An ultralow power athermal silicon modulator", *Nature Communications 5*, Article No. 4008 (2014) 11 pages.
Taiwan Office Action for Taiwan Application No. TW 109109209, dated Mar. 4, 2021, 9 pages (With English Translation).
Vandoorne et al., "Experimental demonstration of reservoir computing on a silicon photonics chip", *Nature Communications*, vol. 5, (2014) 6 pages.
Vazquez et al., "Optical NP problem solver on laser-written waveguide platform", *Optics Express*, vol. 26, No. 2, pp. 702-710 (Jan. 2018).
Vivien et al., "Zero-bias 40Gbit/s germanium waveguide photodetector on silicon", *Optics Express*, vol. 20, No. 2, pp. 1096-1101 (2012).
Wang et al., "Coherent Ising machine based on degenerate optical parametric oscillators" *Physical Review A*, vol. 88, pp. 063853-1-063853-9 (2013).
Wang et al., "Deep learning for identifying metastatic breast cancer", *arXiv:1606.05718* (2016) 6 pages.
Werbos, "Beyond regression: New tools for prediction and analysis in the behavioral sciences", *Ph.D. dissertation, Harvard University* (1974) 454 pages.
Whitfield, J. D. et al., "Simulation of electronic structure Hamiltonians using quantum computers", *Molecular Physics*, vol. 109, pp. 735-750 (2010).
Wu et al., "A 20Gb/s NRZ/PAM-4 1V Transmitter in 40nm CMOS Driving a Si-Photonic Modulator in 0.13 µm CMOS", *IEEE International Solid-State Circuits Conference*, Session 7, Optical Transceivers and Silicon Photonics, 7.7, pp. 128-130 (2013).
Wu et al., "An optical fiber network oracle for NP-complete problems", *Light: Science & Applications*, vol. 3, (2014).
Xia, F., et al., "Mode conversion losses in silicon-on-insulator photonic wire based racetrack resonators", *Optics Express*, vol. 14, No. 9, pp. 3872-3886 (2006).
Xu et al., "Experimental observations of bistability and instability in a two-dimensional nonlinear optical superlattice", *Physical Review Letters*, vol. 71, No. 24, pp. 3959-3962 (Dec. 13, 1993).
Yang, M. et al., "Non-Blocking 4×4 Electro-Optic Silicon Switch for On-Chip Photonic Networks", *Optics Express*, vol. 19, No. 1, pp. 47-54 (2010).
Yao et al., "Serial-parallel multipliers", *Signals, Systems and Computers*, Conference Record of The Twenty-Seventh Asilomar Conference, pp. 359-363 (1993).
Young et al., "Recent trends in deep learning based natural language processing", *IEEE Computational Intelligence Magazine*, pp. 55-75 (Aug. 2018).
Zhou, X.-Q., et al., "Calculating Unknown Eigenvalues with a Quantum Algorithm", *Nature Photonics 7*, pp. 223-228 (2013).

\* cited by examiner $$\vec{V} = \begin{bmatrix} V_0 \\ V_1 \\ V_2 \\ V_3 \end{bmatrix} \qquad U = \begin{bmatrix} U_{00} & U_{01} & U_{02} & U_{03} \\ U_{10} & U_{11} & U_{12} & U_{13} \\ U_{20} & U_{21} & U_{22} & U_{23} \\ U_{30} & U_{31} & U_{32} & U_{33} \end{bmatrix}$$

$$\vec{V} = 2^0 \overbrace{\begin{bmatrix} V_{0,bit0} \\ V_{1,bit0} \\ V_{2,bit0} \\ V_{3,bit0} \end{bmatrix}}^{\vec{V}_{bit0}} + 2^1 \overbrace{\begin{bmatrix} V_{0,bit1} \\ V_{1,bit1} \\ V_{2,bit1} \\ V_{3,bit1} \end{bmatrix}}^{\vec{V}_{bit1}} + 2^2 \overbrace{\begin{bmatrix} V_{0,bit2} \\ V_{1,bit2} \\ V_{2,bit2} \\ V_{3,bit2} \end{bmatrix}}^{\vec{V}_{bit2}} + 2^3 \overbrace{\begin{bmatrix} V_{0,bit3} \\ V_{1,bit3} \\ V_{2,bit3} \\ V_{3,bit3} \end{bmatrix}}^{\vec{V}_{bit3}}$$

$$U \cdot \vec{V} = 2^0 \, U \cdot \vec{V}_{bit0} + 2^1 \, U \cdot \vec{V}_{bit1} + 2^2 \, U \cdot \vec{V}_{bit2} + 2^3 \, U \cdot \vec{V}_{bit3}$$

FIG. 4B

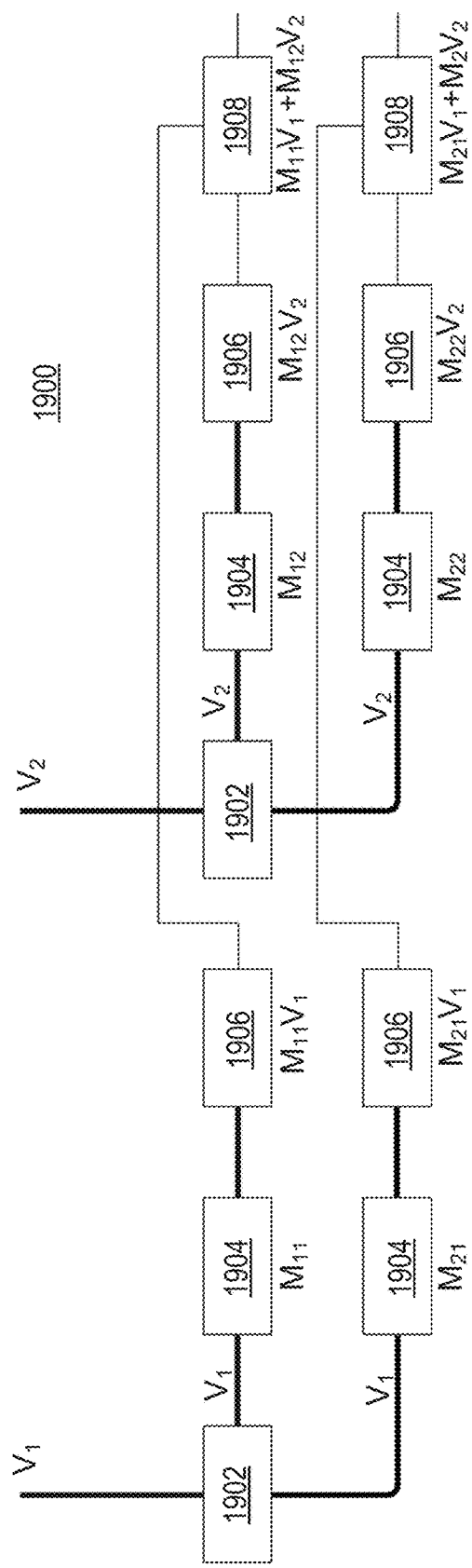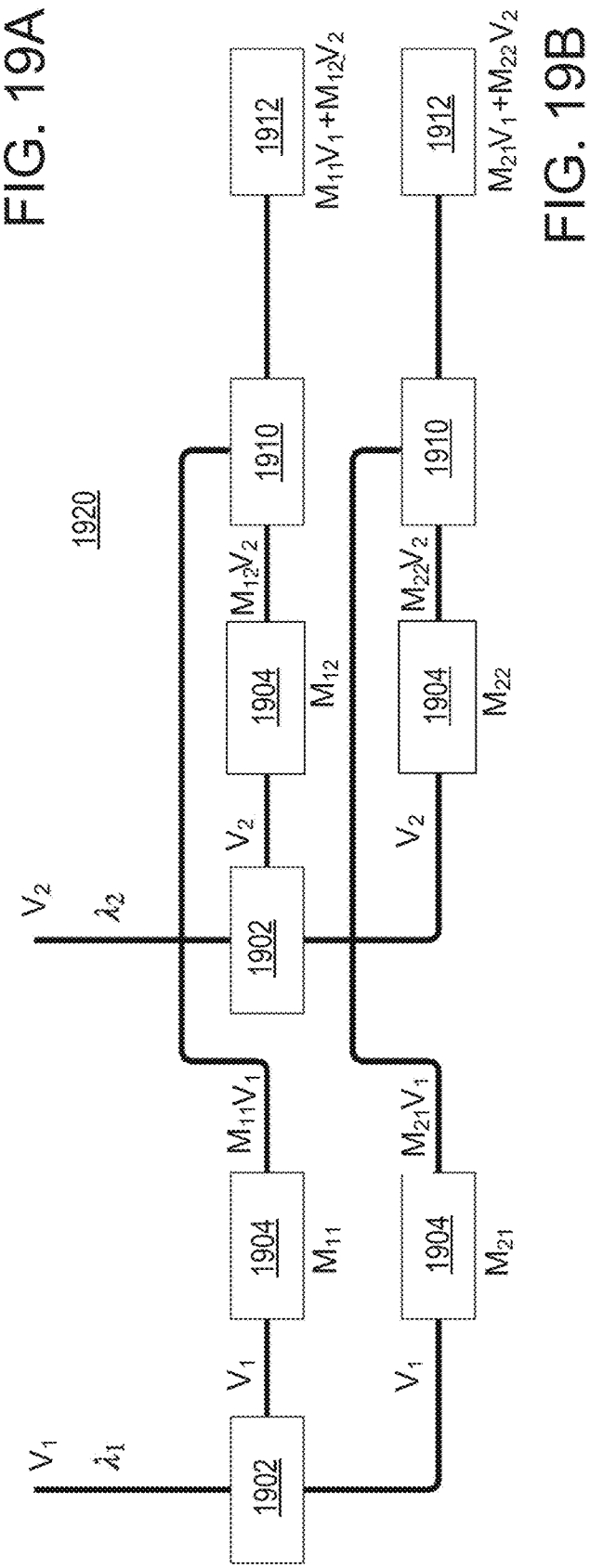

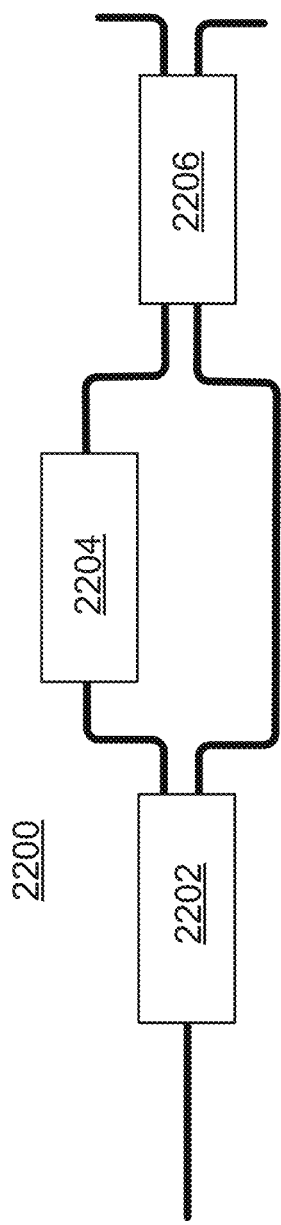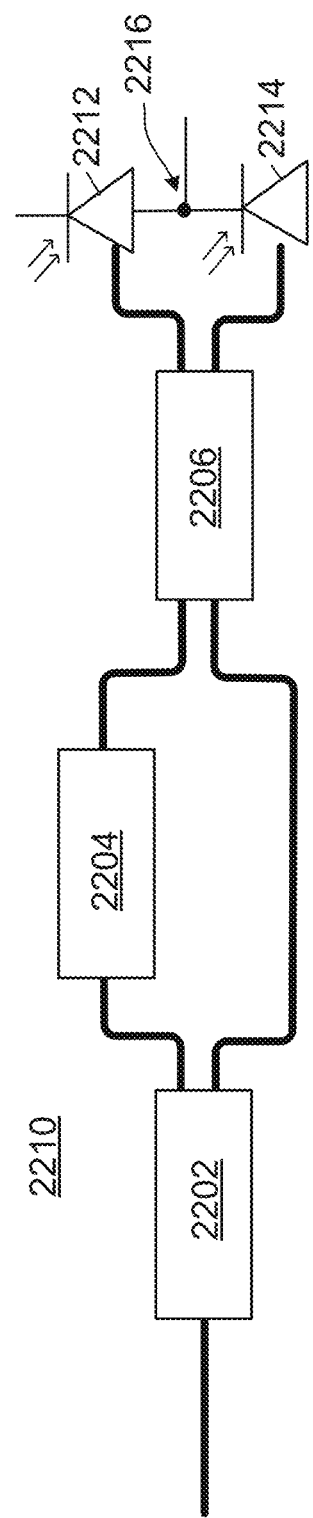

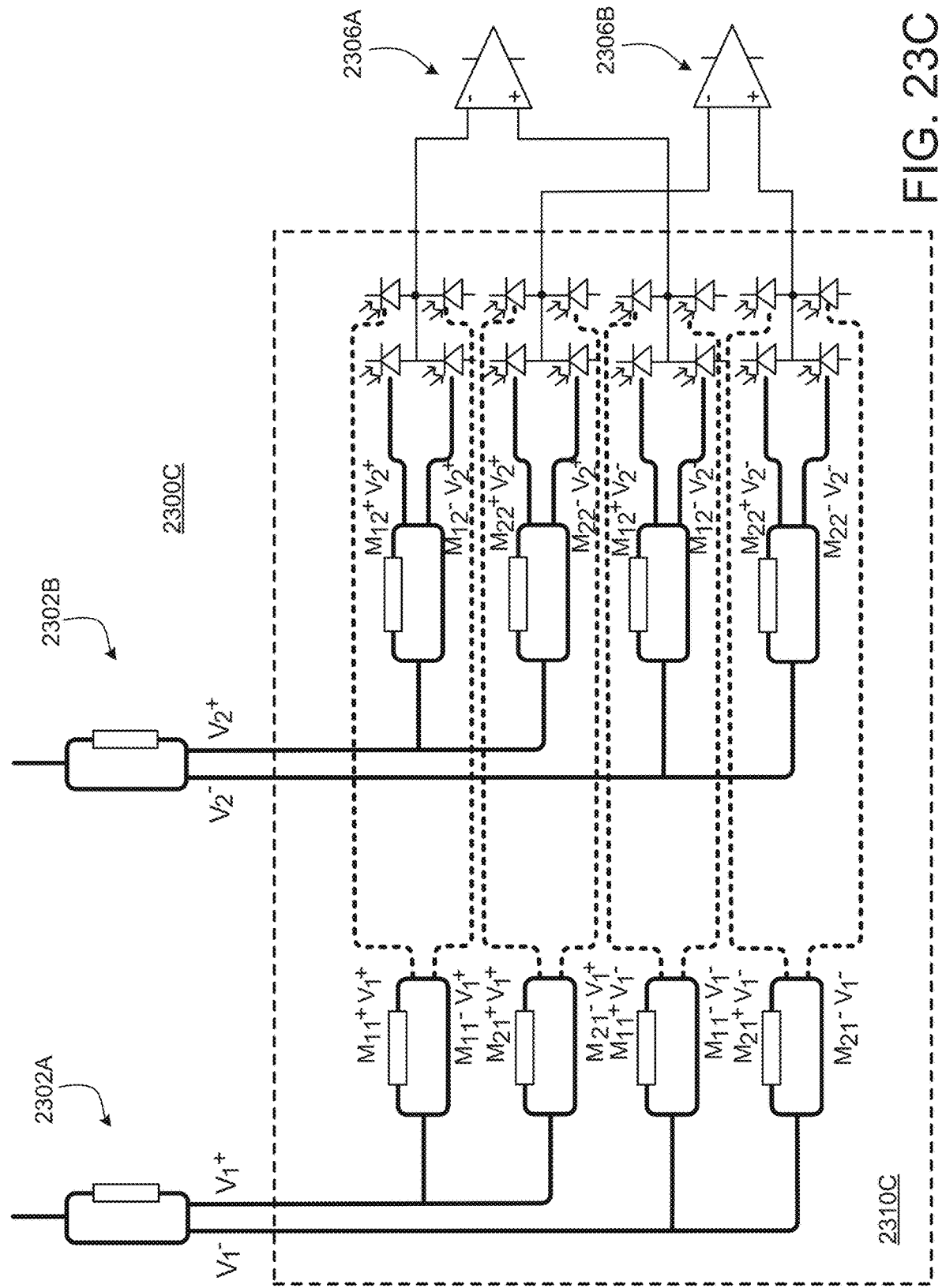

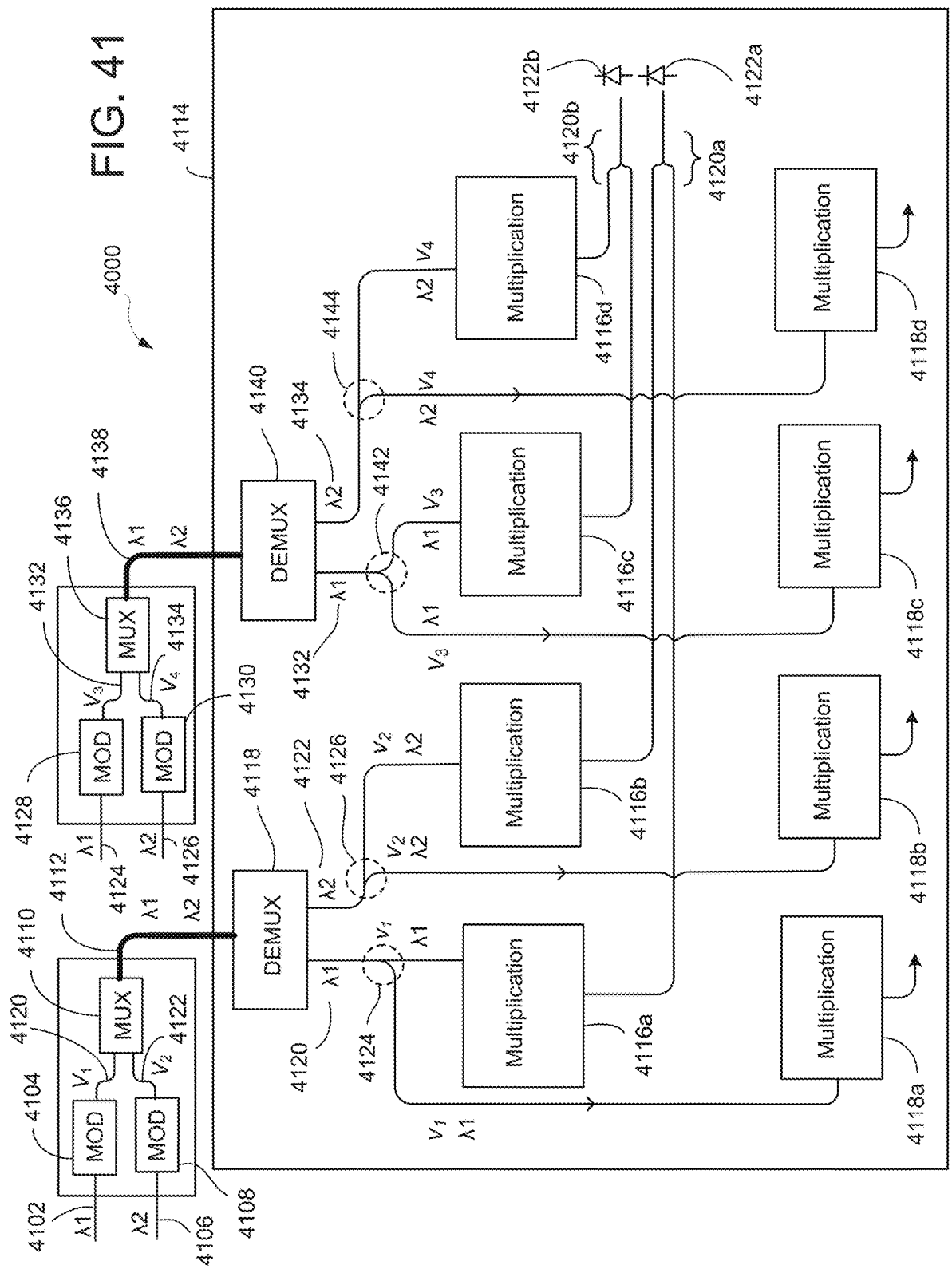

OPTOELECTRONIC COMPUTING SYSTEMS

CROSS-REFERENCE TO RELATED APPLICATIONS

This application is a continuation of and claims priority under 35 U.S.C. § 120 from U.S. application Ser. No. 16/431,167, filed on Jun. 4, 2019, which claims priority to U.S. Provisional Application No. 62/680,944, filed on Jun. 5, 2018, U.S. Provisional Application No. 62/744,706, filed on Oct. 12, 2018, U.S. Provisional Application No. 62/792,144, filed on Jan. 14, 2019, and U.S. Provisional Application No. 62/820,562, filed on Mar. 19, 2019. The entire disclosures of the above applications are hereby incorporated by reference.

TECHNICAL FIELD

This disclosure relates to optoelectronic computing systems.

BACKGROUND

Neuromorphic computing is an approach of approximating the operation of a brain in the electronic domain. A prominent approach to neuromorphic computing is an artificial neural network (ANN), which is a collection of artificial neurons that are interconnected in specific ways to process information in a way similar to how a brain functions. ANNs have found uses in a wide range of applications including artificial intelligence, speech recognition, text recognition, natural language processing, and various forms of pattern recognition.

An ANN has an input layer, one or more hidden layers, and an output layer. Each of the layers have nodes, or artificial neurons, and the nodes are interconnected between the layers. Each node of the hidden layers performs a weighted sum of the signals received from nodes of a previous layer, and performs a nonlinear transformation ("activation") of the weighted sum to generate an output. The weighted sum can be calculated by performing a matrix multiplication step. As such, computing an ANN typically involves multiple matrix multiplication steps, which are typically performed using electronic integrated circuits.

Computation performed on electronic data, encoded in analog or digital form on electrical signals (e.g., voltage or current), is typically implemented using electronic computing hardware, such as analog or digital electronics implemented in integrated circuits (e.g., a processor, application-specific integrated circuit (ASIC), or a system on a chip (SoC)), electronic circuit boards, or other electronic circuitry. Optical signals have been used for transporting data, over long distances, and over shorter distances (e.g., within data centers). Operations performed on such optical signals often take place in the context of optical data transport, such as within devices that are used for switching or filtering optical signals in a network. Use of optical signals in computing platforms has been more limited. Various components and systems for all-optical computing have been proposed. Such systems may include conversion from and to electrical signals at the input and output, respectively, but may not use both types of signals (electrical and optical) for significant operations that are performed in computations.

SUMMARY

In general, in a first aspect, a system includes: a memory unit configured to store a dataset and a plurality of neural network weights; a digital-to-analog converter (DAC) unit configured to generate a plurality of modulator control signals and to generate a plurality of weight control signals; an optical processor including: a laser unit configured to generate a plurality of light outputs; a plurality of optical modulators coupled to the laser unit and the DAC unit, the plurality of optical modulators being configured to generate an optical input vector by modulating the plurality of light outputs generated by the laser unit based on the plurality of modulator control signals; an optical matrix multiplication unit coupled to the plurality of optical modulators and the DAC unit, the optical matrix multiplication unit being configured to transform the optical input vector into an optical output vector based on the plurality of weight control signals; and a photodetection unit coupled to the optical matrix multiplication unit and configured to generate a plurality of output voltages corresponding to the optical output vector; an analog-to-digital conversion (ADC) unit coupled to the photodetection unit and configured to convert the plurality of output voltages into a plurality of digitized optical outputs; a controller including integrated circuitry configured to perform operations including: receiving, from a computer, an artificial neural network computation request including an input dataset and a first plurality of neural network weights, wherein the input dataset includes a first digital input vector; storing, in the memory unit, the input dataset and the first plurality of neural network weights; and generating, through the DAC unit, a first plurality of modulator control signals based on the first digital input vector and a first plurality of weight control signals based on the first plurality of neural network weights.

Embodiments of the system can include one or more of the following features. For example, the operations can further include: obtaining, from the ADC unit, a first plurality of digitized optical outputs corresponding to the optical output vector of the optical matrix multiplication unit, the first plurality of digitized optical outputs forming a first digital output vector; performing a nonlinear transformation on the first digital output vector to generate a first transformed digital output vector; and storing, in the memory unit, the first transformed digital output vector.

The system can have a first loop period defined as a time elapsed between the step of storing, in the memory unit, the input dataset and the first plurality of neural network weights, and the step of storing, in the memory unit, the first transformed digital output vector. The first loop period can be less than or equal to 1 ns.

In some implementations, operations can further include: outputting an artificial neural network output generated based on the first transformed digital output vector.

In some implementations, the operations can further include: generating, through the DAC unit, a second plurality of modulator control signals based on the first transformed digital output vector.

In some implementations, the artificial neural network computation request can further include a second plurality of neural network weights, and the operations can further include: based on the obtaining of the first plurality of digitized optical outputs, generating, through the DAC unit, a second plurality of weight control signals based on the second plurality of neural network weights. The first and second pluralities of neural network weights can correspond to different layers of an artificial neural network.

In some implementations, the input dataset can further include a second digital input vector, and the operations can further include: generating, through the DAC unit, a second plurality of modulator control signals based on the second digital input vector; obtaining, from the ADC unit, a second plurality of digitized optical outputs corresponding to the optical output vector of the optical matrix multiplication unit, the second plurality of digitized optical outputs forming a second digital output vector; performing a nonlinear transformation on the second digital output vector to generate a second transformed digital output vector; storing, in the memory unit, the second transformed digital output vector; and outputting an artificial neural network output generated based on the first transformed digital output vector and the second transformed digital output vector. The optical output vector of the optical matrix multiplication unit results from a second optical input vector generated based on the second plurality of modulator control signals that is transformed by the optical matrix multiplication unit based on the first-mentioned plurality of weight control signals.

In some implementations, the system can further include: an analog nonlinearity unit arranged between the photodetection unit and the ADC unit, the analog nonlinearity unit being configured to receive the plurality of output voltages from the photodetection unit, apply a nonlinear transfer function, and output a plurality of transformed output voltages to the ADC unit, and the operations further include: obtaining, from the ADC unit, a first plurality of transformed digitized output voltages corresponding to the plurality of transformed output voltages, first plurality of transformed digitized output voltages forming a first transformed digital output vector; and storing, in the memory unit, the first transformed digital output vector.

In some implementations, the integrated circuitry of the controller can be configured to generate the first plurality of modulator control signals at a rate greater than or equal to 8 GHz.

In some implementations, the system can further include: an analog memory unit arranged between the DAC unit and the plurality of optical modulators, the analog memory unit being configured to store analog voltages and to output the stored analog voltages; and an analog nonlinearity unit arranged between the photodetection unit and the ADC unit, the analog nonlinearity unit being configured to receive the plurality of output voltages from the photodetection unit, apply a nonlinear transfer function, and output a plurality of transformed output voltages. The analog memory unit can include a plurality of capacitors.

In some implementations, the analog memory unit can be configured to receive and store the plurality of transformed output voltages of the analog nonlinearity unit, and to output the stored plurality of transformed output voltages to the plurality of optical modulators, and the operations can further include: based on generating the first plurality of modulator control signals and the first plurality of weight control signals, storing, in the analog memory unit, the plurality of transformed output voltages of the analog nonlinearity unit; outputting, through the analog memory unit, the stored transformed output voltages; obtaining, from the ADC unit, a second plurality of transformed digitized output voltages, the second plurality of transformed digitized output voltages forming a second transformed digital output vector; and storing, in the memory unit, the second transformed digital output vector.

In some implementations, the input dataset of the artificial neural network computation request can include a plurality of digital input vectors. The laser unit can be configured to generate a plurality of wavelengths. The plurality of optical modulators can include: banks of optical modulators configured to generate a plurality of optical input vectors, each of the banks corresponding to one of the plurality of wavelengths and generating a respective optical input vector having a respective wavelength; and an optical multiplexer configured to combine the plurality of optical input vectors into a combined optical input vector including the plurality of wavelengths. The photodetection unit can be further configured to demultiplex the plurality of wavelengths and to generate a plurality of demultiplexed output voltages. The operations can include: obtaining, from the ADC unit, a plurality of digitized demultiplexed optical outputs, the plurality of digitized demultiplexed optical outputs forming a plurality of first digital output vectors, wherein each of the plurality of first digital output vectors corresponds to one of the plurality of wavelengths; performing a nonlinear transformation on each of the plurality of first digital output vectors to generate a plurality of transformed first digital output vectors; and storing, in the memory unit, the plurality of transformed first digital output vectors. Each of the plurality of digital input vectors can correspond to one of the plurality of optical input vectors.

In some implementations, the artificial neural network computation request can include a plurality of digital input vectors. The laser unit can be configured to generate a plurality of wavelengths. The plurality of optical modulators can include: banks of optical modulators configured to generate a plurality of optical input vectors, each of the banks corresponding to one of the plurality of wavelengths and generating a respective optical input vector having a respective wavelength; and an optical multiplexer configured to combine the plurality of optical input vectors into a combined optical input vector including the plurality of wavelengths. The operations can include: obtaining, from the ADC unit, a first plurality of digitized optical outputs corresponding to the optical output vector including the plurality of wavelengths, the first plurality of digitized optical outputs forming a first digital output vector; performing a nonlinear transformation on the first digital output vector to generate a first transformed digital output vector; and storing, in the memory unit, the first transformed digital output vector.

In some implementations, the DAC unit can include: a 1-bit DAC subunit configured to generate a plurality of 1-bit modulator control signals. A resolution of the ADC unit can be 1 bit. A resolution of the first digital input vector can be N bits. The operations can include: decomposing the first digital input vector into N 1-bit input vectors, each of the N 1-bit input vectors corresponding to one of the N bits of the first digital input vector; generating, through the 1-bit DAC subunit, a sequence of N 1-bit modulator control signals corresponding to the N 1-bit input vectors; obtaining, from the ADC unit, a sequence of N digitized 1-bit optical outputs corresponding to the sequence of the N 1-bit modulator control signals; constructing an N-bit digital output vector from the sequence of the N digitized 1-bit optical outputs; performing a nonlinear transformation on the constructed N-bit digital output vector to generate a transformed N-bit digital output vector; and storing, in the memory unit, the transformed N-bit digital output vector.

In some implementations, the memory unit can include: a digital input vector memory configured to store the digital input vector and including at least one SRAM; and a neural network weights memory configured to store the plurality of neural network weights and including at least one DRAM.

In some implementations, the DAC unit can include: a first DAC subunit configured to generate the plurality of modulator control signals; and a second DAC subunit configured to generate the plurality of weight control signals, wherein the first and second DAC subunits are different.

In some implementations, the laser unit can include: a laser source configured to generate light; and an optical power splitter configured to split the light generated by the laser source into the plurality of light outputs, wherein each of the plurality of light outputs have substantially equal powers.

In some implementations, the plurality of optical modulators can include one of MZI modulators, ring resonator modulators, or electro-absorption modulators.

In some implementations, the photodetection unit can include: a plurality of photodetectors; and a plurality of amplifiers configured to convert photocurrents generated by the photodetectors into the plurality of output voltages.

In some implementations, the integrated circuitry can be an application specific integrated circuit.

In some implementations, the optical matrix multiplication unit can include: an array of input waveguides to receive the optical input vector; an optical interference unit, in optical communication with the array of input waveguides, to perform a linear transformation of the optical input vector into a second array of optical signals; and an array of output waveguides, in optical communication with the optical interference unit, to guide the second array of optical signals, wherein at least one input waveguide in the array of input waveguides is in optical communication with each output waveguide in the array of output waveguides via the optical interference unit.

In some implementations, the optical interference unit can include: a plurality of interconnected Mach-Zehnder interferometers (MZIs), each MZI in the plurality of interconnected MZIs including: a first phase shifter configured to change a splitting ratio of the MZI; and a second phase shifter configured to shift a phase of one output of the MZI, wherein the first phase shifters and the second phase shifters are coupled to the plurality of weight control signals.

In another aspect, a system includes: a memory unit configured to store a dataset and a plurality of neural network weights; a driver unit configured to generate a plurality of modulator control signals and to generate a plurality of weight control signals; an optical processor including: a laser unit configured to generate a plurality of light outputs; a plurality of optical modulators coupled to the laser unit and the driver unit, the plurality of optical modulators being configured to generate an optical input vector by modulating the plurality of light outputs generated by the laser unit based on the plurality of modulator control signals; an optical matrix multiplication unit coupled to the plurality of optical modulators and the driver unit, the optical matrix multiplication unit being configured to transform the optical input vector into an optical output vector based on the plurality of weight control signals; and a photodetection unit coupled to the optical matrix multiplication unit and configured to generate a plurality of output voltages corresponding to the optical output vector; a comparator unit coupled to the photodetection unit and configured to convert the plurality of output voltages into a plurality of digitized 1-bit optical outputs; and a controller including integrated circuitry configured to perform operations including: receiving, from a computer, an artificial neural network computation request including an input dataset and a first plurality of neural network weights, wherein the input dataset includes a first digital input vector having a resolution of N bits; storing, in the memory unit, the input dataset and the first plurality of neural network weights; decomposing the first digital input vector into N 1-bit input vectors, each of the N 1-bit input vectors corresponding to one of the N bits of the first digital input vector; generating, through the driver unit, a sequence of N 1-bit modulator control signals corresponding to the N 1-bit input vectors; obtaining, from the comparator unit, a sequence of N digitized 1-bit optical outputs corresponding to the sequence of the N 1-bit modulator control signals; constructing an N-bit digital output vector from the sequence of the N digitized 1-bit optical outputs; performing a nonlinear transformation on the constructed N-bit digital output vector to generate a transformed N-bit digital output vector; and storing, in the memory unit, the transformed N-bit digital output vector.

In another aspect, a method for performing artificial neural network computations in a system having an optical matrix multiplication unit configured to transform an optical input vector into an optical output vector based on a plurality of weight control signals include: receiving, from a computer, an artificial neural network computation request including an input dataset and a first plurality of neural network weights, wherein the input dataset includes a first digital input vector; storing, in a memory unit, the input dataset and the first plurality of neural network weights; generating, through a digital-to-analog converter (DAC) unit, a first plurality of modulator control signals based on the first digital input vector and a first plurality of weight control signals based on the first plurality of neural network weights; obtaining, from an analog-to-digital conversion (ADC) unit, a first plurality of digitized optical outputs corresponding to an optical output vector of the optical matrix multiplication unit, the first plurality of digitized optical outputs forming a first digital output vector; performing, by a controller, a nonlinear transformation on the first digital output vector to generate a first transformed digital output vector; storing, in the memory unit, the first transformed digital output vector; and outputting, by the controller, an artificial neural network output generated based on the first transformed digital output vector.

In another aspect, a method includes: providing input information in an electronic format; converting at least a part of the electronic input information into an optical input vector; optically transforming the optical input vector into an optical output vector based on an optical matrix multiplication; converting the optical output vector into an electronic format; and electronically applying a non-linear transformation to the electronically converted optical output vector to provide output information in an electronic format.

Embodiments of the method can include one or more of the following features. For example, the method can further include: repeating the electronic-to-optical converting, the optical transforming, the optical-to-electronic converting, and the electronically applied non-linear transforming with respect to new electronic input information corresponding to the provided output information in electronic format.

In some implementations, the optical matrix multiplication for the initial optical transforming and the optical matrix multiplication of the repeated optical transforming can be the same and can correspond to the same layer of an artificial neural network.

In some implementations, the optical matrix multiplication for the initial optical transforming and the optical matrix multiplication of the repeated optical transforming can be different and can correspond to different layers of an artificial neural network.

In some implementations, the method can further include: repeating the electronic-to-optical converting, the optical transforming, the optical-to-electronic converting, and the electronically applied non-linear transforming with respect to a different part of the electronic input information, wherein the optical matrix multiplication for the initial optical transforming and the optical matrix multiplication of the repeated optical transforming are the same and correspond to a first layer of an artificial neural network.

In some implementations, the method can further include: providing intermediate information in an electronic format based on the electronic output information produced for the multiple parts of the electronic input information by the first layer of the artificial neural network; and repeating the electronic-to-optical converting, the optical transforming, the optical-to-electronic converting, and the electronically applied non-linear transforming with respect to each of different parts of the electronic intermediate information, wherein the optical matrix multiplication for the initial optical transforming and the optical matrix multiplication of the repeated optical transforming related to the different parts of the electronic intermediate information are the same and correspond to a second layer of the artificial neural network.

In another aspect, a system includes: an optical processor including passive diffractive optical elements, in which the passive diffractive optical elements are configured to transform an optical input vector or matrix to an optical output vector or matrix that represents a result of a matrix processing applied to the optical input vector or matrix and a predetermined vector defined by the arrangement of the diffractive optical elements.

Embodiments of the system can include one or more of the following features. For example, the matrix processing can include a matrix multiplication between the optical input vector or matrix and the predetermined vector defined by the arrangement of the diffractive optical elements.

In some implementations, the optical processor can include an optical matrix processing unit that includes: an array of input waveguides to receive the optical input vector, an optical interference unit comprising the passive diffractive optical elements, in which the optical interference unit is in optical communication with the array of input waveguides and configured to perform a linear transformation of the optical input vector into a second array of optical signals; and an array of output waveguides, in optical communication with the optical interference unit, to guide the second array of optical signals, wherein at least one input waveguide in the array of input waveguides is in optical communication with each output waveguide in the array of output waveguides via the optical interference unit.

In some implementations, the optical interference unit can include a substrate having at least one of holes or stripes, the holes have dimensions in a range from 100 nm to 10 µm, and the widths of the stripes are in a range from 100 nm to 10 µm.

In some implementations, the optical interference unit can include a substrate having the passive diffractive optical elements that are arranged in a two-dimensional configuration, and the substrate comprises at least one of a planar substrate or a curved substrate.

In some implementations, the substrate can include a planar substrate that is parallel to a direction of light propagation from the array of input waveguides to the array of output waveguides.

In some implementations, the optical processor can include an optical matrix processing unit that includes: a matrix of input waveguides to receive the optical input matrix, an optical interference unit comprising the passive diffractive optical elements, in which the optical interference unit is in optical communication with the matrix of input waveguides and configured to perform a linear transformation of the optical input matrix into a second matrix of optical signals; and a matrix of output waveguides, in optical communication with the optical interference unit, to guide the second matrix of optical signals, wherein at least one input waveguide in the matrix of input waveguides is in optical communication with each output waveguide in the matrix of output waveguides via the optical interference unit.

In some implementations, the optical interference unit can include a substrate having at least one of holes or stripes, the holes have dimensions in a range from 100 nm to 10 µm, and the widths of the stripes are in a range from 100 nm to 10 µm.

In some implementations, the optical interference unit can include a substrate having the passive diffractive optical elements that are arranged in a three-dimensional configuration.

In some implementations, the substrate can have the shape of at least one of a cube, a column, a prism, or an irregular volume.

In some implementations, the optical processor can include an optical interference unit that includes a hologram that has the passive diffractive optical elements, the optical processor is configured to receive modulated light representing the optical input matrix and continuously transform the light as the light passes through the hologram until the light emerges from the hologram as the optical output matrix.

In some implementations, the optical interference unit can include a substrate having the passive diffractive optical elements, and the substrate comprises at least one of silicon, silicon oxide, silicon nitride, quartz, lithium niobate, a phase-change material, or a polymer.

In some implementations, the optical interference unit can include a substrate having the passive diffractive optical elements, and the substrate comprises at least one of a glass substrate or an acrylic substrate.

In some implementations, the passive diffractive optical elements can be partly formed by dopants.

In some implementations, the matrix processing can represent processing of input data represented by the optical input vector by a neural network.

In some implementations, the optical processor can include: a laser unit configured to generate a plurality of light outputs, a plurality of optical modulators coupled to the laser unit and configured to generate the optical input vector by modulating the plurality of light outputs generated by the laser unit based on a plurality of modulator control signals, an optical matrix processing unit coupled to the plurality of optical modulators, the optical matrix processing unit comprising passive diffractive optical elements that are configured to transform the optical input vector into an optical output vector based on a plurality of weights defined by the passive diffractive optical elements; and a photodetection unit coupled to the optical matrix processing unit and configured to generate a plurality of output electric signals corresponding to the optical output vector.

In some implementations, the passive diffractive optical elements can be arranged in a three-dimensional configuration, the plurality of optical modulators comprise a two-dimensional array of optical modulators, and the photodetection unit comprises a two-dimensional array of photodetectors.

In some implementations, the optical matrix processing unit can include a housing module to support and protect the array of input waveguides, the optical interference unit, and the array of output waveguides, and the optical processor comprises a receiving module configured to receive the optical matrix processing unit, the receiving module comprising a first interface to enable the optical matrix processing unit to receive the optical input vector from the plurality of optical modulators, and a second interface to enable the optical matrix processing unit to transmit the optical output vector to the photodetection unit.

In some implementations, the plurality of output electric signals can include at least one of a plurality of voltage signals or a plurality of current signals.

In some implementations, the system can include: a memory unit; a digital-to-analog converter (DAC) unit configured to generate the plurality of modulator control signals; an analog-to-digital conversion (ADC) unit coupled to the photodetection unit and configured to convert the plurality of output electric signals into a plurality of digitized outputs; and a controller including integrated circuitry configured to perform operations including: receiving, from a computer, an artificial neural network computation request comprising an input dataset, in which the input dataset comprises a first digital input vector; storing, in the memory unit, the input dataset; and generating, through the DAC unit, a first plurality of modulator control signals based on the first digital input vector.

In another aspect, a method includes: 3D printing an optical matrix processing unit comprising passive diffractive optical elements, in which the passive diffractive optical elements are configured to transform an optical input vector or matrix to an optical output vector or matrix that represents a result of a matrix processing applied to an optical input vector or matrix and a predetermined vector defined by the arrangement of the diffractive optical elements.

In another aspect, a method include: generating, using one or more laser beams, a hologram comprising passive diffractive optical elements, in which the passive diffractive optical elements are configured to transform an optical input vector or matrix to an optical output vector or matrix that represents a result of a matrix processing applied to an optical input vector or matrix and a predetermined vector defined by the arrangement of the diffractive optical elements.

In another aspect, a system includes: an optical processor comprising passive diffractive optical elements arranged in a one-dimensional manner, in which the passive diffractive optical elements are configured to transform an optical input to an optical output that represents a result of a matrix processing applied to the optical input and a predetermined vector defined by the arrangement of the diffractive optical elements.

Implementations of the system can include one or more of the following features. For example, the matrix processing can include a matrix multiplication between the optical input and the predetermined vector defined by the arrangement of the diffractive optical elements.

In some implementations, the optical processor can include an optical matrix processing unit that includes: an input waveguide to receive the optical input, an optical interference unit comprising the passive diffractive optical elements, in which the optical interference unit is in optical communication with the input waveguide and configured to perform a linear transformation of the optical input; and an output waveguide, in optical communication with the optical interference unit, to guide the optical output.

In some implementations, the optical interference unit can include a substrate having at least one of holes or gratings, and the holes or grating elements can have dimensions in a range from 100 nm to 10 µm.

In another aspect, a system includes: a memory unit; a digital-to-analog converter (DAC) unit configured to generate a plurality of modulator control signals; and an optical processor including: a laser unit configured to generate a plurality of light outputs; a plurality of optical modulators coupled to the laser unit and the DAC unit, the plurality of optical modulators being configured to generate an optical input vector by modulating the plurality of light outputs generated by the laser unit based on the plurality of modulator control signals; an optical matrix processing unit coupled to the plurality of optical modulators, the optical matrix processing unit comprising passive diffractive optical elements that are configured to transform the optical input vector into an optical output vector based on a plurality of weights defined by the passive diffractive optical elements; and a photodetection unit coupled to the optical matrix processing unit and configured to generate a plurality of output electric signals corresponding to the optical output vector. The system further includes: an analog-to-digital conversion (ADC) unit coupled to the photodetection unit and configured to convert the plurality of output electric signals into a plurality of digitized optical outputs; and a controller including integrated circuitry configured to perform operations including: receiving, from a computer, an artificial neural network computation request comprising an input dataset, wherein the input dataset comprises a first digital input vector; storing, in the memory unit, the input dataset; and generating, through the DAC unit, a first plurality of modulator control signals based on the first digital input vector.

Embodiments of the system can include one or more of the following features. For example, the matrix processing unit can include passive diffractive optical elements that are configured to transform the optical input vector into an optical output vector that represents a product of a matrix multiplication between the digital input vector and a predetermined vector defined by the passive diffractive optical elements.

In some implementations, the operations further include: obtaining, from the ADC unit, a first plurality of digitized optical outputs corresponding to the optical output vector of the optical matrix processing unit, the first plurality of digitized optical outputs forming a first digital output vector; performing a nonlinear transformation on the first digital output vector to generate a first transformed digital output vector; and storing, in the memory unit, the first transformed digital output vector.

In some implementations, the system can have a first loop period defined as a time elapsed between the step of storing, in the memory unit, the input dataset, and the step of storing, in the memory unit, the first transformed digital output vector, and wherein the first loop period can be less than or equal to 1 ns.

In some implementations, the operations can further include: outputting an artificial neural network output generated based on the first transformed digital output vector.

In some implementations, the operations can further include: generating, through the DAC unit, a second plurality of modulator control signals based on the first transformed digital output vector.

In some implementations, the input dataset can further include a second digital input vector, and wherein the operations can further include: generating, through the DAC unit, a second plurality of modulator control signals based on the second digital input vector obtaining, from the ADC unit, a second plurality of digitized optical outputs corresponding to the optical output vector of the optical matrix processing unit, the second plurality of digitized optical outputs forming a second digital output vector; performing a nonlinear transformation on the second digital output vector to generate a second transformed digital output vector; storing, in the memory unit, the second transformed digital output vector; and outputting an artificial neural network output generated based on the first transformed digital output vector and the second transformed digital output vector, wherein the optical output vector of the optical matrix processing unit results from a second optical input vector generated based on the second plurality of modulator control signals that is transformed by the optical matrix processing unit based on the plurality of weights defined by the passive diffractive optical elements.

In some implementations, the system can further include: an analog nonlinearity unit arranged between the photodetection unit and the ADC unit, the analog nonlinearity unit being configured to receive the plurality of output electric signals from the photodetection unit, apply a nonlinear transfer function, and output a plurality of transformed output electric signals to the ADC unit, wherein the operations can further include: obtaining, from the ADC unit, a first plurality of transformed digitized output electric signals corresponding to the plurality of transformed output electric signals, the first plurality of transformed digitized output electric signals forming a first transformed digital output vector; and storing, in the memory unit, the first transformed digital output vector.

In some implementations, the integrated circuitry of the controller can be configured to generate the first plurality of modulator control signals at a rate greater than or equal to 8 GHz.

In some implementations, the system can further include: an analog memory unit arranged between the DAC unit and the plurality of optical modulators, the analog memory unit being configured to store analog voltages and to output the stored analog voltages; and an analog nonlinearity unit arranged between the photodetection unit and the ADC unit, the analog nonlinearity unit being configured to receive the plurality of output electric signals from the photodetection unit, apply a nonlinear transfer function, and output a plurality of transformed output electric signals.

In some implementations, the analog memory unit can include a plurality of capacitors.

In some implementations, the analog memory unit can be configured to receive and store the plurality of transformed output electric signals of the analog nonlinearity unit, and to output the stored plurality of transformed output electric signals to the plurality of optical modulators, and wherein the operations can further include: based on generating the first plurality of modulator control signals, storing, in the analog memory unit, the plurality of transformed output electric signals of the analog nonlinearity unit; outputting, through the analog memory unit, the stored transformed output electric signals; obtaining, from the ADC unit, a second plurality of transformed digitized output electric signals, the second plurality of transformed digitized output electric signals forming a second transformed digital output vector; and storing, in the memory unit, the second transformed digital output vector.

In some implementations, the input dataset of the artificial neural network computation request can include a plurality of digital input vectors, wherein the laser unit can be configured to generate a plurality of wavelengths, and wherein the plurality of optical modulators can include: banks of optical modulators configured to generate a plurality of optical input vectors, each of the banks corresponding to one of the plurality of wavelengths and generating a respective optical input vector having a respective wavelength; and an optical multiplexer configured to combine the plurality of optical input vectors into a combined optical input vector comprising the plurality of wavelengths. The photodetection unit can be further configured to demultiplex the plurality of wavelengths and to generate a plurality of demultiplexed output electric signals, and the operations can include: obtaining, from the ADC unit, a plurality of digitized demultiplexed optical outputs, the plurality of digitized demultiplexed optical outputs forming a plurality of first digital output vectors, wherein each of the plurality of first digital output vectors corresponds to one of the plurality of wavelengths; performing a nonlinear transformation on each of the plurality of first digital output vectors to generate a plurality of transformed first digital output vectors; and storing, in the memory unit, the plurality of transformed first digital output vectors, wherein each of the plurality of digital input vectors can correspond to one of the plurality of optical input vectors.

In some implementations, the artificial neural network computation request can include a plurality of digital input vectors, wherein the laser unit is configured to generate a plurality of wavelengths, and wherein the plurality of optical modulators can include: banks of optical modulators configured to generate a plurality of optical input vectors, each of the banks corresponding to one of the plurality of wavelengths and generating a respective optical input vector having a respective wavelength; and an optical multiplexer configured to combine the plurality of optical input vectors into a combined optical input vector comprising the plurality of wavelengths. The operations can include: obtaining, from the ADC unit, a first plurality of digitized optical outputs corresponding to the optical output vector comprising the plurality of wavelengths, the first plurality of digitized optical outputs forming a first digital output vector; performing a nonlinear transformation on the first digital output vector to generate a first transformed digital output vector; and storing, in the memory unit, the first transformed digital output vector.

In some implementations, the DAC unit can include: a 1-bit DAC unit configured to generate a plurality of 1-bit modulator control signals, wherein a resolution of the ADC unit can be 1 bit, and wherein a resolution of the first digital input vector can be N bits. The operations can include: decomposing the first digital input vector into N 1-bit input vectors, each of the N 1-bit input vectors corresponding to one of the N bits of the first digital input vector; generating, through the 1-bit DAC unit, a sequence of N 1-bit modulator control signals corresponding to the N 1-bit input vectors; obtaining, from the ADC unit, a sequence of N digitized 1-bit optical outputs corresponding to the sequence of the N 1-bit modulator control signals; constructing an N-bit digital output vector from the sequence of the N digitized 1-bit optical outputs; performing a nonlinear transformation on the constructed N-bit digital output vector to generate a transformed N-bit digital output vector; and storing, in the memory unit, the transformed N-bit digital output vector.

In some implementations, the memory unit can include a digital input vector memory configured to store the digital input vector and comprising at least one SRAM.

In some implementations, the laser unit can include: a laser source configured to generate light; and an optical power splitter configured to split the light generated by the laser source into the plurality of light outputs, wherein each of the plurality of light outputs have substantially equal powers.

In some implementations, the plurality of optical modulators can include one of MZI modulators, ring resonator modulators, or electro-absorption modulators.

In some implementations, the photodetection unit can include: a plurality of photodetectors; and a plurality of amplifiers configured to convert photocurrents generated by the photodetectors into the plurality of output electric signals.

In some implementations, the integrated circuitry can include an application specific integrated circuit.

In some implementations, the optical matrix processing unit can include: an array of input waveguides to receive the optical input vector; an optical interference unit, in optical communication with the array of input waveguides, to perform a linear transformation of the optical input vector into a second array of optical signals, wherein the optical interference unit comprises the passive diffractive optical elements; and an array of output waveguides, in optical communication with the optical interference unit, to guide the second array of optical signals, wherein at least one input waveguide in the array of input waveguides is in optical communication with each output waveguide in the array of output waveguides via the optical interference unit.

In another aspect, a system includes: a memory unit; a driver unit configured to generate a plurality of modulator control signals; and an optical processor that includes: a laser unit configured to generate a plurality of light outputs; a plurality of optical modulators coupled to the laser unit and the driver unit, the plurality of optical modulators being configured to generate an optical input vector by modulating the plurality of light outputs generated by the laser unit based on the plurality of modulator control signals; an optical matrix processing unit coupled to the plurality of optical modulators and the driver unit, the optical matrix processing unit comprising passive diffractive optical elements configured to transform the optical input vector into an optical output vector based on a plurality of weight control signals defined by the passive diffractive optical elements; and a photodetection unit coupled to the optical matrix processing unit and configured to generate a plurality of output electric signals corresponding to the optical output vector. The system also includes a comparator unit coupled to the photodetection unit and configured to convert the plurality of output electric signals into a plurality of digitized 1-bit optical outputs; and a controller including integrated circuitry configured to perform operations including: receiving, from a computer, an artificial neural network computation request comprising an input dataset, wherein the input dataset comprises a first digital input vector having a resolution of N bits; storing, in the memory unit, the input dataset; decomposing the first digital input vector into N 1-bit input vectors, each of the N 1-bit input vectors corresponding to one of the N bits of the first digital input vector; generating, through the driver unit, a sequence of N 1-bit modulator control signals corresponding to the N 1-bit input vectors; obtaining, from the comparator unit, a sequence of N digitized 1-bit optical outputs corresponding to the sequence of the N 1-bit modulator control signals; constructing an N-bit digital output vector from the sequence of the N digitized 1-bit optical outputs; performing a nonlinear transformation on the constructed N-bit digital output vector to generate a transformed N-bit digital output vector; and storing, in the memory unit, the transformed N-bit digital output vector.

Embodiments of the system can include one or more of the following features. For example, the optical matrix processing unit can include an optical matrix multiplication unit configured to transform the optical input vector into an optical output vector that represents a product of a matrix multiplication between an input vector represented by the optical input vector and a predetermined vector defined by the diffractive optical elements.

In another aspect, a method for performing artificial neural network computations in a system having an optical matrix processing unit, the method includes: receiving, from a computer, an artificial neural network computation request comprising an input dataset comprising a first digital input vector; storing, in a memory unit, the input dataset; generating, through a digital-to-analog converter (DAC) unit, a first plurality of modulator control signals based on the first digital input vector; transforming, by using the optical matrix processing unit comprising an arrangement of diffractive optical elements, an optical input vector into an optical output vector, in which the optical output vector represents a result of a matrix processing applied to the optical input vector and a predetermined vector defined by the arrangement of the diffractive optical elements; obtaining, from an analog-to-digital conversion (ADC) unit, a first plurality of digitized optical outputs corresponding to the optical output vector of the optical matrix processing unit, the first plurality of digitized optical outputs forming a first digital output vector; performing, by a controller, a nonlinear transformation on the first digital output vector to generate a first transformed digital output vector; storing, in the memory unit, the first transformed digital output vector; and outputting, by the controller, an artificial neural network output generated based on the first transformed digital output vector.

Embodiments of the method can include one or more of the following features. For example, transforming the optical input vector into the optical output vector can include transforming the optical input vector into an optical output vector that represents a product of a matrix multiplication between the digital input vector and the predetermined vector defined by the arrangement of diffractive optical elements.

In another aspect, a method includes: providing input information in an electronic format; converting at least a part of the electronic input information into an optical input vector; optically transforming the optical input vector into an optical output vector based on an optical matrix processing by an optical processor comprising passive diffractive optical elements; converting the optical output vector into an electronic format; and electronically applying a non-linear transformation to the electronically converted optical output vector to provide output information in an electronic format.

Embodiments of the method can include one or more of the following features. For example, optically transforming the optical input vector into an optical output vector can include optically transforming the optical input vector into an optical output vector based on an optical matrix multiplication between a digital input vector represented by the optical input vector and a predetermined vector defined by the passive diffractive optical elements.

In some implementations, the method can further include: repeating the electronic-to-optical converting, the optical transforming, the optical-to-electronic converting, and the electronically applied non-linear transforming with respect to new electronic input information corresponding to the provided output information in electronic format.

In some implementations, the optical matrix processing for the initial optical transforming and the optical matrix processing of the repeated optical transforming can be the same and correspond to the same layer of an artificial neural network.

In some implementations, the method can further include: repeating the electronic-to-optical converting, the optical transforming, the optical-to-electronic converting, and the electronically applied non-linear transforming with respect to a different part of the electronic input information, wherein the optical matrix processing for the initial optical transforming and the optical matrix processing of the repeated optical transforming can be the same and correspond to a layer of an artificial neural network.

In another aspect, a system including: an optical matrix processing unit configured to process an input vector of length N, in which the optical matrix processing unit comprises N+2 layers of directional couplers and N layers of phase shifters, and N is a positive integer.

Embodiments of the system can include one or more of the following features. For example, the optical matrix processing unit can include no more than N+2 layers of directional couplers.

In some implementations, the optical matrix processing unit can include an optical matrix multiplication unit.

In some implementations, the optical matrix processing unit can include: a substrate, and interconnected interferometers disposed on the substrate, in which each interferometer comprises optical waveguides disposed on the substrate, and the directional couplers and the phase shifters are part of the interconnected interferometers.

In some implementations, the optical matrix processing unit can include a layer of attenuators following the last layer of directional couplers.

In some implementations, the layer of attenuators can include N attenuators.

In some implementations, the system can include one or more homodyne detectors to detect outputs from the attenuators.

In some implementations, N=3, and the optical matrix processing unit can include: input terminals configured to receive the input vector; a first layer of directional couplers coupled to the input terminals; a first layer of phase shifters coupled to the first layer of directional couplers; a second layer of directional couplers coupled to the first layer of phase shifters; a second layer of phase shifters coupled to the second layer of directional couplers; a third layer of directional couplers coupled to the second layer of phase shifters; a third layer of phase shifters coupled to the third layer of directional couplers; a fourth layer of directional couplers coupled to the third layer of phase shifters; and a fifth layer of directional couplers coupled to the fourth layer of directional couplers.

In some implementations, N=4, and the optical matrix processing unit can include: input terminals configured to receive the input vector; a first layer, a second layer, a third layer, and a fourth layer of directional couplers each followed by a layer of phase shifters, in which the first layer of directional couplers is coupled to the input terminals; a second-to-last layer of directional couplers coupled to the fourth layer of phase shifters; and a final layer of directional couplers coupled to the second-to-last layer of directional couplers.

In some implementations, N=8, and the optical matrix processing unit can include: input terminals configured to receive the input vector; eight layers of directional couplers each followed by a layer of phase shifters, in which the first layer of directional couplers is coupled to the input terminals; a second-to-last layer of directional couplers coupled to the eighth layer of phase shifters; and a final layer of directional couplers coupled to the second-to-last layer of directional couplers.

In some implementations, the optical matrix multiplier unit can include: input terminals configured to receive the input vector; N layers of directional couplers each followed by a layer of phase shifters, in which the first layer of directional couplers is coupled to the input terminals; a second-to-last layer of directional couplers coupled to the N-th layer of phase shifters; and a final layer of directional couplers coupled to the second-to-last layer of directional couplers.

In some implementations, N is an even number.

In some implementations, each of the i-th layer of directional couplers includes N/2 directional couplers, in which i is an odd number, and each of the j-th layer of directional couplers includes N/2−1 directional couplers, in which j is an even number.

In some implementations, for each of the i-th layer of directional couplers for which i is an odd number, the k-th directional coupler can be coupled to the (2k−1)-th and 2k-th output of the previous layer, and k is an integer from 1 to N/2.

In some implementations, for each of the j-th layer of directional couplers in which j is an even number, the m-th directional coupler can be coupled to the (2m)-th and (2m+1)-th output of the previous layer, and m is an integer from 1 to N/2−1.

In some implementations, each of the i-th layer of phase shifters can include N phase shifters for which i is an odd number, and each of the j-th layer of phase shifters can include N−2 phase shifters for which j is an even number.

In some implementations, N can be an odd number.

In some implementations, each layer of directional couplers can include (N−1)/2 directional couplers.

In some implementations, each layer of phase shifters can include N−1 phase shifters.

In another aspect, a system includes: a generator configured to generate a first dataset, in which the generator comprises an optical matrix processing unit; and a discriminator configured to receive a second dataset comprising data from the first dataset and data from a third dataset, the data in the first dataset having characteristics similar to those of the data in the third dataset, and classify data in the second dataset as data from the first dataset or data from the third dataset.

Embodiments of the method can include one or more of the following features. For example, the optical matrix processing unit can include at least one of (i) the optical matrix multiplication unit recited above, (ii) the passive diffractive optical elements recited above, or (iii) the optical matrix processing unit recited above.

In some implementations, the third dataset can include real data, the generator is configured to generate synthesized data that resemble the real data, and the discriminator is configured to classify data as real data or synthesized data.

In some implementations, the generator can be configured to generate datasets for training at least one of autonomous vehicles, medical diagnosis systems, fraud detection systems, weather prediction systems, financial forecast systems, facial recognition systems, speech recognition systems, or product defect detection systems.

In some implementations, the generator can be configured to generate images resembling images of at least one of real objects or real scenes, and the discriminator is configured to classify a received image as (i) an image of a real object or real scene, or (ii) a synthesized image generated by the generator.

In some implementations, the real objects can include at least one of people, animals, cells, tissues, or products, and the real scenes comprise scenes encountered by vehicles.

In some implementations, the discriminator can be configured to classify whether a received image is (i) an image of real people, real animals, real cells, real tissues, real products, or real scenes encountered by vehicles, or (ii) a synthesized image generated by the generator.

In some implementations, the vehicles can include at least one of motorcycles, cars, trucks, trains, helicopters, airplanes, submarines, ships, or drones.

In some implementations, the generator can be configured to generate images of tissues or cells associated with at least one of diseases of humans, diseases of animals, or diseases of plants.

In some implementations, the generator can be configured to generate images of tissues or cells associated with diseases of humans, and the diseases comprise at least one of cancer, Parkinson's disease, sickle cell anemia, heart disease, cardiovascular disease, diabetes, chest disease, or skin disease.

In some implementations, the generator can be configured to generate images of tissues or cells associated with cancer, and the cancer can include at least one of skin cancer, breast cancer, lung cancer, liver cancer, prostate cancer, or brain cancer.

In some implementations, the system can further include a random noise generator configured to generate random noise that is provided as input to the generator, and the generator is configured to generate the first dataset based on the random noise.

In another aspect, a system includes: a random noise generator configured to generate random noise; and a generator configured to generate data based on the random noise, in which the generator comprises an optical matrix processing unit.

Embodiments of the system can include one or more of the following features. For example, the optical matrix processing unit can include at least one of (i) the optical matrix multiplication unit described above, (ii) the passive diffractive optical elements described above, or (iii) the optical matrix processing unit described above.

In another aspect, a system includes: a photonic circuit configured to perform a logic function on two input signals, the photonic circuit including: a first directional coupler having two input terminals and two output terminals, the two input terminals configured to receive the two input signals, a first pair of phase shifters configured to modify phases of the signals at the two output terminals of the first directional coupler, a second directional coupler having two input terminals and two output terminals, the two input terminals configured to receive signals from the first pair of phase shifters, and a second pair of phase shifters configured to modify phases of the signals at the two output terminals of the second directional coupler.

Embodiments of the method can include one or more of the following features. For example, the phase shifters can be configured to cause the photonic circuit to implement a rotation:

$$M = \frac{1}{\sqrt{2}}\begin{pmatrix} 1 & -1 \\ 1 & 1 \end{pmatrix} = \begin{pmatrix} \cos\pi/4 & -\sin\pi/4 \\ \sin\pi/4 & \cos\pi/4 \end{pmatrix}.$$

In some implementations, when input signals x1 and x2 are provided to the two input terminals of the first directional coupler, the phase shifters can be configured to cause the photonic circuit to implement an operation:

$$M \cdot \begin{pmatrix} x_1 \\ x_2 \end{pmatrix} = \begin{pmatrix} \frac{1}{\sqrt{2}}(x_1 - x_2) \\ \frac{1}{\sqrt{2}}(x_1 + x_2) \end{pmatrix}.$$

In some implementations, the photonic circuit can include first photodetectors configured to generate absolute values of the signals from the second pair of phase shifters to cause the photonic circuit to implement an operation:

$$\left| M \cdot \begin{pmatrix} x_1 \\ x_2 \end{pmatrix} \right| = \begin{pmatrix} \frac{1}{\sqrt{2}}|x_1 - x_2| \\ \frac{1}{\sqrt{2}}|x_1 + x_2| \end{pmatrix}.$$

In some implementations, the photonic circuit can include comparators configured to compare the output signals of the first photodetectors with threshold values to generate binary values to cause the photonic circuit to generate outputs:

$$\begin{pmatrix} XOR(x_1, x_2) \\ OR(x_1, x_2) \end{pmatrix}.$$

In some implementations, the photonic circuit can include a feedback mechanism configured such that output signals of the photodetectors are fed back to the input terminals of the first directional coupler and passed through the first directional coupler, the first pair of phase shifters, the second directional coupler, and the second pair of phase shifters, and detected by the photodetectors to cause the photonic circuit to implement an operation:

$$\left| M \cdot \left| M \cdot \begin{pmatrix} x_1 \\ x_2 \end{pmatrix} \right| \right|,$$

which produces outputs AND(x1, x2) and OR(x1, x2).

In some implementations, the photonic circuit can include: a third directional coupler having two input terminals and two output terminals, the two input terminals configured to receive the signals from the second pair of phase shifters, a third pair of phase shifters configured to modify phases of the signals at the two output terminals of the third directional coupler, a fourth directional coupler having two input terminals and two output terminals, the two input terminals configured to receive signals from the third pair of phase shifters, a fourth pair of phase shifters configured to modify phases of the signals at the two output terminals of the fourth directional coupler, and second photodetectors configured to generate absolute values of signals from the fourth pair of phase shifters to cause the photonic circuit to implement an operation:

$$\left| M \cdot \left| M \cdot \begin{pmatrix} x_1 \\ x_2 \end{pmatrix} \right| \right|,$$

which produces outputs AND(x1, x2) and OR(x1, x2).

In some implementations, the system can include a Bitonic sorter configured such that a sorting function of the Bitonic sorter is performed using the photonic circuit.

In some implementations, the system can include a device configured to perform a hashing function using the photonic circuit.

In some implementations, the hashing function can include secure hash algorithm 2 (SHA-2).

Generally, a system for performing computations produces a computational result using different types of operations that are each performed on signals (e.g., electrical signals or optical signals) for which the underlying physics of the operation is most suitable (e.g., in terms of energy consumption and/or speed). For example, three such operations are: copying, summation, and multiplication. Copying can be performed using optical power splitting, summation can be performed using electrical current-based summation, and multiplication can be performed using optical amplitude modulation, as described in more detail below. An example of a computation that can be performed using these three types of operations is multiplying a vector by a matrix (e.g., as employed by artificial neural network computations). A variety of other computations can be performed using these operations, which represent a set of general linear operations from which a variety of computations can be performed, including but not limited to: vector-vector dot products, vector-vector element-wise multiplication, vector-scalar element wise multiplication, or matrix-matrix element-wise multiplication. Some of the examples described herein illustrate techniques and configurations for vector-matrix multiplication, but corresponding techniques and configurations can be used for any of these types of computations.

Aspects can have one or more of the following advantages.

An optoelectronic computing system that uses both electrical signals and optical signals as described herein may facilitate increased flexibility and/or efficiency. In the past, there may have been potential challenges associated with combining optical (or photonic) integrated devices with electrical (or electronic) integrated devices on a common platform (e.g., a common semiconductor die, or multiple semiconductor dice combined in a controlled collapsed chip connection or "flip-chip" arrangement). Such potential challenges may include input/output (I/O) packaging, or temperature control, for example. For systems such as those described herein, the potential challenges may be increased when used with a relatively large number of optical input ports and a relatively large number of electrical output ports (e.g., 4 or more optical input/output ports, 200 or more electric input/output ports). These potential challenges can be mitigated using appropriate system design. For example, a system may use a high density packaging arrangement that controls thermal expansion between different material types (e.g., semiconductor material such as Silicon, glass material such as Silicon Dioxide or "Silica", ceramic material, etc.) using temperature control (e.g., thermo-electric cooling) and/or an enclosing housing that acts as a heat sink and provides some degree of sealing. With such temperature stability techniques, different coefficients of thermal expansion (CTE), and resulting misalignment between system ports and ports of a packaged high density fiber array, can be limited.

For a copy operation, since optical power splitting is passive, no power needs to be consumed to perform the operation. Additionally, the frequency bandwidth of an electric splitter has a limit associated with the RC time constant. In comparison, the frequency bandwidth of optical splitter is virtually unlimited. Different types of optical power splitters can be used, including waveguide optical splitters or free-space beam splitters, as described in more detail below.

For a multiplication operation, one value can be encoded as an optical signal and the other value can be encoded as an amplitude scaling coefficient (e.g., multiplication by a value in a range from 0 to 1). After the scaling coefficient has been set, the multiplication in the optical domain has reduced (or no) requirement for the tuning of electrical signals, and therefore has reduced constraints due to electrical noise, power consumption, and bandwidth limit. By a suitable choice of the detection scheme, a signed result can be obtained (e.g., multiplication by a value between −1 to +1), as described in more detail below.

For a summation operation, different techniques can be used to achieve a result where the magnitude of a current flow in a conductor is determined based on a sum of different contributions. In the context of incoming current signals, when two or more conductors carrying those incoming current signals combine at a junction, a single conductor carrying an outgoing current signal represents a sum of those input current signals. In the context of incoming optical signals, when two or more optical waves at different wavelengths impinge upon the detector, a current signal carried on a photocurrent that is produced by the detector represents a sum of the powers in the incoming optical signals. Both produce an electrical signal (e.g., an electrical current) as an output that represents a sum, but one uses current as inputs (current-input-based summation, also called "electrical summation" performed in the "electrical domain") and the other uses optical waves as inputs (optical-input-based summation, also called "optoelectronic summation" performed in the "optoelectronic domain"). But, in some embodiments, current-input-based summation is used instead of optical-input-based summation, which enables a single optical wavelength to be used in the system, avoiding potentially complex elements of the system that may be needed to provide and maintain multiple wavelengths.

The combination of these basic operations implemented by these modules can be arranged to provide a device that performs linear operations, such as vector-matrix multiplication with arbitrary matrix element magnitudes. Other implementations of matrix multiplication using optical signals and interferometers for combining optical signals using optical interference (without the use of copy modules or addition modules as described here) have been limited to providing vector-matrix multiplication that has certain restrictions (e.g., a unitary matrix, or a diagonal matrix). Additionally, some other implementations may rely on large scale phase alignment of multiple optical signals as they propagate through a relatively large number of optical elements (e.g., optical modulators). Alternatively, the implementations described herein may be able to relax such phase alignment constraints by converting optical signals to electrical signals after propagation through fewer optical elements (e.g., after a propagation through no more than a single optical amplitude modulator), which allows the use of optical signals that have reduced coherence, or even incoherent optical signals for optical modulators that do not rely on constructive/destructive interference.

For time domain encoding of optical and electrical signals, described below in more detail, the analog electronic circuitry can be optimized for operation at a particular power level, which may be helpful if the circuitry is operating at a high speed. Such time domain encoding may be useful, for example, in reducing any challenges that may be associated with accurately controlling a relatively large number of clearly distinguishable intensity levels of each symbol. Instead, a relatively constant amplitude can be used (for an "on" level, with a zero, or near zero, amplitude in an "off" level), while accurate control of duty cycle is applied in the time domain over multiple time slots within a single symbol duration.

The modules can be conveniently fabricated at a large scale by integrating photonics and electronics on a common substrate (e.g., a Silicon chip). Routing signals on the substrate as optical signals instead of electrical signals, and grouping photodetectors in a portion of the substrate may help avoid long electronic wiring and their associated challenges (e.g., parasitic capacitance, inductance, and crosstalk).

For an embodiment of the system that uses submatrix multiplication, each element of the output vector can be computed concurrently using a different device (e.g., different core, different processor, different computer, different server), helping to alleviate certain potential limitations, such as the memory wall, and helping the overall system to scale for very large matrices. In some embodiments, each submatrix can be multiplied by a corresponding sub-vector using a different device. The total sum can then be computed by collecting or accumulating summands from different devices. The intermediate results, in the form of optical signals, can be conveniently transported between devices, even if the devices are separated by relatively large distances.

Other aspects include other combinations of the features recited above and other features, expressed as methods, apparatus, systems, program products, and in other ways.

Particular embodiments of the subject matter described in this specification can be implemented to realize one or more of the following advantages. ANN computation throughput, latency, or both may be improved. Power efficiency of ANN computations may be improved.

In another aspect, an apparatus includes: a plurality of optical waveguides, wherein a set of multiple input values are encoded on respective optical signals carried by the optical waveguides; a plurality of copying modules, and for each of at least two subsets of one or more optical signals, a corresponding set of one or more of the copying modules is configured to split the subset of one or more optical signals into two or more copies of the optical signals; a plurality of multiplication modules, and for each of at least two copies of a first subset of one or more optical signals, a corresponding multiplication module configured to multiply the one or more optical signals of the first subset by one or more matrix element values using optical amplitude modulation, where at least one of the multiplication modules includes an optical amplitude modulator including an input port and two output ports, and a pair of related optical signals is provided from the two output ports such that a difference between amplitudes of the related optical signals corresponds to a result of multiplying an input value by a signed matrix element value; and one or more summation modules, and for results of two or more of the multiplication modules, a corresponding one of the summation modules is configured to produce an electrical signal that represents a sum of the results of the two or more of the multiplication modules.

Embodiments of the apparatus can include one or more of the following features. For example, the input values in the set of multiple input values encoded on the respective optical signals can represent elements of an input vector that is being multiplied by a matrix that includes the one or more matrix element values.

In some implementations, a set of multiple output values can be encoded on respective electrical signals produced by the one or more summation modules, and the output values in the set of multiple output values can represent elements of an output vector that results from the input vector being multiplied by the matrix.

In some implementations, each of the optical signals carried by an optical waveguide can include an optical wave having a common wavelength that is substantially identical for all of the optical signals.

In some implementations, the copying modules can include at least one copying module including an optical splitter that sends a predetermined fraction of the power of an optical wave at an input port to a first output port, and sends the remaining fraction of the power of the optical wave at the input port to a second output port.

In some implementations, the optical splitter can include a waveguide optical splitter that sends a predetermined fraction of the power of an optical wave guided by an input optical waveguide to a first output optical waveguide, and sends the remaining fraction of the power of the optical wave guided by the input optical waveguide to a second output optical waveguide.

In some implementations, a guided mode of the input optical waveguide can be adiabatically coupled to guided modes of each of the first and second output optical waveguides.

In some implementations, the optical splitter can include a beam splitter that includes at least one surface that transmits the predetermined fraction of the power of the optical wave at the input port and reflects the remaining fraction of the power of the optical wave at the input port.

In some implementations, at least one of the plurality of optical waveguides can include an optical fiber that is coupled to an optical coupler that couples a guided mode of the optical fiber to a free-space propagation mode.

In some implementations, the multiplication modules can include at least one coherence-sensitive multiplication module configured to multiply the one or more optical signals of the first subset by one or more matrix element values using optical amplitude modulation based on interference between optical waves that have a coherence length at least as long as a propagation distance through the coherence-sensitive multiplication module.

In some implementations, the coherence-sensitive multiplication module can include a Mach-Zehnder Interferometer (MZI) that splits an optical wave guided by an input optical waveguide into a first optical waveguide arm of the MZI and a second optical waveguide arm of the MZI, the first optical waveguide arm includes a phase shifter that imparts a relative phase shift with respect to a phase delay of the second optical waveguide arm, and the MZI combines optical waves from the first optical waveguide arm and the second optical waveguide arm into at least one output optical waveguide.

In some implementations, the MZI can combine optical waves from the first optical waveguide arm and the second optical waveguide arm into each of a first output optical waveguide and a second output optical waveguide, a first photodetector can receive an optical wave from the first output optical waveguide to generate a first photocurrent, a second photodetector can receive an optical wave from the second output optical waveguide to generate a second photocurrent, and a result of the coherence-sensitive multiplication module can include a difference between the first photocurrent and the second photocurrent.

In some implementations, the coherence-sensitive multiplication module can include one or more ring resonators, including at least one ring resonator coupled to a first optical waveguide and at least one ring resonator coupled to a second optical waveguide.

In some implementations, a first photodetector can receive an optical wave from the first optical waveguide to generate a first photocurrent, a second photodetector can receive an optical wave from the second optical waveguide to generate a second photocurrent, and a result of the coherence-sensitive multiplication module can include a difference between the first photocurrent and the second photocurrent.

In some implementations, the multiplication modules can include at least one coherence-insensitive multiplication module configured to multiply the one or more optical signals of the first subset by one or more matrix element values using optical amplitude modulation based on absorption of energy within an optical wave.

In some implementations, the coherence-insensitive multiplication module can include an electro-absorption modulator.

In some implementations, the one or more summation modules can include at least one summation module including: (1) two or more input conductors that each carries an electrical signal in the form of an input current whose amplitude represents a respective result of a respective one of the multiplication modules, and (2) at least one output conductor that carries the electrical signal that represents the sum of the respective results in the form of an output current that is proportional to the sum of the input currents.

In some implementations, the two or more input conductors and the output conductor can include wires that meet at one or more junctions among the wires, and the output current can be substantially equal to the sum of the input currents.

In some implementations, at least a first input current of the input currents can be provided in the form of at least one photocurrent generated by at least one photodetector that receives an optical signal generated by a first multiplication module of the multiplication modules.

In some implementations, the first input current can be provided in the form of a difference between two photocurrents generated by different respective photodetectors that receive different respective optical signals both generated by the first multiplication module.

In some implementations, one of the copies of the first subset of one or more optical signals can consist of a single optical signal on which one of the input values is encoded.

In some implementations, the multiplication module corresponding to the copy of the first subset can multiply the encoded input value by a single matrix element value.

In some implementations, one of the copies of the first subset of one or more optical signals can include more than one of the optical signals, and fewer than all of the optical signals, on which multiple input values are encoded.

In some implementations, the multiplication module corresponding to the copy of the first subset can multiply the encoded input values by different respective matrix element values.

In some implementations, different multiplication modules corresponding to different respective copies of the first subset of one or more optical signals can be contained by different devices that are in optical communication to transmit one of the copies of the first subset of one or more optical signals between the different devices.

In some implementations, two or more of the plurality of optical waveguides, two or more of the plurality of copying modules, two or more of the plurality of multiplication modules, and at least one of the one or more summation modules can be arranged on a substrate of a common device.

In some implementations, the device can perform vector-matrix multiplication, wherein an input vector can be provided as a set of optical signals, and an output vector can be provided as a set of electrical signals.

In some implementations, the apparatus can further include an accumulator that integrates an input electrical signal corresponding to an output of a multiplication module or a summation module, wherein the input electrical signal can be encoded using a time domain encoding that uses on-off amplitude modulation within each of multiple time slots, and the accumulator can produce an output electrical signal that is encoded with more than two amplitude levels corresponding to different duty cycles of the time domain encoding over the multiple time slots.

In some implementations, the two or more of the multiplication modules each correspond to a different subset of one or more optical signals.

In some implementations, the apparatus can further include, for each copy of a second subset of one or more optical signals, different from the optical signals in the first subset of one or more optical signals, a multiplication module configured to multiply the one or more optical signals of the second subset by one or more matrix element values using optical amplitude modulation.

In another aspect, a method includes: encoding a set of multiple input values on respective optical signals; for each of at least two subsets of one or more optical signals, using a corresponding set of one or more copying modules to split the subset of one or more optical signals into two or more copies of the optical signals; for each of at least two copies of a first subset of one or more optical signals, using a corresponding multiplication module to multiply the one or more optical signals of the first subset by one or more matrix element values using optical amplitude modulation, where at least one of the multiplication modules includes an optical amplitude modulator including an input port and two output ports, and a pair of related optical signals is provided from the two output ports such that a difference between amplitudes of the related optical signals corresponds to a result of multiplying an input value by a signed matrix element value; and for results of two or more of the multiplication modules, using a summation module configured to produce an electrical signal that represents a sum of the results of the two or more of the multiplication modules.

In another aspect, a method includes: encoding a set of input values representing elements of an input vector on respective optical signals; encoding a set of coefficients representing elements of a matrix as amplitude modulation levels of a set of optical amplitude modulators coupled to the optical signals, where at least one of the optical amplitude modulators including an input port and two output ports provides a pair of related optical signals from the two output ports such that a difference between amplitudes of the related optical signals corresponds to a result of multiplying an input value by a signed matrix element value; and encoding a set of output values representing elements of an output vector on respective electrical signals, where at least one of the electrical signals is in the form of a current whose amplitude corresponds to a sum of respective elements of the input vector multiplied by respective elements of a row of the matrix.

Embodiments of the method can include one or more of the following features. For example, at least one of the optical signals can be provided by a first optical waveguide, and the first optical waveguide can be coupled to an optical splitter that sends a predetermined fraction of the power of an optical wave guided by the first optical waveguide to a second output optical waveguide, and sends the remaining fraction of the power of the optical wave guided by the first optical waveguide to a third optical waveguide.

In another aspect, an apparatus includes: a plurality of optical waveguides encoding a set of input values representing elements of an input vector on respective optical signals carried by the optical waveguides; a set of optical amplitude modulators coupled to the optical signals encoding a set of coefficients representing elements of a matrix as amplitude modulation levels, where at least one of the optical amplitude modulators including an input port and two output ports provides a pair of related optical signals from the two output ports such that a difference between amplitudes of the related optical signals corresponds to a result of multiplying an input value by a signed matrix element value; and a plurality of summation modules encoding a set of output values representing elements of an output vector on respective electrical signals, where at least one of the electrical signals is in the form of a current whose amplitude corresponds to a sum of respective elements of the input vector multiplied by respective elements of a row of the matrix.

In another aspect, a method for multiplying an input vector by a given matrix includes: encoding a set of input values representing elements the input vector on respective optical signals of a set of optical signals; coupling a first set of one or more devices to a first set of one or more waveguides providing a first subset of the set of optical signals, and generating a result of a first submatrix of the given matrix multiplied by values encoded on the first subset of the set of optical signals; coupling a second set of one or more devices to a second set of one or more waveguides providing a second subset of the set of optical signals, and generating a result of a second submatrix of the given matrix multiplied by values encoded on the second subset of the set of optical signals; coupling a third set of one or more devices to a third set of one or more waveguides providing a copy of the first subset of the set of optical signals generated by a first optical splitter, and generating a result of a third submatrix of the given matrix multiplied by values encoded on the first subset of the set of optical signals; and coupling a fourth set of one or more devices to a fourth set of one or more waveguides providing a copy of the second subset of the set of optical signals generated by a second optical splitter, and generating a result of a fourth submatrix of the given matrix multiplied by values encoded on the second subset of the set of optical signals; wherein the first, second, third, and fourth submatrices concatenated together form the given matrix; and wherein at least one output value representing an element of an output vector corresponding to the input vector multiplied by the given matrix is encoded on electrical signals generated by a device in communication with the first set of one or more devices and the second set of one or more devices.

Embodiments of the method can include one or more of the following features. For example, each pair of sets of the first set of one or more devices, the second set of one or more devices, the third set of one or more devices, and the fourth set of one or more devices can be mutually exclusive.

In another aspect, an apparatus includes: a first set of one or more devices configured to receive a first set of optical signals, and to generate a result of a first matrix multiplied by values encoded on the first set of optical signals; a second set of one or more devices configured to receive a second set of optical signals, and to generate a result of a second matrix multiplied by values encoded on the second set of optical signals; a third set of one or more devices configured to receive a third set of optical signals, and to generate a result of a third matrix multiplied by values encoded on the third set of optical signals; a fourth set of one or more devices configured to receive a fourth set of optical signals, and to generate a result of a fourth matrix multiplied by values encoded on the fourth set of optical signals; and configurable connection pathways between two or more of the first set of one or more devices, the second set of one or more devices, the third set of one or more devices, or the fourth set of one or more devices, wherein a first configuration of the configurable connection pathways is configured to: (1) provide a copy of the first set of optical signals as at least one of the second set of optical signals, the third set of optical signals, or the fourth set of optical signals, and (2) provide one or more signals from the first set of one or more device and one or more signals from the second set of one or more devices to a summation module configured to produce an electrical signal that represents a sum of values encoded on signals received by the summation module.

In another aspect, an apparatus includes: a first set of one or more devices configured to receive a first set of optical signals, and to generate a result based on optical amplitude modulation of one or more of the optical signals of the first set of optical signals; a second set of one or more devices configured to receive a second set of optical signals, and to generate a result based on optical amplitude modulation of one or more of the optical signals of the second set of optical signals; a third set of one or more devices configured to receive a third set of optical signals, and to generate a result based on optical amplitude modulation of one or more of the optical signals of the third set of optical signals; a fourth set of one or more devices configured to receive a fourth set of optical signals, and to generate a result based on optical amplitude modulation of one or more of the optical signals of the fourth set of optical signals; and configurable connection pathways between two or more of the first set of one or more devices, the second set of one or more devices, the third set of one or more devices, or the fourth set of one or more devices, wherein a first configuration of the configurable connection pathways is configured to: (1) provide a copy of the first set of optical signals as the third set of optical signals, or (2) provide one or more signals from the first set of one or more device and one or more signals from the second set of one or more devices to a summation module configured to produce an electrical signal that represents a sum of values encoded on signals received by the summation module.

Embodiments of the apparatus can include one or more of the following features. For example, each pair of sets of the first set of one or more devices, the second set of one or more devices, the third set of one or more devices, and the fourth set of one or more devices can be mutually exclusive.

In some implementations, the first configuration of the configurable connection pathways can be configured to: (1) provide a copy of the first set of optical signals as the third set of optical signals, and (2) provide one or more signals from the first set of one or more device and one or more signals from the second set of one or more devices to the summation module configured to produce an electrical signal that represents a sum of values encoded on at least two different signals received by the summation module.

In some implementations, the first configuration of the configurable connection pathways can be configured to provide a copy of the first set of optical signals as the third set of optical signals, and a second configuration of the configurable connection pathways can be configured to provide one or more signals from the first set of one or more device and one or more signals from the second set of one or more devices to the summation module configured to produce an electrical signal that represents a sum of values encoded on signals received by the summation module.

In another aspect, an apparatus includes: a plurality of optical waveguides, wherein a set of multiple input values are encoded on respective optical signals carried by the optical waveguides; a plurality of copying modules, including for each of at least two subsets of one or more optical signals, a corresponding set of one or more copying modules configured to split the subset of one or more optical signals into two or more copies of the optical signals; a plurality of multiplication modules, including for each of at least two copies of a first subset of one or more optical signals, a corresponding multiplication module configured to multiply the one or more optical signals of the first subset by one or more values using optical amplitude modulation; and one or more summation modules, including for results of two or more of the multiplication modules, a summation module configured to produce an electrical signal that represents a sum of the results of the two or more of the multiplication modules, where the results include at least one result that is encoded on an electrical signal and was derived from one of the copies of the optical signals that propagated through no more than a single optical amplitude modulator before being converted to an electrical signal.

In another aspect, a system includes: a first unit configured to generate a plurality of modulator control signals; and a processor unit including: a light source configured to provide a plurality of light outputs; a plurality of optical modulators coupled to the light source and the first unit, the plurality of optical modulators being configured to generate an optical input vector by modulating the plurality of light outputs provided by the light source based on the plurality of modulator control signals, the optical input vector comprising a plurality of optical signals; and a matrix multiplication unit coupled to the plurality of optical modulators and the first unit, the matrix multiplication unit being configured to transform the optical input vector into an analog output vector based on a plurality of weight control signals. The system also includes a second unit coupled to the matrix multiplication unit and configured to convert the analog output vector into a digitized output vector; and a controller including integrated circuitry configured to perform operations including: receiving an artificial neural network computation request comprising an input dataset that comprises a first digital input vector; receiving a first plurality of neural network weights; and generating, through the first unit, a first plurality of modulator control signals based on the first digital input vector and a first plurality of weight control signals based on the first plurality of neural network weights.

Embodiments of the system can include one or more of the following features. For example, the first unit can include a digital to analog converter (DAC).

In some implementations, the second unit can include an analog to digital converter (ADC).

In some implementations, the system can include a memory unit configured to store a dataset and a plurality of neural network weights.

In some implementations, the integrated circuitry of the controller can be further configured to perform operations including storing, in the memory unit, the input dataset and the first plurality of neural network weights.

In some implementations, the first unit can be configured to generate the plurality of weight control signals.

In some implementations, the controller can include an application specific integrated circuit (ASIC), and receiving an artificial neural network computation request can include receiving, from a general purpose data processor, an artificial neural network computation request.

In some implementations, the first unit, the processing unit, the second unit, and the controller can be disposed on at least one of a multi-chip module or an integrated circuit. Receiving an artificial neural network computation request can include receiving, from a second data processor, an artificial neural network computation request, wherein the second data processor can be external to the multi-chip module or the integrated circuit, the second data processor can be coupled to the multi-chip module or the integrated circuit through a communication channel, and the processor unit can process data at a data rate that is at least an order of magnitude greater than a data rate of the communication channel.

In some implementations, the first unit, the processor unit, the second unit, and the controller can be used in an optoelectronical processing loop that is repeated for a plurality of iterations, and the optoelectronical processing loop includes: (1) at least a first optical modulation operation based on at least one of the plurality of modulator control signals, and at least a second optical modulation operation based on at least one of the weight control signals, and (2) at least one of (a) an electrical summation operation or (b) an electrical storage operation.

In some implementations, the optoelectronical processing loop can include the electrical storage operation, and the electrical storage operation can be performed using a memory unit coupled to the controller, wherein the operations performed by the controller can further include storing, in the memory unit, the input dataset and the first plurality of neural network weights.

In some implementations, the optoelectronical processing loop can include the electrical summation operation, and the electrical summation operation can be performed using an electrical summation module within the matrix multiplication unit, wherein the electrical summation module can be configured to generate an electrical current corresponding to an element of the analog output vector that represents a sum of respective elements of the optical input vector multiplied by respective neural network weights.

In some implementations, the optoelectronical processing loop can include at least one signal path on which there is no more than one first optical modulation operation based on at least one of the plurality of modulator control signals, and no more than one second optical modulation operation based on at least one of the weight control signals performed in a single loop iteration.

In some implementations, the first optical modulation operation can be performed by one of the plurality of optical modulators coupled to the source of the light outputs and to the matrix multiplication unit, and the second optical modulation operation can be performed by an optical modulator included in the matrix multiplication unit.

In some implementations, the optoelectronical processing loop can include at least one signal path on which there is no more than one electrical storage performed in a single loop iteration.

In some implementations, the source can include a laser unit configured to generate the plurality of light outputs.

In some implementations, the matrix multiplication unit can include: an array of input waveguides to receive the optical input vector, and the optical input vector comprises a first array of optical signals; an optical interference unit, in optical communication with the array of input waveguides, to perform a linear transformation of the optical input vector into a second array of optical signals; and an array of output waveguides, in optical communication with the optical interference unit, to guide the second array of optical signals, wherein at least one input waveguide in the array of input waveguides is in optical communication with each output waveguide in the array of output waveguides via the optical interference unit.

In some implementations, the optical interference unit can include: a plurality of interconnected Mach-Zehnder interferometers (MZIs), each MZI in the plurality of interconnected MZIs including: a first phase shifter configured to change a splitting ratio of the MZI; and a second phase shifter configured to shift a phase of one output of the MZI, wherein the first phase shifters and the second phase shifters are coupled to the plurality of weight control signals.

In some implementations, the matrix multiplication unit can include: a plurality of copying modules, wherein each of the copying modules corresponds to a subset of one or more optical signals of the optical input vector and is configured to split the subset of one or more optical signals into two or more copies of the optical signals; a plurality of multiplication modules, wherein each of the multiplication modules corresponds to a subset of one or more optical signals configured to multiply the one or more optical signals of the subset by one or more matrix element values using optical amplitude modulation; and one or more summation modules, wherein each summation module is configured to produce an electrical signal that represents a sum of the results of two or more of the multiplication modules.

In some implementations, at least one of the multiplication modules includes an optical amplitude modulator including an input port and two output ports, and a pair of related optical signals can be provided from the two output ports such that a difference between amplitudes of the related optical signals corresponds to a result of multiplying an input value by a signed matrix element value.

In some implementations, the matrix multiplication unit can be configured to multiply the input vector by a matrix that includes the one or more matrix element values.

In some implementations, a set of multiple output values can be encoded on respective electrical signals produced by the one or more summation modules, and the output values in the set of multiple output values can represent elements of an output vector that results from the input vector being multiplied by the matrix.

In some implementations, the system can include a memory unit configured to store the input dataset and the neural network weights, the second unit can include an analog to digital converter (ADC) unit, and the operations can further include: obtaining, from the ADC unit, a first plurality of digitized outputs corresponding to the analog output vector of the matrix multiplication unit, the first plurality of digitized outputs forming a first digital output vector; performing a nonlinear transformation on the first digital output vector to generate a first transformed digital output vector; and storing, in the memory unit, the first transformed digital output vector.

In some implementations, the system can have a first loop period defined as a time elapsed between the step of storing, in the memory unit, the input dataset and the first plurality of neural network weights, and the step of storing, in the memory unit, the first transformed digital output vector, and wherein the first loop period is less than or equal to 1 ns.

In some implementations, the operations can further include: outputting an artificial neural network output generated based on the first transformed digital output vector.

In some implementations, the first unit can include a digital to analog converter (DAC) unit, and the operations can further include: generating, through the DAC unit, a second plurality of modulator control signals based on the first transformed digital output vector.

In some implementations, the first unit can include a digital to analog converter (DAC) unit, the artificial neural network computation request can further include a second plurality of neural network weights, and wherein the operations can further include: based on the obtaining of the first plurality of digitized outputs, generating, through the DAC unit, a second plurality of weight control signals based on the second plurality of neural network weights.

In some implementations, the first and second pluralities of neural network weights can correspond to different layers of an artificial neural network.

In some implementations, the first unit can include a digital to analog converter (DAC) unit, and the input dataset can further include a second digital input vector. The operations can further include: generating, through the DAC unit, a second plurality of modulator control signals based on the second digital input vector; obtaining, from the ADC unit, a second plurality of digitized outputs corresponding to the output vector of the matrix multiplication unit, the second plurality of digitized outputs forming a second digital output vector; performing a nonlinear transformation on the second digital output vector to generate a second transformed digital output vector; storing, in the memory unit, the second transformed digital output vector; and outputting an artificial neural network output generated based on the first transformed digital output vector and the second transformed digital output vector. The output vector of the matrix multiplication unit can result from a second optical input vector generated based on the second plurality of modulator control signals that is transformed by the matrix multiplication unit based on the first-mentioned plurality of weight control signals.

In some implementations, the system can include a memory unit configured to store the input dataset and the neural network weights, and the second unit can include an analog to digital converter (ADC) unit. The system can further include: an analog nonlinearity unit arranged between the matrix multiplication unit and the ADC unit, the analog nonlinearity unit can be configured to receive the plurality of output voltages from the matrix multiplication unit, apply a nonlinear transfer function, and output a plurality of transformed output voltages to the ADC unit. The operations performed by the integrated circuitry of the controller can further include: obtaining, from the ADC unit, a first plurality of transformed digitized output voltages corresponding to the plurality of transformed output voltages, first plurality of transformed digitized output voltages forming a first transformed digital output vector; and storing, in the memory unit, the first transformed digital output vector.

In some implementations, the integrated circuitry of the controller can be configured to generate the first plurality of modulator control signals at a rate greater than or equal to 8 GHz.

In some implementations, the first unit can include a digital to analog converter (DAC) unit, and the second unit can include an analog to digital converter (ADC) unit. The matrix multiplication unit can include: an optical matrix multiplication unit coupled to the plurality of optical modulators and the DAC unit, the optical matrix multiplication unit being configured to transform the optical input vector into an optical output vector based on the plurality of weight control signals; and a photodetection unit coupled to the optical matrix multiplication unit and configured to generate a plurality of output voltages corresponding to the optical output vector.

In some implementations, the system can further include: an analog memory unit arranged between the DAC unit and the plurality of optical modulators, the analog memory unit being configured to store analog voltages and to output the stored analog voltages; and an analog nonlinearity unit arranged between the photodetection unit and the ADC unit, the analog nonlinearity unit being configured to receive the plurality of output voltages from the photodetection unit, apply a nonlinear transfer function, and output a plurality of transformed output voltages.

In some implementations, the analog memory unit can include a plurality of capacitors.

In some implementations, the analog memory unit can be configured to receive and store the plurality of transformed output voltages of the analog nonlinearity unit, and to output the stored plurality of transformed output voltages to the plurality of optical modulators. The operations can further include: based on generating the first plurality of modulator control signals and the first plurality of weight control signals, storing, in the analog memory unit, the plurality of transformed output voltages of the analog nonlinearity unit; outputting, through the analog memory unit, the stored transformed output voltages;

obtaining, from the ADC unit, a second plurality of transformed digitized output voltages, the second plurality of transformed digitized output voltages forming a second transformed digital output vector; and storing, in the memory unit, the second transformed digital output vector.

In some implementations, the system can include a memory unit configured to store the input dataset and the neural network weights, and the input dataset of the artificial neural network computation request can include a plurality of digital input vectors. The source can be configured to generate a plurality of wavelengths. The plurality of optical modulators can include: banks of optical modulators configured to generate a plurality of optical input vectors, each of the banks corresponding to one of the plurality of wavelengths and generating a respective optical input vector having a respective wavelength; and an optical multiplexer configured to combine the plurality of optical input vectors into a combined optical input vector comprising the plurality of wavelengths. The photodetection unit can be further configured to demultiplex the plurality of wavelengths and to generate a plurality of demultiplexed output voltages. The operations can include: obtaining, from the ADC unit, a plurality of digitized demultiplexed optical outputs, the plurality of digitized demultiplexed optical outputs forming a plurality of first digital output vectors, wherein each of the plurality of first digital output vectors corresponds to one of the plurality of wavelengths; performing a nonlinear transformation on each of the plurality of first digital output vectors to generate a plurality of transformed first digital output vectors; and storing, in the memory unit, the plurality of transformed first digital output vectors. Each of the plurality of digital input vectors can correspond to one of the plurality of optical input vectors.

In some implementations, the system can include a memory unit configured to store the input dataset and the neural network weights, the second unit can include an analog to digital converter (ADC) unit, and the artificial neural network computation request can include a plurality of digital input vectors. The source can be configured to generate a plurality of wavelengths. The plurality of optical modulators can include: banks of optical modulators configured to generate a plurality of optical input vectors, each of the banks corresponding to one of the plurality of wavelengths and generating a respective optical input vector having a respective wavelength; and an optical multiplexer configured to combine the plurality of optical input vectors into a combined optical input vector comprising the plurality of wavelengths. The operations can include: obtaining, from the ADC unit, a first plurality of digitized optical outputs corresponding to the optical output vector comprising the plurality of wavelengths, the first plurality of digitized optical outputs forming a first digital output vector; performing a nonlinear transformation on the first digital output vector to generate a first transformed digital output vector; and storing, in the memory unit, the first transformed digital output vector.

In some implementations, the first unit can include a digital to analog converter (DAC) unit, the second unit can include an analog to digital converter (ADC) unit, and the DAC unit can include: a 1-bit DAC subunit configured to generate a plurality of 1-bit modulator control signals. A resolution of the ADC unit can be 1 bit, and a resolution of the first digital input vector can be N bits. The operations can include: decomposing the first digital input vector into N 1-bit input vectors, each of the N 1-bit input vectors corresponding to one of the N bits of the first digital input vector; generating, through the 1-bit DAC subunit, a sequence of N 1-bit modulator control signals corresponding to the N 1-bit input vectors; obtaining, from the ADC unit, a sequence of N digitized 1-bit optical outputs corresponding to the sequence of the N 1-bit modulator control signals; constructing an N-bit digital output vector from the sequence of the N digitized 1-bit optical outputs; performing a nonlinear transformation on the constructed N-bit digital output vector to generate a transformed N-bit digital output vector; and storing, in the memory unit, the transformed N-bit digital output vector.

In some implementations, the system can include a memory unit configured to store the input dataset and the neural network weights. The memory unit can include: a digital input vector memory configured to store the digital input vector and comprising at least one SRAM; and a neural network weights memory configured to store the plurality of neural network weights and comprising at least one DRAM.

In some implementations, the first unit can include a digital to analog converter (DAC) unit that includes: a first DAC subunit configured to generate the plurality of modulator control signals; and a second DAC subunit configured to generate the plurality of weight control signals, wherein the first and second DAC subunits are different.

In some implementations, the light source can include: a laser source configured to generate light; and an optical power splitter configured to split the light generated by the laser source into the plurality of light outputs, wherein each of the plurality of light outputs have substantially equal powers.

In some implementations, the plurality of optical modulators can include one of MZI modulators, ring resonator modulators, or electro-absorption modulators.

In some implementations, the photodetection unit can include: a plurality of photodetectors; and a plurality of amplifiers configured to convert photocurrents generated by the photodetectors into the plurality of output voltages.

In some implementations, the integrated circuitry can be an application specific integrated circuit.

In some implementations, the apparatus can include a plurality of optical waveguides coupled between the optical modulators and the matrix multiplication unit, in which the optical input vector can include a set of multiple input values that are encoded on respective optical signals carried by the optical waveguides, and each of the optical signals carried by one of the optical waveguides can include an optical wave having a common wavelength that is substantially identical for all of the optical signals.

In some implementations, the copying modules can include at least one copying module including an optical splitter that sends a predetermined fraction of the power of an optical wave at an input port to a first output port, and sends the remaining fraction of the power of the optical wave at the input port to a second output port.

In some implementations, the optical splitter can include a waveguide optical splitter that sends a predetermined fraction of the power of an optical wave guided by an input optical waveguide to a first output optical waveguide, and sends the remaining fraction of the power of the optical wave guided by the input optical waveguide to a second output optical waveguide.

In some implementations, a guided mode of the input optical waveguide can be adiabatically coupled to guided modes of each of the first and second output optical waveguides.

In some implementations, the optical splitter can include a beam splitter that includes at least one surface that transmits the predetermined fraction of the power of the optical wave at the input port and reflects the remaining fraction of the power of the optical wave at the input port.

In some implementations, at least one of the plurality of optical waveguides can include an optical fiber that is coupled to an optical coupler that couples a guided mode of the optical fiber to a free-space propagation mode.

In some implementations, the multiplication modules can include at least one coherence-sensitive multiplication module configured to multiply the one or more optical signals of the first subset by one or more matrix element values using optical amplitude modulation based on interference between optical waves that have a coherence length at least as long as a propagation distance through the coherence-sensitive multiplication module.

In some implementations, the coherence-sensitive multiplication module can include a Mach-Zehnder Interferometer (MZI) that splits an optical wave guided by an input optical waveguide into a first optical waveguide arm of the MZI and a second optical waveguide arm of the MZI, the first optical waveguide arm includes a phase shifter that imparts a relative phase shift with respect to a phase delay of the second optical waveguide arm, and the MZI can combine optical waves from the first optical waveguide arm and the second optical waveguide arm into at least one output optical waveguide.

In some implementations, the MZI can combine optical waves from the first optical waveguide arm and the second optical waveguide arm into each of a first output optical waveguide and a second output optical waveguide, a first photodetector can receive an optical wave from the first output optical waveguide to generate a first photocurrent, a second photodetector can receive an optical wave from the second output optical waveguide to generate a second photocurrent, and a result of the coherence-sensitive multiplication module can include a difference between the first photocurrent and the second photocurrent.

In some implementations, the coherence-sensitive multiplication module can include one or more ring resonators, including at least one ring resonator coupled to a first optical waveguide and at least one ring resonator coupled to a second optical waveguide.

In some implementations, a first photodetector can receive an optical wave from the first optical waveguide to generate a first photocurrent, a second photodetector can receive an optical wave from the second optical waveguide to generate a second photocurrent, and a result of the coherence-sensitive multiplication module can include a difference between the first photocurrent and the second photocurrent.

In some implementations, the multiplication modules can include at least one coherence-insensitive multiplication module configured to multiply the one or more optical signals of the first subset by one or more matrix element values using optical amplitude modulation based on absorption of energy within an optical wave.

In some implementations, the coherence-insensitive multiplication module can include an electro-absorption modulator.

In some implementations, the one or more summation modules can include at least one summation module including: (1) two or more input conductors that each carries an electrical signal in the form of an input current whose amplitude represents a respective result of a respective one of the multiplication modules, and (2) at least one output conductor that carries the electrical signal that represents the sum of the respective results in the form of an output current that is proportional to the sum of the input currents.

In some implementations, the two or more input conductors and the output conductor can include wires that meet at one or more junctions among the wires, and the output current can be substantially equal to the sum of the input currents.

In some implementations, at least a first input current of the input currents can be provided in the form of at least one photocurrent generated by at least one photodetector that receives an optical signal generated by a first multiplication module of the multiplication modules.

In some implementations the first input current can be provided in the form of a difference between two photocurrents generated by different respective photodetectors that receive different respective optical signals both generated by the first multiplication module.

In some implementations, one of the copies of the first subset of one or more optical signals can consist of a single optical signal on which one of the input values is encoded.

In some implementations, the multiplication module corresponding to the copy of the first subset can multiply the encoded input value by a single matrix element value.

In some implementations, one of the copies of the first subset of one or more optical signals can include more than one of the optical signals, and fewer than all of the optical signals, on which multiple input values are encoded.

In some implementations, the multiplication module corresponding to the copy of the first subset can multiply the encoded input values by different respective matrix element values.

In some implementations, different multiplication modules corresponding to different respective copies of the first subset of one or more optical signals can be contained by different devices that are in optical communication to transmit one of the copies of the first subset of one or more optical signals between the different devices.

In some implementations, two or more of the plurality of optical waveguides, two or more of the plurality of copying modules, two or more of the plurality of multiplication modules, and at least one of the one or more summation modules can be arranged on a substrate of a common device.

In some implementations, the device can perform vector-matrix multiplication, wherein an input vector can be provided as a set of optical signals, and an output vector can be provided as a set of electrical signals.

In some implementations, the apparatus can further include an accumulator that integrates an input electrical signal corresponding to an output of a multiplication module or a summation module, wherein the input electrical signal can be encoded using a time domain encoding that uses on-off amplitude modulation within each of multiple time slots, and the accumulator can produce an output electrical signal that is encoded with more than two amplitude levels corresponding to different duty cycles of the time domain encoding over the multiple time slots.

In some implementations, the two or more of the multiplication modules each correspond to a different subset of one or more optical signals.

In some implementations, the apparatus can further include, for each copy of a second subset of one or more optical signals, different from the optical signals in the first subset of one or more optical signals, a multiplication module configured to multiply the one or more optical signals of the second subset by one or more matrix element values using optical amplitude modulation.

In another aspect a system includes: a memory unit configured to store a dataset and a plurality of neural network weights; and a driver unit configured to generate a plurality of modulator control signals. The system includes an optoelectronic processor including: a light source configured to provide a plurality of light outputs; a plurality of optical modulators coupled to the light source and the driver unit, the plurality of optical modulators being configured to generate an optical input vector by modulating the plurality of light outputs generated by the light source based on the plurality of modulator control signals; a matrix multiplication unit coupled to the plurality of optical modulators and the driver unit, the matrix multiplication unit being configured to transform the optical input vector into an analog output vector based on a plurality of weight control signals; and a comparator unit coupled to the matrix multiplication unit and configured to convert the analog output vector into a plurality of digitized 1-bit outputs. The system includes a controller including integrated circuitry configured to perform operations including: receiving an artificial neural network computation request comprising an input dataset and a first plurality of neural network weights, wherein the input dataset comprises a first digital input vector having a resolution of N bits; storing, in the memory unit, the input dataset and the first plurality of neural network weights; decomposing the first digital input vector into N 1-bit input vectors, each of the N 1-bit input vectors corresponding to one of the N bits of the first digital input vector; generating, through the driver unit, a sequence of N 1-bit modulator control signals corresponding to the N 1-bit input vectors; obtaining, from the comparator unit, a sequence of N digitized 1-bit outputs corresponding to the sequence of the N 1-bit modulator control signals; constructing an N-bit digital output vector from the sequence of the N digitized 1-bit outputs; performing a nonlinear transformation on the constructed N-bit digital output vector to generate a transformed N-bit digital output vector; and storing, in the memory unit, the transformed N-bit digital output vector.

Embodiments of the system can include one or more of the following features. For example, receiving an artificial neural network computation request can include receiving, from a general purpose computer, an artificial neural network computation request.

In some implementations, the driver unit can be configured to generate the plurality of weight control signals.

In some implementations, the matrix multiplication unit can include: an optical matrix multiplication unit coupled to the plurality of optical modulators and the driver unit, the optical matrix multiplication unit being configured to transform the optical input vector into an optical output vector based on the plurality of weight control signals; and a photodetection unit coupled to the optical matrix multiplication unit and configured to generate a plurality of output voltages corresponding to the optical output vector.

In some implementations, the matrix multiplication unit can include: an array of input waveguides to receive the optical input vector; an optical interference unit, in optical communication with the array of input waveguides, to perform a linear transformation of the optical input vector into a second array of optical signals; and an array of output waveguides, in optical communication with the optical interference unit, to guide the second array of optical signals, wherein at least one input waveguide in the array of input waveguides is in optical communication with each output waveguide in the array of output waveguides via the optical interference unit.

In some implementations, the optical interference unit can include: a plurality of interconnected Mach-Zehnder interferometers (MZIs), each MZI in the plurality of interconnected MZIs including: a first phase shifter configured to change a splitting ratio of the MZI; and a second phase shifter configured to shift a phase of one output of the MZI, wherein the first phase shifters and the second phase shifters can be coupled to the plurality of weight control signals.

In some implementations, the matrix multiplication unit can include: a plurality of copying modules, including for each of at least two subsets of one or more optical signals of the optical input vector, a corresponding set of one or more copying modules configured to split the subset of one or more optical signals into two or more copies of the optical signals; a plurality of multiplication modules, including for each of at least two copies of a first subset of one or more optical signals, a corresponding multiplication module configured to multiply the one or more optical signals of the first subset by one or more matrix element values using optical amplitude modulation; and one or more summation modules, including for results of two or more of the multiplication modules, a summation module configured to produce an electrical signal that represents a sum of the results of the two or more of the multiplication modules.

In some implementations, at least one of the multiplication modules can include an optical amplitude modulator including an input port and two output ports, and a pair of related optical signals can be provided from the two output ports such that a difference between amplitudes of the related optical signals corresponds to a result of multiplying an input value by a signed matrix element value.

In some implementations, the matrix multiplication unit can be configured to multiply the input vector by a matrix that includes the one or more matrix element values.

In some implementations, a set of multiple output values can be encoded on respective electrical signals produced by the one or more summation modules, and the output values in the set of multiple output values can represent elements of an output vector that results from the input vector being multiplied by the matrix.

In another aspect, a method for performing artificial neural network computations in a system having a matrix multiplication unit configured to transform an optical input vector into an analog output vector based on a plurality of weight control signals is provided. The method includes: receiving an artificial neural network computation request comprising an input dataset and a first plurality of neural network weights, wherein the input dataset comprises a first digital input vector; storing, in a memory unit, the input dataset and the first plurality of neural network weights; generating a first plurality of modulator control signals based on the first digital input vector and a first plurality of weight control signals based on the first plurality of neural network weights; obtaining a first plurality of digitized outputs corresponding to an output vector of the matrix multiplication unit, the first plurality of digitized outputs forming a first digital output vector; performing, by a controller, a nonlinear transformation on the first digital output vector to generate a first transformed digital output vector; storing, in the memory unit, the first transformed digital output vector; and outputting, by the controller, an artificial neural network output generated based on the first transformed digital output vector.

Embodiments of the method can include one or more of the following features. For example, receiving an artificial neural network computation request can include receiving the artificial neural network computation request from a computer through a communication channel.

In some implementations, generating a first plurality of modulator control signals can include generating, through a digital-to-analog converter (DAC) unit, a first plurality of modulator control signals.

In some implementations, obtaining a first plurality of digitized outputs can include obtaining, from an analog-to-digital conversion (ADC) unit, a first plurality of digitized outputs.

In some implementations, the method can include: applying the first plurality of modulator control signals to a plurality of optical modulators coupled to a light source and the DAC unit; and generating, using the plurality of optical modulators, an optical input vector by modulating the plurality of light outputs generated by the laser unit based on the plurality of modulator control signals.

In some implementations, the matrix multiplication unit can be coupled to the plurality of optical modulators and the DAC unit, and the method can include: transforming, using the matrix multiplication unit, the optical input vector into an analog output vector based on the plurality of weight control signals.

In some implementations, the ADC unit can be coupled to the matrix multiplication unit, and the method can include: converting, using the ADC unit, the analog output vector into the first plurality of digitized outputs.

In some implementations, the matrix multiplication unit can include an optical matrix multiplication unit coupled to the plurality of optical modulators and the DAC unit. Transforming the optical input vector into an analog output vector can include transforming, using the optical matrix multiplication unit, the optical input vector into an optical output vector based on the plurality of weight control signals. The method can include: generating, using a photodetection unit coupled to the optical matrix multiplication unit, a plurality of output voltages corresponding to the optical output vector.

In some implementations, the method can include: receiving, at an array of input waveguides, the optical input vector; performing, using an optical interference unit in optical communication with the array of input waveguides, a linear transformation of the optical input vector into a second array of optical signals; and guiding, using an array of output waveguides in optical communication with the optical interference unit, the second array of optical signals, wherein at least one input waveguide in the array of input waveguides is in optical communication with each output waveguide in the array of output waveguides via the optical interference unit.

In some implementations, the optical interference unit can include a plurality of interconnected Mach-Zehnder interferometers (MZIs), each MZI in the plurality of interconnected MZIs can include a first phase shifter and a second phase shifter, and the first phase shifters and the second phase shifters can be coupled to the plurality of weight control signals. The method can include: changing a splitting ratio of the MZI using the first phase shifter, and shifting a phase of one output of the MZI using the second phase shifter.

In some implementations, the method can include: for each of at least two subsets of one or more optical signals of the optical input vector, splitting, using a corresponding set of one or more copying modules, the subset of one or more optical signals into two or more copies of the optical signals; for each of at least two copies of a first subset of one or more optical signals, multiplying, using a corresponding multiplication module, the one or more optical signals of the first subset by one or more matrix element values using optical amplitude modulation; and for results of two or more of the multiplication modules, producing, using a summation module, an electrical signal that represents a sum of the results of the two or more of the multiplication modules.

In some implementations, at least one of the multiplication modules can include an optical amplitude modulator including an input port and two output ports, and a pair of related optical signals can be provided from the two output ports such that a difference between amplitudes of the related optical signals corresponds to a result of multiplying an input value by a signed matrix element value.

In some implementations, the method can include multiplying, using the matrix multiplication unit, the input vector by a matrix that includes the one or more matrix element values.

In some implementations, the method can include encoding a set of multiple output values on respective electrical signals produced by the one or more summation modules; and representing, using the output values in the set of multiple output values, elements of an output vector that results from the input vector being multiplied by the matrix.

In another aspect, a method includes: providing input information in an electronic format; converting at least a part of the electronic input information into an optical input vector; optoelectronically transforming the optical input vector into an analog output vector based on a matrix multiplication; and electronically applying a non-linear transformation to the analog output vector to provide output information in an electronic format.

Embodiments of the method can include one or more of the following features. For example, the method can further include: repeating the electronic-to-optical converting, the optoelectronical transforming, and the electronically applied non-linear transforming with respect to new electronic input information corresponding to the provided output information in electronic format.

In some implementations, the matrix multiplication for the initial optoelectronical transforming and the matrix multiplication of the repeated optoelectronical transforming cam be the same and correspond to the same layer of an artificial neural network.

In some implementations, the matrix multiplication for the initial optoelectronical transforming and the matrix multiplication of the repeated optoelectronical transforming can be different and correspond to different layers of an artificial neural network.

In some implementations, the method can further include: repeating the electronic-to-optical converting, the optoelectronical transforming, and the electronically applied non-linear transforming with respect to a different part of the electronic input information, wherein the matrix multiplication for the initial optoelectronical transforming and the matrix multiplication of the repeated optoelectronical transforming are the same and correspond to a first layer of an artificial neural network.

In some implementations, the method can further include: providing intermediate information in an electronic format based on the electronic output information produced for the multiple parts of the electronic input information by the first layer of the artificial neural network; and repeating the electronic-to-optical converting, the optoelectronical transforming, and the electronically applied non-linear transforming with respect to each of different parts of the electronic intermediate information, wherein the matrix multiplication for the initial optoelectronical transforming and the matrix multiplication of the repeated optoelectronical transforming related to the different parts of the electronic intermediate information can be the same and correspond to a second layer of the artificial neural network.

In another aspect, a system for performing artificial neural network computations is provided. The system includes: a first unit configured to generate a plurality of vector control signals and to generate a plurality of weight control signals; a second unit configured to provide an optical input vector based on the plurality of vector control signals; and a matrix multiplication unit coupled to the second unit and the first unit, the matrix multiplication unit being configured to transform the optical input vector into an output vector based on the plurality of weight control signals. The system includes a controller including integrated circuitry configured to perform operations including: receiving an artificial neural network computation request comprising an input dataset and a first plurality of neural network weights, wherein the input dataset comprises a first digital input vector; and generating, through the first unit, a first plurality of vector control signals based on the first digital input vector and a first plurality of weight control signals based on the first plurality of neural network weights; wherein the first unit, the second unit, the matrix multiplication unit, and the controller are used in an optoelectronical processing loop that is repeated for a plurality of iterations, and the optoelectronical processing loop includes: (1) at least two optical modulation operations, and (2) at least one of (a) an electrical summation operation or (b) an electrical storage operation.

In another aspect, a method for performing artificial neural network computations is provided. The method includes: providing input information in an electronic format; converting at least a part of the electronic input information into an optical input vector; and transforming the optical input vector into an output vector based on a matrix multiplication using a set of neural network weights. The providing, converting, and transforming are performed in an optoelectronical processing loop that is repeated for a plurality of iterations using different respective sets of neural network weights and different respective input information, and the optoelectronical processing loop includes: (1) at least two optical modulation operations, and (2) at least one of (a) an electrical summation operation or (b) an electrical storage operation.

The details of one or more embodiments of the subject matter described in this specification are set forth in the accompanying drawings and the description below. Other features, aspects, and advantages of the invention will become apparent from the description, the drawings, and the claims.

Unless otherwise defined, all technical and scientific terms used herein have the same meaning as commonly understood by one of ordinary skill in the art to which this invention belongs. In case of conflict with patent applications or patent application publications incorporated herein by reference, the present specification, including definitions, will control.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4B is a mathematical representation of the operation of the ANN computation system of FIG. 4A.

FIGS. 19A and 19B are schematic diagrams of example system configurations.

FIG. 22A is a schematic diagram of an example optical amplitude modulator.

FIG. 22B-22D are schematic diagrams of examples of optical amplitude modulators with optical detection in a symmetric differential configuration.

FIGS. 23A-23C are optoelectronic circuit diagrams of example system configurations.

FIG. 41 is a schematic diagram of a computation system that includes optical fibers that each carry signals having multiple wavelengths.

Like reference numbers and designations in the various drawings indicate like elements.

DETAILED DESCRIPTION

Figure 1A:
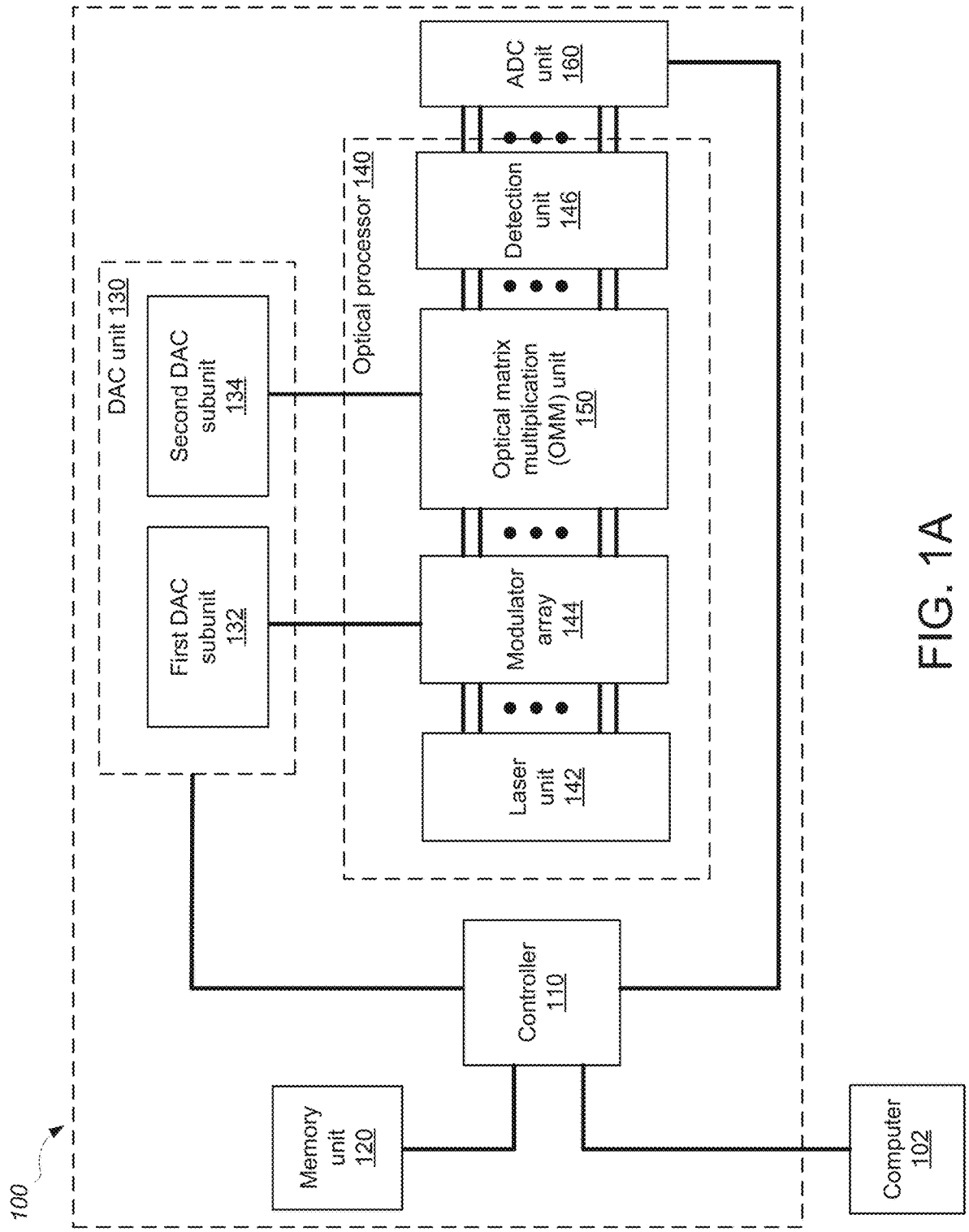
FIG. 1A is a schematic diagram of an example of an artificial neural network (ANN) computation system.

FIG. 1A shows a schematic diagram of an example of an artificial neural network (ANN) computation system 100. The system 100 includes a controller 110, a memory unit 120, a digital-to-analog converter (DAC) unit 130, an optical processor 140, and an analog-to-digital converter (ADC) unit 160. The controller 110 is coupled to a computer 102, the memory unit 120, the DAC unit 130, and the ADC unit 160. The controller 110 includes integrated circuitry that is configured to control the operation of the ANN computation system 100 to perform ANN computations.

The integrated circuitry of the controller 110 may be an application specific integrated circuit specifically configured to perform the steps of an ANN computation process. For example, the integrated circuitry may implement a microcode or a firmware specific to performing the ANN computation process. As such, the controller 110 may have a reduced set of instructions relative to a general purpose processor used in conventional computers, such as the computer 102. In some implementations, the integrated circuitry of the controller 110 may include two or more circuitries configured to perform different steps of the ANN computation process.

In an example operation of the ANN computation system 100, the computer 102 may issue an artificial neural network computation request to the ANN computation system 100. The ANN computation request may include neural network weights that define an ANN, and an input dataset to be processed by the provided ANN. The controller 110 receives the ANN computation request, and stores the input dataset and the neural network weights in the memory unit 120.

The input dataset may correspond to various digital information to be processed by the ANN. Examples of the input dataset include image files, audio files, LiDAR point cloud, and GPS coordinates sequences, and the operation of the ANN computation system 100 will be described based on receiving an image file as the input dataset. In general, the size of the input dataset can vary greatly, from hundreds of data points to millions of data points or larger. For example, a digital image file with a resolution of 1 megapixel has approximately one million pixels, and each of the one million pixels may be a data point to be processed by the ANN. Due to the large number of data points in a typical input dataset, the input dataset is typically divided into multiple digital input vectors of smaller size to be individually processed by the optical processor 140. As an example, for a greyscale digital image, the elements of the digital input vectors may be 8-bit values representing the intensity of the image, and the digital input vectors may have a length that ranges from 10's of elements (e.g., 32 elements, 64 elements) to hundreds of elements (e.g., 256 elements, 512 elements). In general, input dataset of arbitrary size can be divided into digital input vectors of a size suitable for processing by the optical processor 140. In cases where the number of elements of the input dataset is not divisible by the length of the digital input vector, zero padding can be used to fill out the data set to be divisible by the length of the digital input vector. The processed outputs of the individual digital input vectors can be processed to reconstruct a complete output that is a result of processing the input dataset through the ANN. In some implementations, the dividing of the input data set into multiple input vectors and subsequent vector-level processing may be implemented using block matrix multiplication techniques.

The neural network weights are a set of values that define the connectivity of the artificial neurons of the ANN, including the relative importance, or weights, of those connections. An ANN may include one or more hidden layers with respective sets of nodes. In the case of an ANN with a single hidden layer, the ANN may be defined by two sets of neural network weights, one set corresponding to the connectivity between the input nodes and the nodes of the hidden layer, and a second set corresponding to the connectivity between the hidden layer and the output nodes. Each set of neural network weights that describes the connectivity corresponds to a matrix to be implemented by the optical processor 140. For ANNs with two or more hidden layers, additional sets of neural network weights are needed to define the connectivity between the additional hidden layers. As such, in general, the neural network weights included in the ANN computation request may include multiple sets of neural network weights that represent the connectivity between various layers of the ANN.

As the input dataset to be processed is typically divided into multiple smaller digital input vectors for individual processing, the input dataset is typically stored in a digital memory. However, the speed of memory operations between a memory and a processor of the computer 102 is significantly slower than the rate at which the ANN computation system 100 can perform ANN computations. For example, the ANN computation system 100 can perform tens to hundreds of ANN computations during a typical memory read cycle of the computer 102. As such, the rate at which ANN computations can be performed by the ANN computation system 100 may be limited below its full processing rate if an ANN computation by the ANN computation system 100 involves multiple data transfers between the system 100 and the computer 102 during the course of processing an ANN computation request. For example, if the computer 102 were to access the input dataset from its own memory and provide the digital input vectors to the controller 110 when requested, the operation of the ANN computation system 100 would likely be greatly slowed down by the time needed for the series of data transfers that would be needed between the computer 102 and the controller 110. It should be noted that a memory access latency of the computer 102 is typically non-deterministic, which further complicates and degrades the speed at which digital input vectors can be provided to the ANN computation system 100. Further, the processor cycles of the computer 102 may be wasted on managing the data transfer between the computer 102 and the ANN computation system 100.

Instead, in some implementations, the ANN computation system 100 stores the entire input dataset in the memory unit 120, which is a part of and is dedicated for use by the ANN computation system 100. The dedicated memory unit 120 allows transactions between the memory unit 120 and the controller 110 to be specifically adapted to allow a smooth and uninterrupted flow of data between the memory unit 120 and the controller 110. Such uninterrupted flow of data may significantly improve the overall throughput of the ANN computation system 100 by allowing the optical processor 140 to perform matrix multiplication at its full processing rate without being limited by slow memory operations of a conventional computer such as the computer 102. Further, because all of the data needed in performing the ANN computation is provided by the computer 102 to the ANN computation system 100 in a single transaction, the ANN computation system 100 may perform its ANN computation in a self-contained manner independent of the computer 102. This self-contained operation of the ANN computation system 100 offloads the computation burden from the computer 102 and removes external dependencies in the operation of the ANN computation system 100, improving the performances of both the system 100 and the computer 102.

The internal operations of the ANN computation system 100 will now be described. The optical processor 140 includes a laser unit 142, a modulator array 144, a detection unit 146, and an optical matrix multiplication (OMNI) unit 150. The optical processor 140 operates by encoding a digital input vector of length N onto an optical input vector of length N and propagating the optical input vector through the OMM unit 150. The OMM unit 150 receives the optical input vector of length N and performs, in the optical domain, an N×N matrix multiplication on the received optical input vector. The N×N matrix multiplication performed by the OM unit 150 is determined by an internal configuration of the OMM unit 150. The internal configuration of the OMM unit 150 may be controlled by electrical signals, such as those generated by the DAC unit 130.

Figure 1B:
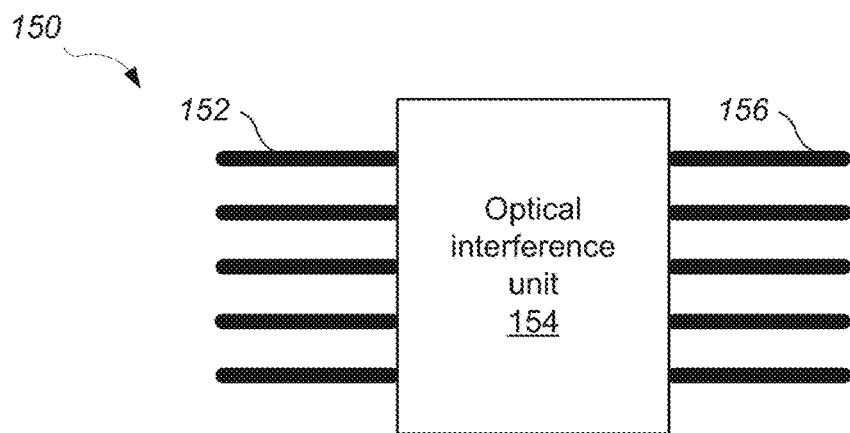
FIG. 1B is a schematic diagram of an example of an optical matrix multiplication unit.

The OMM unit 150 may be implemented in various ways. FIG. 1B shows a schematic diagram of an example of the OMNI unit 150. The OMNI unit 150 may include an array of input waveguides 152 to receive the optical input vector; an optical interference unit 154 in optical communication with the array of input waveguides 152; and an array of output waveguides 156 in optical communication with the optical interference unit 154. The optical interference unit 154 performs a linear transformation of the optical input vector into a second array of optical signals. The array of output waveguides 156 guides the second array of optical signals output by the optical interference unit 154. At least one input waveguide in the array of input waveguides 152 is in optical communication with each output waveguide in the array of output waveguides 156 via the optical interference unit 154. For example, for an optical input vector of length N, the OMM unit 150 may include N input waveguides 152 and N output waveguides 156.

Figure 1C:
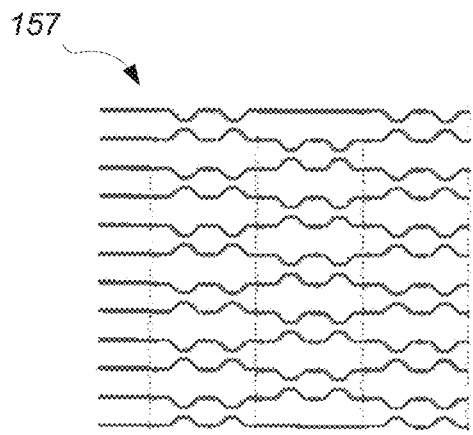
FIGS. 1C and 1D are schematic diagrams of example configurations of interconnected Mach-Zehnder interferometers (MZIs).
Figure 1D:
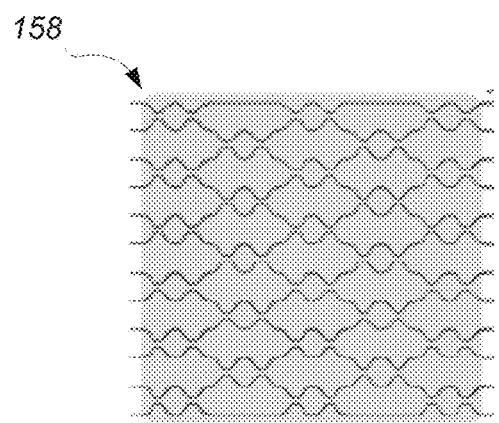

The optical interference unit may include a plurality of interconnected Mach-Zehnder interferometers (MZIs). FIGS. 1C and 1D shows schematic diagrams of example configurations 157 and 158 of interconnected MZIs. The MZIs can be interconnected in various ways, such as in configurations 157 or 158 to achieve linear transformation of the optical input vectors received through the array of input waveguides 152.

Figure 1E:
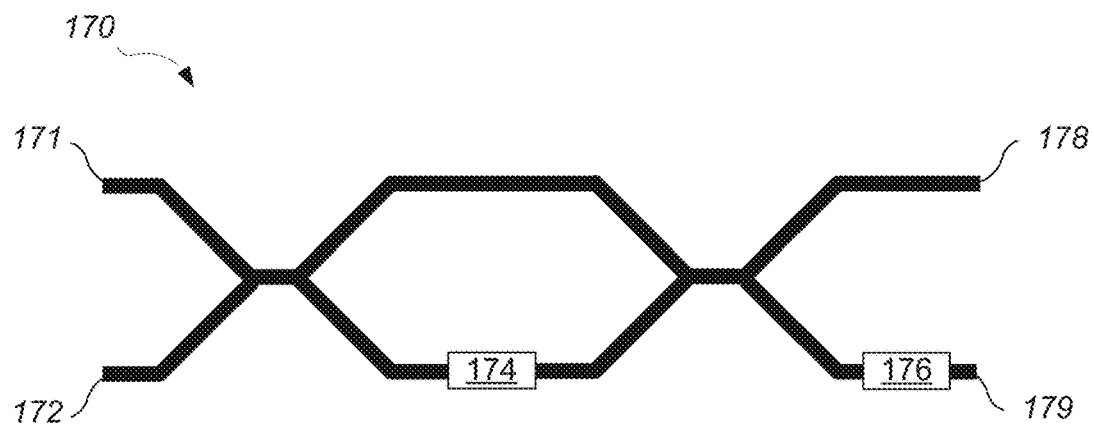
FIG. 1E is a schematic diagram of an example of an MZI.

FIG. 1E shows a schematic diagram of an example of an MZI 170. The MZI includes a first input waveguide 171, a second input waveguide 172, a first output waveguide 178, and a second output waveguide 179. Further, each MZI 170 in the plurality of interconnected MZIs include a first phase shifter 174 configured to change a splitting ratio of the MZI 170; and a second phase shifter 176 configured to shift a phase of one output of the MZI, such as the light exiting the MZI 170 through the second output waveguide 179. The first phase shifters 174 and the second phase shifters 176 of the MZIs 170 are coupled to the plurality of weight control signals generated by the DAC unit 130. The first and second phase shifters 174 and 176 are examples of reconfigurable elements of the OMNI unit 150. Examples of the reconfiguring elements include thermo-optic phase shifters or electro-optic phase shifters. Thermo-optic phase shifters operate by heating the waveguide to change the refractive index of the waveguide and cladding materials, which translates to a change in phase. Electro-optic phase shifters operate by applying an electric field (e.g., $LiNbO_3$, reverse bias PN junctions) or electrical current (e.g., forward bias PIN junctions), which changes the refractive index of the waveguide material. By varying the weight control signals, the phase delays of the first and second phase shifters 174 an 176 of each of the interconnected MZIs 170 can be varied, which reconfigures the optical interference unit 154 of the OMNI unit 150 to implement a particular matrix multiplication that is determined by the phase delays set across the entire optical interference unit 154. Additional embodiments of the OMNI unit 150 and the optical interference unit are disclosed in U.S. Patent Publication No. US 2017/0351293 A1 titled "APPARATUS AND METHODS FOR OPTICAL NEURAL NETWORK," which is fully incorporated by reference herein.

The optical input vector is generated through the laser unit 142 and the modulator array 144. The optical input vector of length N has N independent optical signals that each have an intensity that corresponds to the value of respective element of the digital input vector of length N. As an example, the laser unit 142 may generate N light outputs. The N light outputs are of the same wavelength, and are optically coherent. Optical coherence of the light outputs allow the light outputs to optically interfere with each other, which is a property utilized by the OMM unit 150 (e.g., in the operation of the MZIs). Further, the light outputs of the laser unit 142 may be substantially identical to each other. For example, the N light outputs may be substantially uniform in their intensities (e.g., within 5%, 3%, 1%, 0.5%, 0.1% or 0.01%) and in their relative phases (e.g., within 10 degrees, 5 degrees, 3 degrees, 1 degree, 0.1 degree). The uniformity of the light outputs may improve the faithfulness of the optical input vector to the digital input vector, improving the overall accuracy of the optical processor 140. In some implementations, the light outputs of the laser unit 142 may have optical powers that range from 0.1 mW to 50 mW per output, wavelengths in the near infrared range (e.g., between 900 nm and 1600 nm), and linewidths less than 1 nm. The light outputs of the laser unit 142 may be single transverse-mode light outputs.

In some implementations, the laser unit 142 includes a single laser source and an optical power splitter. The single laser source is configured to generate laser light. The optical power splitter is configured to split the light generated by the laser source into N light outputs of substantially equal intensities and phase. By splitting a single laser output into multiple outputs, optical coherence of the multiple light outputs may be achieved. The single laser source may be, for example, a semiconductor laser diode, a vertical-cavity surface-emitting laser (VCSEL), a distributed feedback (DFB) laser, or a distributed Bragg reflector (DBR) laser. The optical power splitter may be, for example, a 1:N multimode interference (MMI) splitter, a multi-stage splitter including multiple 1:2 MMI splitter or directional-couplers, or a star coupler. In some other implementations, a master-slave laser configuration may be used, where the slave lasers are injection locked by the master laser to have a stable phase relationship to the master laser.

The light outputs of the laser unit 142 are coupled to the modulator array 144. The modulator array 144 is configured to receive the light inputs from the laser unit 142 and modulate the intensities of the received light inputs based on modulator control signals, which are electrical signals. Examples of modulators include Mach-Zehnder Interferometer (MZI) modulators, ring resonator modulators, and electro-absorption modulators. The modulator array 144 has N modulators that each receives one of the N light outputs of the laser unit 142. A modulator receives a control signal that corresponds to an element of the digital input vector and modulates the intensity of the light. The control signal may be generated by the DAC unit 130.

The DAC unit 130 is configured to generate multiple modulator control signals and to generate multiple weight control signals under the control of the controller 110. For example, the DAC unit 130 receives, from the controller 110, a first DAC control signal that corresponds to the digital input vectors to be processed by the optical processor 140. The DAC unit 130 generates, based on the first DAC control signal, the modulator control signals, which are analog signals suitable for driving the modulator array 144. The analog signals may be voltages or currents, for example, depending on the technology and design of the modulators of the array 144. The voltages may have an amplitude that ranges from, e.g., ±0.1 V to ±10 V, and the current may have an amplitude that ranges from, e.g., 100 µA to 100 mA. In some implementations, the DAC unit 130 may include modulator drivers that are configured to buffer, amplify, or condition the analog signals so that the modulators of the array 144 may be adequately driven. For example, some types of modulators may be driven with a differential control signal. In such cases, the modulator drivers may be differential drivers that produce a differential electrical output based on a single-ended input signal. As another example, some types of modulators may have a 3 dB bandwidth that is less than a desired processing rate of the optical processor 140. In such cases, the modulator drivers may include pre-emphasis circuits or other bandwidth-enhancing circuits that are designed to extend the operating bandwidth of the modulators.

In some cases, the modulators of the array 144 may have nonlinear transfer functions. For example, a MZI optical modulator may have a nonlinear relationship (e.g., a sinusoidal dependence) between the applied control voltage and its transmission. In such cases, the first DAC control signals may be adjusted, or compensated, based on the nonlinear transfer function of the modulators such that a linear relationship between the digital input vectors and the generated optical input vectors can be maintained. Maintaining such linearity is typically important in ensuring that the input to the OMNI unit 150 is an accurate representation of the digital input vector. In some implementations, the compensation of the first DAC control signal may be performed by the controller 110 by a lookup table that maps a value of the digital input vector to a value to be output by the DAC unit 130 such that the resulting modulated optical signals are linearly proportional to the elements of the digital input vector. The lookup table may be generated by characterizing the nonlinear transfer function of the modulator and calculating an inverse function of the nonlinear transfer function.

In some implementations, the nonlinearity of the modulators and resulting nonlinearity in the generated optical input vectors can be compensated by ANN computation algorithms.

The optical input vector generated by the modulator array 144 is input to the OMM unit 150. The optical input vector may be N spatially separated optical signals that each have an optical power corresponding to the elements of the digital input vector. The optical power of the optical signals typically range from, e.g., 1 µW to 10 mW. The OMM unit 150 receives the optical input vector and performs an N×N matrix multiplication based on its internal configuration. The internal configuration is controlled by electrical signals generated by the DAC unit 130. For example, the DAC unit 130 receives, from the controller 110, a second DAC control signal that corresponds to the neural network weights to be implemented by the OMM unit 150. The DAC unit 130 generates, based on the second DAC control signal, the weight control signals, which are analog signals suitable for controlling the reconfigurable elements within the OMM unit 150. The analog signals may be voltages or currents, for example, depending on the type of the reconfiguring elements of the OMNI unit 150. The voltages may have an amplitude that ranges from, e.g., 0.1 V to 10 V, and the current may have an amplitude that ranges from, e.g., 100 µA to 10 mA.

The modulator array 144 may operate at a modulation rate that is different from a reconfiguration rate at which the OMM unit 150 can be reconfigured. The optical input vector generated by the modulator array 144 propagates through the OMM unit at a substantial fraction of the speed of light (e.g., 80%, 50%, or 25% of the speed of light), depending on the optical properties (e.g., effective index) of the OMNI unit 150. For a typical OMNI unit 150, the propagation time of the optical input vector is in the range of 1 to 10's of picoseconds, which corresponds to 10's to 100's of GHz in processing rate. As such, the rate at which the optical processor 140 can perform matrix multiplication operations is limited in part by the rate at which the optical input vector can be generated. Modulators having bandwidths of 10's of GHz are readily available, and modulators having bandwidth exceeding 100 GHz are being developed. As such, the modulation rate of the modulator array 144 may range, for example, from 5 GHz, 8 GHz, or 10's of GHz to 100's of GHz. In order to sustain the operation of the modulator array 144 at such modulation rate, the integrated circuitry of the controller 110 may be configured to output control signals for the DAC unit 130 at a rate greater than or equal to, for example, 5 GHz, 8 GHz, 10 GHz, 20 GHz, 25 GHz, 50 GHz, or 100 GHz.

The reconfiguration rate of the OMNI unit 150 may be significantly slower than the modulation rate depending on the type of the reconfigurable elements implemented by the OMNI unit 150. For example, the reconfigurable elements of the OMM unit 150 may be a thermo-optic type that uses a micro-heater to adjust a temperature of an optical waveguide of the OMNI unit 150, which in turn affects the phase of an optical signal within the OMM unit 150 and leads to matrix multiplication. Due to the thermal time constants associated with heating and cooling of structures, the reconfiguration rate may be limited to 100's of kHz to 10's of MHz, for example. As such, the modulator control signals for controlling the modulator array 144 and the weight control signals for reconfiguring the OMNI unit 150 may have significantly different requirements in speed. Further, the electrical characteristics of the modulator array 144 may differ significantly from those of the reconfigurable elements of the OMNI unit 150.

To accommodate the different characteristics of the modulator control signals and the weight control signals, in some implementations, the DAC unit 130 may include a first DAC subunit 132, and a second DAC subunit 134. The first DAC subunit 132 may be specifically configured to generate the modulator control signals, and the second DAC subunit 134 may be specifically configured to generate the weight control signals. For example, the modulation rate of the modulator array 144 may be 25 GHz, and the first DAC subunit 132 may have a per-channel output update rate of 25 giga-samples per second (GSPS) and a resolution of 8 bits or higher. The reconfiguration rate of the OMNI unit 150 may be 1 MHz, and the second DAC subunit 134 may have an output update rate of 1 mega-samples per second (MSPS) and a resolution of 10 bits. Implementing separate DAC subunits 132 and 134 allows independent optimization of the DAC subunits for respective signals, which may reduce the total power consumption, complexity, cost, or combination thereof of the DAC unit 130. It should be noted that while the DAC subunits 132 and 134 are described as sub elements of the DAC unit 130, in general, the DAC subunits 132 and 134 may be integrated on a common chip, or be implemented as separate chips.

Based on the different characteristics of the first DAC subunit 132 and the second DAC subunit 134, in some implementations, the memory unit 120 may include a first memory subunit and a second memory subunit. The first memory subunit may be a memory dedicated to storing of the input dataset and the digital input vectors, and may have an operating speed sufficient to support the modulation rate. The second memory subunit maybe a memory dedicated to storing of the neural network weights, and may have an operation speed sufficient to support the reconfiguration rate of the OMNI unit 150. In some implementations, the first memory subunit may be implemented using SRAM and the second memory subunit may be implemented using DRAM. In some implementations, the first and second memory subunits may be implemented using DRAM. In some implementations, the first memory unit may be implemented as a part of or as a cache of the controller 110. In some implementations, the first and second memory subunits may be implemented by a single physical memory device as different address spaces.

The OMM unit 150 outputs an optical output vector of length N, which corresponds to the result of the N×N matrix multiplication of the optical input vector and the neural network weights. The OMM unit 150 is coupled to the detection unit 146, which is configured to generate N output voltages corresponding to the N optical signals of the optical output vector. For example, the detection unit 146 may include an array of N photodetectors configured to absorb the optical signals and generate photocurrents, and an array of N transimpedance amplifiers configured to convert the photocurrents into the output voltages. The bandwidths of the photodetectors and the transimpedance amplifiers may be set based on the modulation rate of the modulator array 144. The photodetectors may be formed from various materials based on the wavelengths of the optical output vector being detected. Examples of the materials for photodetectors include germanium, silicon-germanium alloy, and indium gallium arsenide (InGaAs).

The detection unit 146 is coupled to the ADC unit 160. The ADC unit 160 is configured to convert the N output voltages into N digitized optical outputs, which are quantized digital representations of the output voltages. For example, the ADC unit 160 may be an N channel ADC. The controller 110 may obtain, from the ADC unit 160, the N digitized optical outputs corresponding to the optical output vector of the optical matrix multiplication unit 150. The controller 110 may form, from the N digitized optical outputs, a digital output vector of length N that corresponds to the result of the N×N matrix multiplication of the input digital vector of length N.

Various electrical components of the ANN computation system 100 may be integrated in various ways. For example, the controller 110 may be an application specific integrated circuit that is fabricated on a semiconductor die. Other electrical components, such as the memory unit 120, the DAC unit 130, the ADC unit 160, or combination thereof may be monolithically integrated on the semiconductor die on which the controller 110 is fabricated. As another example, two or more electrical components can be integrated as a System-on-Chip (SoC). In a SoC implementation, the controller 110, the memory unit 120, the DAC unit 130, and the ADC unit 160 may be fabricated on respective dies, and the respective dies may be integrated on a common platform (e.g., an interposer) that provides electrical connections between the integrated components. Such SoC approach may allow faster data transfer between the electronic components of the ANN computation system 100 relative to an approach where the components are separately placed and routed on a printed circuit board (PCB), thereby improving the operating speed of the ANN computation system 100. Further, the SoC approach may allow use of different fabrication technologies optimized for different electrical components, which may improve the performance of the different components and reduce overall costs over a monolithic integration approach. While the integration of the controller 110, the memory unit 120, the DAC unit 130, and the ADC unit 160 has been described, in general, a subset of the components may be integrated while other components are implemented as discrete components for various reasons, such as performance or cost. For example, in some implementations, the memory unit 120 may be integrated with the controller 110 as a functional block within the controller 110.

Various optical components of the ANN computation system 100 may also be integrated in various ways. Examples of the optical components of the ANN computation system 100 include the laser unit 142, the modulator array 144, the OMNI unit 150, and the photodetectors of the detection unit 146. These optical components may be integrated in various ways to improve performance and/or reduce cost. For example, the laser unit 142, the modulator array 144, the OMM unit 150, and the photodetectors may be monolithically integrated on a common semiconductor substrate as a photonic integrated circuit (PIC). On a photonic integrated circuit formed based on a compound semiconductor material system (e.g., III-V compound semiconductors such as InP), lasers, modulators such as electro-absorption modulators, waveguides, and photodetectors may be monolithically integrated on a single die. Such monolithic integration approach may reduce the complexities of aligning the inputs and outputs of various discrete optical components, which may require alignment accuracies ranging from sub-micron to a few microns. As another example, the laser source of the laser unit 142 may be fabricated on a compound-semiconductor die, while the optical power splitter of the laser unit 142, the modulator array 144, the OMNI unit 150, and the photodetectors of the detection unit 146 may be fabricated on a silicon die. PICs fabricated on a silicon wafer, which may be referred to as silicon photonics technology, typically has a greater integration density, higher lithographic resolution, and lower cost relative to the III-V based PICs. Such greater integration density may be beneficial in fabrication of the OMNI unit 150, as the OMNI unit 150 typically includes 10's to 100's of optical components such as power splitters and phase shifters. Further, the higher lithographic resolution of the silicon photonics technology may reduce fabrication variation of the OMNI unit 150, improving the accuracy of the OMNI unit 150.

The ANN computation system 100 may be implemented in a variety of form factors. For example, the ANN computation system 100 may be implemented as a co-processor that is plugged into a host computer. Such system 100 may have, for example, a form factor of a PCI express card and communicate with the host computer over the PCIe bus. The host computer may host multiple co-processor type ANN computation systems 100, and be connected to the computer 102 over a network. This type of implementation may be suitable for a use in a cloud datacenter where racks of servers may be dedicated to processing ANN computation requests received from other computers or servers. As another example, the co-processor type ANN computation system 100 may be plugged directly into the computer 102 issuing the ANN computation requests.

In some implementations, the ANN computation system 100 may be integrated onto a physical system that requires real-time ANN computation capability. For example, systems that rely heavily on real-time artificial intelligence tasks such as autonomous vehicles, autonomous drones, object- or face-recognizing security cameras, and various Internet-of-Things (IoT) devices may benefit from having ANN computation system 100 directly integrated with other subsystems of such systems. Having directly-integrated ANN computation system 100 can enable real-time artificial intelligence in devices with poor or no internet connectivity, and enhance the reliability and availability of mission-critical artificial intelligence systems.

While the DAC unit 130 and the ADC unit 160 are illustrated to be coupled to the controller 110, in some implementations, the DAC unit 130, the ADC unit 160 or both may alternatively, or additionally, be coupled to the memory unit 120. For example, a direct memory access (DMA) operation by the DAC unit 130 or the ADC unit 160 may reduce the computation burden on the controller 110 and reduce latency in reading from and writing to the memory unit 120, further improving the operating speed of the ANN computation unit 100.

FIG. 2 shows a flowchart of an example of a method 200 for performing an ANN computation. The steps of the process 200 may be performed by the controller 110. In some implementations, various steps of method 200 can be run in parallel, in combination, in loops, or in any order.

At 210, an artificial neural network (ANN) computation request comprising an input dataset and a first plurality of neural network weights is received. The input dataset includes a first digital input vector. The first digital input vector is a subset of the input dataset. For example, it may be a sub-region of an image. The ANN computation request may be generated by various entities, such as the computer 102. The computer may include one or more of various types of computing devices, such as a personal computer, a server computer, a vehicle computer, and a flight computer. The ANN computation request generally refers to an electrical signal that notifies or informs the ANN computation system 100 of an ANN computation to be performed. In some implementations, the ANN computation request may be divided into two or more signals. For example, a first signal may query the ANN computation system 100 to check whether the system 100 is ready to receive the input dataset and the first plurality of neural network weights. In response to a positive acknowledgement by the system 100, the computer may send a second signal that includes the input dataset and the first plurality of neural network weights.

At 220, the input dataset and the first plurality of neural network weights are stored. The controller 110 may store the input dataset and the first plurality of neural network weights in the memory unit 120. Storing of the input dataset and the first plurality of neural network weights in the memory unit 120 may allow flexibilities in the operation of the ANN computation system 100 that, for example, can improve the overall performance of the system. For example, the input dataset can be divided into digital input vectors of a set size and format by retrieving desired portions of the input dataset from the memory unit 120. Different portions of the input dataset can be processed in various order, or be shuffled, to allow various types of ANN computations to be performed. For example, shuffling may allow matrix multiplication by block matrix multiplication technique in cases where the input and output matrix sizes are different. As another example, storing of the input dataset and the first plurality of neural network weights in the memory unit 120 may allow queuing of multiple ANN computation requests by the ANN computation system 100, which may allow the system 100 to sustain operation at its full speed without periods of inactivity.

In some implementations, the input dataset may be stored in the first memory subunit, and the first plurality of neural network weights may be stored in the second memory subunit.

At 230, a first plurality of modulator control signals is generated based on the first digital input vector and a first plurality of weight control signals is generated based on the first plurality of neural network weights. The controller 110 may send a first DAC control signal to the DAC unit 130 for generating the first plurality of modulator control signals. The DAC unit 130 generates the first plurality of modulator control signals based on the first DAC control signal, and the modulator array 144 generates the optical input vector representing the first digital input vector.

The first DAC control signal may include multiple digital values to be converted by the DAC unit 130 into the first plurality of modulator control signals. The multiple digital values are generally in correspondence with the first digital input vector, and may be related through various mathematical relationships or look-up tables. For example, the multiple digital values may be linearly proportional to the values of the elements of the first digital input vector. As another example, the multiple digital values may be related to the elements of the first digital input vector through a look-up table configured to maintain a linear relationship between the digital input vector and the optical input vector generated by the modulator array 144.

The controller 110 may send a second DAC control signal to the DAC unit 130 for generating the first plurality of weight control signals. The DAC unit 130 generates the first plurality of weight control signals based on the second DAC control signal, and the OMM unit 150 is reconfigured according to the first plurality of weight control signals, implementing a matrix corresponding to the first plurality of neural network weights.

The second DAC control signal may include multiple digital values to be converted by the DAC unit 130 into the first plurality of weight control signals. The multiple digital values are generally in correspondence with the first plurality of neural network weights, and may be related through various mathematical relationships or look-up tables. For example, the multiple digital values may be linearly proportional to the first plurality of neural network weights. As another example, the multiple digital values may be calculated by performing various mathematical operations on the first plurality of neural network weights to generate weight control signals that can configure the OMNI unit 150 to perform a matrix multiplication corresponding to the first plurality of neural network weights.

In some implementations, the first plurality of neural network weights representing a matrix M may be decomposed through singular value decomposition (SVD) method into $M=USV^*$, where U is an M×M unitary matrix, S is an M×N diagonal matrix with non-negative real numbers on the diagonal, and $V^*$ is the complex conjugate of an N×N unitary matrix V. In such cases, the first plurality of weight control signals may include a first plurality of OMM unit control signals corresponding to the matrix V, and a second plurality of OMM unit control signal corresponding to the matrix S. Further, the OMNI unit 150 may be configured to have a first OMM subunit configured to implement the matrix V, a second OMM subunit configured to implement matrix S, and a third OMNI subunit configured to implement matrix U such that the OMNI unit 150 as a whole implements the matrix M. The SVD method is further described in U.S. Patent Publication No. US 2017/0351293 A1 titled "APPARATUS AND METHODS FOR OPTICAL NEURAL NETWORK," which is fully incorporated by reference herein.

At 240, a first plurality of digitized optical outputs corresponding to the optical output vector of the optical matrix multiplication unit is obtained. The optical input vector generated by the modulator array 144 is processed by the OMM unit 150 and transformed into an optical output vector. The optical output vector is detected by the detection unit 146 and converted into electrical signals that can be converted into digitized values by the ADC unit 160. The controller 110 may, for example, send a conversion request to the ADC unit 160 to begin a conversion of the voltages output by the detection unit 146 into digitized optical outputs. Once the conversion is complete, the ADC unit 160 may send the conversion result to the controller 110. Alternatively, the controller 110 may retrieve the conversion result from the ADC unit 160. The controller 110 may form, from the digitized optical outputs, a digital output vector that corresponds to the result of the matrix multiplication of the input digital vector. For example, the digitized optical outputs may be organized, or concatenated, to have a vector format.

In some implementations, the ADC unit 160 may be set or controlled to perform an ADC conversion based on a DAC control signal issued to the DAC unit 130 by the controller 110. For example, the ADC conversion may be set to begin at a preset time following the generation of the modulation control signal by the DAC unit 130. Such control of the ADC conversion may simplify the operation of the controller 110 and reduce the number of necessary control operations.

At 250, a nonlinear transformation is performed on the first digital output vector to generate a first transformed digital output vector. A node, or an artificial neuron, of an ANN operates by first performing a weighted sum of the signals received from nodes of a previous layer, then performing a nonlinear transformation ("activation") of the weighted sum to generate an output. Various types of ANN may implement various types of differentiable, nonlinear transformations. Examples of nonlinear transformation functions include a rectified linear unit (RELU) function, a Sigmoid function, a hyperbolic tangent function, an X^2 function, and a |X| function. Such nonlinear transformations are performed on the first digital output by the controller 110 to generate the first transformed digital output vector. In some implementations, the nonlinear transformations may be performed by a specialized digital integrated circuitry within the controller 110. For example, the controller 110 may include one or more modules or circuit blocks that are specifically adapted to accelerate the computation of one or more types of nonlinear transformations.

At 260, the first transformed digital output vector is stored. The controller 110 may store the first transformed digital output vector in the memory unit 120. In cases where the input dataset is divided into multiple digital input vectors, the first transformed digital output vector corresponds to a result of the ANN computation of a portion of the input dataset, such as the first digital input vector. As such, storing of the first transformed digital output vector allows the ANN computation system 100 to perform and store additional computations on other digital input vectors of the input dataset to later be aggregated into a single ANN output.

At 270, an artificial neural network output generated based on the first transformed digital output vector is output. The controller 110 generates an ANN output, which is a result of processing the input dataset through the ANN defined by the first plurality of neural network weights. In cases where the input dataset is divided into multiple digital input vectors, the generated ANN output is an aggregated output that includes the first transformed digital output, but may further include additional transformed digital outputs that correspond to other portions of the input dataset. Once the ANN output is generated, the generated output is sent to a computer, such as the computer 102, that originated the ANN computation request.

Various performance metrics can be defined for the ANN computation system 100 implementing the method 200. Defining performance metrics may allow a comparison of performance of the ANN computation system 100 that implements the optical processor 140 with other systems for ANN computation that instead implement electronic matrix multiplication units. In one aspect, the rate at which an ANN computation can be performed may be indicated in part by a first loop period defined as a time elapsed between the step 220 of storing, in the memory unit, the input dataset and the first plurality of neural network weights, and the step 260 of storing, in the memory unit, the first transformed digital output vector. This first loop period therefore includes the time taken in converting the electrical signals into optical signals (e.g., step 230), performing the matrix multiplication in the optical domain, and converting the result back into the electrical domain (e.g., step 240). Steps 220 and 260 both involves storing of data into the memory unit 120, which are steps shared between the ANN computation system 100 and conventional ANN computation system systems without the optical processor 140. As such, the first loop period measuring the memory-to-memory transaction time may allow a realistic or fair comparison of ANN computation throughput to be made between the ANN computation system 100 and ANN computation systems without the optical processor 140, such as systems implementing electronic matrix multiplication units.

Due to the rate at which the optical input vectors can be generated by the modulator array 144 (e.g., at 25 GHz) and the processing rate of the OMM unit 150 (e.g., >100 GHz), the first loop period of the ANN computation system 100 for performing a single ANN computation of a single digital input vector may approach the reciprocal of the speed of the modulator array 144, e.g., 40 ps. After accounting for latencies associated with the signal generation by the DAC unit 130 and the ADC conversion by the ADC unit 160, the first loop period may, for example, be less than or equal to 100 ps, less than or equal to 200 ps, less than or equal to 500 ps, less than or equal to 1 ns, less than or equal to 2 ns, less than or equal to 5 ns, or less than or equal to 10 ns.

As a comparison, execution time of a multiplication of an M×1 vector and an M×M matrix by an electronic matrix multiplication unit is typically proportional to M^2−1 processor clock cycles. For M=32, such multiplication would take approximately 1024 cycles, which at 3 GHz clock speed results in an execution time exceeding 300 ns, which is orders of magnitude slower than the first loop period of the ANN computation system 100.

In some implementations, the method 200 further includes a step of generating a second plurality of modulator control signals based on the first transformed digital output vector. In some types of ANN computations, a single digital input vector may be repeatedly propagated through, or processed by, the same ANN. An ANN that implements multi-pass processing may be referred to as a recurrent neural network (RNN). A RNN is a neural network in which the output of the network during a (k)th pass through the neural network is recirculated back to the input of the neural network and used as the input during the (k+1)th pass. RNNs may have various applications in pattern recognition tasks, such as speech or handwriting recognition. Once the second plurality of modulator control signals are generated, the method 200 may proceed from step 240 through step 260 to complete a second pass of the first digital input vector through the ANN. In general, the recirculation of the transformed digital output to be the digital input vector may be repeated for a preset number of cycles depending of the characteristics of the RNN received in the ANN computation request.

In some implementations, the method 200 further includes a step of generating a second plurality of weight control signals based on a second plurality of neural network weights. In some cases, the artificial neural network computation request further includes a second plurality of neural network weights. In general, an ANN has one or more hidden layers in addition to the input and output layers. For ANN with two hidden layers, the second plurality of neural network weights may correspond, for example, to the connectivity between the first layer of the ANN and the second layer of the ANN. To process the first digital input vector through the two hidden layers of the ANN, the first digital input vector may first be processed according to the method 200 up to step 260, at which the result of processing the first digital input vector through the first hidden layer of the ANN is stored in the memory unit 120. The controller 110 then reconfigures the OMNI unit 150 to perform the matrix multiplication corresponding to the second plurality of neural network weights associated with the second hidden layer of the ANN. Once the OMNI unit 150 is reconfigured, the method 200 may generate the plurality of modulator control signals based on the first transformed digital output vector, which generates an updated optical input vector corresponding to the output of the first hidden layer. The updated optical input vector is then processed by the reconfigured OMNI unit 150 which corresponds to the second hidden layer of the ANN. In general, the described steps can be repeated until the digital input vector has been processed through all hidden layers of the ANN.

As previously described, in some implementations of the OMM unit 150, the reconfiguration rate of the OMNI unit 150 may be significantly slower than the modulation rate of the modulator array 144. In such cases, the throughput of the ANN computation system 100 may be adversely impacted by the amount of time spent in reconfiguring the OMM unit 150 during which ANN computations cannot be performed. To mitigate the impact of the relatively slow reconfiguration time of the OMM unit 150, batch processing techniques may be utilized in which two or more digital input vectors are propagated through the OMNI unit 150 without a configuration change to amortize the reconfiguration time over a larger number of digital input vectors.

Figure 2A:
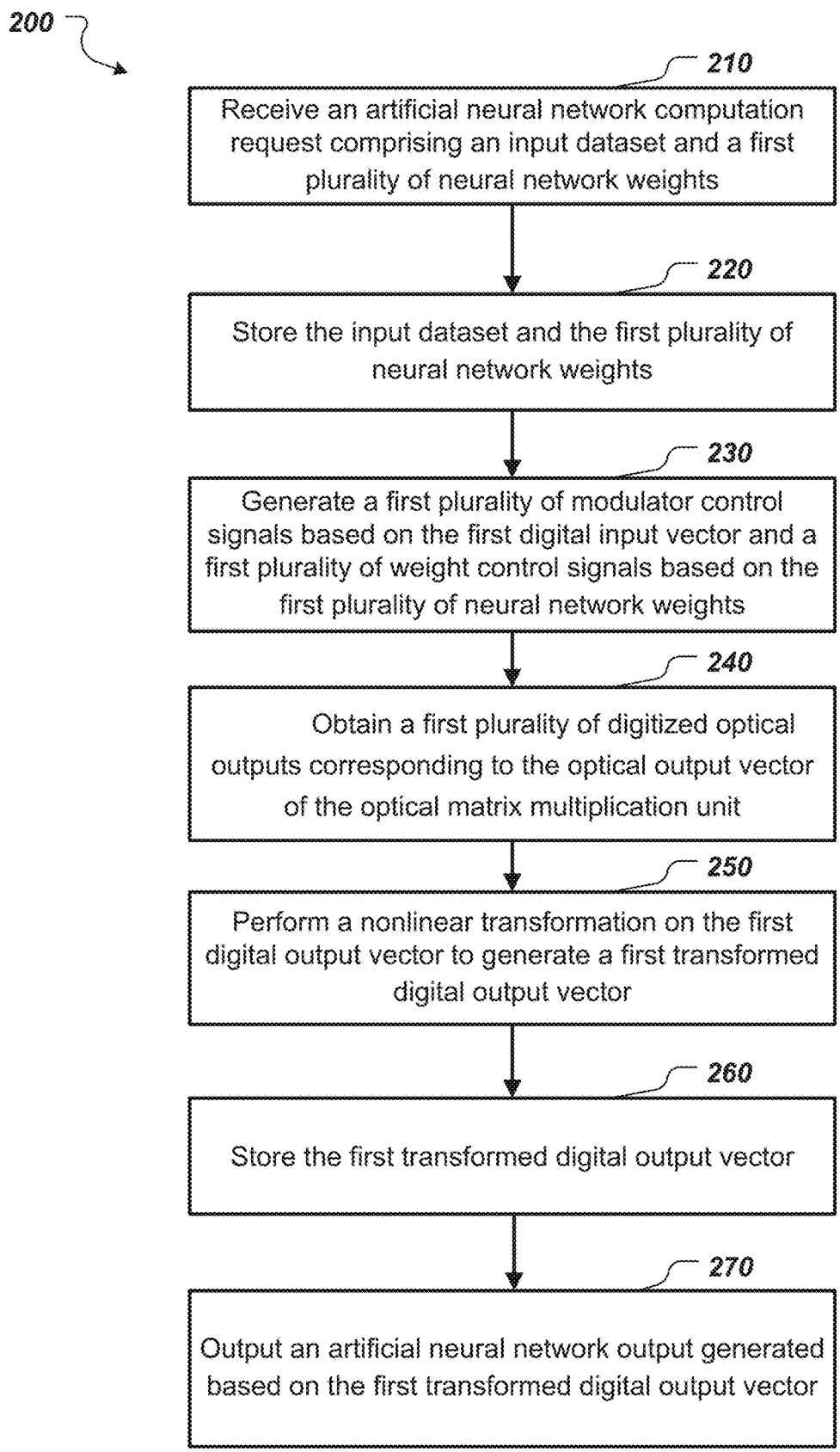
FIG. 2A is a flowchart showing an example of a method for performing an ANN computation.
Figure 2B:
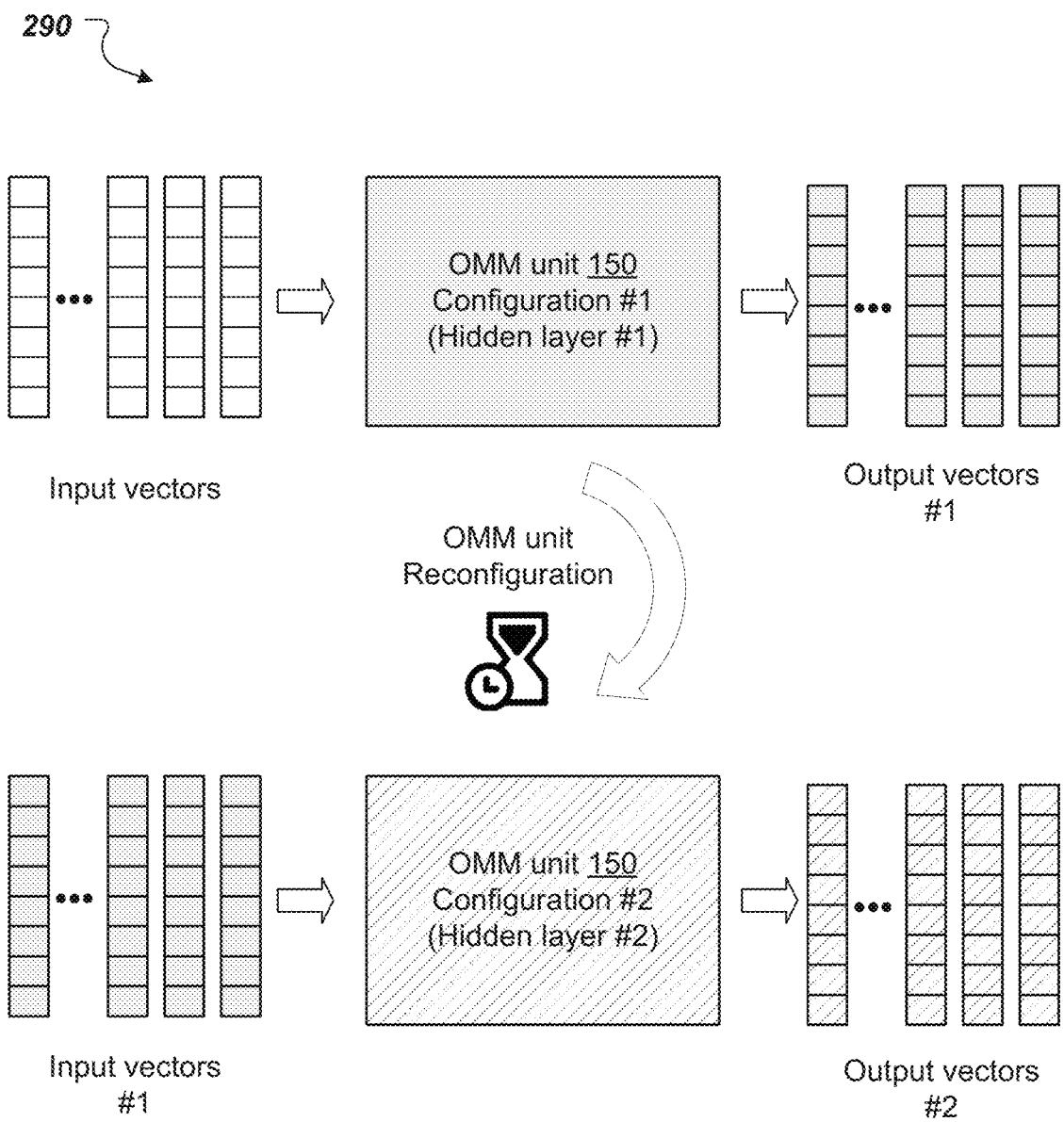
FIG. 2B is a diagram illustrating an aspect of the method of FIG. 2A.

FIG. 2B shows a diagram 290 illustrating an aspect of the method 200 of FIG. 2A. For an ANN with two hidden layers, instead of processing the first digital input vector through the first hidden layer, reconfiguring the OMNI unit 150 for the second hidden layer, processing the first digital input vector through the reconfigured OMM unit 150, and repeating the same for the remaining digital input vectors, all digital input vectors of the input dataset can be first processed through the OMNI unit 150 configured for the first hidden layer (configuration #1) as shown in the upper portion of the diagram 290. Once all digital input vectors have been processed by the OMM unit 150 having configuration #1, the OMNI unit 150 is reconfigured into configuration #2, which correspond to the second hidden layer of the ANN. This reconfiguration can be significantly slower than the rate at which the input vectors can be processed by the OMM unit 150. Once the OMM unit 150 is reconfigured for the second hidden layer, the output vectors from the previous hidden layer can be processed by the OMNI unit 150 in a batch. For large input datasets having tens or hundreds of thousands of digital input vectors, the impact of the reconfiguration time may be reduced by approximately the same factor, which may substantially reduce the portion of the time spent by the ANN computation system 100 in reconfiguration.

To implement batch processing, in some implementations, the method 200 further includes steps of generating, through the DAC unit, a second plurality of modulator control signals based on the second digital input vector; obtaining, from the ADC unit, a second plurality of digitized optical outputs corresponding to the optical output vector of the optical matrix multiplication unit, the second plurality of digitized optical outputs forming a second digital output vector; performing a nonlinear transformation on the second digital output vector to generate a second transformed digital output vector; and storing, in the memory unit, the second transformed digital output vector. The generating of the second plurality of modulator control signals may follow the step 260, for example. Further, the ANN output of step 270 in this case is now based on both the first transformed digital output vector and the second transformed digital output vector. The obtaining, performing, and storing steps are analogous to the steps 240 through 260.

The batch processing technique is one of several techniques for improving the throughput of the ANN computation system 100. Another technique for improving the throughput of the ANN computation system 100 is through parallel processing of multiple digital input vectors by utilizing wavelength division multiplexing (WDM). WDM is a technique of simultaneously propagating multiple optical signals of different wavelengths through a common propagation channel, such as a waveguide of the OMM unit 150. Unlike electrical signals, optical signals of different wavelengths can propagate through a common channel without affecting other optical signals of different wavelengths on the same channel. Further, optical signals can be added (multiplexed) or dropped (demultiplexed) from a common propagation channel using well-known structures such as optical multiplexers and demultiplexers.

Figure 1F:
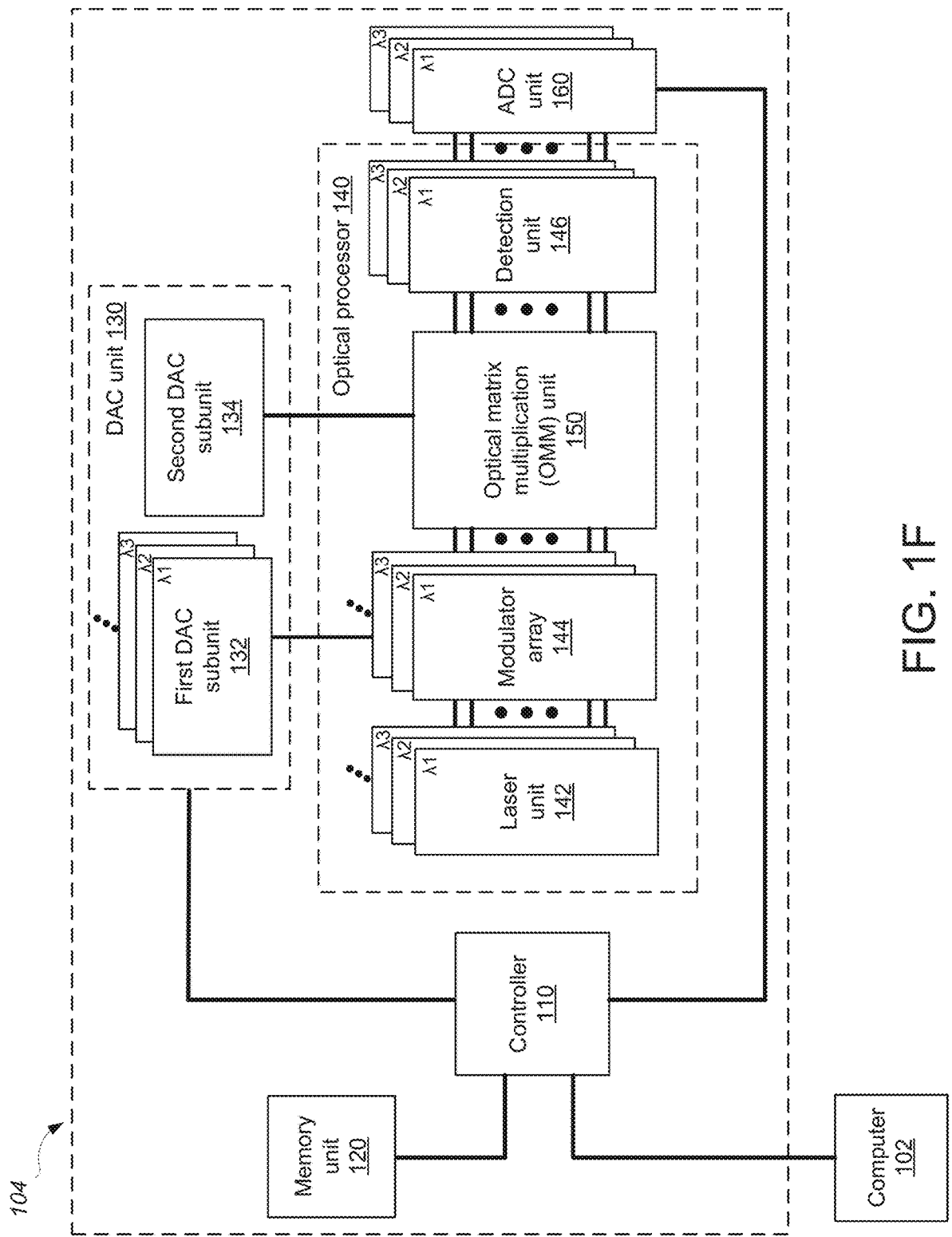
FIG. 1F is a schematic diagram of an example of a wavelength division multiplexed ANN computation system.

In context of the ANN computation system 100, multiple optical input vectors of different wavelengths can be independently generated, simultaneously propagated through the OMNI unit 150, and independently detected to enhance the throughput of the ANN computation system 100. Referring to FIG. 1F, a schematic diagram of an example of a wavelength division multiplexed (WDM) artificial neural network (ANN) computation system 104 is shown. The WDM ANN computation system 104 is similar to the ANN computation system 100 unless otherwise described. In order to implement the WDM technique, in some implementations of the ANN computation system 104, the laser unit 142 is configured to generate multiple wavelengths, such as $\lambda 1$, $\lambda 2$, and $\lambda 3$. The multiple wavelengths may preferably be separated by a wavelength spacing that is sufficiently large to allow easy multiplexing and demultiplexing onto a common propagation channel. For example, the wavelength spacing greater than 0.5 nm, 1.0 nm, 2.0 nm, 3.0 nm, or 5.0 nm may allow simple multiplexing and demultiplexing. On the other hand, the range between the shortest wavelength and the longest wavelength of the multiple wavelengths ("WDM bandwidth") may preferably be sufficiently small such that the characteristics or performance of the OMNI unit 150 remain substantially the same across the multiple wavelengths. Optical components are typically dispersive, meaning that their optical characteristics change as a function of wavelength. For example, a power splitting ratio of an MZI may change over wavelength. However, by designing the OMNI unit 150 to have a sufficiently large operating wavelength window, and by limiting the wavelengths to be within that operating wavelength window, the optical output vector output by the OMM unit 150 at each wavelength may be a sufficiently accurate result of the matrix multiplication implemented by the OMM unit 150. The operating wavelength window may be, for example, 1 nm, 2 nm, 3 nm, 4 nm, 5 nm, 10 nm, or 20 nm.

Figures 39A, 39B:
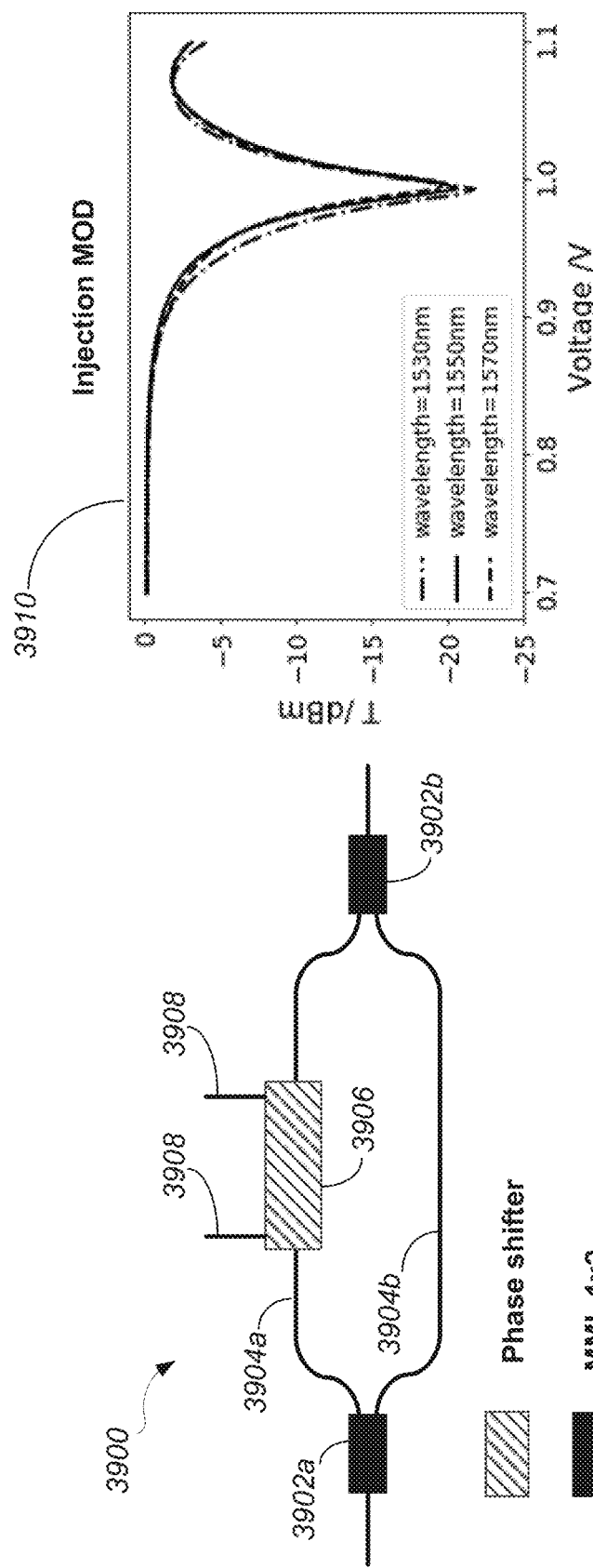
FIG. 39A is a diagram of an example of a Mach-Zehnder modulator.
FIG. 39B is a graph showing the intensity-vs-voltage curves for the Mach-Zehnder modulator of FIG. 39A.

FIG. 39A shows a diagram of an example of a Mach-Zehnder modulator 3900 that can be used to modulate the amplitude of an optical signal. The Mach-Zehnder modulator 3900 includes two 1×2 port multi-mode interference couplers (MMI_1×2) 3902a and 3902b, two balanced arms 3904a and 3904b, and a phase shifter 3906 in one arm (or one phase shifter in each arm). When a voltage is applied to the phase shifter in one arm through signal lines 3908, there will be a phase difference between the two arms 3904a and 3904b that will convert to the amplitude modulation. The 1×2 port multi-mode interference couplers 3902a and 3902b and the phase shifter 3906 are configured to be broadband photonic components, and the optical path lengths of the two arms 3904a and 3904b are configured to be equal. This enables the Mach-Zehnder modulator 3900 to work in a broad wavelength range.

FIG. 39B is a graph 3910 that shows the intensity-vs-voltage curves for the Mach-Zehnder modulator 3900 using the configuration shown in FIG. 39A for wavelengths 1530 nm, 1550 nm, and 1570 nm. The graph 3910 shows that the Mach-Zehnder modulator 3900 has similar intensity-vs-voltage characteristics for different wavelengths in the range from 1530 nm to 1570 nm.

Referring back to FIG. 1F, the modulator array 144 of the WDM ANN computation system 104 includes banks of optical modulators configured to generate a plurality of optical input vectors, each of the banks corresponding to one of the multiple wavelengths and generating respective optical input vector having respective wavelength. For example, for a system with an optical input vector of length 32 and 3 wavelengths (e.g., $\lambda 1$, $\lambda 2$, and $\lambda 3$), the modulator array 144 may have 3 banks of 32 modulators each. Further, the modulator array 144 also includes an optical multiplexer configured to combine the plurality of optical input vectors into a combined optical input vector including the plurality of wavelengths. For example, the optical multiplexer may combine the outputs of the three banks of modulators at three different wavelengths into a single propagation channel, such as a waveguide, for each element of the optical input vector. As such, returning to the example above, the combined optical input vector would have 32 optical signals, each signal containing 3 wavelengths.

Additionally, the detection unit 146 of the WDM ANN computation system 104 is further configured to demultiplex the multiple wavelengths and to generate a plurality of demultiplexed output voltages. For example, the detection unit 146 may include a demultiplexer configured to demultiplex the three wavelengths contained in each of the 32 signals of the multi-wavelength optical output vector, and route the 3 single-wavelength optical output vectors to three banks of photodetectors coupled to three banks of transimpedance amplifiers.

Additionally, the ADC unit 160 of the WDM ANN computation system 104 includes banks of ADCs configured to convert the plurality of demultiplexed output voltages of the detection unit 146. Each of the banks corresponds to one of the multiple wavelengths, and generates respective digitized demultiplexed optical outputs. For example, the banks of ADCs may be coupled to the banks of transimpedance amplifiers of the detection unit 146.

The controller 110 may implement a method analogous to the method 200 but expanded to support the multi-wavelength operation. For example, the method may include the steps of obtaining, from the ADC unit 160, a plurality of digitized demultiplexed optical outputs, the plurality of digitized demultiplexed optical outputs forming a plurality of first digital output vectors, wherein each of the plurality of first digital output vectors corresponds to one of the plurality of wavelengths; performing a nonlinear transformation on each of the plurality of first digital output vectors to generate a plurality of transformed first digital output vectors; and storing, in the memory unit, the plurality of transformed first digital output vectors.

In some cases, the ANN may be specifically designed, and the digital input vectors may be specifically formed such that the multi-wavelength optical output vector can be detected without demultiplexing. In such cases, the detection unit 146 may be a wavelength-insensitive detection unit that does not demultiplex the multiple wavelengths of the multi-wavelength optical output vector. As such, each of the photodetectors of the detection unit 146 effectively sums the multiple wavelengths of an optical signal into a single photocurrent, and each of the voltages output by the detection unit 146 corresponds to an element-by-element sum of the matrix multiplication results of the multiple digital input vectors.

So far, the nonlinear transformations of the weighted sums performed as part of the ANN computation was performed in the digital domain by the controller 110. In some cases, the nonlinear transformations may be computationally intensive or power hungry, add significantly to the complexity of the controller 110, or otherwise limit the performance of the ANN computation system 100 in terms of throughput or power efficiency. As such, in some implementations of the ANN computation system, the nonlinear transformation may be performed in the analog domain through analog electronics.

Figure 3A:
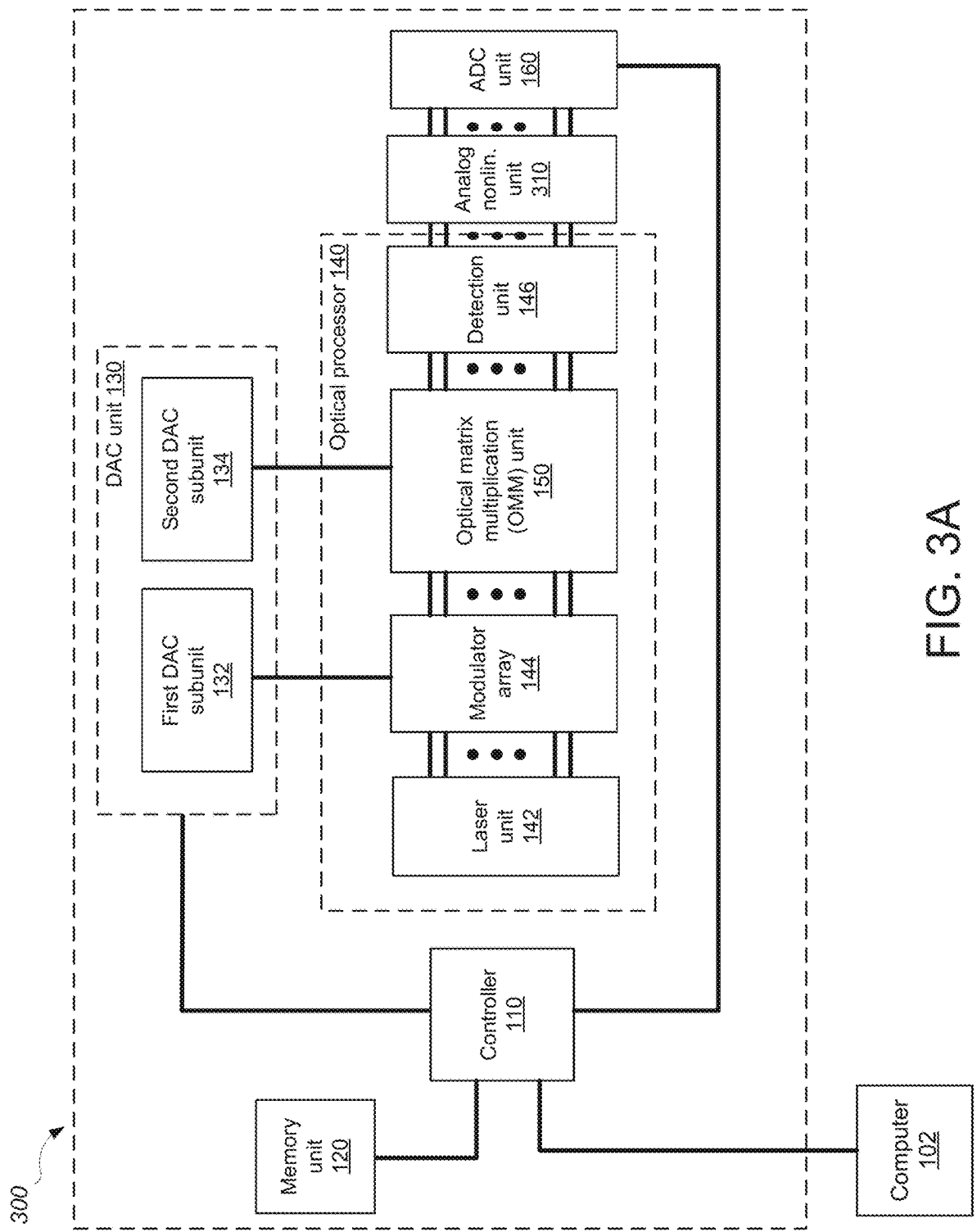
FIGS. 3A and 3B are schematic diagrams of examples of ANN computation systems.

FIG. 3A shows a schematic diagram of an example of an ANN computation system 300. The ANN computation system 300 is similar to the ANN computation system 100, but differs in that an analog nonlinearity unit 310 has been added. The analog nonlinearity unit 310 is arranged between the detection unit 146 and the ADC unit 160. The analog nonlinearity unit 310 is configured to receive the output voltages from the detection unit 146, apply a nonlinear transfer function, and output transformed output voltages to the ADC unit 160.

As the ADC unit 160 receives voltages that have been nonlinearly transformed by the analog nonlinearity unit 310, the controller 110 may obtain, from the ADC unit 160, transformed digitized output voltages corresponding to the transformed output voltages. Because the digitized output voltages obtained from the ADC unit 160 have already been nonlinearly transformed ("activated"), the nonlinear transformation step by the controller 110 can be omitted, reducing the computation burden by the controller 110. The first transformed voltages obtained directly from the ADC unit 160 may then be stored as the first transformed digital output vector in the memory unit 120.

The analog nonlinearity unit 310 may be implemented in various ways. For example, high-gain amplifiers in feedback configuration, comparators with adjustable reference voltage, nonlinear IV characteristics of a diode, breakdown behavior of a diode, nonlinear CV characteristics of a variable capacitor, or nonlinear IV characteristics of a variable resistor can be used to implement the analog nonlinearity unit 310.

Use of the analog nonlinearity unit 310 may improve the performance, such as throughput or power efficiency, of the ANN computation system 300 by reducing a step to be performed in the digital domain. The moving of the nonlinear transformation step out of the digital domain may allow additional flexibility and improvements in the operation of the ANN computation systems. For example, in a recurrent neural network, the output of the OMM unit 150 is activated, and recirculated back to the input of the OMNI unit 150. The activation is performed by the controller 110 in the ANN computation system 100, which necessitates digitizing the output voltages of the detection unit 146 at every pass through the OMM unit 150. However, because the activation is now performed prior to digitization by the ADC unit 160, it may be possible to reduce the number of ADC conversions needed in performing recurrent neural network computations.

In some implementations, the analog nonlinearity unit 310 may be integrated into the ADC unit 160 as a nonlinear ADC unit. For example, the nonlinear ADC unit can be a linear ADC unit with a nonlinear lookup table that maps the linear digitized outputs of the linear ADC unit into desired nonlinearly transformed digitized outputs.

Figure 3B:
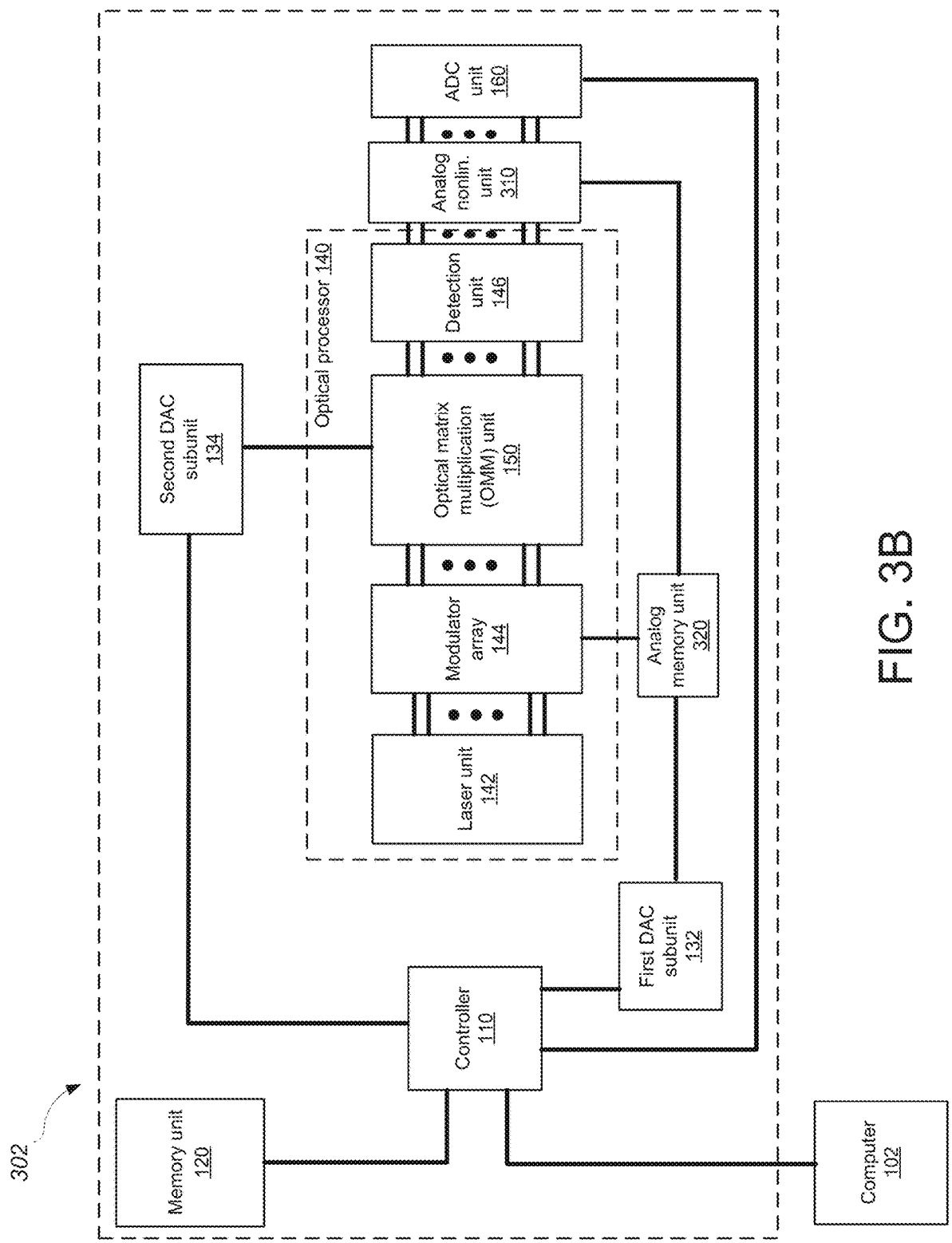

FIG. 3B shows a schematic diagram of an example of an ANN computation system 302. The ANN computation system 302 is similar to the system 300 of FIG. 3A, but differs in that it further includes an analog memory unit 320. The analog memory unit 320 is coupled to the DAC unit 130 (e.g., through the first DAC subunit 132), the modulator array 144, and the analog nonlinearity unit 310. The analog memory unit 320 includes a multiplexer that has a first input coupled to the DAC unit 130 and a second input coupled to the analog nonlinearity unit 310. This allows the analog memory unit 320 to receive signals from either the DAC unit 130 or the analog nonlinearity unit 310. The analog memory unit 320 is configured to store analog voltages and to output the stored analog voltages.

The analog memory unit 320 may be implemented in various ways. For example, arrays of capacitors may be used as analog voltage storing elements. A capacitor of the analog memory unit 320 may be charged to an input voltage by a charging circuit. The storing of the input voltage may be controlled based on a control signal received from the controller 110. The capacitor may be electrically isolated from the surrounding environment to reduce charge leakage that causes unwanted discharging of the capacitor. Additionally, or alternatively, a feedback amplifier can be used to maintain the voltage stored on the capacitor. The stored voltage of the capacitor may be read out by a buffer amplifier, which allows the charge stored by the capacitor to be preserved while outputting the stored voltage. These aspects of the analog memory unit 320 may be similar to operation of a sample and hold circuit. The buffer amplifier may implement the functionality of the modulator driver for driving the modulator array 144.

The operation of the ANN computation system 302 will now be described. The first plurality of modulator control signals output by the DAC unit 130 (e.g., by the first DAC subunit 132) is first input to the modulator array 144 through the analog memory unit 320. At this step, the analog memory unit 320 may simply pass on or buffer the first plurality of modulator control signals. The modulator array 144 generates an optical input vector based on the first plurality of modulator control signals, which propagates through the OMNI unit 150 and is detected by the detection unit 146. The output voltages of the detection unit 146 are nonlinearly transformed by the analog nonlinearity unit 310. At this point, instead of being digitized by the ADC unit 160, the output voltages of the detection unit 146 are stored by the analog memory unit 320, which is then output to the modulator array 144 to be converted into the next optical input vector to be propagated through the OMM unit 150. This recurrent processing can be performed for a preset amount of time or a preset number of cycles, under the control of the controller 110. Once the recurrent processing is complete for a given digital input vector, the transformed output voltages of the analog nonlinearity unit 310 are converted by the ADC unit 160.

The use of analog memory unit 320 can significantly reduce the number of ADC conversions during recurrent neural network computations, such as down to a single ADC conversion per RNN computation of a given digital input vector. Each ADC conversion takes a certain period of time, and consumes a certain amount of energy. As such, the throughput of RNN computation by the ANN computation system 302 may be higher than the throughput of RNN computation by the ANN computation system 100.

The execution of the recurrent neural network computation may be controlled, for example, by controlling the analog memory unit 320. For example, the controller may control the analog memory unit 320 to store a voltage at a certain time, and output the stored voltage at a different time. As such, the circulation of a signal from the analog memory unit 320 to the modulator array 144 through the analog nonlinearity unit 310 and back to the analog memory unit 320 can be controlled by the controller 110 by controlling the storing and readout of the analog memory unit 320.

As such, in some implementations, the controller 110 of the ANN computation system 302 may perform the steps of: based on generating the first plurality of modulator control signals and the first plurality of weight control signals, storing, through the analog memory unit, the plurality of transformed output voltages of the analog nonlinearity unit; outputting, through the analog memory unit, the stored transformed output voltages; obtaining, from the ADC unit, a second plurality of transformed digitized output voltages, the second plurality of transformed digitized output voltages forming a second transformed digital output vector; and storing, in the memory unit, the second transformed digital output vector.

Input datasets to be processed by the ANN computation systems typically include data with resolution greater than 1 bit. For example, a typical pixel of a greyscale digital image may have a resolution of 8 bits, i.e., 256 different levels. One way of representing and processing this data in the optical domain is to encode the 256 different intensity levels of a pixel as 256 different power levels of the optical signal being input to the OMNI unit 150. An optical signal is inherently an analog signal, and is therefore susceptible to noise and detection errors. Referring back to FIG. 1A, in order to maintain the 8 bit resolution of the digital input vector throughout the ANN computation system 100 and generate true 8 bit digitized optical outputs at the output of the ADC unit 160, every part of the signal chain may preferably be designed to reproduce and maintain the 8 bit resolution.

For example, the DAC unit 130 may preferably be designed to support conversion of 8 bit digital input vectors into modulator control signals of at least 8 bits of resolution such that the modulator array 144 can generate optical input vectors that faithfully represent the 8 bits of the digital input vectors. In general, the modulator control signals may need to have additional resolution beyond 8 bits of the digital input vector to compensate for the nonlinear response of the modulator array 144. Further, the internal configuration of the OMM unit 150 may preferably be sufficiently stabilized to ensure that the values of optical output vector are not corrupted by any fluctuations in the configuration of the OMNI unit 150. For example, the temperature of the OMM unit 150 may need to be stabilized within, for example, 5 degrees, 2 degrees, 1 degree, or 0.1 degree. Yet further, the detection unit 146 may preferably be sufficiently low in noise to not corrupt the 8 bit resolution of the optical output vector, and the ADC unit 160 may preferably be designed to support digitization of analog voltages with at least 8 bits of resolution.

Power consumptions and design complexities of various electronic components typically increase with the bit resolution, operating speed, and bandwidth. For example, as a first-order approximation, a power consumption of an ADC unit 160 may scale linearly with the sampling rate, and scale by a factor of $2^{\wedge}N$ where N is the bit resolution of the conversion result. Further, design considerations of the DAC unit 130 and the ADC unit 160 typically result in a tradeoff between the sampling rate and the bit resolution. As such, in some cases, an ANN computation system that internally operates at a bit resolution lower than the resolution of the input dataset while maintaining the resolution of the ANN computation output may be desired.

Figure 4A:
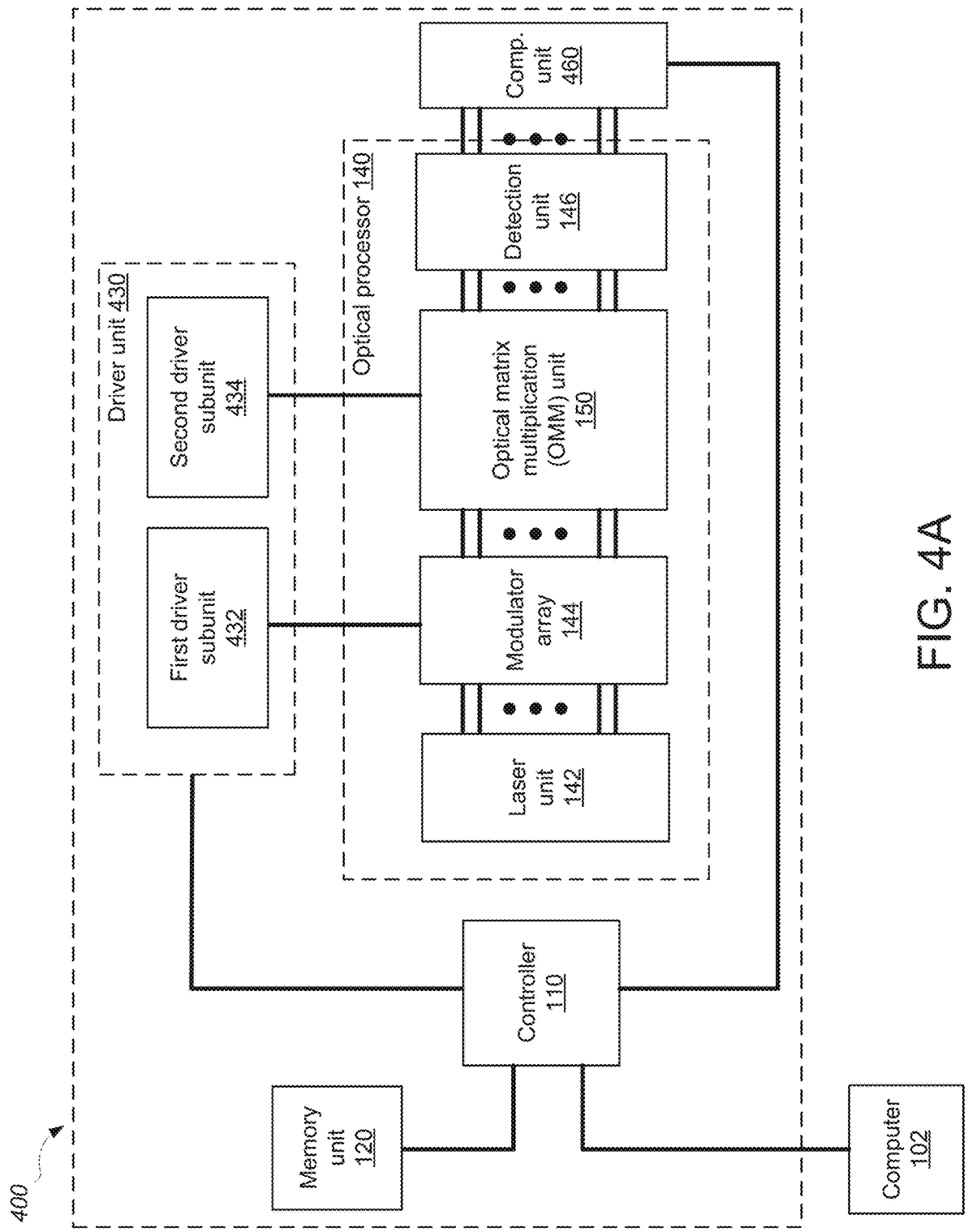
FIG. 4A is a schematic diagram of an example of an ANN computation system with 1-bit internal resolution.

Referring to FIG. 4A, a schematic diagram of an example of an artificial neural network (ANN) computation system 400 with 1-bit internal resolution is shown. The ANN computation system 400 is similar to the ANN computation system 100, but differs in that the DAC unit 130 is now replaced by a driver unit 430, and the ADC unit 160 is now replaced by a comparator unit 460.

The driver unit 430 is configured to generate 1-bit modulator control signals and multi-bit weight control signals. For example, a driver circuitry of the driver unit 430 may directly receive a binary digital output from the controller 110 and condition the binary signal into a two-level voltage or current output suitable for driving the modulator array 144.

The comparator unit 460 is configured to convert the output voltages of the detection unit 146 into digitized 1-bit optical outputs. For example, a comparator circuitry of the comparator unit 460 may receive a voltage from the detection unit 146, compare the voltage to a preset threshold voltage, and either output a digital 0 or a 1 when the received voltage is less than or greater than the preset threshold voltage, respectively.

Referring to FIG. 4B, a mathematical representation of the operation of the ANN computation system 400 is shown. Operation of the ANN computation system 400 will now be described in reference to FIG. 4B. For a given ANN computation to be performed by the ANN computation system 400, there exist a corresponding digital input vector V and a neural network weight matrix U. In this example, the input vector V is a vector of length 4 having elements $V_0$ through $V_3$, and the matrix U is a 4×4 matrix with weights $U_{00}$ through $U_{33}$. Each elements of the vector V has a resolution of 4 bits. Each 4 bit vector element has $0^{th}$ bit ($bit_0$) through $3^{rd}$ bit ($bit_3$) that correspond to the $2^{\wedge}0$ to $2^{\wedge}3$ locations, respectively. As such, decimal (base 10) value of a 4 bit vector element is calculated by the summation of $2^{\wedge}0*bit_0 + 2^{\wedge}1*bit_1 + 2^{\wedge}2*bit_2 + 2^{\wedge}3*bit_3$. Accordingly, the input vector V can analogously be decomposed into $V_{bit0}$ through $V_{bit3}$ by the controller 110 as shown.

Certain ANN computation may then be performed by performing a series of matrix multiplication of 1-bit vectors followed by summation of the individual matrix multiplication result. For example, each of the decomposed input vectors $V_{bit0}$ through $V_{bit3}$ may be multiplied with the matrix U by generating, through the driver unit 430, a sequence of 4 1-bit modulator control signals corresponding to the 4 1-bit input vectors. This in turn generates a sequence of 4 1-bit optical input vectors, which propagates through the OMM unit 150 configured through the driver unit 430 to implement matrix multiplication of matrix U. The controller 110 may then obtain, from the comparator unit 460, a sequence of 4 digitized 1-bit optical outputs corresponding to the sequence of the 4 1-bit modulator control signals.

In this case where a 4-bit vector is decomposed into 4 1-bit vectors, each vector should be processed by the ANN computation system 400 at four times the speed at which a single 4-bit vector can be processed by other ANN computation systems, such as the system 100, to maintain the same effective ANN computation throughput. Such increased internal processing speed may be viewed as time-division multiplexing of the 4 1-bit vectors into a single timeslot for processing a 4-bit vector. The needed increase in the processing speed may be achieved at least in part by the increased operating speeds of the driver unit 430 and the comparator unit 460 relative to the DAC unit 130 and the ADC unit 160, as a decrease in the resolution of a signal conversion process typically leads to an increase in the rate of signal conversion that can be achieved.

While the signal conversion rates are increased by a factor of four in 1-bit operations, the resulting power consumption may be significantly reduced relative to 4-bit operations. As previously described, power consumption of signal conversion processes typically scale exponentially with the bit resolution, while scaling linearly with the conversion rate. As such, a 16 fold reduction in power per conversion may result from the 4 fold reduction in the bit resolution, followed by a 4 fold increase in power from the increased conversion rate. Overall, a 4 fold reduction in operating power may be achieved by the ANN computation system 400 over, for example, the ANN computation system 100 while maintaining the same effective ANN computation throughput.

The controller 110 may then construct a 4-bit digital output vector from the 4 digitized 1-bit optical outputs by multiplying each of the digitized 1-bit optical outputs with respective weights of $2^{\wedge}0$ through $2^{\wedge}3$. Once the 4-bit digital output vector is constructed, the ANN computation may proceed by performing a nonlinear transformation on the constructed 4-bit digital output vector to generate a transformed 4-bit digital output vector; and storing, in the memory unit 120, the transformed 4-bit digital output vector.

Alternatively, or additionally, in some implementations, each of the 4 digitized 1-bit optical outputs may be nonlinearly transformed. For example, a step-function nonlinear function may be used for the nonlinear transformation. Transformed 4-bit digital output vector may then be constructed from the nonlinearly transformed digitized 1-bit optical outputs.

While a separate ANN computation system 400 has been illustrated and described, in general, the ANN computation system 100 of FIG. 1A may be designed to implement functionalities analogous to that of the ANN computation system 400. For example, the DAC unit 130 may include a 1-bit DAC subunit configured to generate 1-bit modulator control signals, and the ADC unit 160 may be designed to have a resolution of 1-bit. Such a 1-bit ADC may be analogous to, or effectively equivalent to, a comparator.

Further, while operation of an ANN computation system with 1-bit internal resolution has been described, in general, the internal resolution of an ANN computation system may be reduced to an intermediate level lower than the N-bit resolution of the input dataset. For example, the internal resolution may be reduced to $2^{\wedge}Y$ bits, where Y is an integer greater than or equal to 0.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results. For example, the optical matrix multiplication unit 150 in FIG. 1A includes an optical interference unit 154 that includes a plurality of interconnected Mach-Zehnder interferometers. In some implementations, the optical interference unit can be implemented using one-dimensional, two-dimensional, or three-dimensional passive diffractive optical elements that consume almost no power. Compared to the optical interference unit that includes Mach-Zehnder interferometers, an optical interference unit that uses passive diffractive optical elements can have a smaller size if the number of inputs/outputs remain the same, or can process a larger number of inputs/outputs for the same chip size. The passive diffractive optical elements can be made at a lower cost compared to the Mach-Zehnder interferometers.

Figure 5:
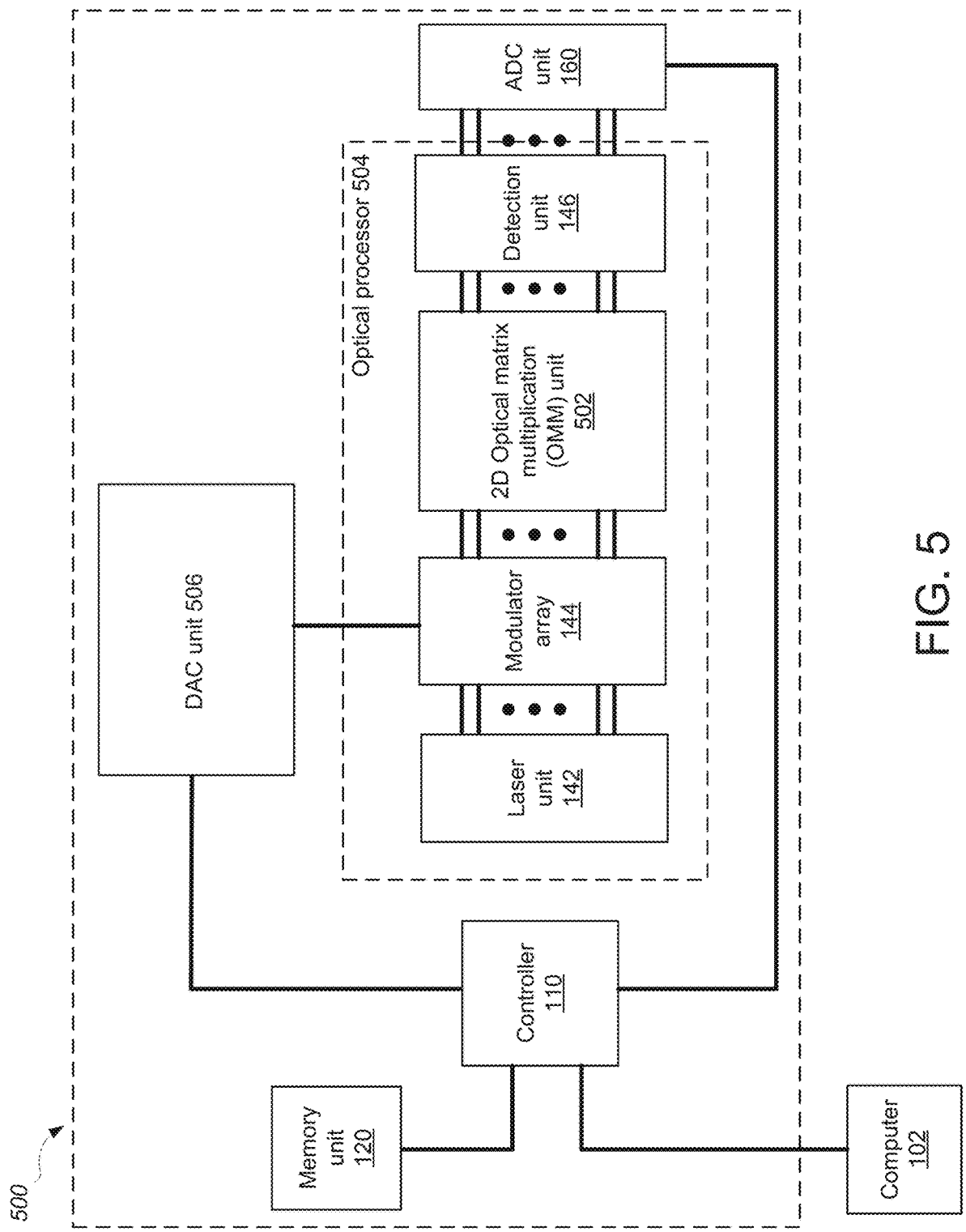
FIG. 5 is a schematic diagram of an example of an artificial neural network (ANN) computation system.

Referring to FIG. 5, in some implementations, an artificial neural network computation system 500 includes a controller 110, a memory unit 120, a DAC unit 506, an optical processor 504, and an ADC unit 160. The memory unit 120 and the ADC unit 160 are similar to the corresponding components of the system 100 in FIG. 1A. The optical processor 504 is configured to perform matrix computations using optical components. In the system 500, the weights for the optical matrix multiplication unit 502 are fixed. The DAC unit 506 is similar to the first DAC subunit 132 of the system 100 of FIG. 1A.

In an example operation of the ANN computation system 500, a computer 102 may issue an artificial neural network computation request to the ANN computation system 500. The ANN computation request may include an input dataset to be processed by the provided ANN. The controller 110 receives the ANN computation request, and stores the input dataset in the memory unit 120.

In some implementations, a hybrid approach is used in which a portion of the optical matrix multiplication unit 150 includes Mach-Zehnder interferometers and another portion of the optical matrix multiplication unit 150 includes passive diffractive elements.

The internal operations of the ANN computation system 500 will now be described. The optical processor 504 includes a laser unit 142, a modulator array 144, a detection unit 146, and the optical matrix multiplication (OMNI) unit 502. The laser unit 142, the modulator array 144, and the detection unit 146 are similar to the corresponding components of the system 100 in FIG. 1A. In this example, the OMNI unit 502 includes two-dimensional diffractive optical elements and can be implemented as a passive integrated silicon photonic chip. The optical matrix multiplication unit 502 can be configured to implement a diffractive neural network and can execute matrix multiplications at almost zero power consumption.

The optical processor 504 operates by encoding a digital input vector of length N onto an optical input vector of length N and propagating the optical input vector through the OMM unit 502. The OMNI unit 502 receives the optical input vector of length N and performs, in the optical domain, an N×N matrix multiplication on the received optical input vector. The N×N matrix multiplication performed by the OMNI unit 502 is determined by internal configurations of the OMM unit 502. The internal configurations of the OMNI unit 502 include, e.g., the dimensions, positions, and geometry of the diffractive optical elements, and doping of impurities, if any.

Figure 6:
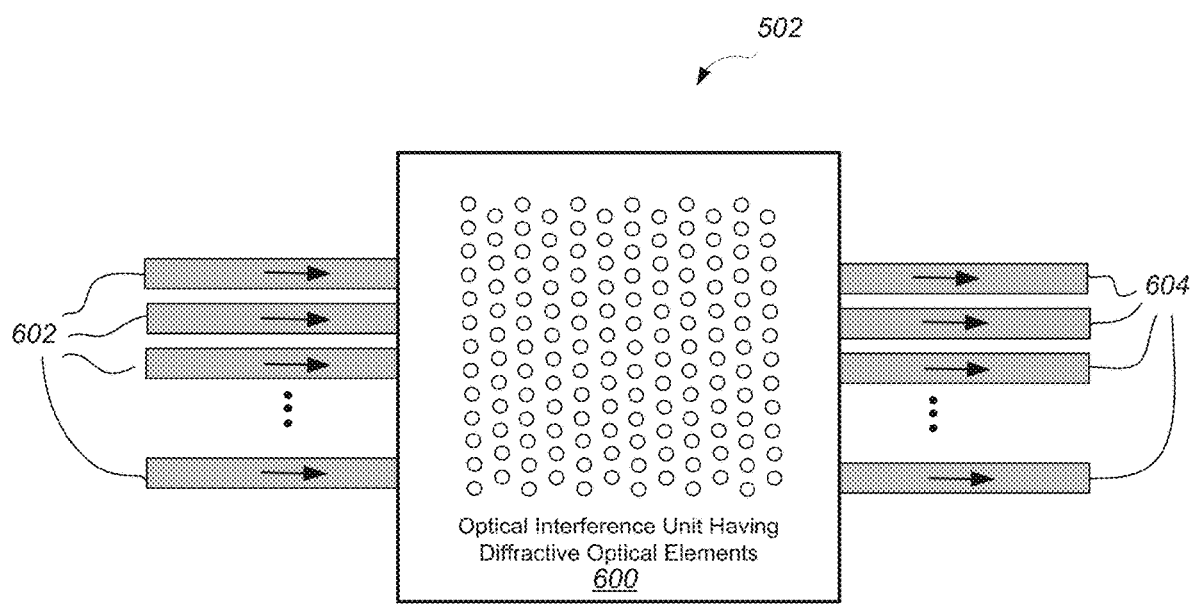
FIG. 6 is a diagram of an example of an optical matrix multiplication unit.

The OMM unit 502 may be implemented in various ways. FIG. 6 shows a schematic diagram of an example of the OMM unit 502 that uses a two-dimensional array of diffractive elements. The OMM unit 502 may include an array of input waveguides 602 to receive the optical input vector, a two-dimensional optical interference unit 600 in optical communication with the array of input waveguides 602, and an array of output waveguides 604 in optical communication with the optical interference unit 600. The optical interference unit 600 includes a plurality of diffractive optical elements and performs a transformation (e.g., linear transformation) of the optical input vector into a second array of optical signals.

The array of output waveguides 604 guides the second array of optical signals output by the optical interference unit 600. At least one input waveguide in the array of input waveguides 602 is in optical communication with each output waveguide in the array of output waveguides 604 via the optical interference unit 600. For example, for an optical input vector of length N, the OMNI unit 502 may include N input waveguides 602 and N output waveguides 604.

In some implementations, the optical interference unit 600 includes a substrate having diffractive elements that are arranged in two dimensions (e.g., in a 2D array). For example, a plurality of circular holes can be drilled or etched into the substrate. The holes have dimensions in the order of magnitude comparable to that of the wavelength of the input light so that the light is diffracted by the holes (or the structure defining the holes). For example, the dimensions of the holes can be in a range from 100 nm to 2 μm. The holes can have the same or different sizes. The holes can also have other cross sectional shapes, such as triangles, squares, rectangles, hexagons, or irregular shapes. The substrate can be made of a material that is transparent or semi-transparent to the input light, e.g., having a transmissivity in a range from 1% to 99% with respect to the input light. For example, the substrate can be made of silicon, silicon oxide, silicon nitride, quartz, crystal (e.g., lithium niobate, $LiNbO_3$), III-V material such as gallium arsenide or indium phosphide, erbium modified semiconductors, or polymer.

In some implementations, holographic methods can be used to form the two-dimensional diffractive optical elements in the substrate. The substrate can be made of glass, crystal, or a photorefractive material.

When designing the OMM unit 502, we consider the dimensions and positions of the diffractive elements in two dimension (e.g., the x and y directions), without considering the relative positions of the diffractive elements in the third dimension (e.g., the z direction). Each diffractive element can be a three-dimensional structure, such as a hole, a column, or a stripe having a certain depth that is formed in the substrate.

In FIG. 6, the diffractive optical elements are represented by circles. The diffractive optical elements can also have other shapes, such as triangles, squares, rectangles, or irregular shapes. The diffractive optical elements can have various sizes. The diffractive optical elements do not have to be located on grid points, their locations can be varied. The diagram in FIG. 6 is merely for purpose of illustration. The actual diffractive optical elements can be different from those shown in the figure. Different arrangements of the diffractive optical elements can be used to implement different matrix operations, such as different matrix multiplication functions.

The configurations of the diffractive optical elements can be determined using an optimization process. For example, the substrate can be divided into an array of pixels, and each pixel can be either filled with the substrate material (no holes) or filled with air (hole). The configurations of the pixels can be iteratively modified, and for each configuration of the pixels, a simulation can be performed by passing light through the diffractive optical elements and evaluating the output. After simulations of all possible configurations of the pixels are performed, the configuration that provides the result that most closely resemble the desired matrix processing is chosen as the diffractive optical element configuration for the OMM unit 502.

As another example, the diffractive elements are initially configured as an array of holes. The positions, dimensions, and shapes of the holes can be slightly varied from their initial configurations. The parameters for each hole can be adjusted iteratively and simulations can be performed to find an optimized configuration for the holes.

In some implementations, a machine learning process is used to design the diffractive optical elements. An analytical function for how the pixels affect the input light to generate the output light is determined, and an optimization process (e.g., the gradient descent method) is used to determine the optimal configuration of the pixels.

In some implementations, the OMM unit 502 can be implemented as a user-changeable component, and different OMNI units 502 having different optical interference units 600 can be installed for different applications. For example, the system 500 can be configured as an optical character recognition system, and the optical interference unit 600 can be configured to implement a neural network for performing optical character recognition. For example, a first OMNI unit may have a first optical interference unit that includes passive diffractive optical elements configured to implement a first neural network for an optical character recognition engine for a first set of written languages and fonts. A second OMM unit may have a second optical interference unit that includes passive diffractive optical elements configured to implement a second neural network for an optical character recognition engine for a second set of written languages and fonts, etc. When the user wants to use the system 500 to apply optical character recognition to the first set of written languages and fonts, the user can insert the first OMNI unit into the system. When the user wants to use the system 500 to apply optical character recognition to the second set of written languages and fonts, the user can swap out the first OMM unit and insert the second OMM unit into the system.

For example, the system 500 can be configured as a speech recognition system, and the optical interference unit 600 can be configured to implement a neural network for performing speech recognition. For example, a first OMM unit may have a first optical interference unit that includes passive diffractive optical elements configured to implement a first neural network for a speech recognition engine for a first spoken language. A second OMM unit may have a second optical interference unit that includes passive diffractive optical elements configured to implement a second neural network for a speech recognition engine for a second spoken language, etc. When the user wants to use the system 500 to recognize speech in the first spoken language, the user can insert the first OMNI unit into the system. When the user wants to use the system 500 to recognize speech in the second spoken language, the user can swap out the first OMNI unit and insert the second OMM unit into the system.

For example, the system 500 can be part of a control unit of an autonomous vehicle, and the optical interference unit 600 can be configured to implement a neural network for performing recognition of road conditions. For example, a first OMM unit 502 may have a first optical interference unit that includes passive diffractive optical elements configured to implement a first neural network for recognizing road conditions, including street signs, in the United States. A second OMNI unit 502 may have a second optical interference unit that includes passive diffractive optical elements configured to implement a second neural network for recognizing road conditions, including street signs, in Canada. A third OMNI unit 502 may have a third optical interference unit that includes passive diffractive optical elements configured to implement a third neural network for recognizing road conditions, including street signs, in Mexico, etc. When the autonomous vehicle is used in the United States, the first OMNI unit is inserted into the system. When the autonomous vehicle crosses the border and enters Canada, the first OMM unit is swapped out and the second OMM unit is inserted into the system. On the other hand, when the autonomous vehicle crosses the border and enters Mexico, the first OMNI unit is swapped out and the third OMNI unit is inserted into the system.

For example, the system 500 can be used for genetic sequencing. DNA sequences can be classified using a convolutional neural network that is implemented using the system 500 that includes passive diffractive optical elements. For example, the system 500 can implement neural networks for distinguishing between tumor types, predicting tumor grades, and predicting patient survival from gene expression patterns. For example, the system 500 can implement neural networks for identifying subsets of genes or signatures that are the most predictive of the characteristics being analyzed. For example, the system 500 can implement neural networks for predicting or inferring the expression levels of all genes from the profiles of a subset of genes. For example, the system 500 can implement neural networks for epigenomic analyses such as predicting transcription factor binding sites, enhancer regions, and chromatin accessibility from gene sequences. For example, the system 500 can implement neural networks for capturing the structure within a genetic sequence.

For example, the system 500 can be configured as medical diagnostic system, and the OMNI unit 502 can be configured to implement a neural network for analyzing physiological parameters to perform screening for diseases. For example, the system 500 can be configured as bacteria detection system, and the OMNI unit 502 can be configured to implement a multiplication function for analyzing a DNA sequence to detect certain strains of bacteria.

In some implementations, the OMM unit 502 includes a housing (e.g., a cartridge) that protects the substrate that has the diffractive optical elements. The housing supports an input interface that is coupled to the input waveguides 602, and an output interface that is coupled to the output waveguides 604. The input interface is configured to receive the output from the modulator array 144, and the output interface is configured to send the output of the OMM unit 502 to the detection unit 146. The OMM unit 502 can be designed as a module that is suitable to be handled by average consumers, allowing the users to easily switch from one OMNI unit 502 to another OMM unit 502. Machine learning technology improves over time. The user can upgrade the system 500 by swapping out the old OMNI unit 502 and inserting a new, upgraded version.

Similar to the way that optical compact discs can store digital information that can be retrieved by a CD player, the OMNI units can store neural network configurations that can be used in an optical processor. Just as the optical compact discs are low cost media for distributing digital information (including audio, video, and software programs) to consumers, the OMM units can be low cost media for distributing pre-configured neural networks or matrix processing functions (e.g., multiplication, convolution, or any other linear operations) to consumers.

In some implementations, the system 500 is an optical computing platform configured to be operable with OMNI units provided by different companies. This allows different companies to develop different passive optical neural networks for diverse applications. The passive optical neural networks are sold to end-users in standardized packages that can be installed in the optical computing platform to allow the system 500 to perform various intelligent functions.

In some implementations, the system can have a holder mechanism for supporting multiple OMM units 502, and a mechanical handling mechanism can be provided for automatically swapping the OMNI units 502. The system determines which OMM unit 502 is needed for the current application and uses the mechanical handling mechanism to automatically retrieve the appropriate OMM unit from the holder mechanism and insert it into the optical processor 504.

For an optical chip of a specified size, more passive diffractive elements can fit on the substrate as compared to using active interferometers, such as Mach-Zehnder interferometers. For example, an optical interference unit 154 in FIG. 1B using Mach-Zehnder interferometers may be configured to process 200×200 matrix multiplications, whereas an optical interference unit 600 having the same overall size and using passive diffractive elements (each having a dimension of about 100 nm×100 nm) may be configured to process 5000×5000 matrix multiplications.

The passive diffractive optical elements consume almost no power, so the OMNI unit 502 can be used in low-power devices, such as battery operated devices. The OMNI unit 502 is suitable for edge computing. For example, the OMM unit 502 can be used in smart sensors in which the raw data from the sensors are processed using optical processors that use the OMNI units 502. The smart sensor can be configured to send processed data to a central computer server, thus reducing the amount of raw data being sent to the central computer server. By placing intelligent processing capabilities at the smart sensors, faults and anomalies can be detected earlier and handled more effectively. The OMNI unit 502 is suitable for applications that require processing of large matrix multiplications. The OMM unit 502 is suitable for applications in which the neural networks have already been trained and the weights have already been determined and do not need to be modified.

The substrate in which the diffractive optical elements are formed can be either flat or curved. In the example of FIG. 6A, the input light enters the optical interference unit 600 from the left and the output light exits the optical interference unit 600 from the right (the terms "left," "right," "top," and "bottom" refer to the directions shown in the figure). In some examples, the passive diffractive optical elements can be configured to cause some of the output light to exit the optical interference unit 600 from the top or bottom, or any combination of left, right, top, and bottom sides of the optical interference unit 600. The substrate for the optical interference unit 600 can have any of a variety of shapes, such as a square, a rectangle, a triangle, a circle, or an oval. The optical interference unit 600 can incorporate reflective elements or mirrors to redirect the light propagation direction.

In some implementations, the artificial neural network computation system 500 can be modified by adding an analog nonlinear unit 310 between the detection unit 146 and the ADC unit 160. The analog nonlinearity unit 310 is configured to receive the output voltages from the detection unit 146, apply a nonlinear transfer function, and output transformed output voltages to the ADC unit 160. The controller 110 may obtain, from the ADC unit 160, transformed digitized output voltages corresponding to the transformed output voltages. Because the digitized output voltages obtained from the ADC unit 160 have already been nonlinearly transformed ("activated"), the nonlinear transformation step by the controller 110 can be omitted, reducing the computation burden by the controller 110. The first transformed voltages obtained directly from the ADC unit 160 may then be stored as the first transformed digital output vector in the memory unit 120.

Figure 7:
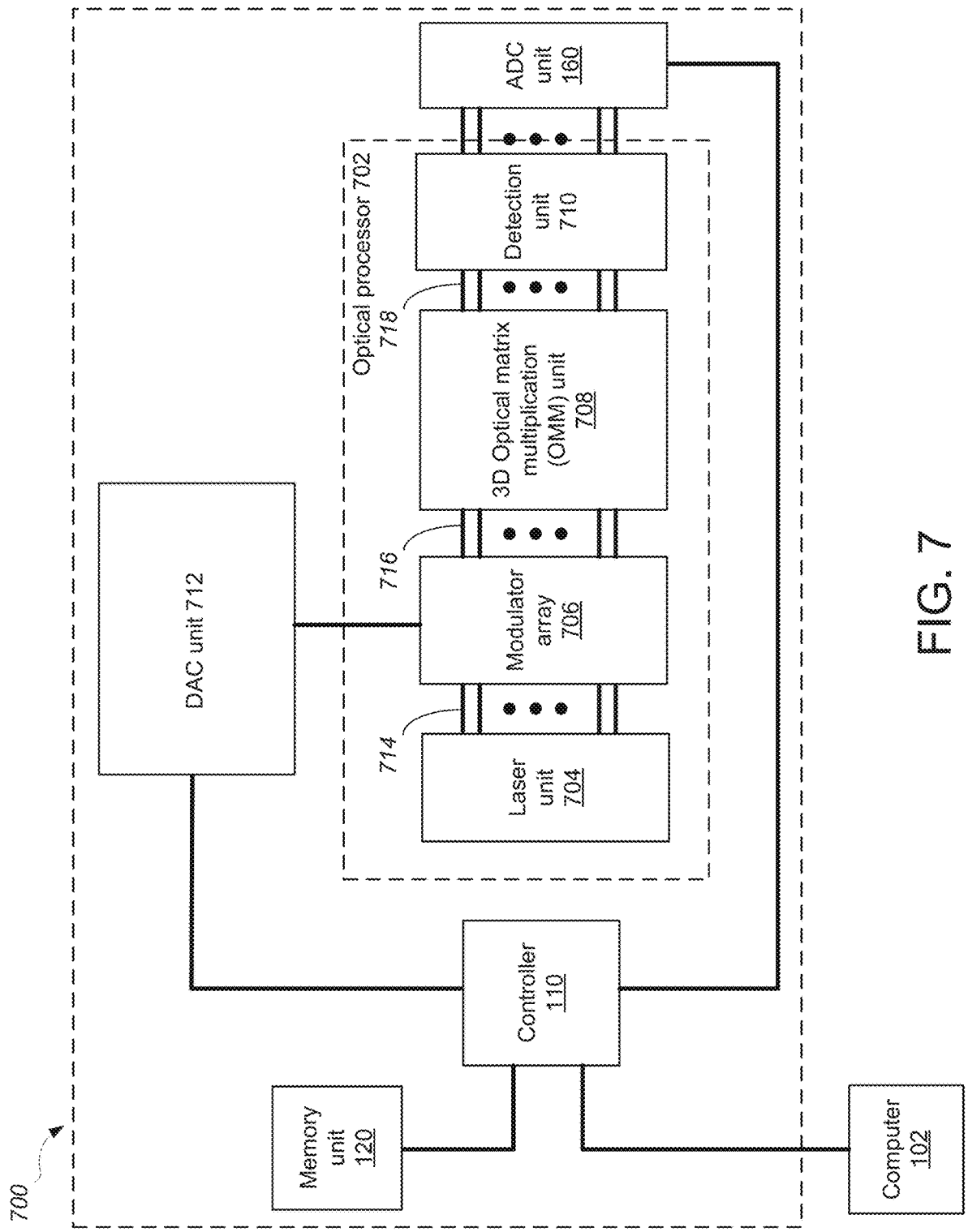
FIG. 7 is a schematic diagram of an example of an artificial neural network (ANN) computation system.

The optical interference unit can be implemented using passive diffractive optical elements arranged in three dimensions. Referring to FIG. 7, in some implementations, an artificial neural network computation system 700 has an optical processor 702 that includes a three-dimensional OMM unit 708. The system 700 includes a memory unit 120 and an ADC unit 160 that are similar to the corresponding components of the system 500 in FIG. 5. The optical processor 702 is configured to perform matrix computations using diffractive optical elements arranged in three dimensions.

The optical processor 702 includes a laser unit 704 configured to output a two-dimensional array of light beams 714, and a two-dimensional modulator array 706 configured to modulate the two-dimensional array of light beams 714 to generate a modulated two-dimensional array of light beams 716. The optical processor 702 includes an optical matrix multiplication (OMNI) unit 708 having diffractive optical elements arranged in three dimensions and configured to process the modulated two-dimensional array of light beams 716 and generate a two-dimensional array of output light beams 718. The optical processor 702 includes a detection unit 710 having a two-dimensional array of light sensors to detect the two-dimensional array of output light beams 718. The outputs of the detection unit 710 are converted to digital signals by the ADC unit 160.

For example, the 3D OMM unit 708 can be implemented as a passive integrated silicon photonic column or cube. The optical matrix multiplication unit 708 can be configured to implement a diffractive neuron network and can execute matrix multiplications at almost zero power consumption.

There are many ways to encode the input data for use by the optical processor 702. For example, a digital input vector of length N×N can be encoded onto an optical input matrix of size N×N, which is propagated through the OMNI unit 708. The OMNI unit 708 performs in the optical domain an (N×N)×(N×N) matrix multiplication on the received optical input matrix. The (N×N)×(N×N) matrix multiplication performed by the OMNI unit 708 is determined by internal configurations of the OMM unit 708, including, e.g., the dimensions, positions, and geometry of the diffractive optical elements arranged in three dimensions, and doping of impurities, if any.

Figure 8:
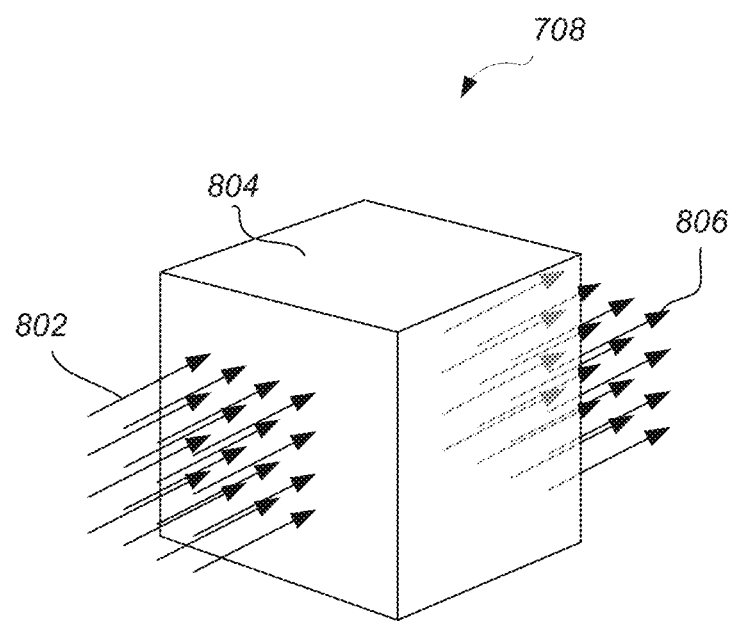
FIG. 8 is a diagram of an example of an optical matrix multiplication unit.

The OMM unit 708 may be implemented in various ways. FIG. 8 shows a schematic diagram of an example of the OMNI unit 708 that uses a three-dimensional arrangement of diffractive elements. The OMNI unit 708 may include a matrix of input waveguides to receive an optical input matrix 802, a three-dimensional optical interference unit 804 in optical communication with the matrix of input waveguides, and a matrix of output waveguides in optical communication with the optical interference unit 804 for providing an optical output matrix 804. The optical interference unit 804 includes a plurality of diffractive optical elements and performs a transformation (e.g., linear transformation) of the optical input (e.g., N×N vector or matrix) into an optical output (e.g., N×N vector or matrix). The matrix of output waveguides guides the optical signals output by the optical interference unit 804. At least one input waveguide in the matrix of input waveguides is in optical communication with each output waveguide in the matrix of output waveguides via the optical interference unit 804. For example, for an optical input vector of length N×N, the OMM unit 708 may include N×N input waveguides and N×N output waveguides.

In some implementations, the optical interference unit 804 includes a block of substrate having diffractive elements that are arranged in three dimensions (e.g., in a 3D matrix). For example, a plurality of holes can be drilled or etched into each of a plurality of slices of substrates, and the plurality of slices of substrates can be combined to form the block of substrate. The holes have dimensions in the order of magnitude comparable to that of the wavelength of the input light so that the light is diffracted by the holes (or the structure defining the holes). The holes can have the same or different sizes. The holes can also have other cross sectional shapes, such as triangles, squares, rectangles, hexagons, or irregular shapes. In some implementations, holographic methods can be used to form the three-dimensional diffractive optical elements in the entire block of substrate. The substrate can be made of a material that is transparent or semi-transparent to the input light, e.g., having a transmissivity in a range from 1% to 99% with respect to the input light.

When designing the OMM unit 708, we consider the dimensions and positions of the diffractive elements in the x, y, and z directions. The configurations of the diffractive optical elements can be determined using an optimization process. For example, the block of substrate can be divided into a three-dimensional matrix of pixels, and each pixel can be either filled with the substrate material (no holes) or filled with air (hole). The configurations of the pixels can be iteratively modified, and for each configuration of the pixels, a simulation can be performed by passing light through the diffractive optical elements and evaluating the output. After simulations of all possible configurations of the pixels are performed, the configuration that provides the result most closely resembling the desired matrix processing is chosen as the diffractive optical element configuration for the OMNI unit 708.

As another example, the diffractive elements are initially configured as a three-dimensional matrix of holes. The positions, dimensions, and shapes of the holes can be slightly varied from their initial configurations. The parameters for each hole can be adjusted iteratively and simulations can be performed to find an optimized configuration for the holes.

In some implementations, a machine learning process is used to design the three-dimensional diffractive optical elements. An analytical function for how the pixels affect the input light is determined, and gradient descent method is used to determine the optimal configuration of the pixels.

In some implementations, the OMNI unit 708 can be implemented as a user-changeable component, and different OMM units 708 having different optical interference units 804 can be installed for different applications. For example, the system 700 can be configured as medical diagnostic system, and the optical interference unit 804 can be configured to implement a neural network for analyzing physiological parameters to perform screening for diseases. For example, a first OMM unit may have a first optical interference unit that includes 3D passive diffractive optical elements configured to implement a first neural network for screening a first set of diseases. A second OMM unit may have a second optical interference unit that includes 3D passive diffractive optical elements configured to implement a second neural network for screening a second set of diseases, etc. The first and second OMM units may be developed by different companies specializing in developing techniques for screening different diseases. When the user wants to use the system 700 to screen for the first set of diseases, the user can insert the first OMM unit into the system. When the user wants to use the system 700 to screen for the second set of diseases, the user can swap out the first OMM unit and insert the second OMNI unit into the system.

For example, the system 700 can be configured as an optical character recognition system, and the optical interference unit 804 can be configured to implement a neural network for performing optical character recognition. For example, the system 700 can be configured as a speech recognition system, and the optical interference unit 804 can be configured to implement a neural network for performing speech recognition. For example, the system 700 can be part of a control unit of an autonomous vehicle, and the optical interference unit 804 can be configured to implement a neural network for performing recognition of road conditions.

For example, the system 700 can be used for genetic sequencing. DNA sequences can be classified using a convolutional neural network that is implemented using the system 700 that includes passive diffractive optical elements. For example, the system 700 can implement neural networks for distinguishing between tumor types, predicting tumor grades, and predicting patient survival from gene expression patterns. For example, the system 700 can implement neural networks for identifying subsets of genes or signatures that are the most predictive of the characteristics being analyzed. For example, the system 700 can implement neural networks for predicting or inferring the expression levels of all genes from the profiles of a subset of genes. For example, the system 700 can implement neural networks for epigenomic analyses such as predicting transcription factor binding sites, enhancer regions, and chromatin accessibility from gene sequences. For example, the system 700 can implement neural networks for capturing the structure within a genetic sequence. For example, the system 700 can be configured as bacteria detection system, and the optical interference unit 804 can be configured to implement a multiplication function for analyzing a DNA sequence to detect certain strains of bacteria.

In some implementations, the OMNI unit 700 includes a housing (e.g., a cartridge) that protects the substrate that has the 3D diffractive optical elements. The housing supports an input interface that is coupled to the input waveguides, and an output interface that is coupled to the output waveguides. The input interface is configured to receive the output from the modulator array 706, and the output interface is configured to send the output of the OMM unit 708 to the detection unit 710. The OMM unit 708 can be designed as a module that is suitable to be handled by average consumers, allowing the users to easily switch from one OMNI unit 708 to another OMNI unit 708. Machine learning technology improves over time. The user can upgrade the system 700 by swapping out the old OMM unit 708 and inserting a new, upgraded version.

In some implementations, the system 700 is an optical computing platform configured to be operable with OMNI units provided by different companies. This allows different companies to develop different 3D passive optical neural networks for diverse applications. The 3D passive optical neural networks are sold to end-users in standardized packages that can be installed in the optical computing platform to allow the system 700 to perform various intelligent functions.

In some implementations, the system can have a holder mechanism for supporting multiple OMM units 708, and a mechanical handling mechanism can be provided for automatically swapping the OMNI units 708. The system determines which OMM unit 708 is needed for the current application and uses the mechanical handling mechanism to automatically retrieve the appropriate OMM unit 708 from the holder mechanism and insert it into the optical processor 702.

In some implementations, the artificial neural network computation system 700 can be modified by adding an analog nonlinear unit between the detection unit 710 and the ADC unit 160. The analog nonlinearity unit is configured to receive the output voltages from the detection unit 710, apply a nonlinear transfer function, and output transformed output voltages to the ADC unit 160. The controller 110 may obtain, from the ADC unit 160, transformed digitized output voltages corresponding to the transformed output voltages. Because the digitized output voltages obtained from the ADC unit 160 have already been nonlinearly transformed ("activated"), the nonlinear transformation step by the controller 110 can be omitted, reducing the computation burden by the controller 110. The first transformed voltages obtained directly from the ADC unit 160 may then be stored as the first transformed digital output vector in the memory unit 120.

Figure 9:
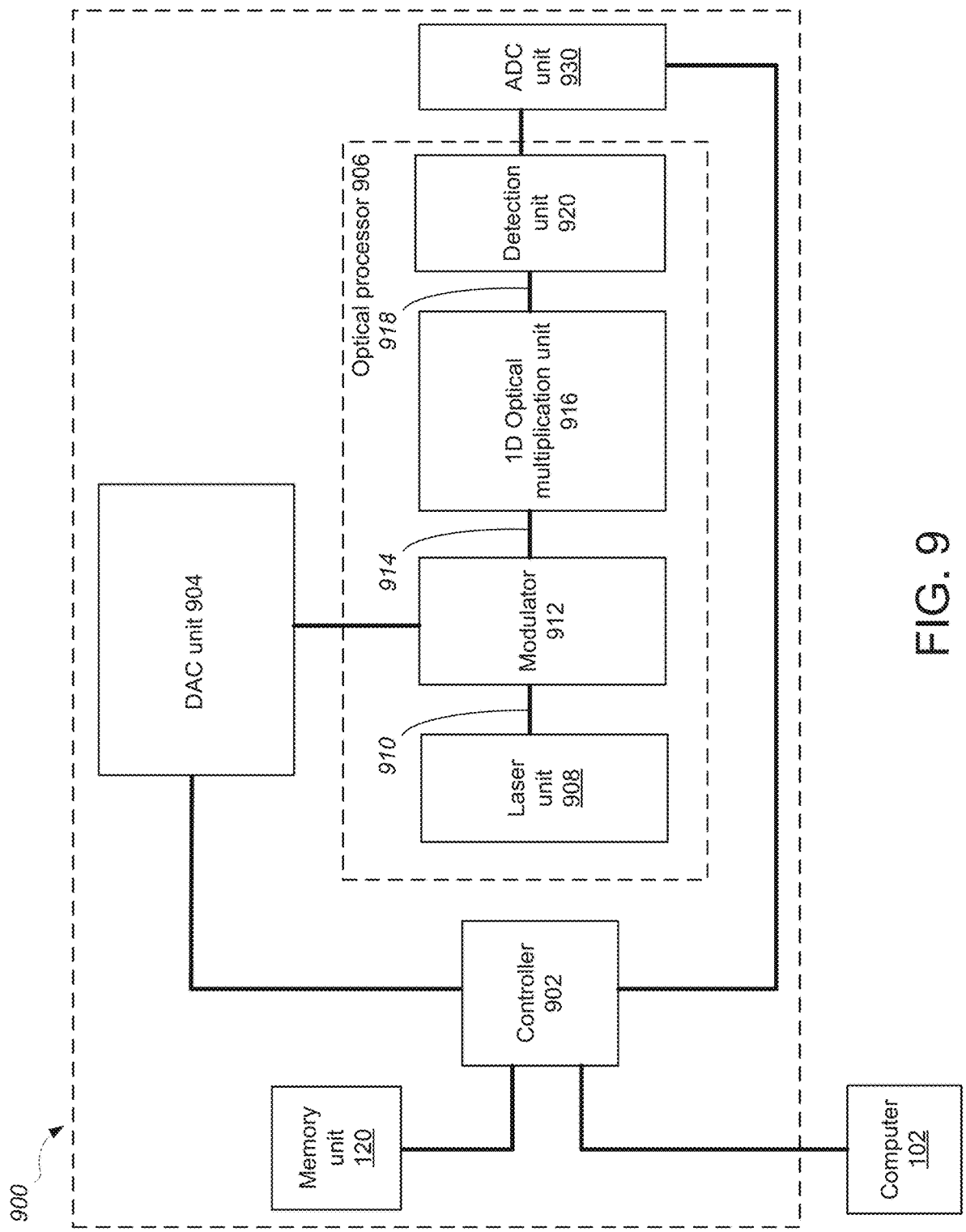
FIG. 9 is a schematic diagram of an example of an artificial neural network (ANN) computation system.

The optical interference unit can be implemented using passive diffractive optical elements arranged in one dimension. Referring to FIG. 9, in some implementations, an artificial neural network computation system 900 has an optical processor 906 that includes a one-dimensional optical multiplication unit 916. The system 900 includes a memory unit 120 that is similar to the corresponding component of the system 100 in FIG. 1A. The optical processor 906 is configured to perform multiplication computations using diffractive optical elements arranged in one dimension—along the axis of light propagation.

The optical processor 906 includes a laser unit 908 configured to output a laser light beam 910, and a modulator 912 configured to modulate the light beam 910 to generate a modulated light beam 914. The optical processor 906 includes a one-dimensional optical multiplication unit 916 having diffractive optical elements arranged in one dimension and configured to process the modulated light beam 914 and generate an output light beam 918. The optical processor 906 includes a detection unit 920 having a light sensor to detect the output light beam 916. The output of the detection unit 920 is converted to a digital signal by an ADC unit 930.

For example, the optical multiplication unit 916 can be implemented as a passive integrated silicon photonic waveguide having diffractive optical elements (e.g., gratings or holes). The optical multiplication unit 916 can be configured to execute multiplication operations at almost zero power consumption.

There are many ways to encode the input data for use by the optical processor 906. For example, a digital input vector can be encoded as an optical input that is propagated through the optical multiplication unit 916. The optical multiplication unit 916 performs in the optical domain a multiplication on the received optical input. The multiplication performed by the optical multiplication unit 916 is determined by internal configurations of the optical multiplication unit 916, including, e.g., the dimensions, positions, and geometry of the diffractive optical elements arranged in one dimension along the light propagation path, and doping of impurities, if any.

Figure 10:
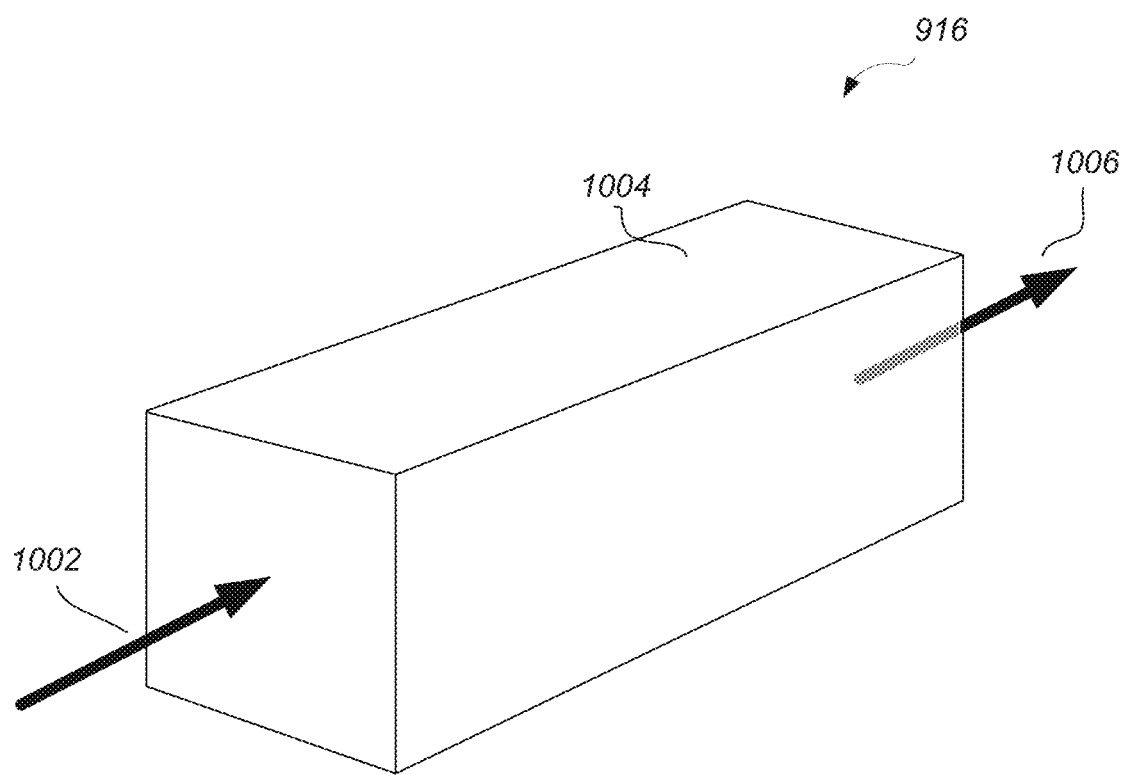
FIG. 10 is a diagram of an example of an optical matrix multiplication unit.

The optical multiplication unit 916 may be implemented in various ways. FIG. 10 shows a schematic diagram of an example of the optical multiplication unit 916 that uses a one-dimensional arrangement of diffractive elements. The optical multiplication unit 916 may include an input waveguide to receive an optical input 1002, a one-dimensional optical interference unit 1004 in optical communication with the input waveguide, and an output waveguide in optical communication with the optical interference unit 1004 for providing an optical output 1006. The optical interference unit 1004 includes a plurality of diffractive optical elements and performs a transformation (e.g., linear transformation) of the optical input into an optical output. The output waveguide guides the optical signal output by the optical interference unit 1004.

In some implementations, the optical interference unit 1004 includes an elongated substrate having diffractive elements that are arranged in one dimension along the light propagation path. For example, a plurality of holes can be drilled or etched into the substrate. The holes have dimensions in the order of magnitude comparable to that of the wavelength of the input light so that the light is diffracted by the holes (or the structure defining the holes). The holes can have the same or different sizes. The substrate can be made of a material that is transparent or semi-transparent to the input light, e.g., having a transmissivity in a range from 1% to 99% with respect to the input light. In some implementations, holographic methods can also be used to form the diffractive optical elements in the substrate.

When designing the optical multiplication unit 1004, we consider the dimensions and positions of the diffractive elements along the propagation path of the light beam. The configurations of the diffractive optical elements can be determined using an optimization process. For example, the substrate can be divided into a series of pixels, and each pixel can be either filled with the substrate material (no holes) or filled with air (hole). The configurations of the pixels can be iteratively modified, and for each configuration of the pixels, a simulation can be performed by passing light through the diffractive optical elements and evaluating the output. After simulations of all possible configurations of the pixels are performed, the configuration that provides the result most closely resembling the desired multiplication processing is chosen as the diffractive optical element configuration for the optical multiplication unit 1004.

As another example, the diffractive elements are initially configured as a series of holes. The positions and dimensions of the holes can be slightly varied from their initial configurations. The parameters for each hole can be adjusted iteratively and simulations can be performed to find an optimized configuration for the holes.

In some implementations, a machine learning process is used to design the one dimensional diffractive optical elements. An analytical function for how the pixels affect the input light is determined, and gradient descent method is used to determine the optimal configuration of the pixels.

In some implementations, the optical multiplication unit 916 can be implemented as a user-changeable component, and different optical multiplication units 916 having different optical interference units 1004 can be installed for different applications. For example, the system 900 can be configured as bacteria detection system, and the optical interference unit 1004 can be configured to implement a multiplication function for analyzing a DNA sequence to detect certain strains of bacteria. For example, a first optical multiplication unit may have a first optical interference unit that includes 1D passive diffractive optical elements configured to implement a first multiplication function for detecting a first group of bacteria. A second optical multiplication unit may have a second optical interference unit that includes 1D passive diffractive optical elements configured to implement a second multiplication function for detecting a second group of bacteria, etc. The first and second optical multiplication units may be developed by different companies specializing in developing techniques for detecting different bacteria. When the user wants to use the system 900 to detect the first group of bacteria, the user can insert the first optical multiplication unit into the system. When the user wants to use the system 900 to detect the second group of bacteria, the user can swap out the first optical multiplication unit and insert the second optical multiplication unit into the system. By using one-dimensional diffractive optical elements, the laser unit 908, the modulator 912, the detection unit 920, and the ADC unit 930 can be made at a low cost.

In some implementations, the optical multiplication unit 916 includes a housing (e.g., a cartridge) that protects the substrate that has the 1D diffractive optical elements. The housing supports an input interface that is coupled to the input waveguide, and an output interface that is coupled to the output waveguide. The input interface is configured to receive the output from the modulator 912, and the output interface is configured to send the output of the optical multiplication unit 916 to the detection unit 920. The optical multiplication unit 916 can be designed as a module that is suitable to be handled by average consumers, allowing the users to easily switch from one optical multiplication unit 916 to another optical multiplication unit 916. Machine learning technology improves over time. The user can upgrade the system 900 by swapping out the old optical multiplication unit 916 and inserting a new, upgraded version.

In some implementations, the system 900 is an optical computing platform configured to be operable with optical multiplication units provided by different companies. This allows different companies to develop different 1D passive optical multiplication functions for diverse applications. The 1D passive optical multiplication functions are sold to end-users in standardized packages that can be installed in the optical computing platform to allow the system 900 to perform various intelligent functions.

In some implementations, the system can have a holder mechanism for supporting multiple optical multiplication units 916, and a mechanical handling mechanism can be provided for automatically swapping the optical multiplication units 916. The system determines which optical multiplication unit 916 is needed for the current application and uses the mechanical handling mechanism to automatically retrieve the appropriate optical multiplication unit 916 from the holder mechanism and insert it into the optical processor 906.

In some implementations, the artificial neural network computation system 900 can be modified by adding an analog nonlinear unit between the detection unit 920 and the ADC unit 930. The analog nonlinearity unit is configured to receive the output voltages from the detection unit 920, apply a nonlinear transfer function, and output transformed output voltages to the ADC unit 930. The controller 110 may obtain, from the ADC unit 930, transformed digitized output voltages corresponding to the transformed output voltages. Because the digitized output voltages obtained from the ADC unit 930 have already been nonlinearly transformed ("activated"), the nonlinear transformation step by the controller 110 can be omitted, reducing the computation burden by the controller 110. The first transformed voltages obtained directly from the ADC unit 930 may then be stored as the first transformed digital output vector in the memory unit 120.

The passive chips having passive diffractive optical elements have several advantages. First, because the active components—typically the most bulky part—have been eliminated, a chip of any given size can contain a larger neural network. Commonly useful neural networks can include millions of weights, which are challenging to implement on active chips and may require multiple runs of data through the chip and reprogramming of the chip. By comparison, a single passive chip may be able to support the entire neural network. Second, the very low power consumption of passive chips is important for "edge" applications because such applications may require a small footprint and low power consumption. Third, the passive chips can be fabricated at a much lower cost because they do not contain active components.

An optical matrix multiplication unit having passive diffractive optical elements can also be used in a wavelength division multiplexed artificial neural network computation system. For example, the OMNI unit 150 of system 104 in FIG. 1F can be replaced with an OMM unit that uses passive diffractive optical elements. In this example, the second DAC subunit 134 can be removed.

In some implementations, the optical processor (e.g., 504, 702) can perform matrix processing other than matrix multiplication. The optical matrix multiplication unit 502 and 708 can be replaced by an optical matrix processing unit that performs other types of matrix processing.

Figure 25:
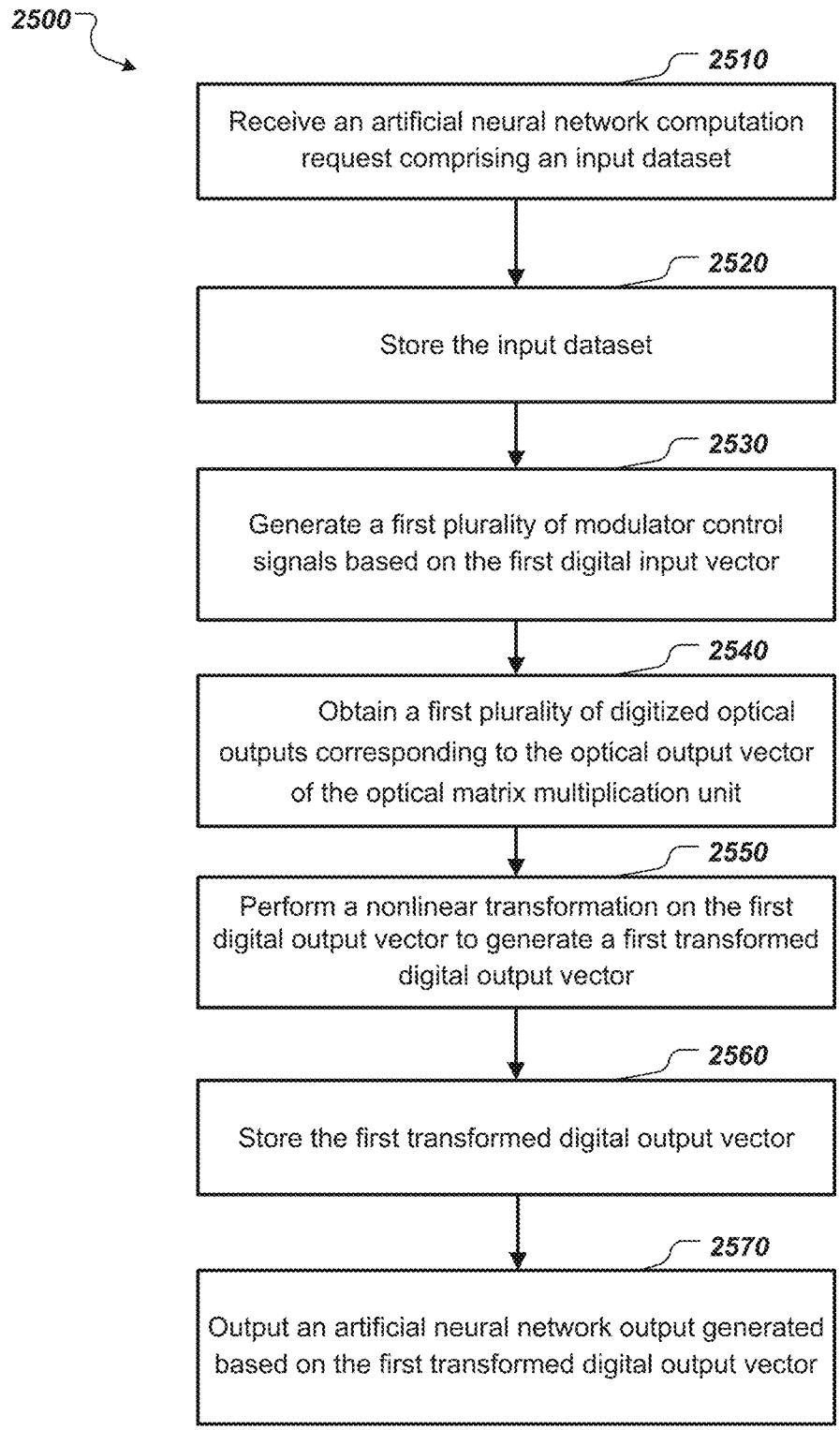
FIG. 25 is a flowchart showing an example of a method for performing an ANN computation.

FIG. 25 shows a flowchart of an example of a method 2500 for performing an ANN computation using the ANN computation system 500, 700, or 900 that include one or more optical matrix multiplication units or optical multiplication units that have passive diffractive elements, such as the 2D OMM unit 502, the 3D OMM unit 708, or the 1D OM unit 916. The steps of the process 2500 may be performed at least in part by the controller 110 or 902. In some implementations, various steps of method 2500 can be run in parallel, in combination, in loops, or in any order.

At 2510, an artificial neural network (ANN) computation request comprising an input dataset is received. The input dataset includes a first digital input vector. The first digital input vector is a subset of the input dataset. For example, it may be a sub-region of an image. The ANN computation request may be generated by various entities, such as the computer 102. The computer may include one or more of various types of computing devices, such as a personal computer, a server computer, a vehicle computer, and a flight computer. The ANN computation request generally refers to an electrical signal that notifies or informs the ANN computation system 500, 700, or 900 of an ANN computation to be performed. In some implementations, the ANN computation request may be divided into two or more signals. For example, a first signal may query the ANN computation system 500, 700, or 900 to check whether the system 500, 700, or 900 is ready to receive the input dataset. In response to a positive acknowledgement by the system 500, 700, or 900, the computer may send a second signal that includes the input dataset.

At 2520, the input dataset is stored. The controller 110 may store the input dataset in the memory unit 120. Storing of the input dataset in the memory unit 120 may allow flexibilities in the operation of the ANN computation system 500, 700, or 900 that, for example, can improve the overall performance of the system. For example, the input dataset can be divided into digital input vectors of a set size and format by retrieving desired portions of the input dataset from the memory unit 120. Different portions of the input dataset can be processed in various order, or be shuffled, to allow various types of ANN computations to be performed. For example, shuffling may allow matrix multiplication by block matrix multiplication technique in cases where the input and output matrix sizes are different. As another example, storing of the input dataset in the memory unit 120 may allow queuing of multiple ANN computation requests by the ANN computation system 500, 700, or 900, which may allow the system 500, 700, or 900 to sustain operation at its full speed without periods of inactivity.

At 2530, a first plurality of modulator control signals is generated based on the first digital input vector. The controller 110 may send a DAC control signal to the DAC unit 506, 712, or 904 for generating the first plurality of modulator control signals. The DAC unit 506, 712, or 904 generates the first plurality of modulator control signals based on the first DAC control signal, and the modulator array 144, 706, or 912 generates the optical input vector representing the first digital input vector.

The first DAC control signal may include multiple digital values to be converted by the DAC unit 506, 712, or 904 into the first plurality of modulator control signals. The multiple digital values are generally in correspondence with the first digital input vector, and may be related through various mathematical relationships or look-up tables. For example, the multiple digital values may be linearly proportional to the values of the elements of the first digital input vector. As another example, the multiple digital values may be related to the elements of the first digital input vector through a look-up table configured to maintain a linear relationship between the digital input vector and the optical input vector generated by the modulator array 144, 706, or 912.

In some implementations, the 2D OMNI unit 502, 3D OMM unit 708, or 1D OM unit 916 is configured to performing optical matrix processing or optical multiplication based on the optical input vector and a plurality of neural network weights implemented using passive diffractive elements. The plurality of neural network weights representing a matrix M may be decomposed through singular value decomposition (SVD) method into $M=USV^*$, where U is an M×M unitary matrix, S is an M×N diagonal matrix with non-negative real numbers on the diagonal, and $V^*$ is the complex conjugate of an N×N unitary matrix V. In such cases, the passive diffractive elements may be configured to implement the matrix V, the matrix S, and the matrix U such that the OMM unit 502 or 708 as a whole implements the matrix M.

At 2540, a first plurality of digitized optical outputs corresponding to the optical output vector of the optical matrix multiplication unit or optical multiplication is obtained. The optical input vector generated by the modulator array 144, 706, or 912 is processed by the 2D OMM unit 502, 3D OMNI unit 708, or the 1D OM unit 916 and transformed into an optical output vector. The optical output vector is detected by the detection unit 146, 710, or 920 and converted into electrical signals that can be converted into digitized values by the ADC unit 160 or 930. The controller 110 or 902 may, for example, send a conversion request to the ADC unit 160 or 930 to begin a conversion of the voltages output by the detection unit 146, 710, or 920 into digitized optical outputs. Once the conversion is complete, the ADC unit 160 or 930 may send the conversion result to the controller 110 or 902. Alternatively, the controller 110 or 902 may retrieve the conversion result from the ADC unit 160 or 930. The controller 110 or 902 may form, from the digitized optical outputs, a digital output vector that corresponds to the result of the matrix multiplication or vector multiplication of the input digital vector. For example, the digitized optical outputs may be organized, or concatenated, to have a vector format.

In some implementations, the ADC unit 160 or 930 may be set or controlled to perform an ADC conversion based on a DAC control signal issued to the DAC unit 506, 712, or 904 by the controller 110 or 902. For example, the ADC conversion may be set to begin at a preset time following the generation of the modulation control signal by the DAC unit 506, 712, or 904. Such control of the ADC conversion may simplify the operation of the controller 110 or 902 and reduce the number of necessary control operations.

At 2550, a nonlinear transformation is performed on the first digital output vector to generate a first transformed digital output vector. A node, or an artificial neuron, of an ANN operates by first performing a weighted sum of the signals received from nodes of a previous layer, then performing a nonlinear transformation ("activation") of the weighted sum to generate an output. Various types of ANN may implement various types of differentiable, nonlinear transformations. Examples of nonlinear transformation functions include a rectified linear unit (RELU) function, a Sigmoid function, a hyperbolic tangent function, an X/\2 function, and a |X| function. Such nonlinear transformations are performed on the first digital output by the controller 110 or 902 to generate the first transformed digital output vector. In some implementations, the nonlinear transformations may be performed by a specialized digital integrated circuitry within the controller 110 or 902. For example, the controller 110 or 902 may include one or more modules or circuit blocks that are specifically adapted to accelerate the computation of one or more types of nonlinear transformations.

At 2560, the first transformed digital output vector is stored. The controller 110 or 902 may store the first transformed digital output vector in the memory unit 120. In cases where the input dataset is divided into multiple digital input vectors, the first transformed digital output vector corresponds to a result of the ANN computation of a portion of the input dataset, such as the first digital input vector. As such, storing of the first transformed digital output vector allows the ANN computation system 500, 700, or 900 to perform and store additional computations on other digital input vectors of the input dataset to later be aggregated into a single ANN output.

At 2570, an artificial neural network output generated based on the first transformed digital output vector is output. The controller 110 or 902 generates an ANN output, which is a result of processing the input dataset through the ANN defined by the first plurality of neural network weights. In cases where the input dataset is divided into multiple digital input vectors, the generated ANN output is an aggregated output that includes the first transformed digital output, but may further include additional transformed digital outputs that correspond to other portions of the input dataset. Once the ANN output is generated, the generated output is sent to a computer, such as the computer 102, that originated the ANN computation request.

Figure 26:
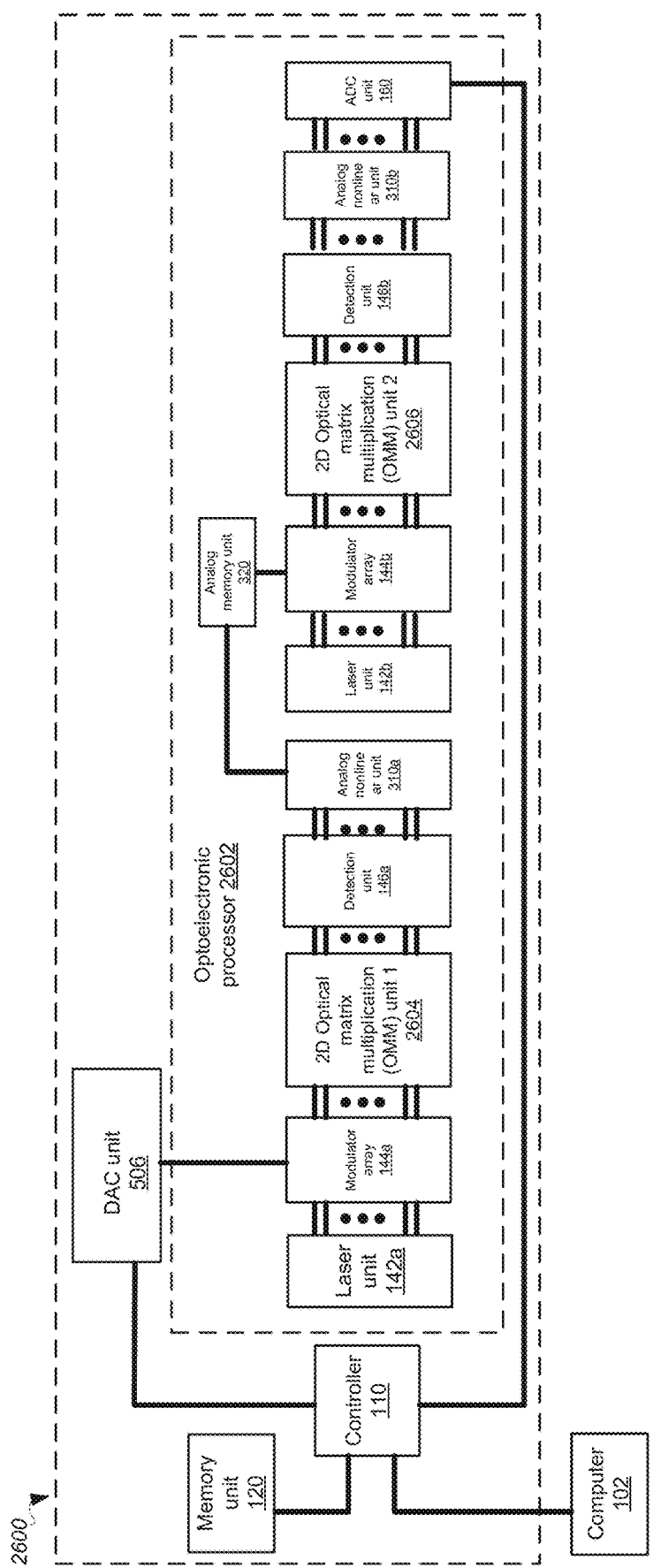
FIGS. 26 and 27 are schematic diagrams of examples of ANN computation systems.

The 2D OMNI unit 502, 3D OMM unit 708, or 1D OM unit 916 can represent the weight coefficients of one hidden layer of a neural network. If the neural network has several hidden layers, additional 2D OMM unit 502, 3D OMNI unit 708, or 1D OM unit 916 can be coupled in series. FIG. 26 shows an example of an ANN computation system 2600 for implementing a neural network having two hidden layers. A first 2D optical matrix multiplication unit 2604 represents the weight coefficients of the first hidden layer, and a second 2D optical matrix multiplication unit 2606 represents the weight coefficients of the second hidden layer. The ANN computation system 2600 includes a controller 110, a memory unit 120, a DAC unit 506, and an optoelectronic processor 2602. The memory unit 120 and the DAC unit 506 are similar to the corresponding components of the system 500 in FIG. 5. The optoelectronic processor 2602 is configured to perform matrix computations using optical and electronic components.

The optoelectronic processor 2602 includes a first laser unit 142, a first modulator array 144a, the first 2D optical matrix multiplication unit 2604, a first detection unit 146a, a first analog non-linear unit 310a, an analog memory unit 320, a second laser unit 142b, a second modulator array 144b, the second 2D optical matrix multiplication unit 2606, a second detection unit 146b, a second analog non-linear unit 310b, and an ADC unit 160. The operations of the first laser unit 142, the first modulator array 144a, the first detection unit 146a, the first analog non-linear unit 310a, and the analog memory unit 320 are similar to corresponding components shown in FIG. 3B. The first 2D OMNI unit 2604 is similar to the 2D OMNI 502 of FIG. 5. The output of the analog memory unit 320 drives the second modulator array 144b, which modulates the laser light from the second laser unit 142b to generate an optical vector. The optical vector from the second modulator array 144b is processed by the second 2D OMM unit 2606, which performs a matrix multiplication and generates an optical output vector that is detected by the second detection unit 246b. The second detection unit 246b is configured to generate output voltages corresponding to the optical signals of the optical output vector from the 2D OMM unit 2606. The ADC unit 160 is configured to convert the output voltages into digitized output voltages. The controller 110 may obtain, from the ADC unit 160, the digitized outputs corresponding to the optical output vector of the second 2D OMM unit 2606. The controller 110 may form, from the digitized outputs, a digital output vector that corresponds to the result of the second matrix multiplication of the nonlinear transformation of the result of the first matrix multiplication of the input digital vector. The second laser unit 142b can be combined with the first laser unit 142a by using optical splitters to divert some of the light from the first laser unit 142a to the second modulator array 144b.

The principle described above can be applied to implementing a neural network having three or more hidden layers, in which the weight coefficients of each hidden layer is represented by a corresponding 2D OMNI unit.

Figure 27:
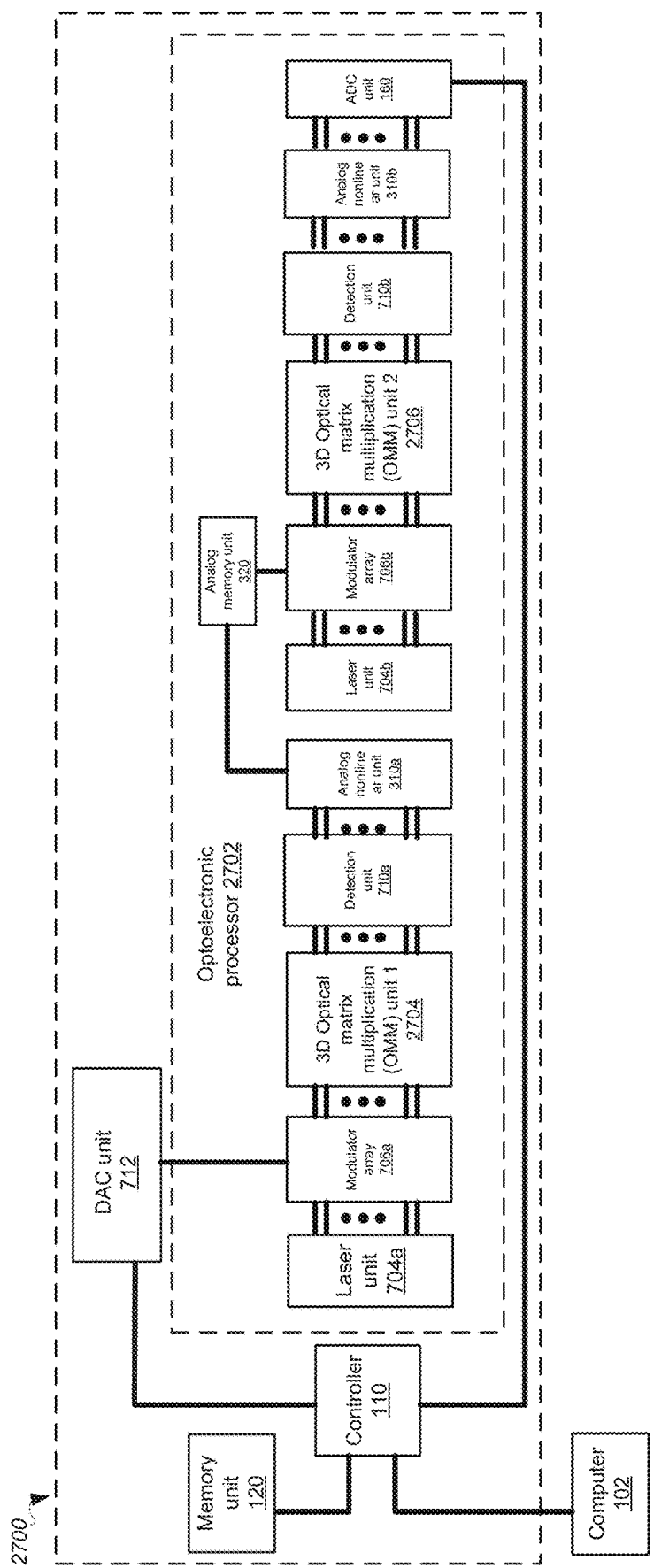

FIG. 27 shows an example of an ANN computation system 2700 for implementing a neural network having two hidden layers. A first 3D optical matrix multiplication unit 2704 represents the weight coefficients of the first hidden layer, and a second 3D optical matrix multiplication unit 2706 represents the weight coefficients of the second hidden layer. The ANN computation system 2700 includes a controller 110, a memory unit 120, a DAC unit 712, and an optoelectronic processor 2702. The memory unit 120 and the DAC unit 712 are similar to the corresponding components of the system 700 in FIG. 7. The optoelectronic processor 2702 is configured to perform matrix computations using optical and electronic components.

The optoelectronic processor 2702 includes a first laser unit 704, a first modulator array 706a, the first 3D optical matrix multiplication unit 2704, a first detection unit 710a, a first analog non-linear unit 310a, an analog memory unit 320, a second laser unit 704b, a second modulator array 706b, the second 2D optical matrix multiplication unit 2706, a second detection unit 710b, a second analog non-linear unit 310b, and an ADC unit 160. The operations of the first laser unit 704a, the first modulator array 706a, the first detection unit 710a, the first analog non-linear unit 310a, and the analog memory unit 320 are similar to corresponding components shown in FIG. 3B. The first 3D OMM unit 2704 is similar to the 3D OMNI 708 of FIG. 7. The output of the analog memory unit 320 drives the second modulator array 706b, which modulates the laser light from the second laser unit 704b to generate an optical vector. The optical vector from the second modulator array 706b is processed by the second 3D OMNI unit 2706, which performs a matrix multiplication and generates an optical output vector that is detected by the second detection unit 710b. The second detection unit 710b is configured to generate output voltages corresponding to the optical signals of the optical output vector from the 3D OMNI unit 2706. The ADC unit 160 is configured to convert the output voltages into digitized output voltages. The controller 110 may obtain, from the ADC unit 160, the digitized outputs corresponding to the optical output vector of the second 3D OMM unit 2706. The controller 110 may form, from the digitized outputs, a digital output vector that corresponds to the result of the second matrix multiplication of the nonlinear transformation of the result of the first matrix multiplication of the input digital vector. The second laser unit 704b can be combined with the first laser unit 704a by using optical splitters to divert some of the light from the first laser unit 704a to the second modulator array 706b.

The principle described above can be applied to implementing a neural network having three or more hidden layers, in which the weight coefficients of each hidden layer is represented by a corresponding 3D OMM unit.

The 2D OMNI units 502 and 3D OMM units 708 having passive diffractive optical elements are suitable for use in recurrent neural networks (RNN) in which the output of the network during a (k)th pass through the neural network is recirculated back to the input of the neural network and used as the input during the (k+1)th pass, such that the weight coefficients of the neural network remain the same during the multiple passes.

Figure 28:
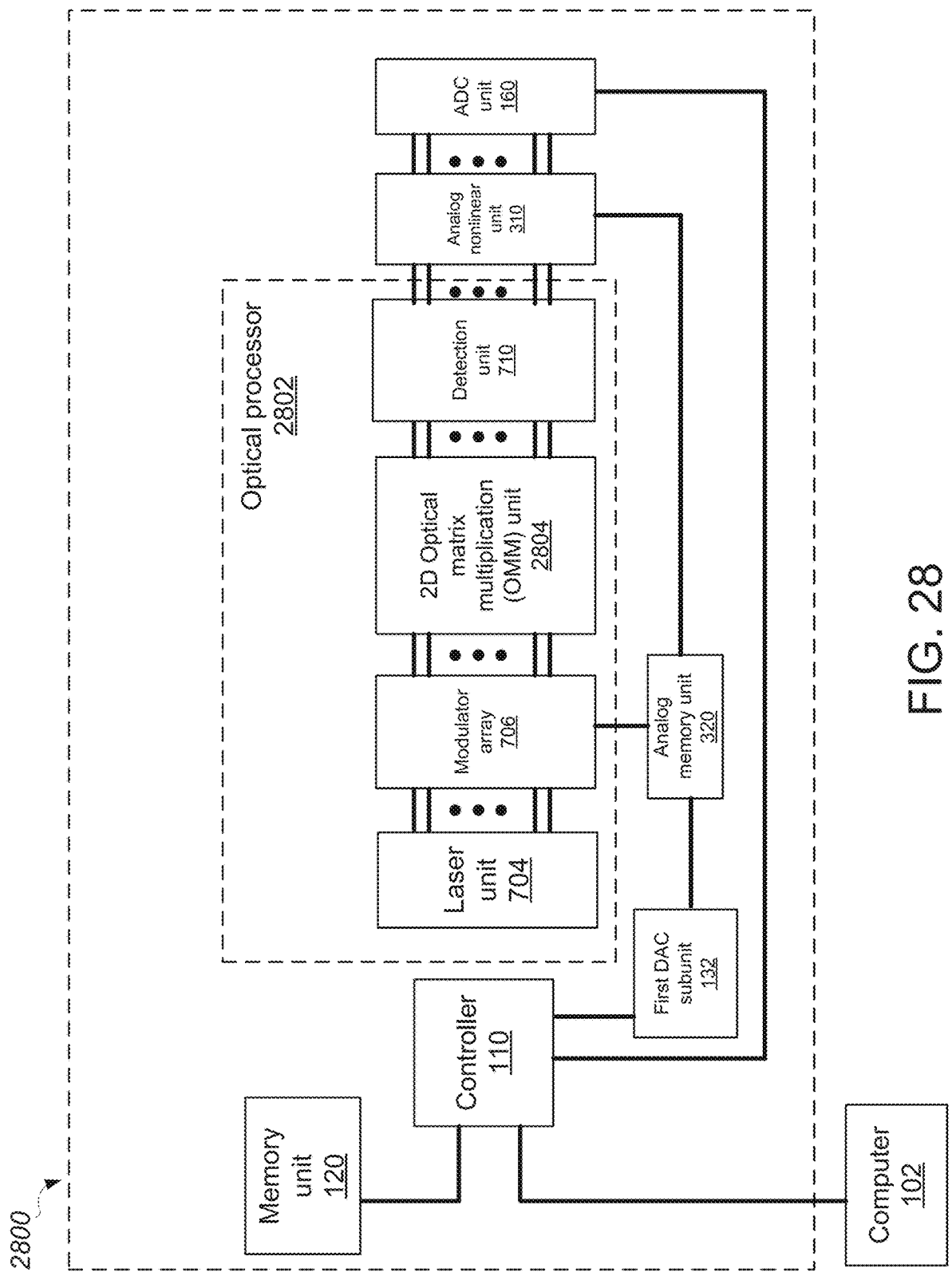
FIG. 28 is a schematic diagram of an example of a neural network computation system that uses a passive 2D optical matrix multiplication unit.

FIG. 28 shows an example of a neural network computation system 2800, which can be used to implement a recurrent neural network. The system 2800 includes an optical processor 2802 that operates in a manner similar to that of the optical processor 140 of FIG. 3B, except that the OMM unit 150 is replaced by the 2D OMNI unit 2804, which can be similar to the 2D OMNI unit 502 of FIG. 6. The neural network weights for the 2D OMNI unit 2804 are fixed, so the system 2800 does not need the second DAC subunit 134 that is used in the system 302 of FIG. 3B.

Figure 29:
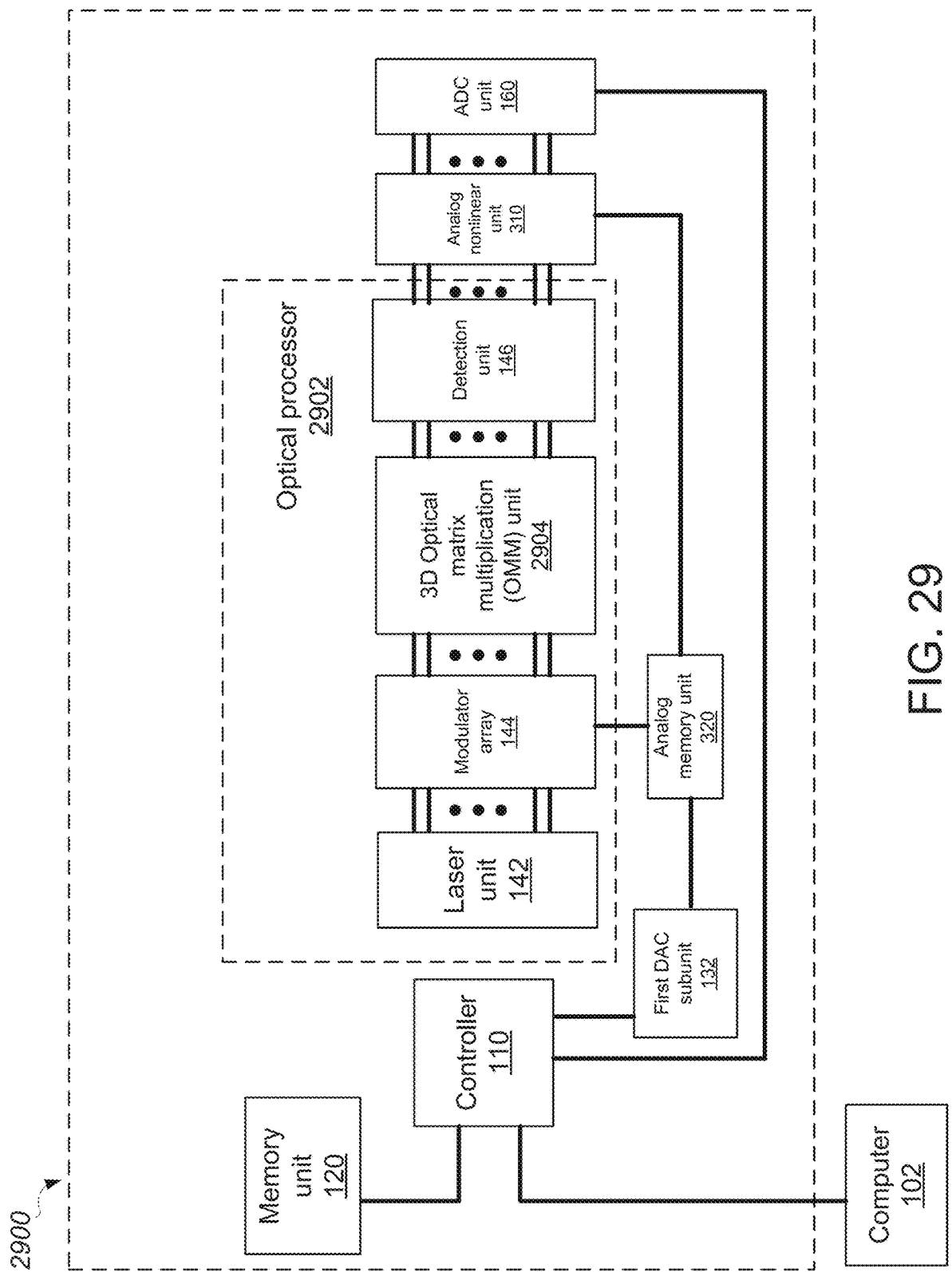
FIG. 29 is a schematic diagram of an example of a neural network computation system that uses a passive 3D optical matrix multiplication unit.

FIG. 29 shows an example of a neural network computation system 2900, which can be used to implement a recurrent neural network. The system 2900 includes an optical processor 2902 that operates in a manner similar to that of the optical processor 140 of FIG. 3B, except that the laser unit 142, the modulator array 144, the OMNI unit 150, and the detection unit 146 are replaced by the laser unit 704, the modulator array 706, the 3D OMNI unit 2904, and the detection unit 710, respectively, of FIG. 7. The neural network weights for the 3D OMM unit 2904 are fixed, so the system 2900 does not need the second DAC subunit 134 that is used in the system 302 of FIG. 3B.

Figure 30:
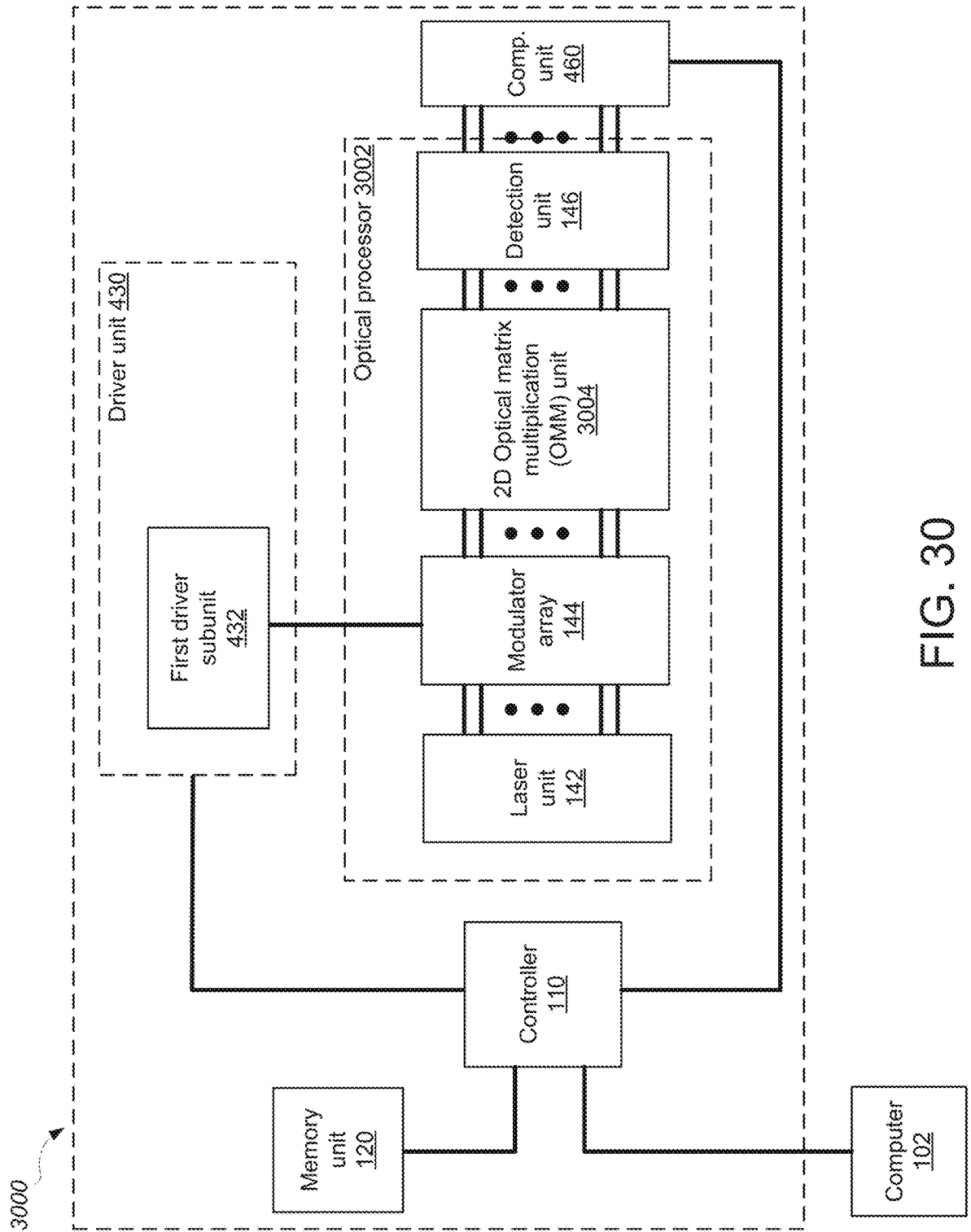
FIG. 30 is a schematic diagram of an example of an artificial neural network computation system with 1-bit internal resolution, in which the system uses a passive 2D optical matrix multiplication unit.

FIG. 30 shows a schematic diagram of an example of an artificial neural network computation system 3000 with 1-bit internal resolution. The ANN computation system 3000 is similar to the ANN computation system 400 of FIG. 4A, except that the OMNI unit 150 is replaced by the 2D OMM unit 3004 (which is similar to the 2D OMNI unit 502 of FIG. 5), and the second driver subunit 434 is omitted. The ANN computation system 3000 operates in a manner similar to that of the ANN computation system 400, in which the input vector is decomposed into several 1-bit vectors, and certain ANN computation may then be performed by performing a series of matrix multiplication of the 1-bit vectors followed by summation of the individual matrix multiplication result.

Figure 31:
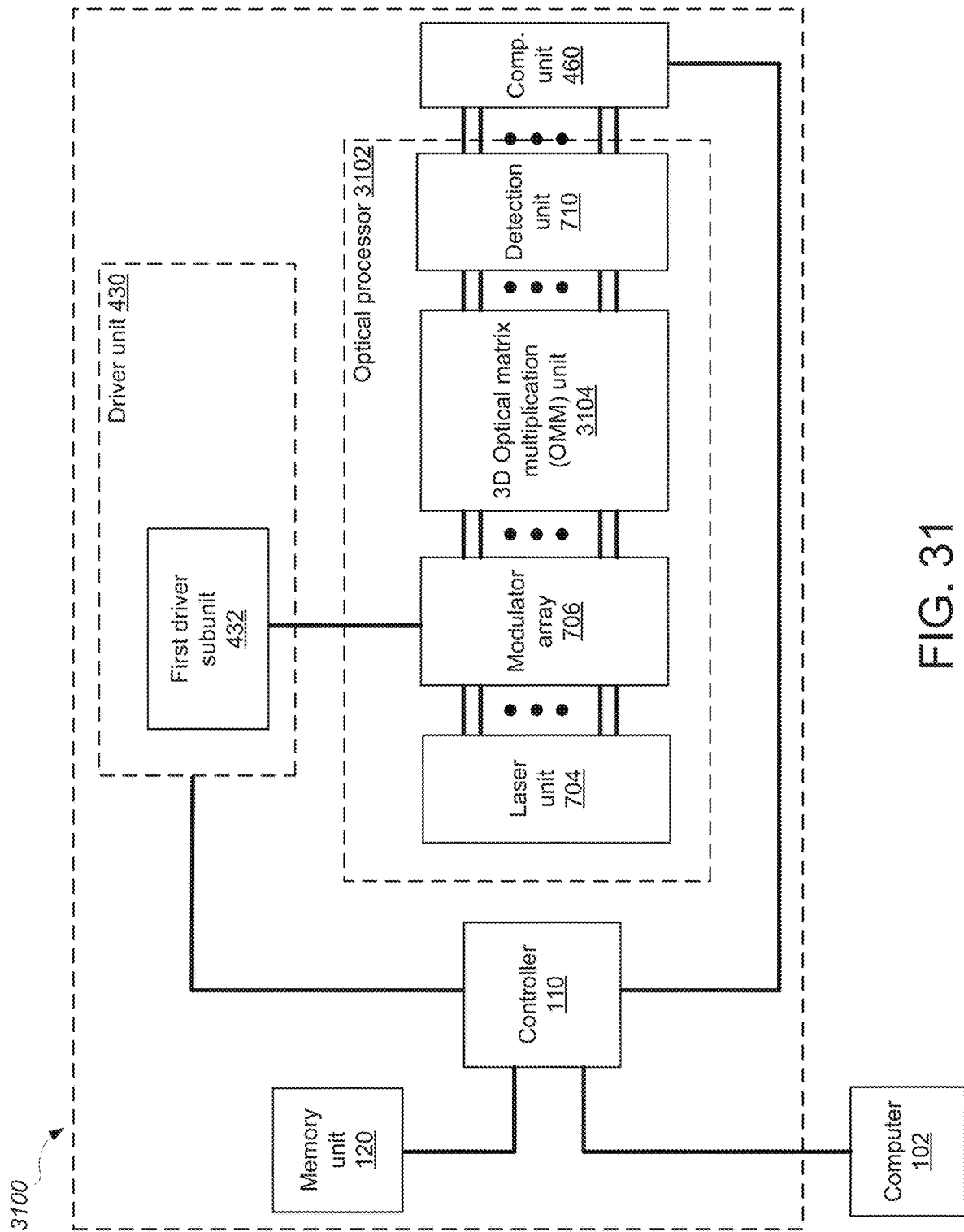
FIG. 31 is a schematic diagram of an example of an artificial neural network computation system with 1-bit internal resolution, in which the system uses a passive 3D optical matrix multiplication unit.

FIG. 31 shows a schematic diagram of an example of an artificial neural network computation system 3100 with 1-bit internal resolution. The ANN computation system 3100 is similar to the ANN computation system 400 of FIG. 4A, except that the OMNI unit 150 is replaced by the 3D OMM unit 3104 (which is similar to the 3D OMNI unit 708 of FIG. 7), and the second driver subunit 434 is omitted. In the example of FIG. 31, the laser unit 142, the modulator array 144, and the detection unit 146 of FIG. 4A are replaced by the laser unit 704, the modulator array 706, and the detection unit 710, respectively, of FIG. 7. The ANN computation system 3100 operates in a manner similar to that of the ANN computation system 400, in which the input vector is decomposed into several 1-bit vectors, and certain ANN computation may then be performed by performing a series of matrix multiplication of the 1-bit vectors followed by summation of the individual matrix multiplication result.

The following describes principles of the optical diffractive neural networks. An optical diffractive neural network can be implemented as a few layers of diffractive or transmissive optical media. Based on the Huygens-Fresnel principle, each point in the diffractive media can be considered as a secondary light source. For each light source, the far field diffraction can be described in the following equation:

$$w_i^l(x, y, z) = \frac{z - z_i}{r^2}\left(\frac{1}{2\pi r} + \frac{1}{j\lambda}\right)\exp\left(\frac{j2\pi r}{\lambda}\right).$$

Here, indices 1 and i indicate i-th neuron in the 1-th layer of the neural network, $\lambda$ is the wavelength of the light, r is the distance in which $$r = \sqrt{(x-x_i)^2 + (y-y_i)^2 + (z-z_i)^2}$$

The output from each secondary light source can be written as the input times the phase and intensity modulation from the light source:

$$n_i^l(x,y,z) = w_i^l(x,y,z)t_i^l(x_i,y_i,z_i)\Sigma_k n_k^{l-1}(x_i,y_i,z_i) = w_i^l(x,y,z)(|A|e^{j\Delta\theta})$$

Here, t is transmission modulation, which is a complex term that includes both amplitude and phase modulation, and $\Sigma_k n_k^{l-1}$ is a summation of input from all previous light sources. Overall, the output can be consolidated into the far-field diffraction w time and amplitude |A| and an additional phase term. Therefore, each point in each layer can be considered a neuron that takes input from multiple neurons from the previous layer and adds additional phase and intensity modulation before outputting to the next layer.

Figure 11:
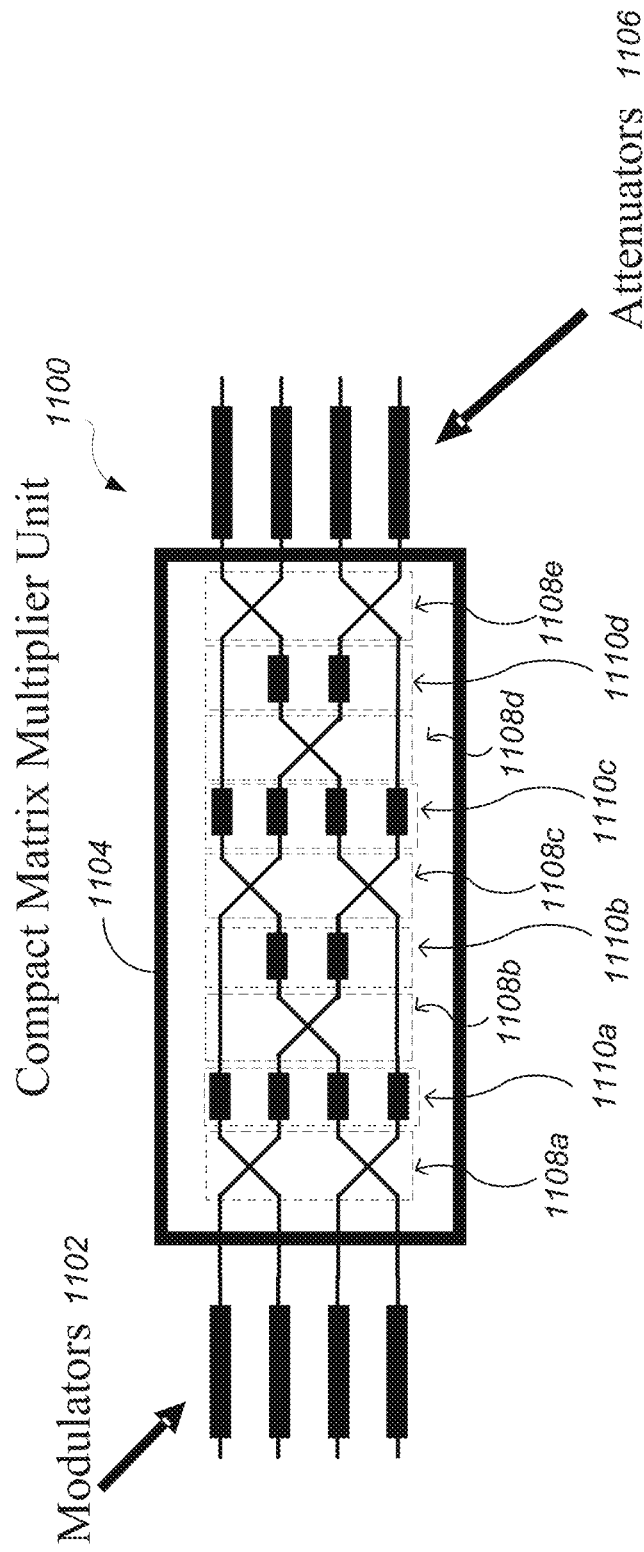
FIG. 11 is a diagram of an example of a compact matrix multiplier unit.

The following describes a compact design for a compact photonic matrix multiplier unit that can implement general unitary matrix multiplications. Referring to FIG. 11, a photonic matrix multiplier unit 1100 includes modulators 1102, a plurality of interconnected interferometers 1104, and attenuators 1106. The interconnected interferometers 1104 include layers (or groups or sets) of directional couplers 1108a, 1108b, 1108c, 1108d, and 1108e (collectively 1108) and layers (or groups or sets) of phase shifters 1110a, 1110b, 1110c, and 1110d (collectively 1110). Each layer (or group or set) of directional coupler(s) can include one or more directional couplers. Each layer of phase shifter(s) can include one or more phase shifters. In this example, the interconnected interferometers 1104 includes five layers of directional couplers 1108 and four layers of phase shifters. In other examples, the photonic matrix multiplier unit 1100 can have different layers of directional couplers and phase shifters. The photonic matrix multiplier unit 1100 has directional couplers 1108 that are positioned in a way such that the number of layers of the directional couplers 1108 is reduced, as compared to conventional matrix multiplier units that use interconnected Mach-Zehnder interferometers.

Here, the term "layer" in the phrase "layers of directional couplers" and "layers of phase shifters" refers to a group or a set of directional couplers or phase shifters based on their positions in the photonic matrix multiplier unit 1100 relative to the input ports and output ports. In the example of FIG. 11, the input light signals are processed by a first layer of direction couplers 1108a, then processed by a second layer of phase shifters 1110a, then processed by a third layer of directional coupler(s) 1108b, then processed by a fourth layer of phase shifters 1110b, etc.

For example, a conventional matrix multiplier unit that uses interconnected Mach-Zehnder interferometers may require 2N layers of directional couplers, whereas the photonic matrix multiplier unit 1100 only needs N+2 layers of directional couplers. N refers to the number of input signals, or the number of digits in the input vector. It is possible that the mesh architecture used in the photonic matrix multiplier unit 1100 has the most compact geometry for photonic interconnected interferometers that can perform general matrix computation.

Figure 12A:
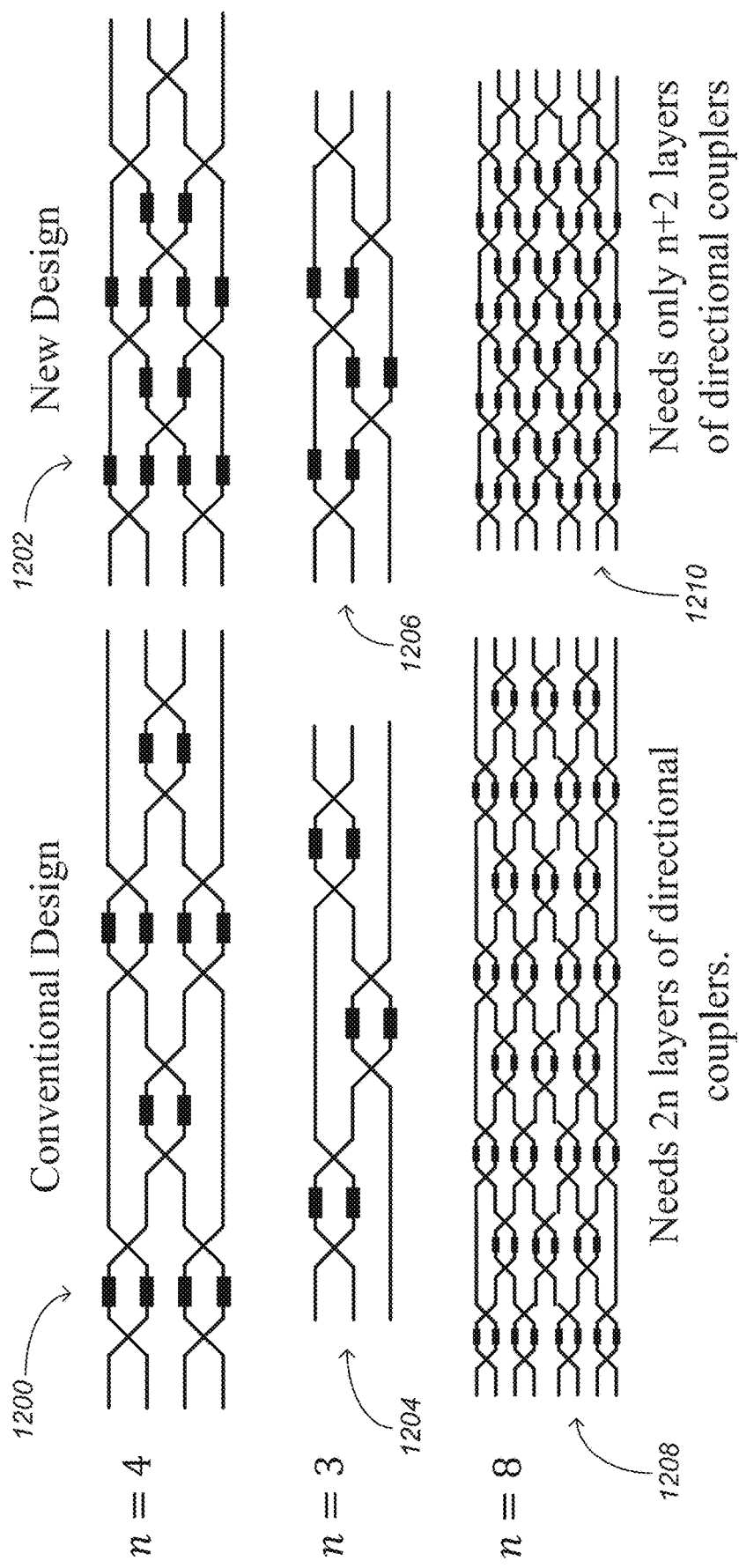
FIG. 12A shows diagrams comparing photonic matrix multiplier units.

FIG. 12A shows diagrams comparing the interconnected interferometers 1104 of the photonic matrix multiplier unit 1100 versus the conventional design for various numbers of input signals. When there are 4 input signals, interconnected Mach-Zehnder interferometers 1200 according to the conventional design needs 8 layers of directional couplers, whereas interconnected interferometers 1202 according to the new compact design only needs 6 layers of directional couplers. When there are 3 input signals, interconnected Mach-Zehnder interferometers 1204 according to the conventional design needs 6 layers of directional couplers, whereas interconnected interferometers 1206 according to the new compact design only needs 5 layers of directional couplers. When there are 8 input signals, interconnected Mach-Zehnder interferometers 1208 according to the conventional design needs 16 layers of directional couplers, whereas interconnected interferometers 1210 according to the new compact design only needs 10 layers of directional couplers.

In general, when there are n input signals, interconnected Mach-Zehnder interferometers according to the conventional design needs 2·n layers of directional couplers, whereas interconnected interferometers according to the new compact design only needs n+2 layers of directional couplers.

In the conventional design, for n input signals, there are n layers of Mach-Zehnder interferometers, and each Mach-Zehnder interferometer includes a directional coupler followed by a pair of phase shifters, followed by another directional coupler. Thus, n layers of Mach-Zehnder interferometers have 2n layers of directional couplers. As a result, in the conventional design, for n input signals, there needs to be n layers of phase shifters and 2n layers of directional couplers.

By comparison, in the new compact design, a layer of directional couplers is followed by a first layer of phase shifters, followed by a layer of directional couplers, followed by a second layer of phase shifters, followed by a layer of directional couplers, followed by a third layer of phase shifters, and so forth. After the last layer of phase shifters, there are two layers of directional couplers. As a result, for n input signals, there are n layers of phase shifters and n+2 layers of directional couplers.

Because directional couplers take up a significant amount of space, reducing the number of directional couplers from 2·n to n+2 results in a significant reduction in the size of the photonic matrix multiplier unit 1100, as compared to the conventional design.

Figure 12B:
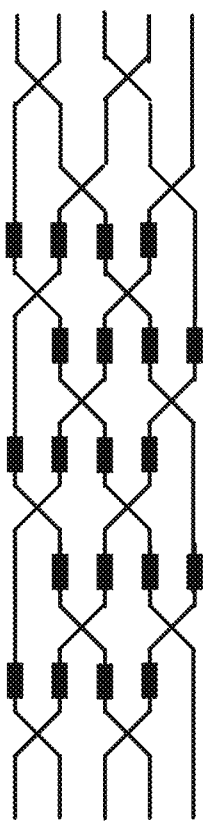
FIG. 12B is a diagram of compact interconnected interferometers.

FIG. 12B is a diagram showing compact interconnected interferometers 1212 according to the new design in which the number of input signals is 5.

The following describes compact design decomposition using gradient descent. The compact design for the photonic matrix multiplier described above can take any unitary matrix U and use an analytic decomposition algorithm to determine what phases are needed to implement with the phase shifters and thus implement the matrix U. For example, we can extract the phases from the given matrix U by using gradient descent. The gradient descent process is as follows. We start from a fixed matrix U and initialize random weights θ for the phase-shifters of the compact design. We construct the matrix U' using the compact design, i.e. U'=CompactDesign(θ). We then look at the loss function L=|U−U'|^2 (this is the Frobenius norm for matrices) and minimize that function with gradient descent (i.e. update θ by using gradient updates).

Figure 13:
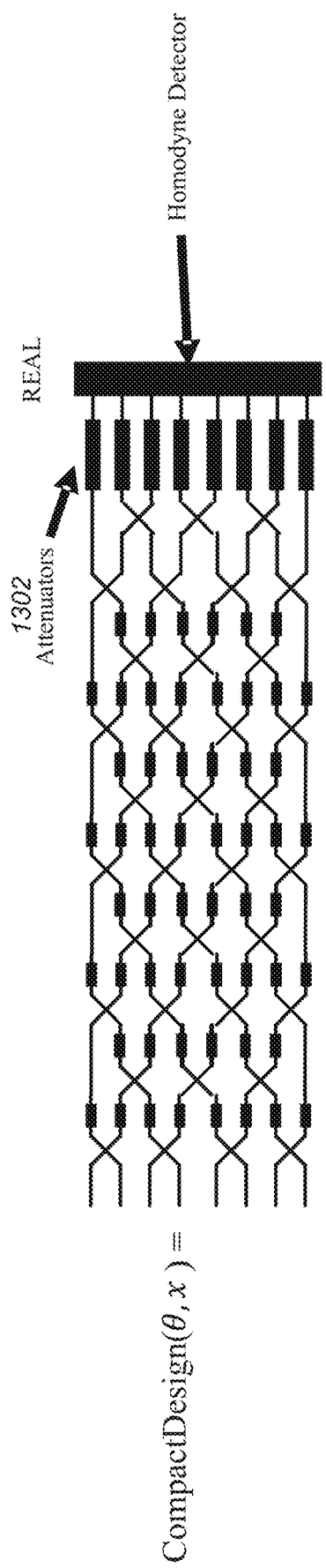
FIG. 13 is a diagram of a compact matrix multiplier unit.

Referring to FIG. 13, we use homodyne detection (e.g., we take the real part at the output), so an extra layer of attenuators 1302 is provided before the detection in order to simulate an orthogonal matrix. This means that along with θ we also need to learn diagonal weights x for the attenuators. In this way, we can learn the phases and diagonal weights needed for U, and can obtain the decomposition numerically.

Figure 14:
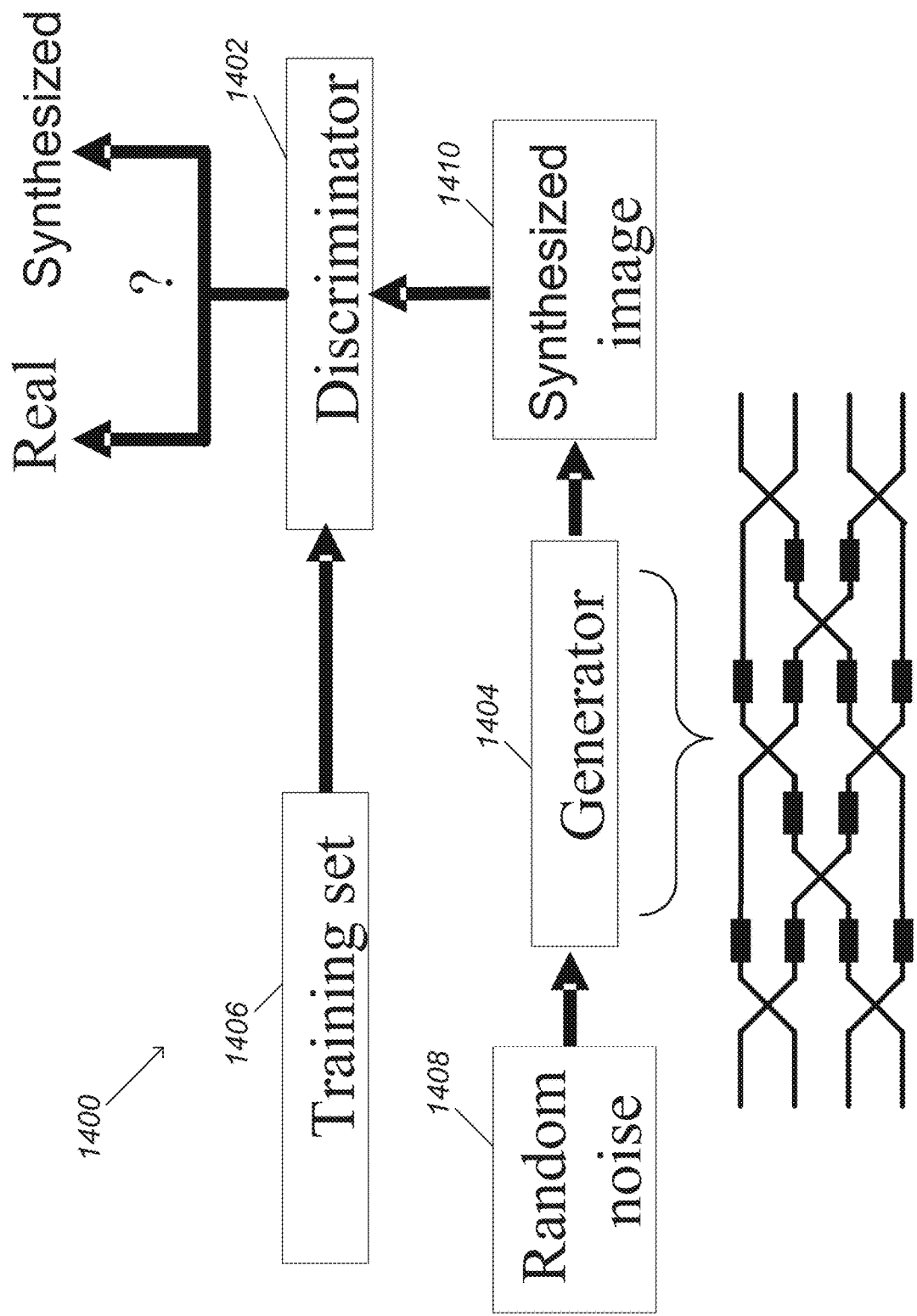
FIG. 14 is a diagram of an optical generative adversarial network.

The following describes optical generative adversarial networks (OGAN) that include generators configured to generate faithful data efficiently. FIG. 14 illustrates an example of an optical generative adversarial network 1400 in which a generator 1404 comprises a neural network that is configured or trained to produce synthesized images 1410 that resemble real images, and a discriminator 1402 comprises a neural network that is trained to determine whether an input image is real or synthesized. An initial set of training images 1406 is provided to train the discriminator 1402 so that the discriminator 1402 learns the features of real images. Similarly, the generator 1404 is trained using a set of training images (not shown) so that the generator 1404 can generate synthesized images 1410 having features that resemble those of real images.

In some implementations, the training of the discriminator 1402 is performed electronically, e.g., using transistor based data processors (such as central processing units or general purpose graphic processor units) to calculate the weights for the neural layers of the discriminator 1402. Similarly, the training of the generator 1404 is also performed electronically to calculate the weights for the neural layers of the generator 1404.

The synthesized images 1410 generated by the generator 1404 can be provided to the discriminator 1402 to further train the discriminator 1402, so that the discriminator 1402 can detect real images more accurately. The results of the detections by the discriminator 1402 can also be used to further train the generator 1404 so that the generator 1404 can generate synthesized images 1410 that are more realistic, i.e., more closely resemble the real images.

The optical generative adversarial network 1400 has many applications. For example, in some applications it may be difficult or expensive to obtain a large number of real images for use in training the discriminator 1402. In order to train the discriminator 1402 to detect, e.g., cancer cells, a large number of images of cancer cells are needed during the training stage. Obtaining a large number of images of cancer cells from cancer patients may be difficult and expensive, so there may not be enough samples to train the discriminator 1402 with sufficient accuracy. To improve the discriminator 1402, the generator 1404 is trained to generate realistic images of cancer cells, and the synthesized realistic images 1410 of cancer cells are used to further train the discriminator 1402, thereby improving the ability of the discriminator 1402 to detect cancer cells.

In some implementations, the generator 1404 can be an optical chip that includes active elements such as active phase shifters for modifying the weights of the neural network. After the generator 1404 is trained, the active elements are fixed so that the weights are fixed. Random noise 1408 is fed into the generator 1404, which then generates synthesized images 1410 based on the random noise 1408, in which the synthesized images 1410 resemble real images of cancer cells.

In some implementations, the generator 1404 is implemented using the optical matrix multiplication units shown in FIGS. 5, 7, and/or 9. After the weights for the neural network are determined, the optical matrix multiplication unit is configured based on the determined weights to implement the neural network. Because the input to the generator 1404 is random noise 1408, it is not necessary to have a modulator array, allowing the generator 1404 to have a small footprint.

Regardless of whether the generator 1404 is implemented using a passive optical chip or an optical chip having active elements, the trained generator 1404 can generate realistic images (e.g., resembling real images of cancer cells) that can then be provided to the discriminator 1402 to further train and improve the discriminator 1402. The generator 1404 has a high throughput and can generate synthesized images 1410 at a rate potentially orders of magnitude faster than using conventional electronic data processors, such as general purpose graphic processing units. The generator 1404 has a low power consumption, possibly with orders of magnitude less power consumption as compared to using conventional electronic data processors.

The generator 1404 has diverse applications. For example, the synthesized images produced by the generator 1404 can have many applications in the medical field. The generator 1404 can be configured to synthesize images of tissues associated with certain diseases, and the synthesized images can be used to train the discriminator 1402 to recognize tissues associated with the diseases. For example, the synthesized images generated by the generator 1404 can have many applications in the field of autonomous driving or navigation. For example, the generator 1404 can be configured to generate synthesized images of various traffic conditions, and the synthesized images can be used to train the discriminator 1402 to recognize the traffic conditions. For example, the synthesized images generated by the generator 1404 can have many applications in the field of manufacturing quality control. For example, the generator 1404 can be configured to generate synthesized images of products having defects, and the synthesized images can be used to train the discriminator 1402 to detect defective products.

In some implementations, the optical generative adversarial network 1400 includes a coherent light source, a filter for inputs of random amplitude and phases, in which both amplitudes and phases follow a known distribution. The optical generative adversarial network 1400 includes a mesh of interferometers for fast processing of the information. The optical generative adversarial network 1400 can be designed to have an architecture that does not need to shuffle weights, i.e., no reprogramming of the interferometers. The optical generative adversarial network 1400 can also be designed to include fast phase-shifters having an operating frequency greater than 1 GHz. The optical generative adversarial network 1400 can have fast execution of non-linearity. For example, it can have (i) non-linearity in the analog electronics domain, (ii) simple optical non-linearity, or (iii) non-linearity in the digital electronics domain.

Figure 15:
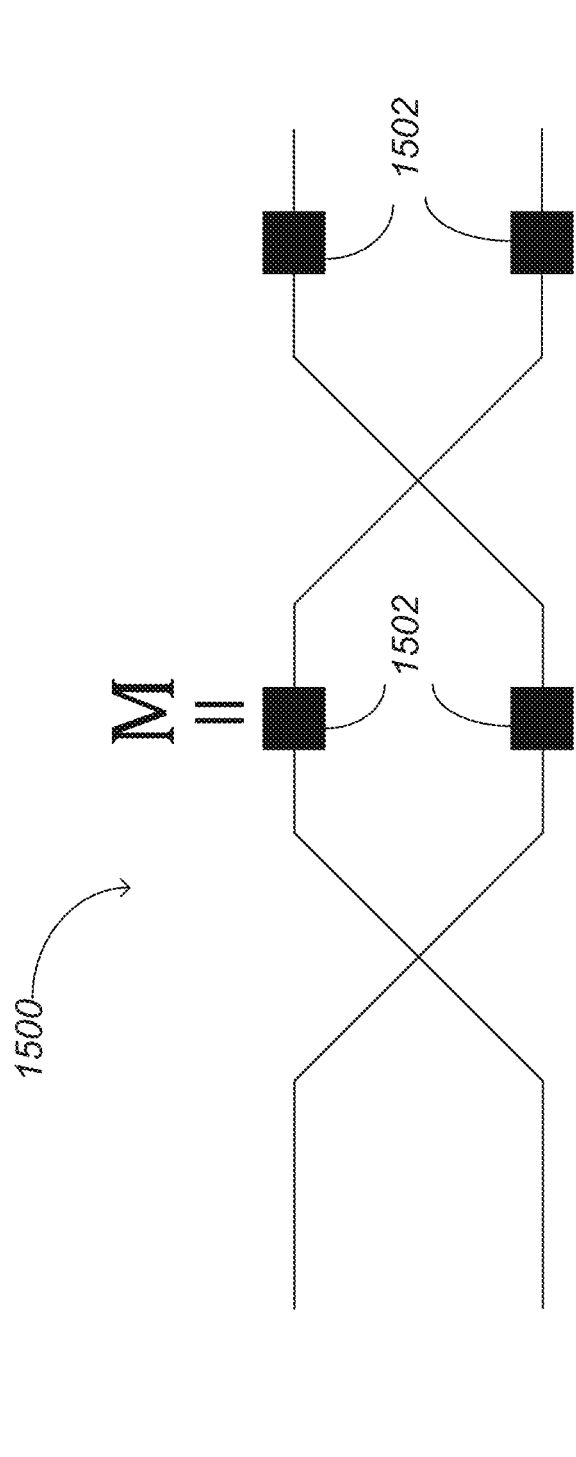
FIG. 15 is a diagram of a Mach-Zehnder interferometer.

The following describes a novel photonic circuit having interconnected Mach-Zehnder interferometers and configured to implement logic gates. Referring to FIG. 15, a Mach-Zehnder interferometer 1500 includes phase shifters 1502 configured in such a way that the Mach-Zehnder interferometer 1500 implements the following rotation:

$$M = \frac{1}{\sqrt{2}}\begin{pmatrix} 1 & -1 \\ 1 & 1 \end{pmatrix} = \begin{pmatrix} \cos\pi/4 & -\sin\pi/4 \\ \sin\pi/4 & \cos\pi/4 \end{pmatrix}.$$

Figure 16:
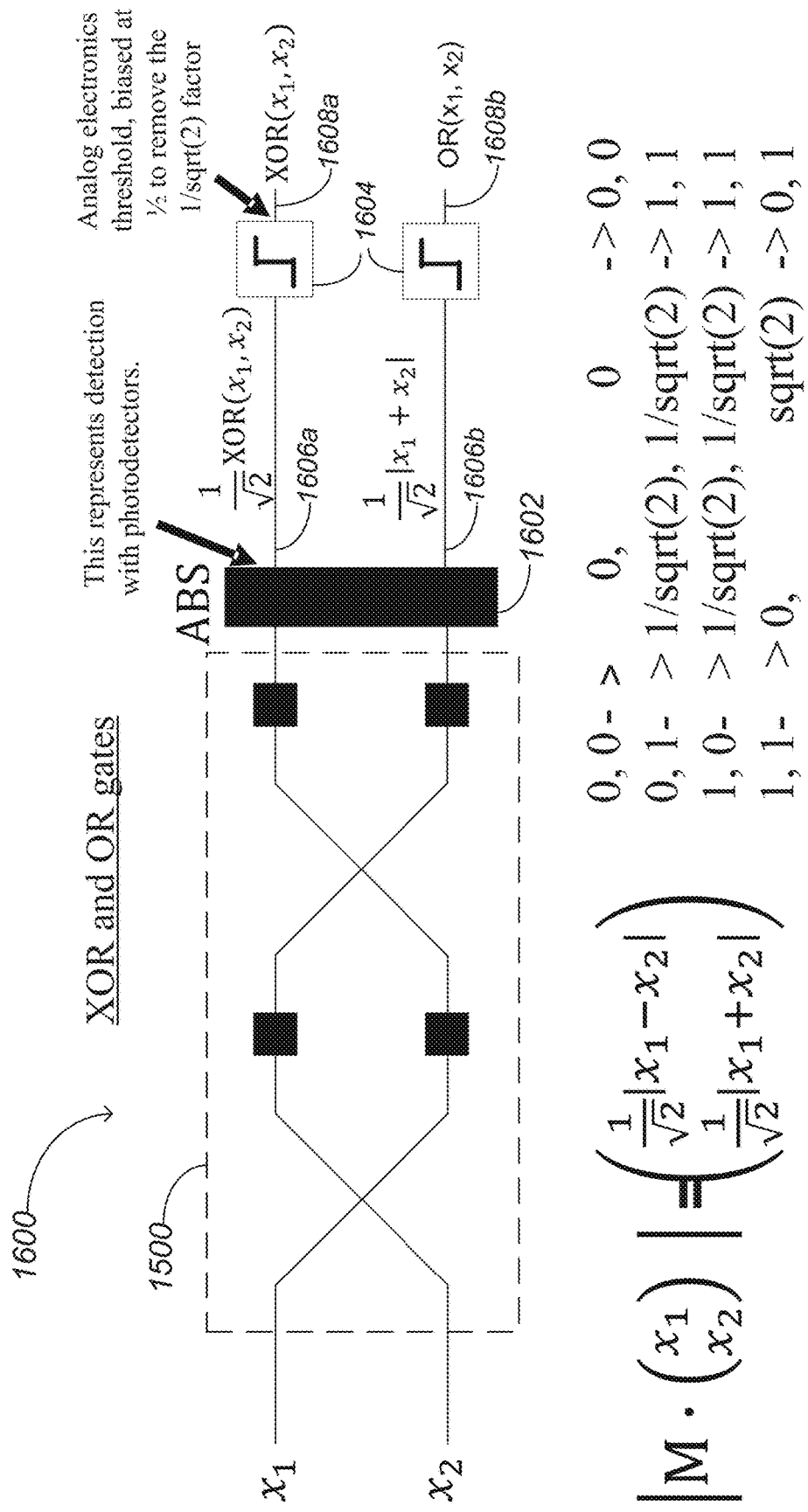
FIGS. 16, 17A, and 17B are diagrams of photonic circuits.

Referring to FIG. 16, a photonic circuit 1600 can implement an XOR gate and an OR gate. The photonic circuit 1600 includes a Mach-Zehnder interferometer 1500, a detector 1602, and comparators 1604 having analog electronic thresholds. When input signals x1 and x2 are provided to the photonic circuit 1600, the Mach-Zehnder interferometer 1500 performs the operation:

$$M \cdot \begin{pmatrix} x_1 \\ x_2 \end{pmatrix} = \begin{pmatrix} \frac{1}{\sqrt{2}}(x_1 - x_2) \\ \frac{1}{\sqrt{2}}(x_1 + x_2) \end{pmatrix}.$$

The detector 1602 generates an output representing the absolute value of the detected signal, so the output of the detector 1602 is:

$$\left| M \cdot \begin{pmatrix} x_1 \\ x_2 \end{pmatrix} \right| = \begin{pmatrix} \frac{1}{\sqrt{2}}|x_1 - x_2| \\ \frac{1}{\sqrt{2}}|x_1 + x_2| \end{pmatrix}.$$

The analog electronic thresholds of the comparators 1604 are biased at ½ to remove the $1/\sqrt{2}$ factor, so the outputs of the comparators 1604 are:

$$\begin{pmatrix} XOR(x_1, x_2) \\ OR(x_1, x_2) \end{pmatrix}.$$

The photonic circuit 1600 produces the following results for various combinations of the input signals x1, x2:

0,0→0,0→0,0

0,1→1/sqrt(2),1/sqrt(2)→1,1

1,0→1/sqrt(2),1/sqrt(2)→1,1

1,1→0,sqrt(2)→0,1

In above, the first pair of numbers are the input signals, the second pair of numbers are the outputs of the detector 1602, and the third pair of numbers are the outputs of the comparators 1604. When input (x1, x2)=(0, 0), the Mach-Zehnder interferometer 1500 performs a multiplication that produces results (0, 0), the detector 1602 outputs (0, 0), and the comparators 1604 produce results (0, 0). When input (x1, x2)=(0, 1), the Mach-Zehnder interferometer 1500 performs a multiplication that produces results $(-1/\sqrt{2}, 1/\sqrt{2})$, the detector 1602 outputs $(1/\sqrt{2}, 1/\sqrt{2})$, and the comparators 1604 produce results (1, 1). When input (x1, x2)=(1, 0), the Mach-Zehnder interferometer 1500 performs a multiplication that produces results $(1/\sqrt{2}, 1/\sqrt{2})$, the detector 1602 outputs $(1/\sqrt{2}, 1/\sqrt{2})$, and the comparators 1604 produce results (1, 1). When input (x1, x2)=(1, 1), the Mach-Zehnder interferometer 1500 performs a multiplication that produces results $(0, \sqrt{2})$, the detector 1602 outputs $(0, \sqrt{2})$, and the comparators 1604 produce results (0, 1). The above results indicate that the detector 1602 generates $1/\sqrt{2}\cdot|x1-x2|$ at a first output 1606a and $1/\sqrt{2}\cdot|x1+x2|$ at a second output 1606b. The comparators 1604 remove the $1/\sqrt{2}$ factor to generate XOR(x1, x2) at a first output 1608a and OR(x1, x2) at a second output 1608b.

Figure 17A:
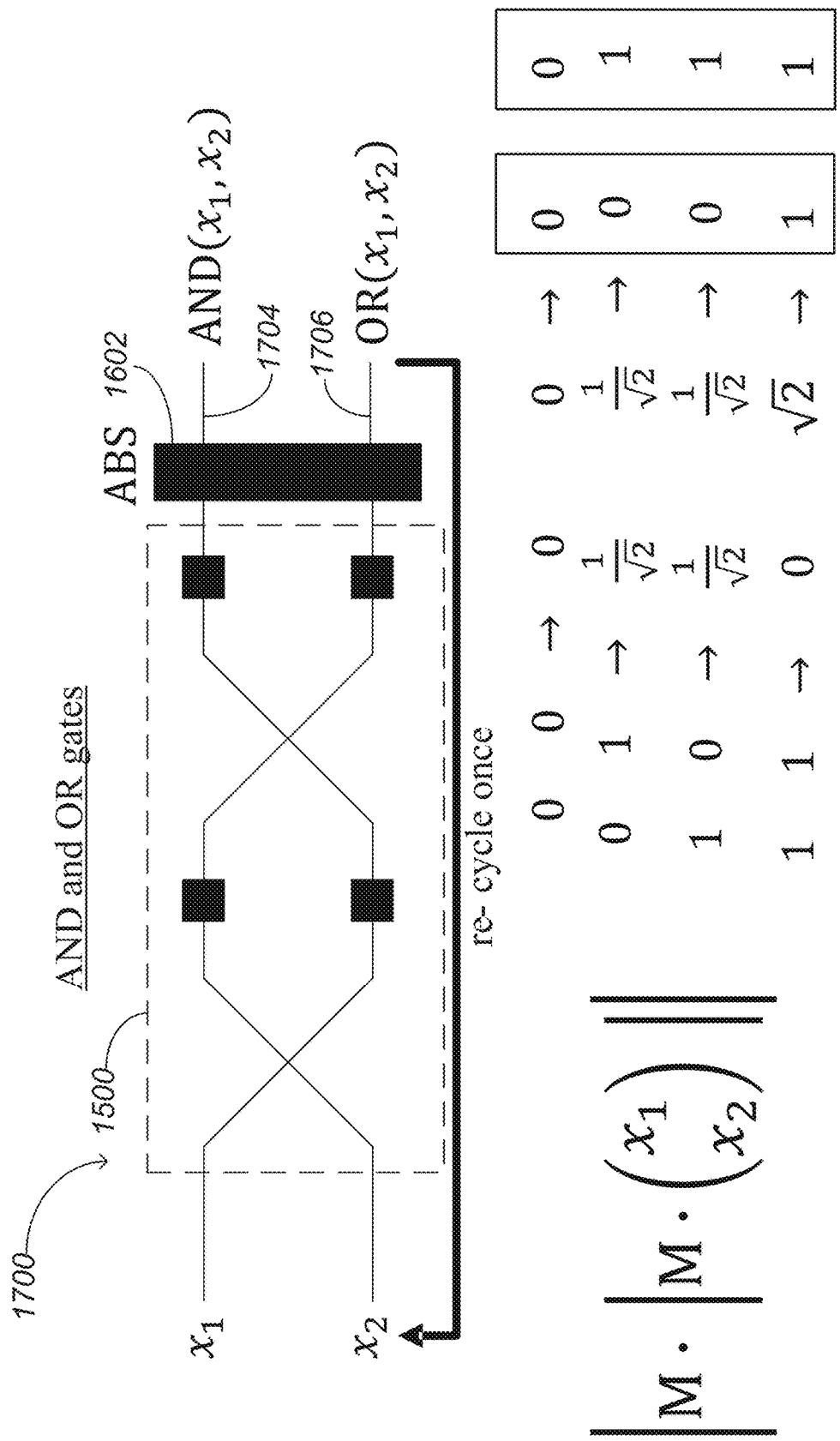

Referring to FIG. 17A, a photonic circuit 1700 can implement an AND gate and an OR gate. The photonic circuit 1700 includes a Mach-Zehnder interferometer 1500 and a detector 1602, in which the outputs of the detector 1602 are recycled once. When input signals x1 and x2 are provided to the photonic circuit 1700, the Mach-Zehnder interferometer 1500 and the detector 1602 generates an output:

$$\left| M \cdot \begin{pmatrix} x_1 \\ x_2 \end{pmatrix} \right|.$$

The output of the detector 1602 is recycled back to the input of the photonic circuit 1600, and after the signals goes a second pass through the Mach-Zehnder interferometer 1500 and the detector 1602, the detector 1602 produces a final output:

$$\left| M \cdot \left| M \cdot \begin{pmatrix} x_1 \\ x_2 \end{pmatrix} \right| \right|.$$

The photonic circuit 1700 produces the following results for various combinations of the input signals x1, x2:

$$\begin{array}{ccccccc}
0 & 0 & \rightarrow & 0 & 0 & \rightarrow & \boxed{0}\boxed{0} \\
0 & 1 & \rightarrow & \frac{1}{\sqrt{2}} & \frac{1}{\sqrt{2}} & \rightarrow & \boxed{0}\boxed{1} \\
1 & 0 & \rightarrow & \frac{1}{\sqrt{2}} & \frac{1}{\sqrt{2}} & \rightarrow & \boxed{0}\boxed{1} \\
1 & 1 & \rightarrow & 0 & \sqrt{2} & \rightarrow & \boxed{1}\boxed{1}
\end{array}$$

In above, the first pair of numbers are the input signals, the second pair of numbers are the outputs of the detector 1602 after the first pass, and the third pair of numbers are the outputs of the detector 1602 after the second pass. When input (x1, x2)=(0, 0), after a first pass through the Mach-Zehnder interferometer 1500, the detector 1602 outputs (0, 0), and after a second pass through the Mach-Zehnder interferometer 1500, the detector 1602 outputs (0, 0). When input (x1, x2)=(0, 1), after a first pass through the Mach-Zehnder interferometer 1500, the detector 1602 outputs $(1/\sqrt{2}, 1/\sqrt{2})$, and after a second pass through the Mach-Zehnder interferometer 1500, the detector 1602 outputs (0, 1). When input (x1, x2)=(1, 0), after a first pass through the Mach-Zehnder interferometer 1500, the detector 1602 outputs $(1/\sqrt{2}, 1/\sqrt{2})$, and after a second pass through the Mach-Zehnder interferometer 1500, the detector 1602 outputs (0, 1). When input (x1, x2)=(1, 1), after a first pass through the Mach-Zehnder interferometer 1500, the detector 1602 outputs $(0, \sqrt{2})$, and after a second pass through the Mach-Zehnder interferometer 1500, the detector 1602 outputs (1, 1). The above results indicate that after two passes, the detector 1602 generates a signal representing AND(x1, x2) at a first output 1704 and a signal representing OR(x1, x2) at a second output 1706.

Figure 17B:
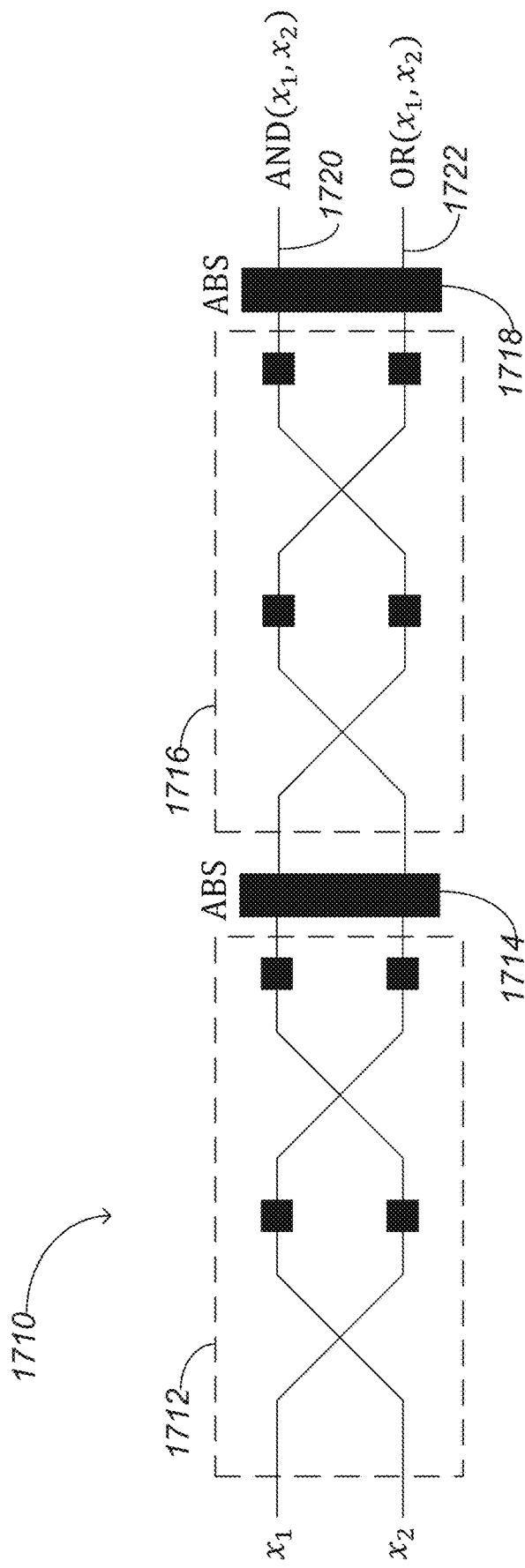

FIG. 17B shows another implementation of a photonic circuit 1710 that includes a first Mach-Zehnder interferometer 1712, a first detector 1714, a second Mach-Zehnder interferometer 1716, and a second detector 1718. The second detector 1718 produces a first output 1720 that represents AND(x1, x2), and a second output 1722 that represents OR(x1, x2).

The above describes using photonic circuits that include Mach-Zehnder interferometers, directional couplers, planar optical waveguides, and photodetectors to implement logic gates such as AND, OR, and XOR gates. The logic gates can be used to generate comparators that can be used for sorting algorithms, for example, algorithms similar to the Bitonic sorter described at the link URL <https://en.wikipedia.org/wikiBitonic_sorter>. As another example, the logic gates can be used to construct hashing algorithms similar to SHA-2, described at the link URL <https://en.wikipedia.org/wiki/SHA-2>, which is a standard suggested by NIST and has many applications, including e.g. Bitcoin mining and creation of Bitcoin addresses. Because the logic circuits implemented using photonic circuits described above are mostly passive, they can have less latency and lower power consumption, as compared to CMOS logic gates. There is no optical nonlinearity in the design of the optical logic gates. The nonlinear response comes from the detection of the signal using photodetectors.

Non-Coherent or Low-Coherent Optical Computing Systems

The following describes optoelectronic computing systems that process non-coherent or low-coherent optical signals in performing matrix computations. The optical processor 140 of the ANN computation system 100 in FIG. 1 includes a laser unit 142 that generates N light outputs that have the same wavelength and are optically coherent. The optical matrix multiplication unit 150 performs an N×N matrix multiplication in the optical domain, in which the optical signals remain coherent from the input of the OMNI unit 150 to the output of the OMNI unit 150. The advantages of the OMM unit 150 in performing the matrix multiplication in the optical domain have been described above. The following describes optoelectronic computing systems that does not require the optical signals to be coherent throughout the entire matrix multiplication process, in which some portions of the computations are performed in the optical domain, and some portions of the computations are performed in the electrical domain. The advantages of the optoelectronic computing systems have been described in the summary section above.

The optoelectronic computing system produces a computational result using different types of operations that are each performed on signals (e.g., electrical signals or optical signals) for which the underlying physics of the operation is most suitable (e.g., in terms of energy consumption and/or speed). For example, copying can be performed using optical power splitting, summation can be performed using electrical current-based summation, and multiplication can be performed using optical amplitude modulation. An example of a computation that can be performed using these three types of operations is multiplying a vector by a matrix (e.g., as employed by artificial neural network computations). A variety of other computations can be performed using these operations, which represent a set of general linear operations from which a variety of computations can be performed, including but not limited to: vector-vector dot products, vector-vector element-wise multiplication, vector-scalar element wise multiplication, or matrix-matrix element-wise multiplication.

Figure 18:
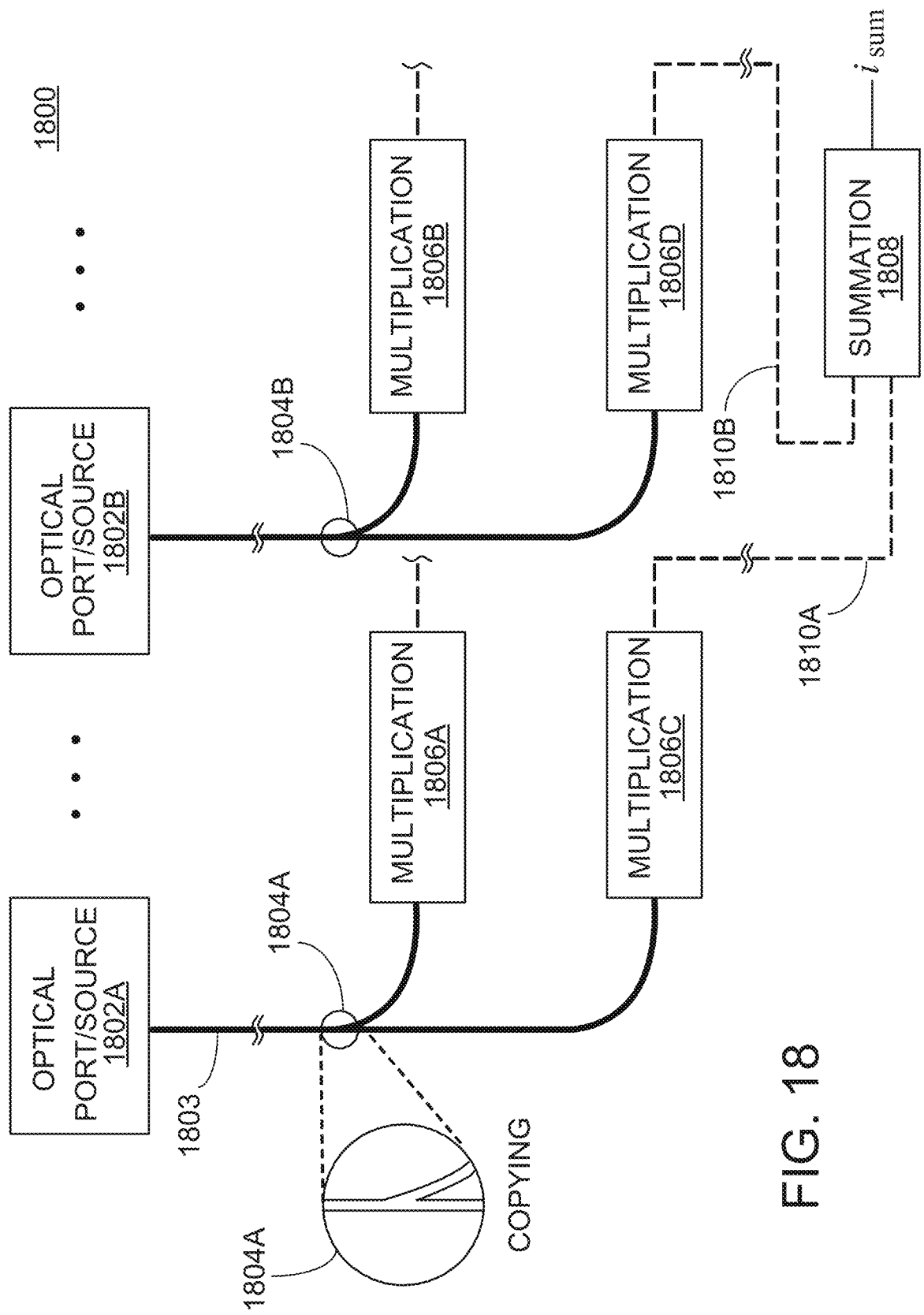
FIG. 18 is a schematic diagram of an example optoelectronic computing system.

Referring to FIG. 18, an example of an optoelectronic computing system 1800 includes a set of optical ports or sources 1802A, 1802B, etc. that provide optical signals. For example, in some implementations, the optical port/source 1802A can include an optical input coupler that provides an optical signal that is coupled to an optical path 1803. In other implementations, the optical port/source 1802A can include a modulated optical source, such as a laser (e.g., for coherence-sensitive implementations) or a light emitting diode (LED) (e.g., for coherence-insensitive implementations), which generates an optical signal that is coupled to the optical path 1803. Some implementations may include a combination of ports that couple optical signals into the system 1800 and sources that generate optical signals within the system 1800. The optical signals may include any optical wave (e.g., an electromagnetic wave having a spectrum that includes wavelengths in the range between about 100 nm and about 1 mm) that has been, or is in the process of being, modulated with information using any of a variety of forms of modulation. The optical path 1803 can be defined, for example, based on a guided mode of an optical waveguide (e.g., a waveguide embedded in a photonic integrated circuit (PIC), or an optical fiber), or based on a predetermined free-space path between the optical port/source 1802A and another module of the system 1800.

In some implementations, the optoelectronic computing system 1800 is configured to perform a computation on an array of input values that are encoded on respective optical signals provided by the optical ports or sources 1802A, 1802B, etc. For example, for various machine learning applications based on neural networks, the computation may implement vector-matrix multiplication (or vector-by-matrix multiplication) where an input vector is multiplied by a matrix to yield an output vector as a result. The optical signals may represent elements of a vector, including possibly only a subset of selected elements of the vector. For example, for some neural network models, the size of a matrix used in the computation may be larger than the size of a matrix that can be loaded into a hardware system (e.g., an engine or co-processor of a larger system) that performs a vector-matrix multiplication portion of the computation. So, part of performing the computation may involve dividing the matrix and the vector into smaller segments that can be provided to the hardware system separately.

The modules shown in FIG. 18 may be part of a larger system that performs vector-matrix multiplication for a relatively large matrix (or submatrix), such as a 64×64-element matrix. But, for purposes of illustration, the modules will be described in the context of an example computation that performs vector-matrix multiplication using a 2×2-element matrix. The modules referenced in this example, will include two copy modules 104A and 104B, four multiplication modules 1806A, 1806B, 1806C, and 1806D, and two summation modules, only one of which, summation module 1808, is shown in FIG. 18. These modules will enable multiplication of an input vector $$x = \begin{bmatrix} x_A \\ x_B \end{bmatrix}$$

by a matrix $$\overline{M} = \begin{bmatrix} M_A & M_B \\ M_C & M_D \end{bmatrix}$$

to produce an output vector $$y = \begin{bmatrix} y_A \\ y_B \end{bmatrix}.$$

For this vector-matrix multiplication $\overline{y}=\overline{M}\cdot\overline{x}$, each of the two elements of the output vector $\overline{y}$ can be represented by a different equation, as follows.

$$y_A = M_A x_A + M_B x_B$$

$$y_B = M_C x_A + M_D x_B$$

These equations can be broken down into separate steps that can be performed in the system 1800 using a set of basic operations: a copying operation, a multiplication operation, and a summation operation. In these equations, each element of the input vector appears twice, so there are two copying operations. There are also four multiplication operations, and there are two summation operations. The number of operations performed would be larger for systems that implement vector-matrix multiplication using a larger matrix, and the relative number of instances of each operation would be different using a matrix that is not square matrix in shape (i.e., with the number of rows being different from the number of columns).

In this example, the copying operations are performed by copying modules 1804A and 1804B. The elements of the input vector $x_A$ and $x_B$ are represented by values encoded on optical signals from the optical port/source 1802A and 1802B, respectively. Each of these values is used in both equations, so each value is copied to provide the resulting two copies to different respective multiplication modules. A value may be encoded in a particular time slot, for example, using optical wave that has been modulated to have a power from a set of multiple power levels, or having a duty cycle from a set of multiple duty cycles, as described in more detail below. A value is copied by copying the optical signal on which that value is encoded. The optical signal encoded with the value representing element $x_A$ is copied by copying module 1804A, and the optical signal encoded with the value representing element $x_B$ is copied by copying module 1804B. Each copying module can be implemented, for example, using an optical power splitter, such as a waveguide optical splitter that couples a guided mode in an input waveguide to each of two output waveguides over a Y-shaped splitter that gradually (e.g., adiabatically) splits the power, or a free-space beam splitter that uses a dielectric interface or thin film with one or more layers to transmit and reflect, respectively, two output beams from an input beam.

In this document, when we say that the optical signal encoded with the value representing element $x_A$ is copied by the copying module 1804A, we mean that multiple copies of signals that represent element $x_A$ are produced based on the input signal, not necessarily that the output signals of the copying module 1804A have the same amplitude as that of the input signal. For example, if the copying module 1804A splits the input signal power evenly between two output signals, then each of the two output signals will have a power that is equal to or less than 50% of the power of the input signal. The two output signals are copies of each other, while the amplitude of each output signal of the copying module 1804A is different from the amplitude of the input signal. Also, in some embodiments that have a group of multiple copying modules used for copying a given optical signal, or subset of optical signals, each individual copying module does not necessarily split power evenly among its generated copies, but the group of copying modules may be collectively configured to provide copies that have substantially equal power to the inputs of downstream modules (e.g., downstream multiplication modules).

In this example, the multiplication operations are performed by four multiplication modules 1806A, 1806B, 1806C, and 1806D. For each copy of one of the optical signals, one of the multiplication modules multiplies that copy of the optical signal by a matrix element value, which can be performed using optical amplitude modulation. For example, the multiplication module 1806A multiplies the input vector element $x_A$ by the matrix element $M_A$. The value of the vector element $x_A$ can be encoded on optical signal, and the value of the matrix element $M_A$ can be encoded as an amplitude modulation level of an optical amplitude modulator.

The optical signal encoded with the vector element $x_A$ can be encoded using different forms of amplitude modulation. The amplitude of the optical signal may correspond to a particular instantaneous power level $P_A$ of a physical optical wave within a particular time slot, or may correspond to a particular energy $E_A$ of a physical optical wave over a particular time slot (where the power integrated over time yields total energy). For example, the power of a laser source may be modulated to have a particular power level from a predetermined set of multiple power levels. In some implementations, it may be useful to operate electronic circuitry near an optimized operation point, so instead of varying the power over many possible power levels, an optimized "on" power level is used with the signal being modulated to be "on" and "off" (at zero power) for particular fractions of a time slot. The fraction of time that the power is at the "on" level corresponds to a particular energy level. Either of these particular values of power or energy may be mapped to a particular value of the element $x_A$ (using a linear or nonlinear mapping relationship). The actual integration over time, to yield a particular total energy level, may occur downstream in the system 1800 after signals are in the electrical domain, as described in more detail below.

Additionally, the term "amplitude" may refer to the magnitude of the signal represented by the instantaneous or integrated power in the optical wave, or may also equivalently refer to the "electromagnetic field amplitude" of the optical wave. This is because the electromagnetic field amplitude has a well-defined relationship to the signal amplitude (e.g., by integrating an electromagnetic field intensity, which is proportional to the square of the electromagnetic field amplitude, over a transverse size of a guided mode or free-space beam to yield the instantaneous power). This leads to a relationship between modulation values, since a modulator that modulates the electromagnetic field amplitude by a particular value $\sqrt{M}$ can also be considered as modulating the power-based signal amplitude by a corresponding value M (since the optical power is proportional to the square of the electromagnetic field amplitude).

The optical amplitude modulator used by the multiplication module to encode the matrix element $M_A$ can operate by changing the amplitude of the optical signal (i.e., the power in the optical signal) using any of a variety of physical interactions. For example, the modulator can include a ring resonator, an electro-absorption modulator, a thermal electro-optical modulator, or a Mach-Zehnder Interferometer (MZI) modulator. In some techniques a fraction of the power is absorbed as part of the physical interaction, and in other techniques the power is diverted using a physical interaction that modifies another property of the optical wave other than its power, such as its polarization or phase, or modifies coupling of optical power between different optical structures (e.g., using tunable resonators). For optical amplitude modulators that operate using interference (e.g., destructive and/or constructive interference) among optical waves that have traveled over different paths, coherent light sources such as lasers can be used. For optical amplitude modulators that operate using absorption, either coherent or non-coherent or low-coherence light sources such as LEDs can be used.

In one example of a waveguide 1×2 optical amplitude modulator, a phase modulator is used to modulate the power in an optical wave by placing that phase modulator in one of multiple waveguides of the modulator. For example, the waveguide 1×2 optical amplitude modulator may split an optical wave guided by an input optical waveguide into first and second arms. The first arm includes a phase shifter that imparts a relative phase shift with respect to a phase delay of the second arm. The modulator then combines the optical waves from the first and second arms. In some embodiments, different values of the phase delay provide multiplication of the power in the optical wave guided by the input optical waveguide by a value between 0 to 1 through constructive or destructive interference. In some embodiments, the first and second arms are combined into each of two output waveguides, and a difference between photocurrents generated by respective photodetectors receiving light waves from the two output waveguides provides a signed multiplication result (e.g., multiplication by a value between −1 to 1), as described in more detail below. By suitable choice of amplitude scaling of the encoded optical signals, the range of the matrix element value can be mapped to an arbitrary range of positive values (0 to M), or signed values (−M to M).

In this example, the summation operations are performed by two summation modules, with the summation module 1808, shown in FIG. 18, used for performing the summation in the equation for computing the output vector element $y_B$. A corresponding summation module (not shown) is used for performing the summation in the equation for computing the output vector element $y_A$. The summation module 1808 produces an electrical signal that represents a sum of the results of the two multiplication modules 1806C and 1806D. In this example, the electrical signal is in the form of a current $i_{sum}$ that is proportional to the sum of the powers in the output optical signals generated by multiplication modules 1806C and 1806D, respectively. The summation operation that yields this current $i_{sum}$ is performed in the optoelectronic domain in some embodiments, and is performed in the electrical domain in other embodiments. Or, some embodiments may use optoelectronic domain summation for some summation modules and electrical domain summation for other summation modules.

In embodiments in which the summation is performed in the electrical domain, the summation module 1808 can be implemented using: (1) two or more input conductors that each carries an input current whose amplitude represents a result of one of the multiplication modules, and (2) at least one output conductor that carries a current that is the sum of the input currents. For example, this occurs if the conductors are wires that meet at a junction. Such a relationship can be understood, for example (without being bound by theory), based on Kirchhoff's current law, which states that current flowing into a junction is equal to current flowing out of the junction. For these embodiments, the signals 1810A and 1810B provided to the summation module 108 are input currents, which may be produced by photodetectors that are part of the multiplication modules that generate a respective photocurrent whose amplitude is proportional to the power in a received optical signal. The summation module 1808 then provides the output current $i_{sum}$. The instantaneous value of that output current, or the integrated value of that output current, can then be used to represent the quantitative value of the sum.

In embodiments in which the summation is performed in the optoelectronic domain, the summation module 1808 can be implemented using a photodetector (e.g., a photodiode) that receives the optical signals generated by different respective multiplication modules. For these embodiments, the signals 1810A and 1810B provided to the summation module 1808 are input optical signals that each comprise an optical wave whose power represents a result of one of the multiplication modules. The output current $i_{sum}$ in this embodiment is the photocurrent generated by the photodetector. Since the wavelengths of the optical waves are different (e.g., different enough such that no significant constructive or destructive interference occurs between them), the photocurrent will be proportional to the sum of the powers of the received optical signals. The photocurrent is also substantially equal to the sum of the individual currents that would result for the individual detected optical powers detected by separate equivalent photodetectors. The wavelengths of the optical waves are different, but close enough to have substantially the same response by the photodetector (e.g., wavelengths within a substantially flat detection bandwidth of the photodetector). As mentioned above, summation in the electrical domain, using current summation, may enable a simpler system architecture by avoiding the need for multiple wavelengths.

FIG. 19A shows an example of a system configuration 1900 for an implementation of the system 1900 for performing vector-matrix multiplication using a 2×2-element matrix, with the summation operation performed in the electrical domain. In this example, the input vector is $$v = \begin{bmatrix} v_1 \\ v_2 \end{bmatrix},$$

and the matrix is $$\overline{\overline{M}} \begin{bmatrix} M_{11} & M_{12} \\ M_{21} & M_{22} \end{bmatrix}.$$

Each of the elements of the input vector is encoded on a different optical signal. Two different copying modules 1902 perform an optical copying operation to split the computation over different paths (e.g., an "upper" path and a "lower" path). There are four multiplication modules 1904 that each multiply by a different matrix element using optical amplitude modulation. At the output of each multiplication module 1904, there is an optical detection module 1906 that converts an optical signal to an electrical signal in the form of an electrical current. Both upper paths of the different input vector elements are combined using a summation module 1908, and both lower paths of the different input vector elements are combined using a summation module 1908, which performs summation in the electrical domain. So, each of the elements of output vector is encoded on a different electrical signal. As shown in FIG. 19A, as the computation progresses, each component of an output vector is incrementally generated to yield the following results for the upper and lower paths, respectively.

$$M_{11}v_1 + M_{12}v_2$$

$$M_{21}v_1 + M_{22}v_2$$

The system configuration 1900 can be implemented using any of a variety of optoelectronic technologies. In some implementations, there is a common substrate (e.g., a semiconductor such as silicon), which may be able to support both integrated optics components and electronic components. The optical paths can be implemented in waveguide structures that have a material with a higher optical index surrounded by a material with a lower optical index defining a waveguide for propagating an optical wave that carries an optical signal. The electrical paths can be implemented by a conducting material for propagating an electrical current that carries an electrical signal. (In FIGS. 19A to 20A, 21A to 24E, unless otherwise indicated, the thicknesses of the lines representing paths are used to differentiate between optical paths, represented by thicker lines, and electrical paths, represented by thinner lines or dashed lines.) Optical devices such as splitters and optical amplitude modulators, and electrical devices such as photodetectors and operational amplifiers (op-amps) can be fabricated on the common substrate. Alternatively, different devices having different substrates can be used to implement different portions of the system, and those devices can be in communication over communication channels. For example, optical fibers can be used to provide communication channels to send optical signals among multiple devices used to implement the overall system. Those optical signals may represent different subsets of an input vector that is provided when performing vector-matrix multiplication, and/or different subsets of intermediate results that are computed when performing vector-matrix multiplication, as described in more detail below.

In this document, a figure may show an optical waveguide crossing an electrical signal line, it is understood that the optical waveguide does not intersect the electrical signal line. The electrical signal line and the optical waveguide may be disposed at different layers of the device.

FIG. 19B shows an example of a system configuration 1920 for an implementation of the system 1900 for performing vector-matrix multiplication using a 2×2-element matrix, with the summation operation performed in the optoelectronic domain. In this example, the different input vector elements are encoded on optical signals using two different respective wavelengths $\lambda_1$ and $\lambda_2$. Also, the optical output signals of the multiplication modules 1904 are combined in optical combiner modules 1910, such that optical waveguides guide both optical signals on both wavelengths to each of the optoelectronic summation modules 1912, which may be implemented using photodetectors, as used for the optical detection modules 1906 in the example of FIG. 19A. But, in this example the summation is represented by the photocurrent representing the power in both wavelengths instead of by the current leaving a junction between different conductors.

In this document, when a figure shows two optical waveguides crossing each other, whether the two optical waveguides are actually optically coupled to each other will be clear from the description. For example, two waveguides that appear to cross each other from a top view of the device may be implemented in different layers and thus not intersect with each other. For example, the optical path that provides the optical signal $\lambda_2$ as input to the copying module 1902 and the optical path that provides the optical signal $M_{11}V_1$ from the multiplication module 1904 to the optical combiner module 1910 are not optically coupled to each other, even though in the figure they may appear to cross each other. Similarly, the optical path that provides the optical signal $\lambda_2$ from the copying module 1902 to the multiplication module 1904 and the optical path that provides the optical signal $M_{21}V_1$ from the multiplication module 1904 to the optical combiner module 1910 are not optically coupled to each other, even though in the figure they may appear to cross each other.

The system configurations shown in FIGS. 19A and 19B can be extended to implement a system configuration for performing vector-matrix multiplication using an m×n-element matrix. In this example, the input vector is $$v = \begin{bmatrix} v_1 \\ \vdots \\ v_n \end{bmatrix},$$

and the matrix is $$\overline{\overline{M}} = \begin{bmatrix} M_{11} & \cdots & M_{1n} \\ \vdots & \ddots & \vdots \\ M_{m1} & \cdots & M_{mn} \end{bmatrix}.$$

For example, the input vector elements $v_1$ to $v_n$ are provided by n waveguides, and each input vector element is processed by one or more copying modules to provide m copies of the input vector element to m respective paths. There are m×n multiplication modules that each multiply by a different matrix element using optical amplitude modulation to produce an electrical or optical signal representing $M_{ij} \cdot v_j$ (i=1 ... m, j=1 ... n). The signals representing $M_{ij} \cdot v_j$ (j=1 ... n) are combined using an i-th summation module (i=1 ... m) to produce the following results for the m paths, respectively.

$$M_{11}v_1 + M_{12}v_2 + \ldots + M_{1n}v_n$$

$$M_{21}v_1 + M_{22}v_2 + \ldots + M_{2n}v_n$$

$$\ldots$$

$$M_{m1}v_1 + M_{m2}v_2 + \ldots + M_{mn}v_n$$

Since optical amplitude modulation is able to reduce the power in an optical signal from its full value to a lower value, down to zero (or near zero) power, multiplication by any value between 0 and 1 can be implemented. However, some computations may call for multiplication by values greater than 1 and/or multiplication by signed (positive or negative) values. First, for extending the range to 0 to $M_{max}$ (where $M_{max} > 1$), the original modulation of the optical signals can include an explicit or implicit scaling of an original vector element amplitude by $M_{max}$ (or equivalently, scaling the value mapped to a particular vector element amplitude in a linear mapping by $1/M_{max}$) such that the range 0 to 1 for matrix element amplitudes corresponds quantitatively in the computation to the range 0 to $M_{max}$. Second, for extending the positive range 0 to $M_{max}$ for matrix element values to a signed range $-M_{max}$ to $M_{max}$, a symmetric differential configuration can be used, as described in more detail below. Similarly, a symmetric differential configuration can also be used to extend a positive range for the values encoded on the various signals to a signed range of values.

Figure 20A:
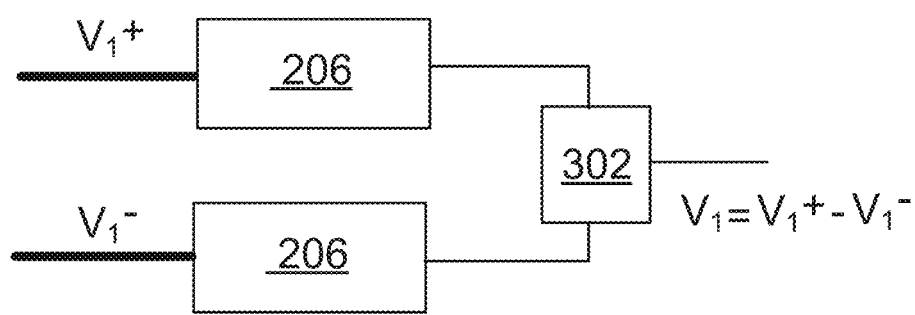
FIG. 20A is a schematic diagram of an example of a symmetric differential configuration.

FIG. 20A shows an example of a symmetric differential configuration 2000 for providing a signed range of values for values that are encoded on optical signals. In this example, there are two related optical signals encoding unsigned values designated as $V_1^+$ and $V_1^-$, where each value is assumed to vary between 0 (e.g., corresponding to an optical power near zero) and $V_{max}$ (e.g., corresponding to an optical power at a maximum power level). The relationship between the two optical signals is such that when one optical signal is encoded with a "main" value $V_1^+$ the other optical signal is encoded with a corresponding "anti-symmetric" value $V_1^-$ such that as the main value $V_1^+$ encoded on one optical signal monotonically increases from 0 to $V_{max}$, the anti-symmetric $V_1^-$ value encoded on the paired optical signal monotonically decreases from $V_{max}$ to 0. Or, conversely, as the main value $V_1^+$ encoded on one optical signal monotonically decreases from $V_{max}$ to 0, the anti-symmetric value $V_1^-$ encoded on the paired optical signal monotonically increases from 0 to $V_{max}$. After the optical signals in the upper and lower paths are converted to electrical current signals by respective optical detection modules 1906, a difference between the current signals may be produced by a current subtraction module 2002. The difference between the current signals encoding $V_1^+$ and $V_1^-$ results in a current that is encoded with a signed value $V_1$ given as:

$$V_1 = V_1^+ - V_1^-$$

where the signed value $V_1$ monotonically increases between $-V_{max}$ and $V_{max}$ as the unsigned main value $V_1^+$ monotonically increases from 0 to $V_{max}$ and its paired anti-symmetric value $V_1^-$ monotonically decreases from $V_{max}$ to 0. There are various techniques that can be used for implementing the symmetric differential configuration of FIG. 20A, as shown in FIGS. 20B and 20C.

Figure 20B:
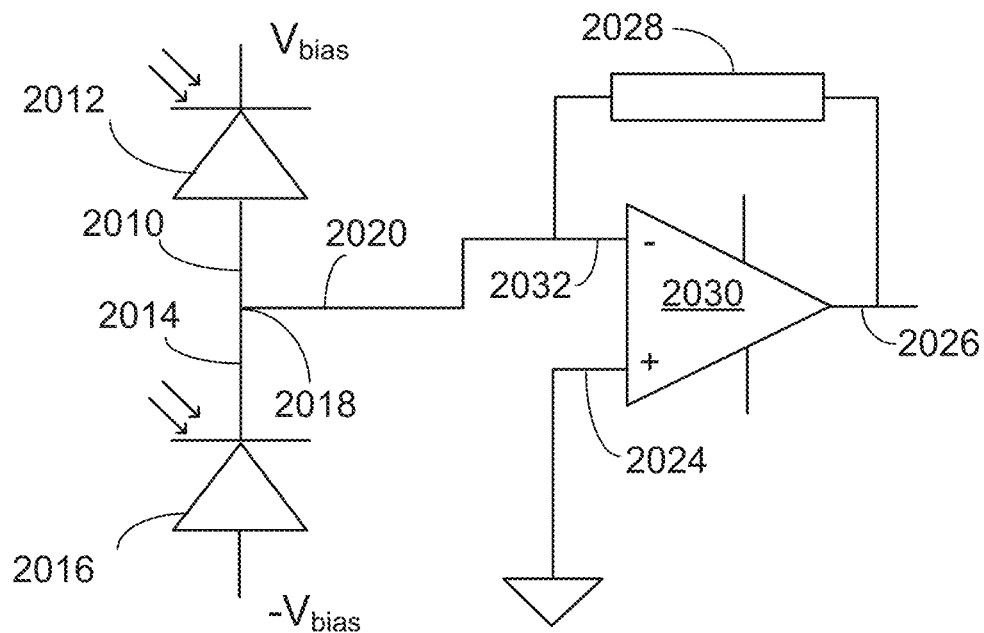
FIGS. 20B and 20C are circuit diagrams of examples of system modules.

In FIG. 20B, the optical signals are detected in a common-terminal configuration where two photodiode detectors are connected to a common terminal 2032 (e.g., the inverting terminal) of an op-amp 2030. In this configuration, a current 2010 generated from a first photodiode detector 2012 and a current 2014 generated from a second photodiode detector 2016 combine at a junction 2018 among three conductors to produce a difference current 2020 between current 2010 and the current 2014. The currents 2010 and 2014 are provided from opposite sides of the respective photodiodes, which are connected at the other ends to voltage sources (not shown) providing bias voltages at the same magnitude $v_{bias}$ but of opposite signs, as shown in FIG. 20B. In this configuration the difference is generated due to the behavior of currents that meet at the common junction 2018. The difference current 2020 represents the signed value encoded on an electrical signal corresponding to the difference between the unsigned values encoded on detected optical signals. The op-amp 2030 may be configured in a transimpedance amplifier (TIA) configuration in which the other terminal 2024 is grounded and an output terminal 2026 is fed back to the common terminal 2032 using a resistive element 2028 that provides a voltage proportional to the difference current 2020. Such a TIA configuration would provide the resulting value as an electrical signal in the form of a voltage signal.

Figure 20C:
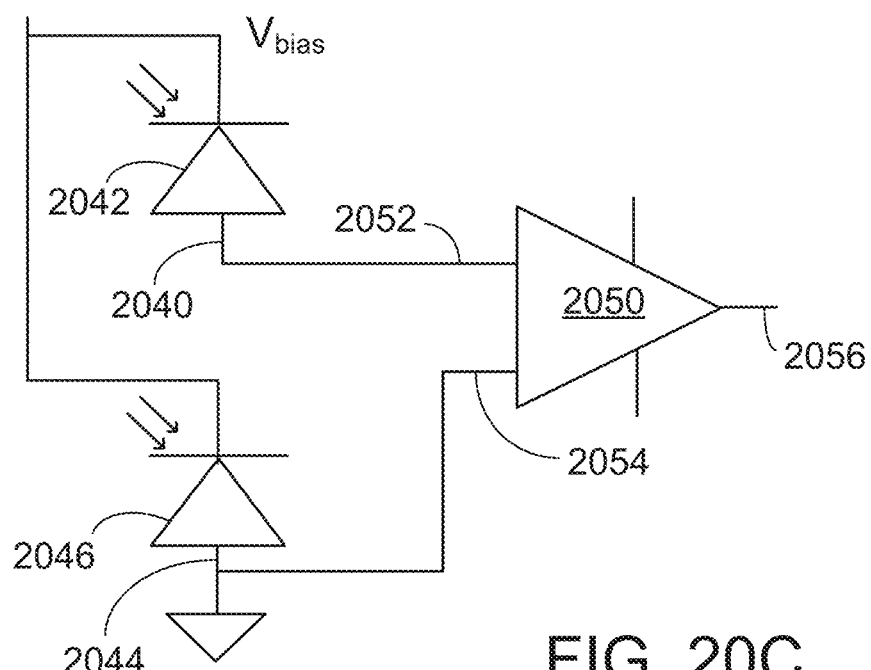

In FIG. 20C, the optical signals are detected in a differential-terminal configuration where two photodiode detectors are connected to different terminals of an op-amp 2050. In this configuration, a current 2040 generated from a first photodiode detector 2042 is connected to an inverting terminal 2052, and a current 2044 generated from a second photodiode detector 2046 is connected to a non-inverting terminal 2054. The currents 2040 and 2044 are provided from the same ends of the respective photodiodes, which are connected at the other ends to a voltage source (not shown) providing a bias voltage at the same magnitude $v_{bias}$ and same sign, as shown in FIG. 20C. The output terminal 2056 of the op-amp 2050 in this configuration provides a current proportional to the difference between the current 2040 and the current 2044. In this configuration, the difference is generated due to the behavior of the circuitry of the op-amp 2050. The difference current flowing from the output terminal 2056 represents the signed value encoded on an electrical signal corresponding to the difference between the unsigned values encoded on the detected optical signals.

Figure 21A:
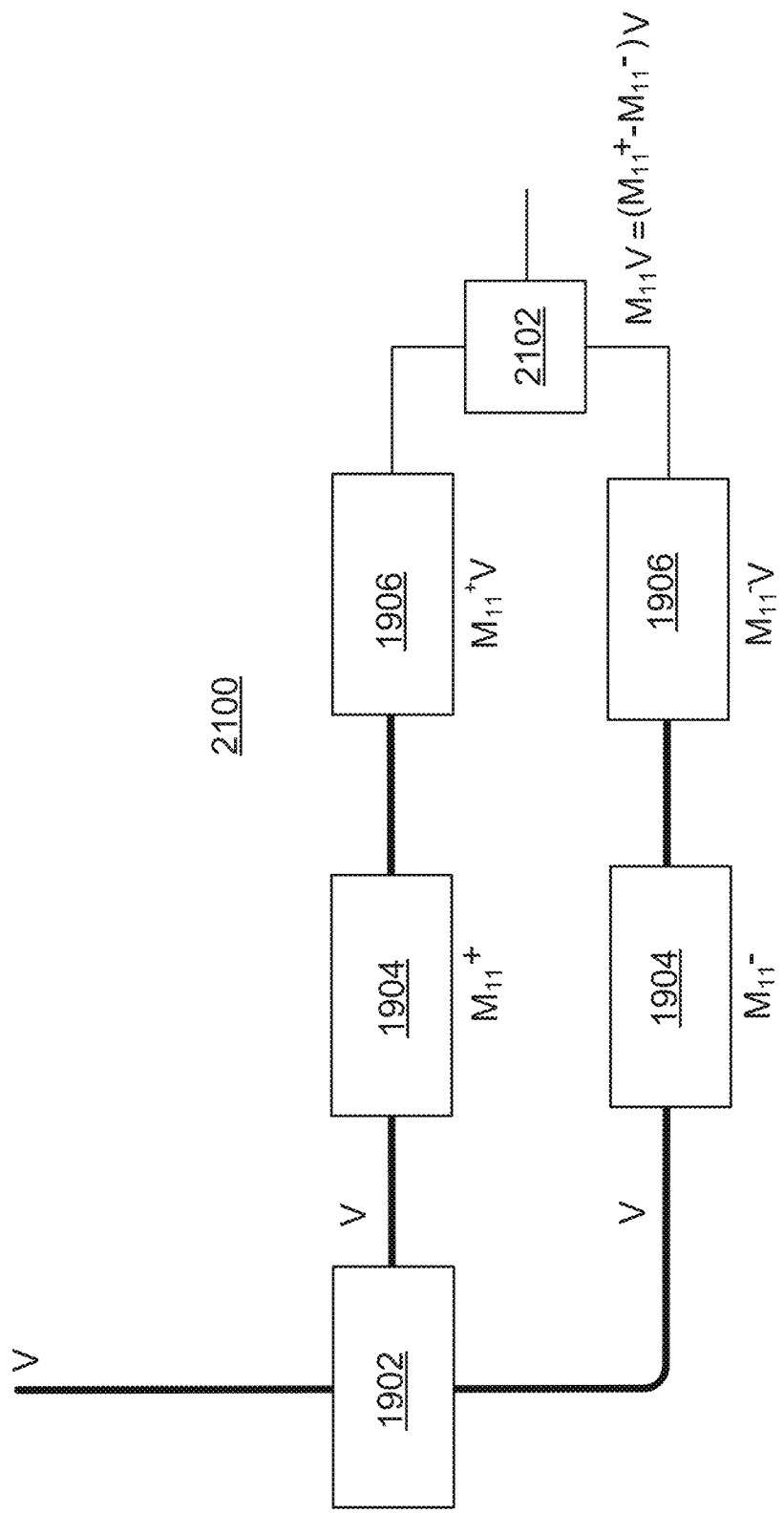
FIG. 21A is a schematic diagram of an example of a symmetric differential configuration.

FIG. 21A shows an example of a symmetric differential configuration 2100 for providing a signed range of values for values that are encoded as modulation levels of optical amplitude modulators implementing the multiplication modules 1904. In this example, there are two related modulators configured to modulate by unsigned values designated as $M_{11}^+$ and $M_{11}^-$ where each value is assumed to vary between 0 (e.g., corresponding to an optical power modulated to be reduced to near zero) and $M_{max}$ (e.g., corresponding to an optical power preserved near a maximum power level). The relationship between the two modulation levels is such that when one modulation level is configured at a "main" value $M_{11}^+$ the other modulation level is configured at a corresponding "anti-symmetric" value $M_{11}^-$ such that as the main value $M_{11}^+$ of one modulator monotonically increases from 0 to $M_{max}$, the anti-symmetric value $M_{11}^-$ of the other modulator monotonically decreases from $M_{max}$ to 0. Or, conversely, as the main value $M_{11}^+$ of one modulator monotonically decreases from $M_{max}$ to 0, the anti-symmetric $M_{11}^-$ value of the other modulator monotonically increases from 0 to $M_{max}$. After an input optical signal encoding a value V has been copied by a copying module 1902, each of the modulators provides a modulated output optical signal to a corresponding optical detection module 1906. The multiplication module 1904 in the upper path includes a modulator that multiplies by $M_{11}^+$ and provides an optical signal encoded with the value $M_{11}^+V$. The multiplication module 1904 in the lower path includes a modulator that multiplies by $M_{11}^-$ and provides an optical signal encoded with the value $M_{11}^-V$. After the optical signals are converted to electrical current signals by the respective optical detection modules 1906, a difference between them may be produced by a current subtraction module 2102. The difference between the current signals encoding $M_{11}^+V$ and $M_{11}^-V$ results in a current that is encoded with V multiplied by a signed value $M_{11}$ given as:

$$M_{11}V = M_{11}^+V - M_{11}^-V$$

where the signed value $M_{11}$ monotonically increases between $-M_{max}$ and $M_{max}$ as the unsigned main value $M_{11}^+$ monotonically increases from 0 to $M_{max}$ and its paired anti-symmetric value $M_{11}^-$ monotonically decreases from $M_{max}$ to 0.

Figure 21B:
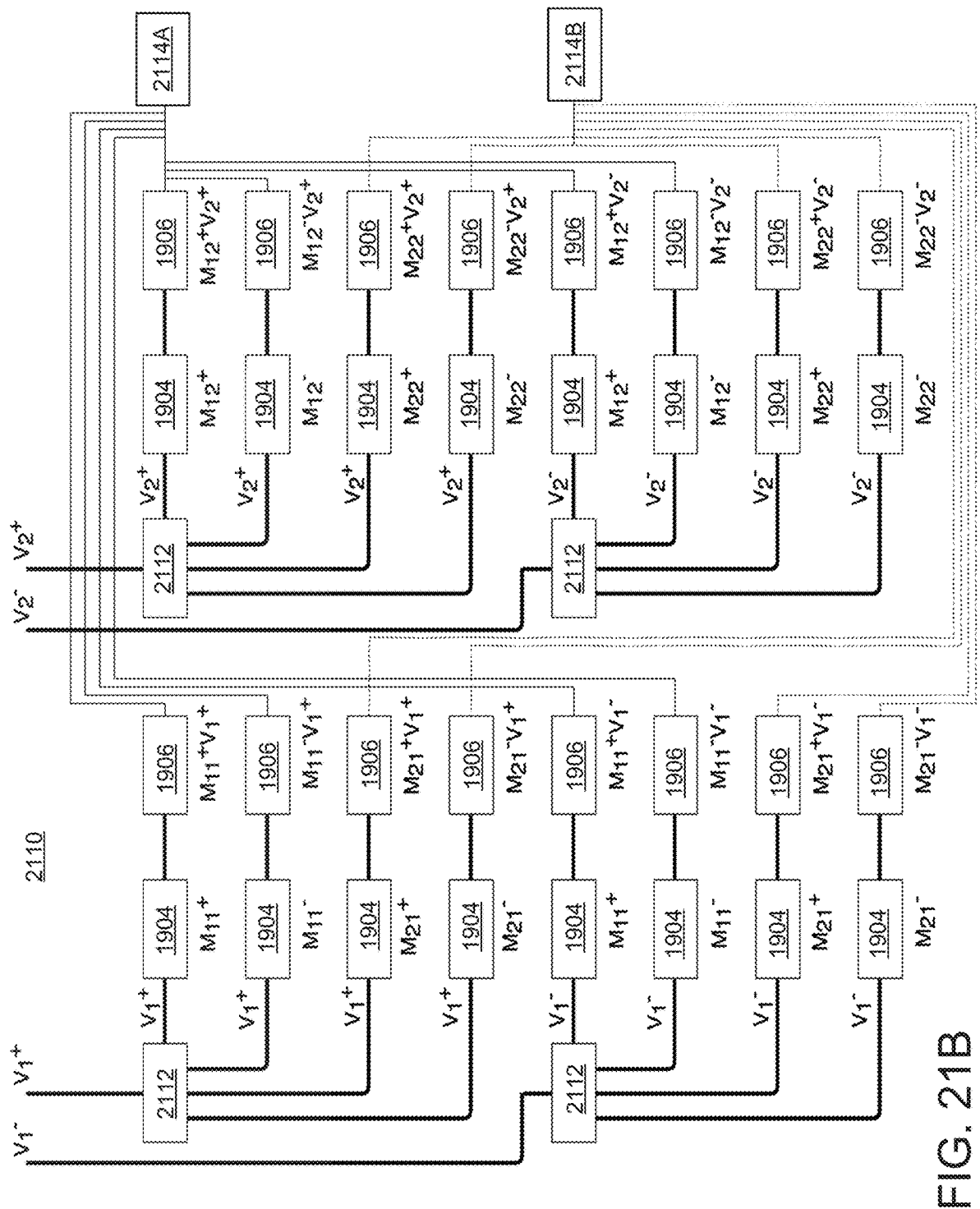
FIG. 21B is a schematic diagram of an example of a system configuration.

FIG. 21B shows an example of a system configuration 2110 for an implementation of the system 1800 for performing vector-matrix multiplication using a 2×2-element matrix, with the summation operation performed in the electrical domain, and with signed elements of an input vector and signed elements of the matrix. In this example, for each signed element of the input vector, there are two related optical signals encoding unsigned values. There are two unsigned values designated as $V_1^+$ and $V_1^-$ for the first signed input vector element value $V_1$, and there are two unsigned values designated as $V_2^+$ and $V_2^-$ for the second signed input vector element value $V_2$. Each unsigned value encoded on an optical signal is received by a copying module 2112 performing one or more optical copying operations that yields four copies of the optical signal over four respective optical paths. In some implementations of the copying module 2112, there are three different Y-shaped waveguide splitters that are each configured to split using a different power ratio (which may be achieved, for example, using any of a variety of photonic devices). For example, a first splitter could split using a 1:4 power ratio to divert 25% (¼) of the power to a first path, a second splitter could split using a 1:3 power ratio to divert 25% (¼=⅓×¾) of the power to a second path, and a third splitter could split using a 1:2 power ratio to divert 25% (¼=½×⅔×¾) of the power to a third path and the remaining 25% of the power to a fourth path. The individual splitters that are part of the copying module 2112 could be arranged in different parts of a substrate, for example, to appropriately distribute the different copies to different pathways within the system. In other implementations of the copying module 2112 there could be a different number of paths being split with different splitting ratios, as appropriate. For example, a first splitter could split using a 1:2 power ratio to provide two intermediate optical signals. Then, one of those intermediate optical signals could be split using a second splitter having a 1:2 power ratio to divert 25% of the power to each of a first path and a second path, and the other of those intermediate optical signals could be split using a third splitter having a 1:2 power ratio to divert 25% of the power to each of a third path and a fourth path.

The system configuration 2110 also includes other modules arranged as shown in FIG. 21B to provide two different output electrical signals that represent an output vector that is the result of the vector-matrix multiplication performed by system 100. There are 16 different multiplication modules 1904 modulating different copies of the optical signals representing the input vector, and there are 16 different optical detection modules 1906 to provide electrical signals representing intermediate results of the computation. There are also two different summation modules 2114A and 2114B that compute the overall summation for each of the output electrical signals. In the figure, the signal lines electrically coupling the optical detection modules 1906 to the summation module 2114B are shown in dashed lines. Because each overall summation may include some anti-symmetric terms that are being subtracted from paired main terms from any symmetric differential configurations for vector elements and/or matrix elements, the summation modules 2114A and 2114B may include a mechanism for some terms of the summation to be added after being inverted (equivalently, being subtracted from the non-inverted terms). For example, in some implementations the summation modules 2114A and 2114B include both inverting and non-inverting input ports such that the terms that are to be added within in the overall summation can be connected to the non-inverting input port, and terms that are to be subtracted within the overall summation can be connected to the inverting input port. One example implementation of such a summation module is an op-amp where a non-inverting terminal is connected to wires conducting currents representing signals to be added, and an inverting terminal is connected to wires conducting currents representing signals to be subtracted. Alternatively, inverting input ports may not be necessary on the summation modules if the inversion of the anti-symmetric terms is performed by other means. The summation modules 2114A and 2114B yield the following summation results, respectively, to complete the vector-matrix multiplication.

$$M_{11}V_1+M_{12}V_2=(M_{11}^+-M_{11}^-)(V_1^+-V_1^-)+(M_{12}^+-M_{12}^-)(V_2^+-V_2^-)$$

$$M_{21}V_1+M_{22}V_2=(M_{21}^+-M_{21}^-)(V_1^+-V_1^-)+(M_{22}^+-M_{22}^-)(V_2^+-V_2^-)$$

In this document, when a figure shows two electrical signal lines crossing each other, whether the two electrical signal lines are electrically coupled to each other will be clear from the description. For example, the signal line carrying the $M_{21}^+V1^+$ signal is not electrically coupled to the signal line carrying the $M_{11}^+V_1^-$ signal or the signal line carrying the $M_{11}^-V_1^-$ signal.

The system configuration shown in FIG. 21B can be extended to implement a system configuration for performing vector-matrix multiplication using an m×n-element matrix, in which the input vector and the matrix include signed elements.

There are various techniques that can be used for implementing the symmetric differential configuration of FIG. 21B. Some of those techniques make use of 1×2 optical amplitude modulators for implementing the multiplication modules 1904, and/or for providing pairs of optical signals that are related as main and anti-symmetric pairs. FIG. 22A shows an example of a 1×2 optical amplitude modulator 2200. In this example, the 1×2 optical amplitude modulator 2200 includes an input optical splitter 2202 that splits an incoming optical signal to provide 50% of the power to a first path that includes a phase modulator 2204 (also called a phase shifter), and 50% of the power to a second path that does not include a phase modulator. The paths can be defined in different ways, depending on whether the optical amplitude modulator is implemented as a free-space interferometer or as a waveguide interferometer. For example, in a free-space interferometer, one path is defined by transmission of a wave through a beam splitter and the other path is defined by reflection of a wave from the beam splitter. In a waveguide interferometer, each path is defined by a different optical waveguide that has been coupled to an incoming waveguide (e.g., in a Y-shaped splitter). The phase modulator 2204 can be configured to impart a phase shift such that the total phase delay of the first path differs from the total phase delay of the second path by a configurable phase shift value (e.g., a value that can be set to phase shift somewhere between 0 degrees to 180 degrees).

The 1×2 optical amplitude modulator 2200 includes a 2×2 coupler 2206 that combines the optical waves from first and second input paths using optical interference or optical coupling in a particular manner to divert power into first and second output paths in different ratios, depending on the phase shift. For example, in a free-space interferometer, a phase shift of 0 degrees causes substantially all of the input power that was split between the two paths to constructively interfere to exit from one output path of a beam splitter implementing the coupler 2206, and a phase shift of 180 degrees causes substantially all of the input power that was split between the two paths constructively interfere to exit from the other output path of the beam splitter implementing the coupler 2206. In a waveguide interferometer, a phase shift of 0 degrees causes substantially all of the input power that was split between the two paths to couple to one output waveguide of the coupler 2206, and a phase shift of 180 degrees causes substantially of the input power that was split between the two paths to couple to the other output waveguide of the coupler 2206. Phase shifts between 0 degrees and 180 degrees may then provide multiplication of the power in an optical wave (and the value encoded on the optical wave) by a value between 0 and 1 through partial constructive or destructive interference, or partial waveguide coupling. Multiplication by any value between 0 to 1 can then be mapped to multiplication by any value between 0 to $M_{max}$ as described above.

Additionally, the relationship between the power in the two optical waves emitted from the modulator 2200 follows that of the main and anti-symmetric pairs described above. When the amplitude of the optical power of one signal increases, the amplitude of the optical power of the other signal decreases, so a difference between detected photocurrents can yield a signed vector element, or multiplication by a signed matrix element, as described herein. For example, the pair of related optical signals may be provided from the two output ports of the modulator 2200 such that a difference between amplitudes of the related optical signals corresponds to a result of multiplying an input value by a signed matrix element value. FIG. 22B shows a symmetric differential configuration 2210 of the 1×2 optical amplitude modulator 2200 arranged with the optical signals at the output to be detected in the common-terminal version of the symmetric differential configuration of FIG. 20B. The current signals corresponding to the photocurrent generated by a pair of photodetectors 2212 and 2214 are combined at a junction 2216 to provide an output current signal whose amplitude corresponds to the difference between the amplitudes of the related optical signals. In other examples, such as in the symmetric differential configuration of FIG. 20C, the photocurrents detected from the two optical signals at the output may be combined using different electrical circuitry.

Figure 22C:
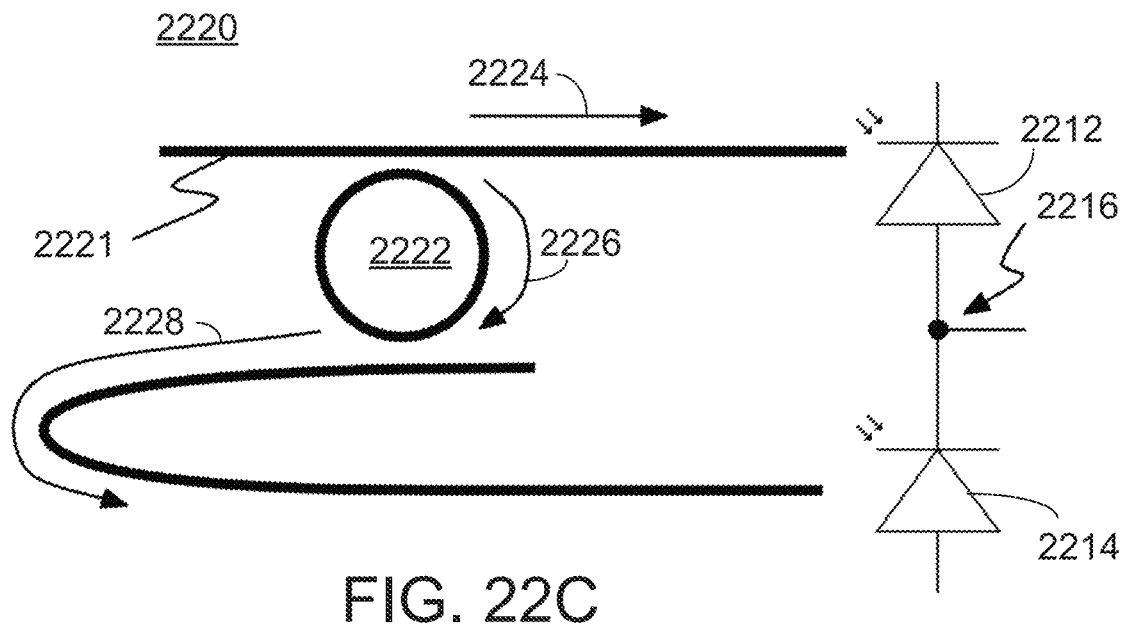

Other techniques can be used to construct 1×2 optical amplitude modulators for implementing the multiplication modules 1904, and/or for providing pairs of optical signals that are related as main and anti-symmetric pairs. FIG. 22C shows another example of a symmetric differential configuration 2220 of another type of 1×2 optical amplitude modulator. In this example, the 1×2 optical amplitude modulator includes a ring resonator 2222 that is configured to split the optical power of an optical signal at an input port 2221 to two output ports. The ring resonator 2222 (also called a "microring") can be fabricated, for example, by forming a circular waveguide on a substrate, where the circular waveguide is coupled to a straight waveguide corresponding to the input port 2221. When the wavelength of the optical signal is near a resonant wavelength associated with the ring resonator 2222, the optical wave that is coupled into the ring circulates around the ring on a clockwise path 2226 and destructively interferes at the coupling location such that a reduced-power optical wave exits over a path 2224 to a first output port. The circulating optical wave is also coupled out of the ring such that another optical wave exits over a path 2228 through a curved waveguide that guides an optical wave out of a second output port.

Since the time scale over which the optical power circulates around the ring resonator 2222 is small compared to the time scale of the amplitude modulation of the optical signals, an anti-symmetric power relationship is quickly established between the two output ports, such that the optical wave detected by the photodetector 2212 and the optical wave detected by the photodetector 2214 form main and anti-symmetric pairs. The resonance wavelength of the ring resonator 2222 can be tuned to monotonically decrease/ increase the main/anti-symmetric signals to achieve a signed result, as described above. When the ring is completely off-resonance all of the power exits over the path 2224 out of the first output port, and when it is completely on-resonance, with certain other parameters (e.g., quality factor, and coupling coefficient) appropriately tuned, all of the power exits over the path 2228 out of the second output port. In particular, to achieve complete power transfer, the coupling coefficient characterizing the coupling efficiency between the waveguide and the ring resonator should be matched. In some embodiments, it is useful to have a relatively shallow tuning curve, which can be achieved by reducing the quality factor of the ring resonator 2222 (e.g., by increasing the loss) and correspondingly increasing the coupling coefficients into and out of the ring. A shallow tuning curve provides less sensitivity of the amplitude to the resonance wavelength. Techniques such as temperature control can also be used for tuning and/or stability of the resonance wavelength.

Figure 22D:
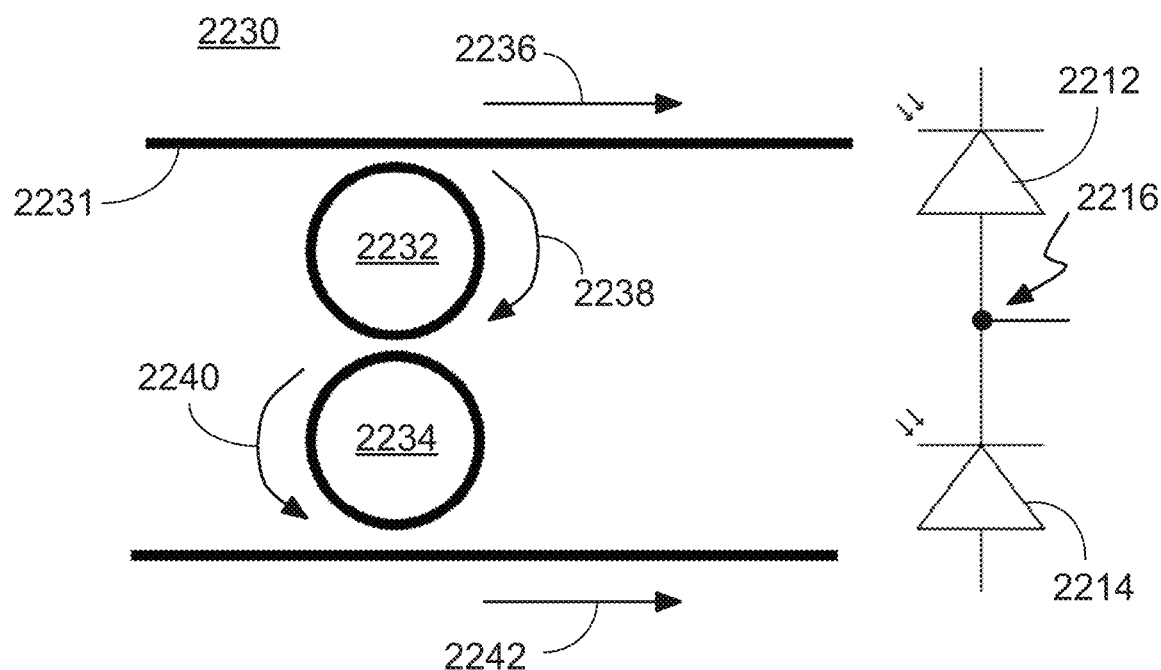

FIG. 22D shows another example of a symmetric differential configuration 2230 of another type of 1×2 optical amplitude modulator. In this example, the 1×2 optical amplitude modulator includes two ring resonators 2232 and 2234. The optical power of an optical signal at an input port 2231 is split to two ports. When the wavelength of the optical signal is near a resonant wavelength associated with both ring resonators 2232 and 2234, a reduced-power optical wave exits over a path 2236 to a first output port. A portion of the optical wave is also coupled into the ring resonator 2232 circulating around the ring on a clockwise path 2238, and is also coupled into the ring resonator 2234 circulating around the ring on a counter-clockwise path 2240. The circulating optical wave is then coupled out of the ring such that another optical wave exits over a path 2242 out of a second output port. The optical wave detected by the photodetector 2212 and the optical wave detected by the photodetector 2214 also form main and anti-symmetric pairs in this example.

Figure 23A:
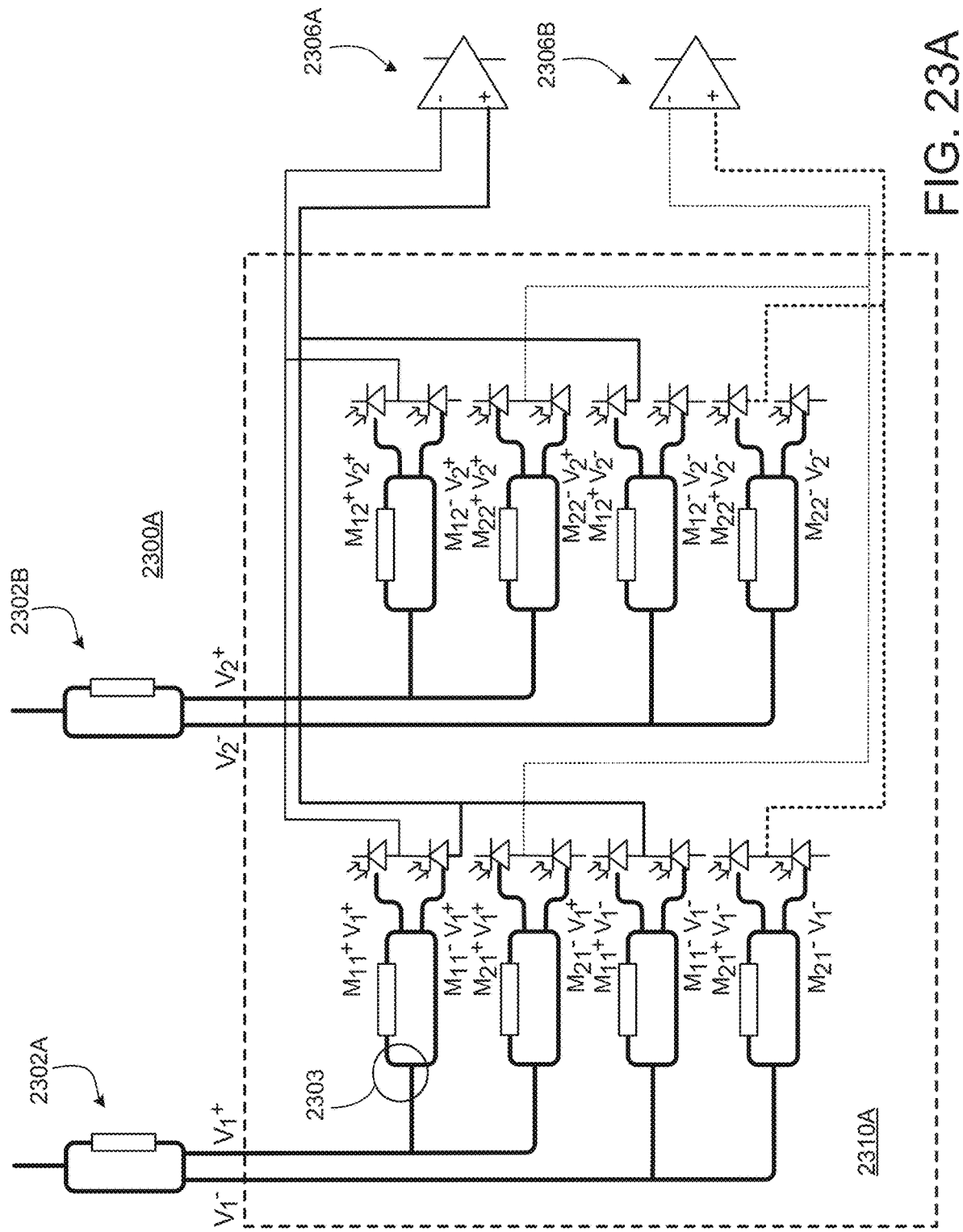
Figure 23B:
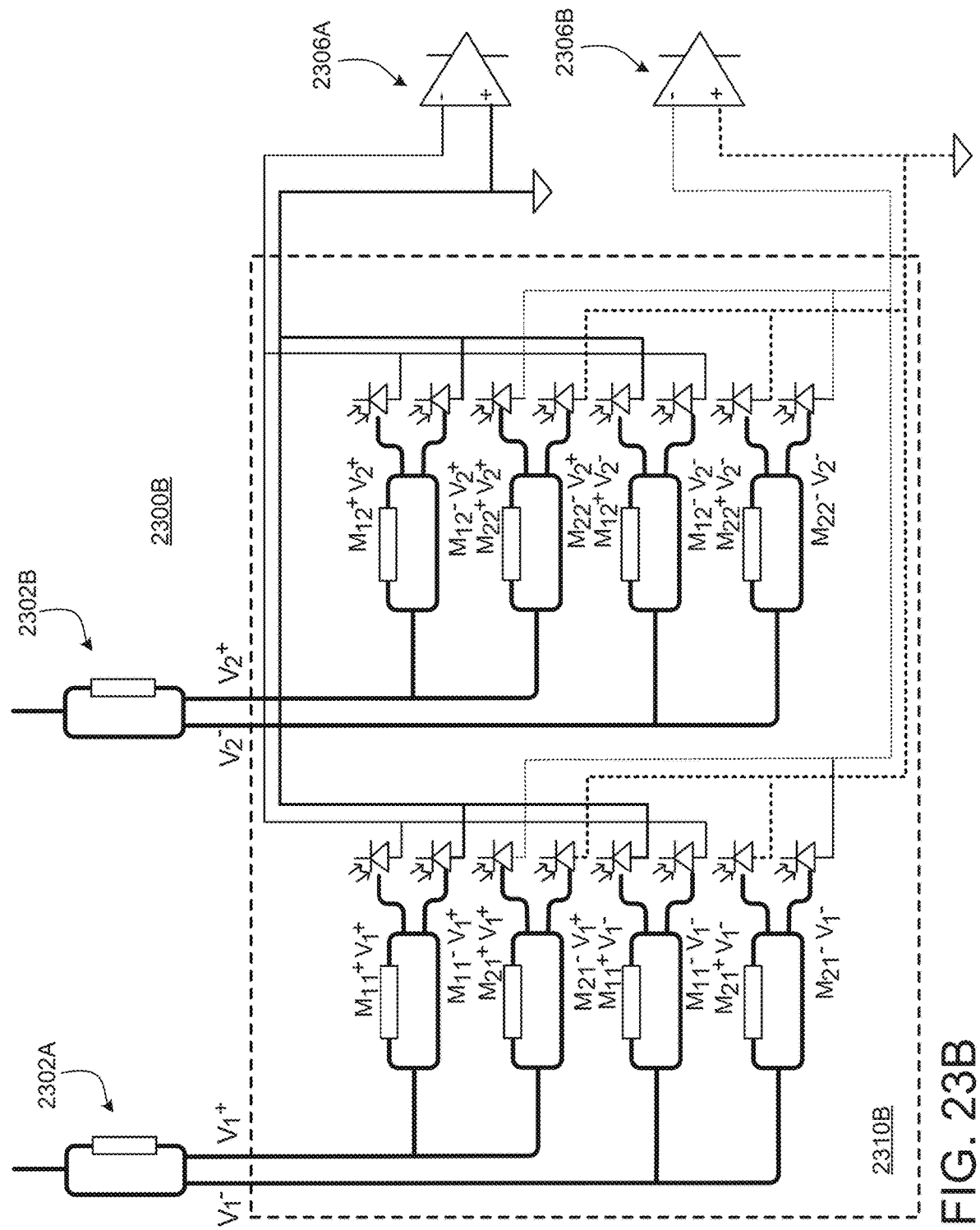

FIGS. 23A and 23B show different examples of the use of optical amplitude modulators such as the 1×2 optical amplitude modulator 2200 for an implementation of the system 1800 for performing vector-matrix multiplication for a 2×2-element matrix. FIG. 23A shows an example of an optoelectronic system configuration 2300A that includes optical amplitude modulators 2302A and 2302B providing values representing the signed vector elements of the input vector. The modulator 2302A provides a pair of optical signals that encode a pair of values $V_1^+$ and $V_1^-$ for a first signed vector element, and the modulator 602B provides a pair of optical signals that encode a pair of values $V_2^+$ and $V_2^-$ for a second signed vector element. A vector-matrix multiplier (VMM) subsystem 610A receives the input optical signals, performs the splitting operations, multiplication operations, and some of the summation operations as described above, and provides output current signals to be processed by additional circuitry. In some examples, the output current signals represent partial sums that are further processed to produce the ultimate sums that result in the signed vector elements of the output vector. In this example, some of the final summation operations are performed as a subtraction between different partial sums represented by the current signals at inverting and non-inverting terminals of op-amps 2306A and 2306B. The subtractions are used to provide the signed values, as described above (e.g., with reference to FIG. 21B). This example also illustrates how some elements can be part of multiple modules. In particular, the optical copying performed by a waveguide splitter 2303 can be considered to be part of a copying module (e.g., one of the copying modules 2112 in FIG. 21B) and part of a multiplication module (e.g., one of the multiplication modules 1904 in FIG. 21B). The optical amplitude modulators that are used within the VMM subsystem 2310A are configured for detection in the common-terminal configuration shown in FIG. 20B.

FIG. 23B shows an example of an optoelectronic system configuration 2300B similar to that of the optoelectronic system configuration 2300A shown in FIG. 23A. But, the VMM subsystem 2310B includes optical modulators that are configured for detection in the differential-terminal configuration shown in FIG. 20C. In this example, the output current signals of the VMM subsystem 2310B also represent partial sums that are further processed to produce the ultimate sums that result in the signed vector elements of the output vector. The final summation operations that are performed as a subtraction between different partial sums represented by the current signals at inverting and non-inverting terminals of op-amps 2306A and 2306B are different than in the example of FIG. 23A. But, the final subtractions still result in providing the signed values, as described above (e.g., with reference to FIG. 21B).

FIG. 23C shows an example of an optoelectronic system configuration 2300C that uses an alternative arrangement of a VVM subsystem 2310C with detection in the common-terminal configuration, as in the VVM subsystem 2310A shown in FIG. 23A, but with optical signals carrying results of multiplication modules routed through the subsystem within waveguides (e.g., in a semiconductor substrate) to a portion of the substrate that includes detectors arranged to convert the optical signals to electrical signals. In some embodiments, this grouping of the detectors allows the electrical paths to be shortened, potentially reducing electrical cross-talk or other impairments due to the long electrical paths that would otherwise be used. The optical waveguides can be routed within one layer of the substrate, or routed within multiple layers of the substrate to allow more flexibility in routing paths that cross in two dimensions of the substrate but don't cross in a third dimension (of depth in the substrate). A variety of other changes can be made in the system configuration, including changes in what components are included in a VMM subsystem. For example, the optical amplitude modulators 2302A and 2302B can be included as part of the VMM subsystem. Alternatively, the VMM subsystem can include optical input ports for receiving paired main and anti-symmetric optical signals generated by modules other than optical amplitude modulators, or for interfacing with other kinds of subsystems.

Figure 24A:
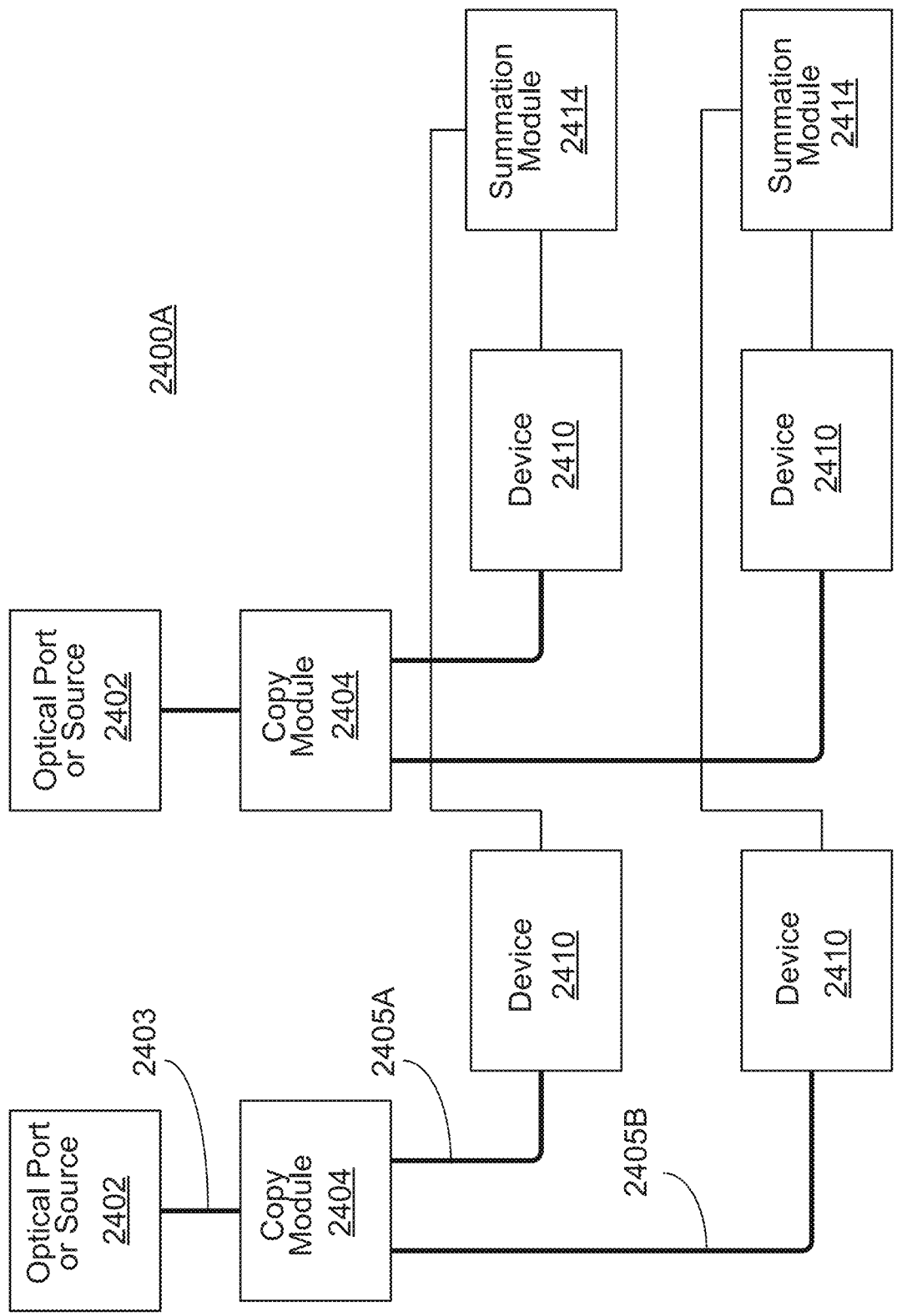
FIGS. 24A-24E are schematic diagrams of example computing systems using multiple optoelectronic subsystems.

FIG. 24A shows an example of a system configuration 2400A for an implementation of the system 1800 in which there are multiple devices 2410 that host different ones of the multiplication modules (e.g., the multiplication modules 1806A, 1806B, 1806C, and 1806D), which are each configured as a VMM subsystem to perform vector-matrix multiplication on a different subset of vector elements by a different submatrix of a larger matrix. For example, each multiplication module may be configured similar to the system configuration 2110 (FIG. 21B), but instead of implementing a VMM subsystem using a 2×2-element matrix, each multiplication module may be configured to implement a VMM subsystem using a matrix that has as large a size as can be efficiently fabricated on a single device having a common substrate for the modules within that device. For example, each multiplication module may implement a VMM subsystem using a 64×64-element matrix.

The different VMM subsystems are arranged so that the results of each submatrix are appropriately combined to yield results for the larger combined matrix (e.g., elements of a 128-element vector resulting from multiplication by a 128×128-element matrix). Each set of optical ports or sources 2402 provides a set of optical signals that represent different subsets of vector elements of a larger input vector. Copy modules 2404 are configured to copy all of the optical signals within a received set of optical signals encoded on optical waves guided in a set 2403 of 64 optical waveguides, and provide that set of optical signals to each of two different sets of optical waveguides, which in this example are a set 2405 A of 64 optical waveguides and a set 2405B of 64 optical waveguides. This copying operation can be performed, for example, by using an array of waveguide splitters, each splitter in the array copying one of the elements of the subset of input vector elements (e.g., a subset of 64 elements for each copy module 2404) by splitting an optical wave in the set 2403 of optical waveguides into a first corresponding optical wave in the set 2405A of optical waveguides and a second corresponding optical wave in the set 2405B of optical waveguides. If multiple wavelengths are used in some embodiments (e.g., W wavelengths), the number of separate waveguides (and thus the number of separate ports or sources in 2402) can be reduced, for example, by a factor of 1/W. Each VMM subsystem device 2410 performs vector-matrix multiplication, providing its partial results as a set of electrical signals (for a subset of elements of the output vector), with corresponding partial result pairs from different devices 2410 being added together by the summation modules 2414 as shown in FIG. 24A, using any of the techniques described herein, such as current summation at a junction among conductors. In some implementations, vector-matrix multiplications using a desired matrix can be performed, recursively, by combining results from smaller submatrices, for any number of levels of recursion, ending by using the single element optical amplitude modulator at the root level of the recursion. At different levels of recursion the VMM subsystem device may be more compact (e.g., different data centers connected by long distance optical fiber networks at one level, different multi-chip devices connected by optical fibers within a data center at another level, different chips within a device connected by optical fibers at another level, and different sections of modules on the same chip connected by on-chip waveguides at another level).

Figure 24B:
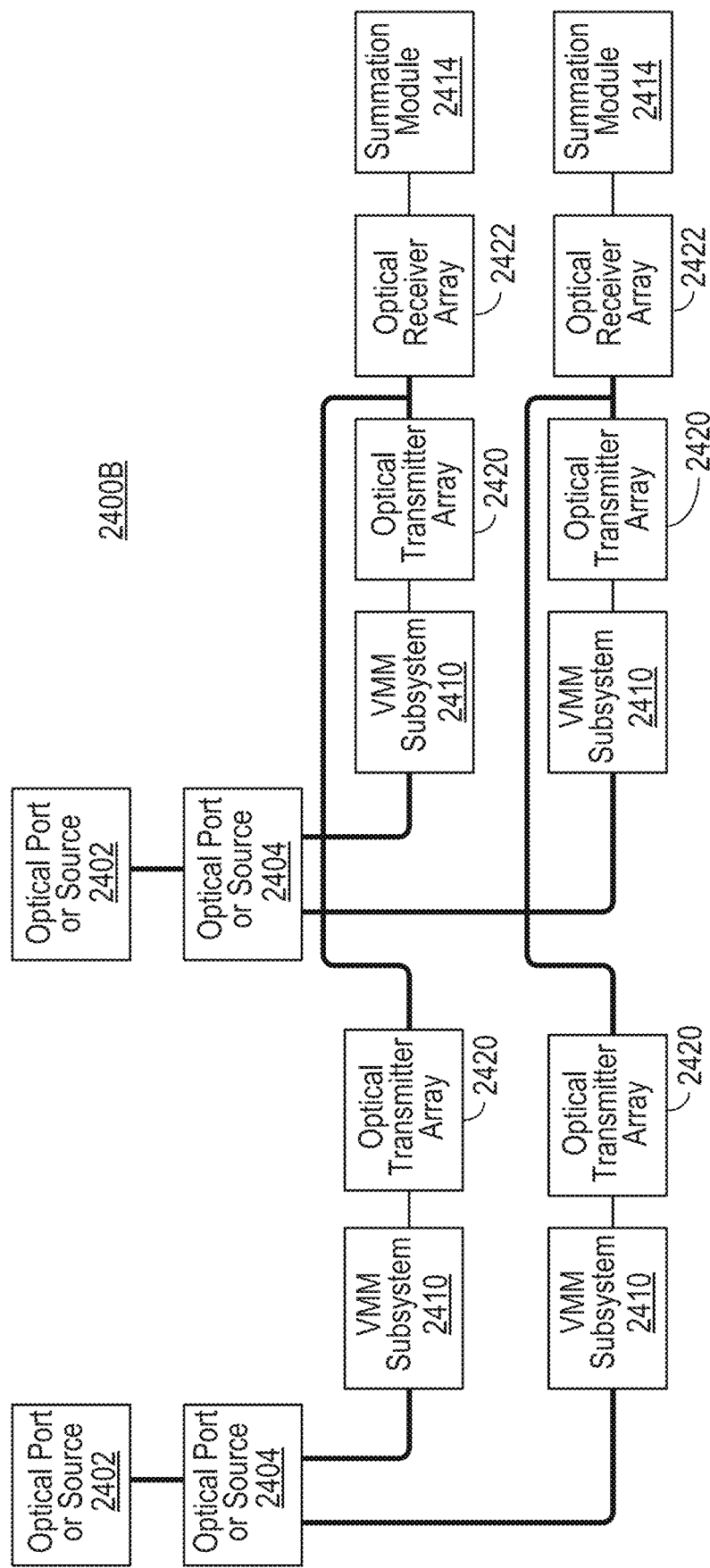

FIG. 24B shows another example of a system configuration 2400B in which additional devices are used for optical transmission and reception for each VMM subsystem 2410. At the output of each VMM subsystem 2410, an optical transmitter array 2420 is used to couple each optical signal to a channel within an optical transmission line (e.g., an optical fiber in a fiber bundle between VMM subsystems 2410 that may be hosted by separate devices and/or distributed in remote locations, or a waveguide in a set of waveguides on an integrated device, such as a SoC, that hosts the VMM subsystems 2410 on a common substrate). An optical receiver array 2422 is used for each subset of output vector elements to convert the optical signals to electrical signals before corresponding pairs of partial results are summed by the summation modules 2414.

Figure 24C:
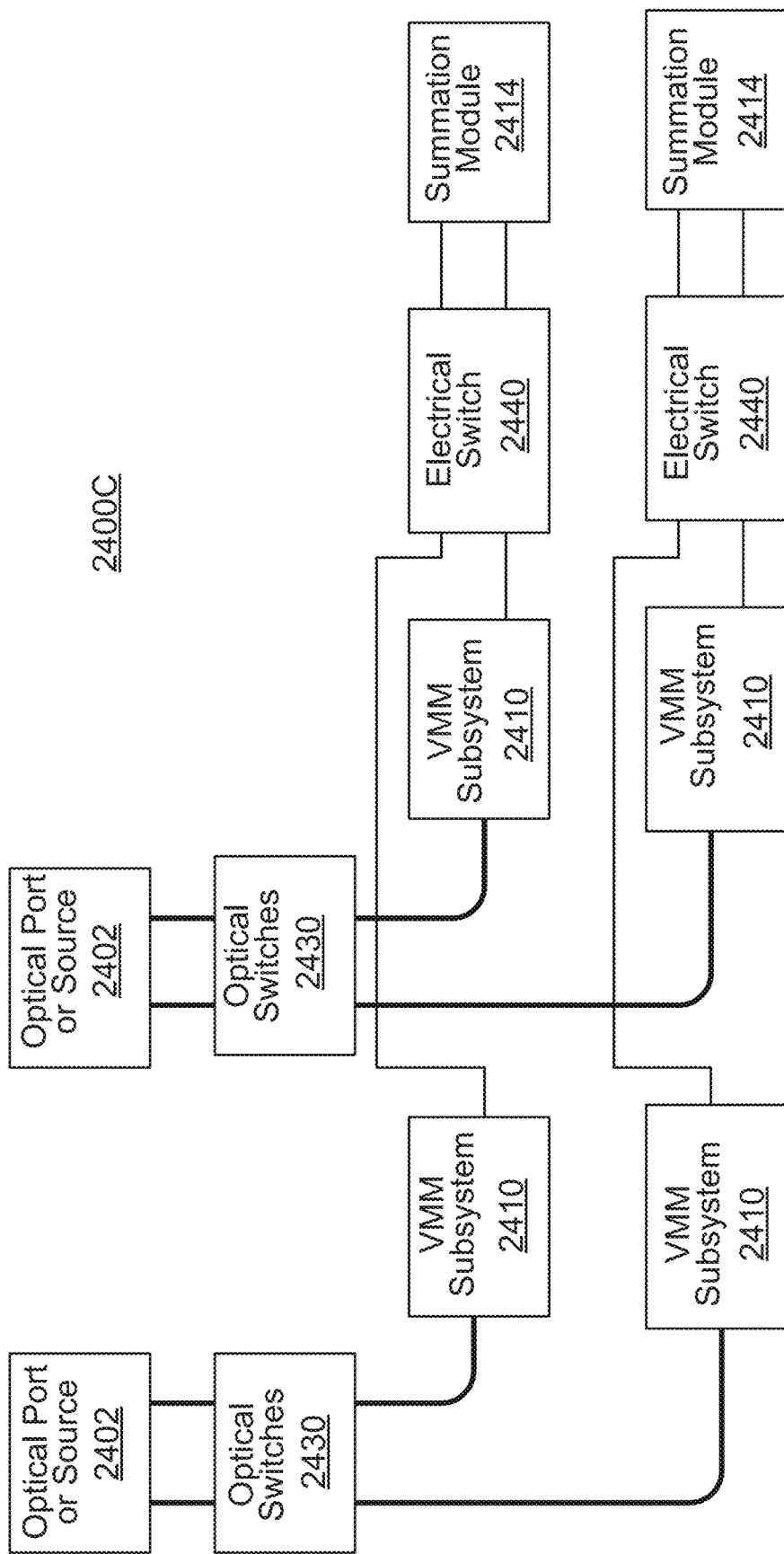

FIG. 24C shows another example of a system configuration 2400C in which the VMM subsystems 2410 can be reconfigured to enable the different vector-matrix multiplications for different submatrices to be rearranged in different ways. For example, the shape of the larger matrix that is formed by combining different submatrices can be configurable. In this example, two different subsets of optical signals are provided from each set of optical ports or sources 2402 to optical switches 2430. There are also electrical switches 2440 that are able to rearrange subsets of electrical signals representing partial results to be summed by the summation modules 2414 to provide an output vector, or separate output vectors, for a desired computation. For example, instead of vector-matrix multiplication using a matrix of size 2m×2n composed of four submatrices of size m×n, the VMM subsystems 2410 can be rearranged to use a matrix of size 2m×n or a matrix of size m×2n.

Figure 24D:
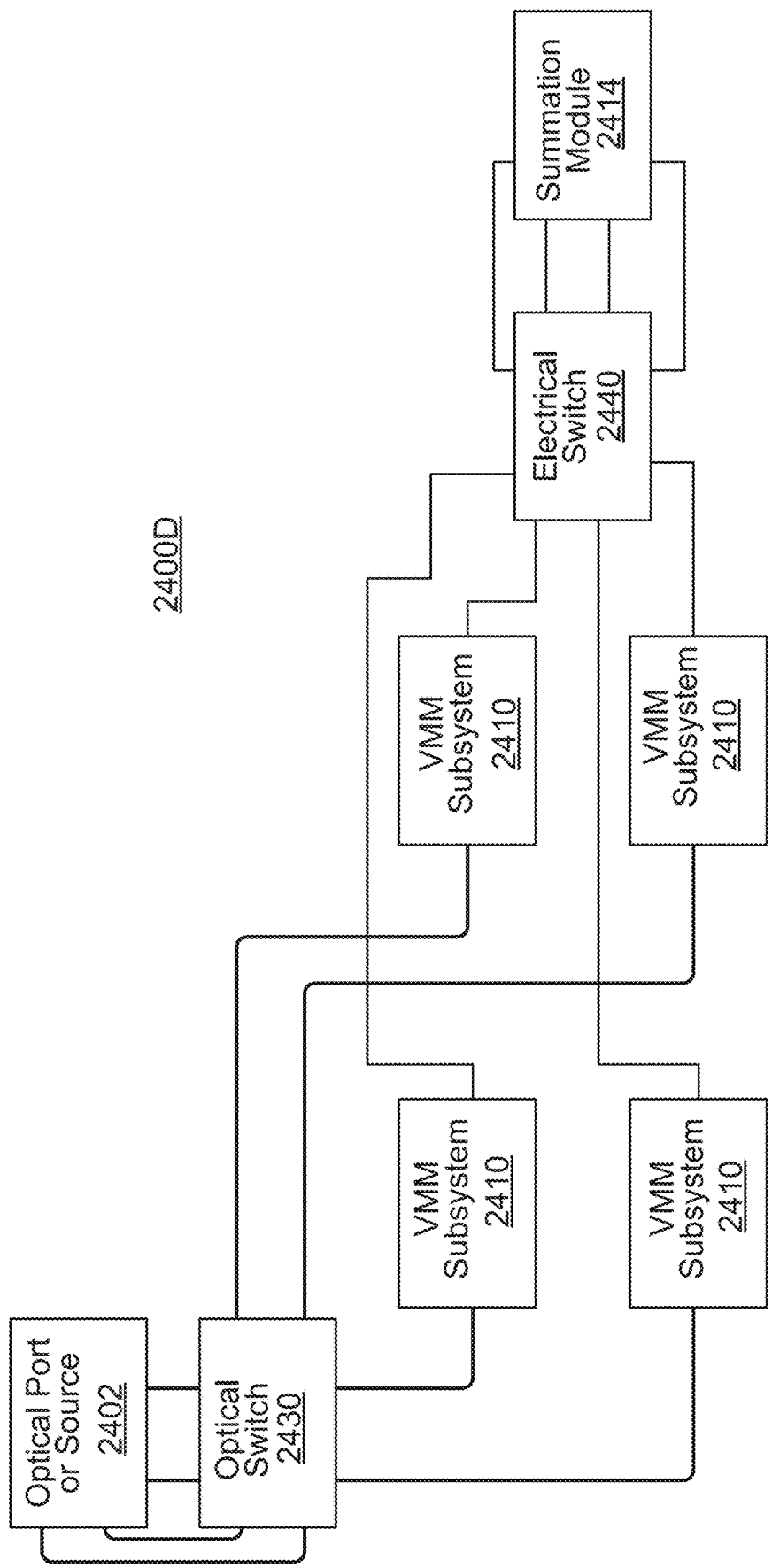

FIG. 24D shows another example of a system configuration 2400D in which the VMM subsystems 2410 can be reconfigured in additional ways. The optical switches 2430 can receive up to four separate sets of optical signals, and can be configured to provide different sets of optical signals to different VMM subsystems 2410, or to copy any of the sets of optical signals to multiple VMM subsystems 2410. Also, the electrical switches 2440 can be configured to provide any combination of the sets of electrical signals received to the summation modules 2414. This greater reconfigurability enables a wider variety of different vector-matrix multiplication computations, including multiplication using a matrix of size: m×3n, 3m×n, m×4n, 4m×n.

Figure 24E:
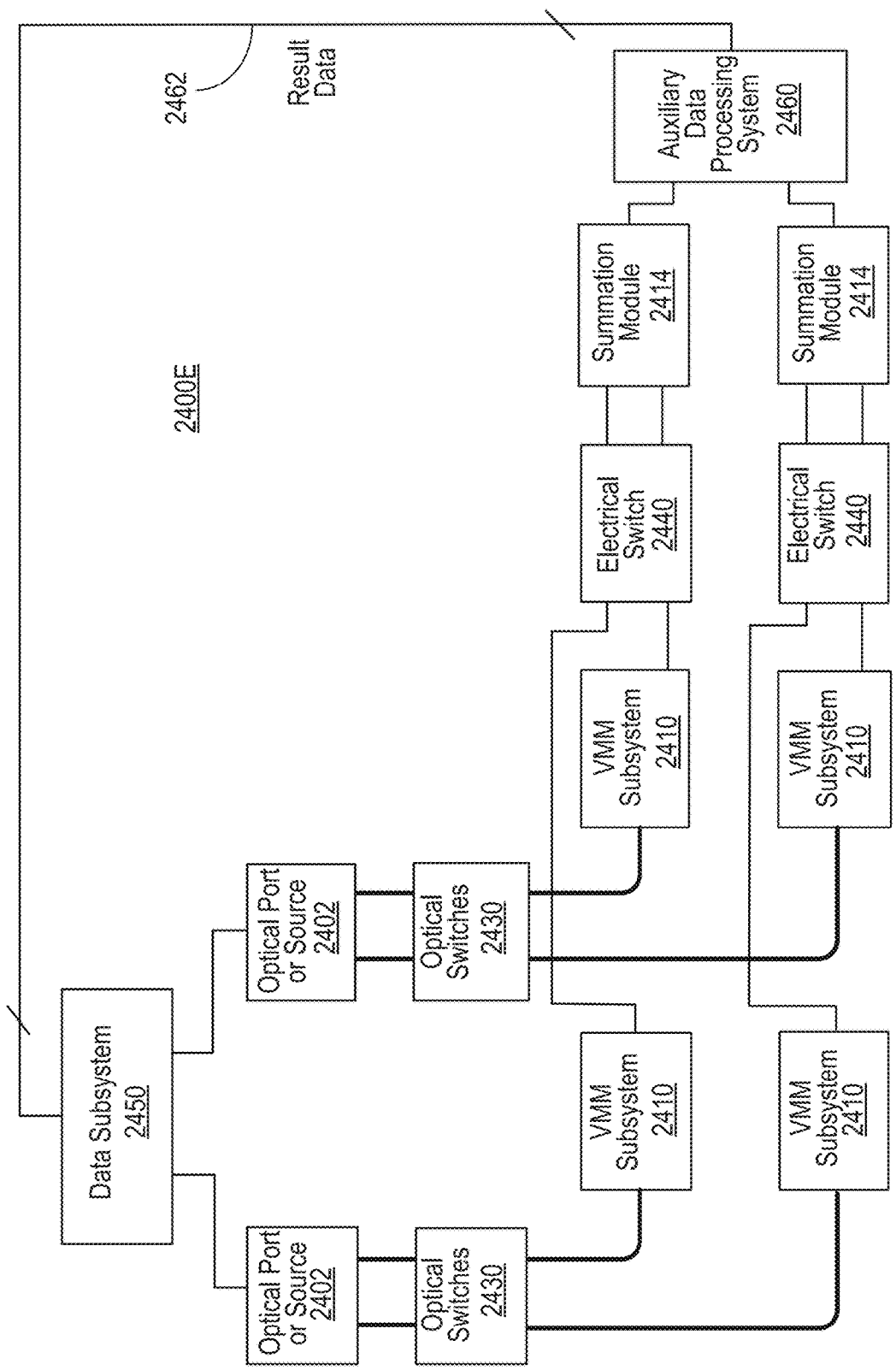

FIG. 24E shows another example of a system configuration 2400E that includes additional circuitry that can perform various operations (e.g., digital logic operations), to enable the system configuration 2400E to be used (e.g., for a complete optoelectronic computing system, or for an optoelectronic subsystem of a larger computing platform) for implementing computational techniques such as artificial neural networks or other forms of machine learning. A data storage subsystem 2450 can include volatile storage media (e.g., SRAM, and/or DRAM) and/or non-volatile storage media (e.g., solid state drives, and/or hard drives). The data storage subsystem 2450 can also include hierarchical cache modules. The data that is stored may include, for example, training data, intermediate result data, or production data used to feed online computational systems. The data storage subsystem 2450 can be configured to provide concurrent access to input data for modulation onto different optical signals provided by the optical ports or sources 2402. The conversion of data stored in digital form to an analog form that can be used for the modulation can be performed by circuitry (e.g., digital-to-analog converters) that is included at the output of the data storage subsystem 2450, or the input of the optical ports or sources 2402, or split between both. An auxiliary processing subsystem 2460 can be configured to perform auxiliary operations (e.g., nonlinear operations, data shuffling, etc.) on data that may be cycled through multiple iterations of vector-matrix multiplication using the VMM subsystems 2410. Result data 2462 from those auxiliary operations can be sent to the data storage subsystem 2450 in digital form. The data retrieved by the data storage subsystem 2450 can be used for modulating optical signals with appropriate input vectors, and for providing control signals (not shown) used to set modulation levels of optical amplitude modulators in the VMM subsystems 2410. The conversion of data encoded on electrical signals in analog form to a digital form can be performed by circuitry (e.g., analog-to-digital converters) within the auxiliary processing subsystem 2460.

In some implementations, a digital controller (not shown in the figure) is provided to control the operations of the data storage subsystem 2450, the hierarchical cache modules, various circuitry such as the digital-to-analog converters and analog-to-digital converters, the VMM subsystems 2410, and the optical sources 2402. For example, the digital controller is configured to execute program code to implement a neural network having several hidden layers. The digital controller iteratively performs matrix processing associated with various layers of the neural network. The digital controller performs a first iteration of matrix processing by retrieving first matrix data from the data storage subsystem 2450 and setting the modulation levels of the optical amplitude modulators in the VMM subsystems 2410 based on the retrieved data, in which the first matrix data represent coefficients of a first layer of the neural network. The digital controller retrieves a set of input data from the data storage subsystem and sets the modulation levels for the optical sources 2402 to produce a set of optical input signals that represent elements of a first input vector.

The VMM subsystems 2410 perform matrix processing based on the first input vector and the first matrix data, representing the processing of signals by the first layer of the neural network. After the auxiliary processing subsystem 2450 has produced a first set of result data 2462, the digital controller performs a second iteration of matrix processing by retrieving second matrix data from the data storage subsystem that represent coefficients of a second layer of the neutral network, and setting the modulation levels of the optical amplitude modulators in the VMM subsystems 2410 based on the second matrix data. The first set of result data 2462 is used as a second input vector to set the modulation levels for the optical sources 2402. The VMM subsystems 2410 perform matrix processing based on the second input vector and the second matrix data, representing the processing of signals by the second layer of the neural network, and so forth. At the last iteration, the output of the processing of signals by the last layer of the neural network is produced.

In some implementations, when performing computations associated with hidden layers of a neural network, the result data 2462 are not sent to the data storage subsystem 2450, but are used by the digital controller to directly control digital-to-analog converters that produce control signals for setting the modulation levels of the optical amplitude modulators in the VMM subsystems 2410. This reduces the time needed for storing data to and accessing data from the data storage subsystem 2450.

Other processing techniques can be incorporated into other examples of system configurations. For example, various techniques used with other kinds of vector-matrix multiplication subsystems (e.g., subsystems using optical interference without the electrical summation or signed multiplication described herein) can be incorporated into some system configurations, such as some of the techniques described in U.S. Patent Publication No. 2017/0351293, incorporated herein by reference.

Figure 32A:
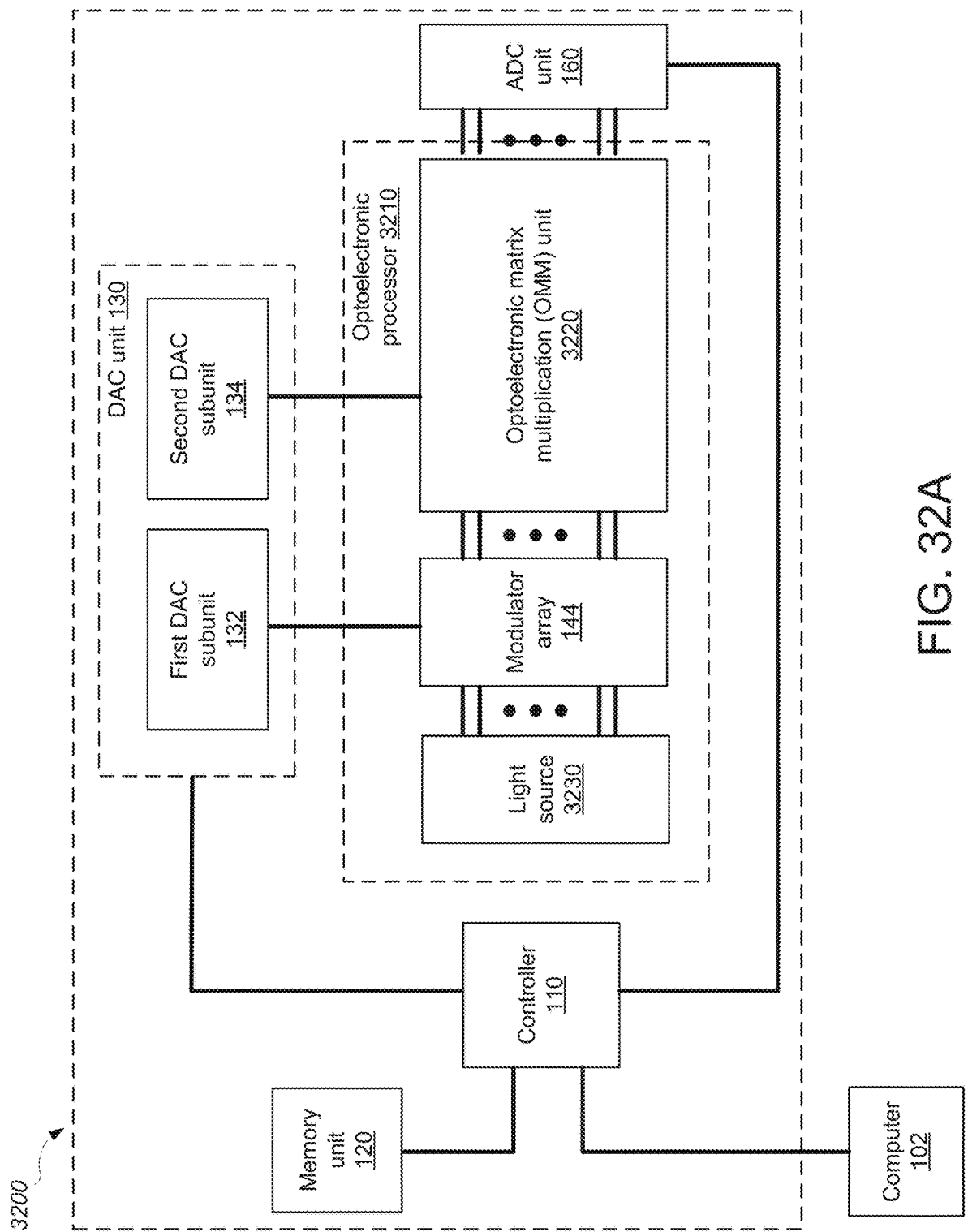
FIG. 32A is a schematic diagram of an example of an artificial neural network (ANN) computation system.

Referring to FIG. 32A, an artificial neural network (ANN) computation system 3200 includes an optoelectronic matrix multiplication unit 3220 that has, e.g., the copying modules, multiplication modules, and summation modules shown in FIGS. 18 to 24D to enable processing non-coherent or low-coherent optical signals in performing matrix computations. The artificial neural network computation system 3200 includes a controller 110, a memory unit 120, a DAC unit 130, and an ADC unit 160, similar to those of the system 100 of FIG. 1A. The controller 110 receives requests from a computer 102 and sends the computation outputs to the computer 102, similar to that shown in FIG. 1A.

The optical processor 3210 includes a light source 3230, which can be the similar to the laser unit 142 of FIG. 1A in which the multiple output signals of the laser unit 3230 are coherent. The light source 3230 can also use light emitting diodes to produce multiple output signals that are not coherent or have low coherency. The optoelectronic matrix multiplication unit 3220 includes a modulator array 144 that receives modulator control signals that are generated based on an input vector by the first DAC subunit 132, similar to the operation performed by the optical processor 140 of FIG. 1A. The outputs of the modulator array 144 are comparable to the outputs of the optical ports/sources 1802 in FIG. 18. The optoelectronic matrix multiplication unit 3220 processes the light signals from the modulator array 144 in a manner similar to the way that the copy modules 1804, the multiplication modules 1806, and the summation modules 1808 process the optical signals from the optical ports/sources 1802 in FIG. 18.

Figure 32B:
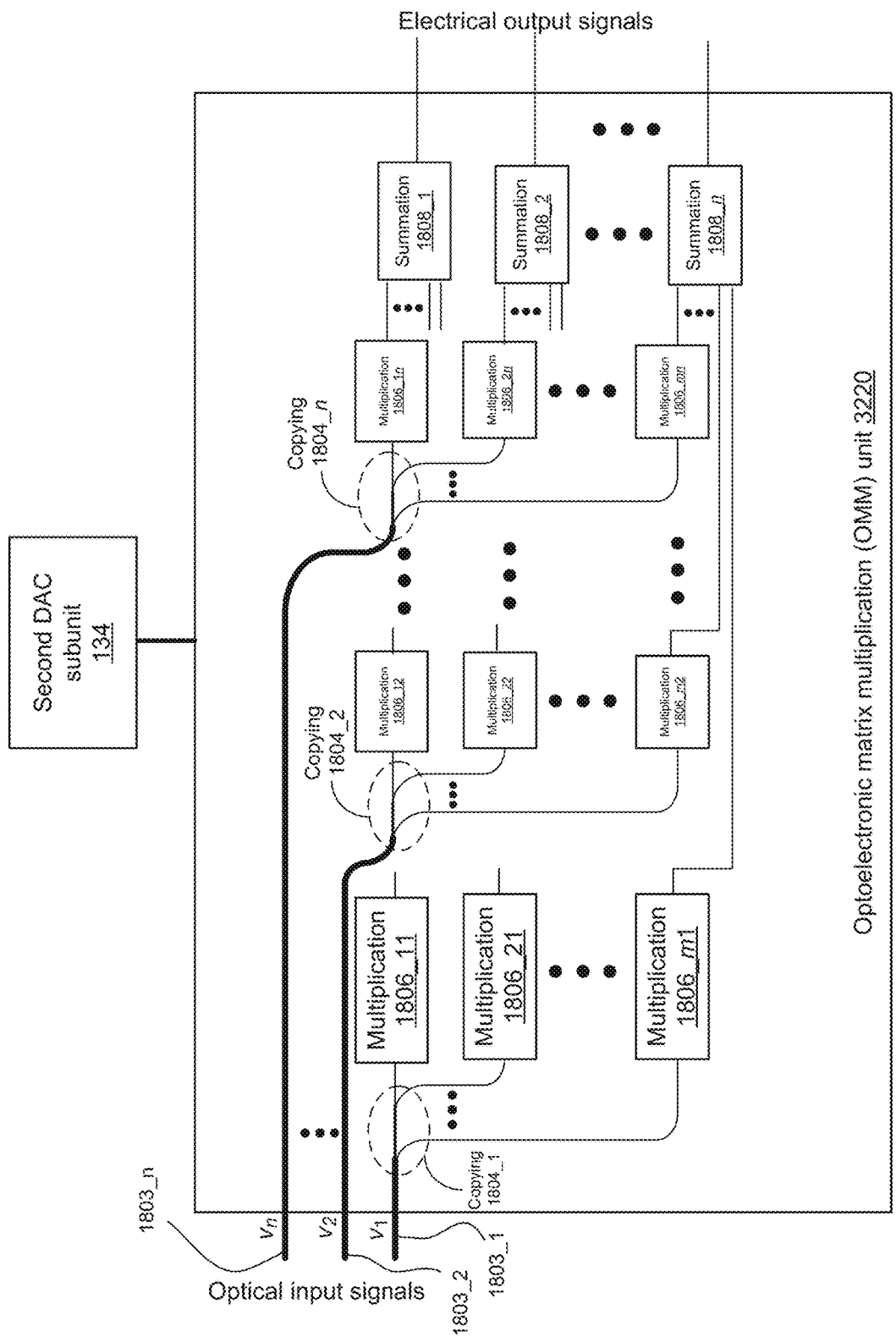
FIG. 32B is a schematic diagram of an example of an optoelectronic matrix multiplication unit.

Referring to FIG. 32B, the optoelectronic matrix multiplication unit 3220 receives an input vector $$v = \begin{bmatrix} v_1 \\ \vdots \\ v_n \end{bmatrix},$$

and multiplies the input vector with a matrix $$\overline{M} = \begin{bmatrix} M_{11} & \cdots & M_{1n} \\ \vdots & \ddots & \vdots \\ M_{m1} & \cdots & M_{mn} \end{bmatrix}$$

to produce an output vector $$y = \begin{bmatrix} M_{11}v_1 + M_{12}v_2 + \ldots + M_{1n}v_n \\ M_{21}v_1 + M_{22}v_2 + \ldots + M_{2n}v_n \\ \ldots \\ M_{m1}v_1 + M_{m2}v_2 + \ldots + M_{mn}v_n \end{bmatrix}.$$

The optoelectronic matrix multiplication unit 3220 includes m optical paths 1803_1, 1803_2, ..., 1803_m (collectively referenced as 1803) that carry the optical signals representing the input vector. A copying module 1804_1 provides copies of the input optical signal $v_1$ to multiplication modules 1806_11, 1806_21, ..., 1806_m1. A copying module 1804_2 provides copies of the input optical signal $v_2$ to multiplication modules 1806_12, 1806_22, ..., 1806_m2. A copying module 1804_n provides copies of the input optical signal $v_n$ to multiplication modules 1806_1n, 1806_2n, ..., 1806_mn.

As discussed above, the amplitudes of the copies of the optical signal $v_1$ provided by the copying module 1804_1 are the same (or substantially the same) relative to one another, but different from that of the optical signal $v_1$ provided by the modulator array 144. For example, if the copying module 1804_1 splits the signal power of $v_1$ provided by the modulator array 144 evenly among m signals, then each of the m signals will have a power that is equal to or less than 1/m of the power of $v_1$ provided by the modulator array 144.

A multiplication module 1806_11 multiplies the input signal $v_1$ with a matrix element $M_{11}$ to produce $M_{11} \cdot v_1$. A multiplication module 1806_21 multiplies the input signal $v_1$ with a matrix element $M_{21}$ to produce $M_{21} \cdot v_1$. A multiplication module 1806_m1 multiplies the input signal $v_1$ with a matrix element $M_{m1}$ to produce $M_{m1} \cdot v_1$. A multiplication module 1806_12 multiplies the input signal $v_2$ with a matrix element $M_{12}$ to produce $M_{12} \cdot v_2$. A multiplication module 1806_22 multiplies the input signal $v_2$ with a matrix element $M_{22}$ to produce $M_{22} \cdot v_2$. A multiplication module 1806_m2 multiplies the input signal $v_2$ with a matrix element $M_{m2}$ to produce $M_{N2} \cdot v_2$. A multiplication module 1806_1n multiplies the input signal $v_n$ with a matrix element $M_{1n}$ to produce $M_{1n} \cdot v_n$. A multiplication module 1806_2n multiplies the input signal $v_n$ with a matrix element $M_{2n}$ to produce $M_{2n} v_n$. A multiplication module 1806_mn multiplies the input signal $v_n$ with a matrix element $M_{mn}$ to produce $M_{mn} \cdot v_n$, and so forth.

The second DAC subunit 134 generates control signals based on the values of the matrix elements, and sends the control signals to the multiplication modules 1806 to enable the multiplication modules 1806 to multiply the values of the input vector elements with the values of the matrix elements, e.g., by using optical amplitude modulation. For example, the multiplication module 1806_11 can include an optical amplitude modulator, and multiplying the input vector element $v_1$ by the matrix element $M_{11}$ can be achieved by encoding the value of the matrix element $M_{11}$ as an amplitude modulation level applied to the input optical signal representing the input vector element $v_1$.

A summation module 1808_1 receives the outputs of the multiplication modules 1806_11, 1806_12, ..., 1806_1n, and generates a sum $y_1$ equal to $M_{11}v_1 + M_{12}v_2 + \ldots + M_{1n}v_n$. A summation module 1808_2 receives the outputs of the multiplication modules 1806_21, 1806_22, ..., 1806_2n, and generates a sum $y_2$ equal to $M_{21}v_1 + M_{22}v_2 + \ldots + M_{2n}v_n$. A summation module 1808_n receives the outputs of the multiplication modules 1806_m1, 1806_m2, ..., 1806_mn, and generates a sum $y_n$ equal to $M_{m1}v_1 + M_{m2}v_2 + \ldots + M_{mn}v_n$.

In the system 3200, the output of the optoelectronic matrix multiplication unit 3220 is provided to the ADC unit 160 without passing through a detection unit 146 as is the case in the system 100 of FIG. 1A. This is because either the multiplication modules 1806 or the summation modules 1808 already convert the optical signals into electrical signals, so there is no need for a separate detection unit 146 in the system 3200.

Figure 33:
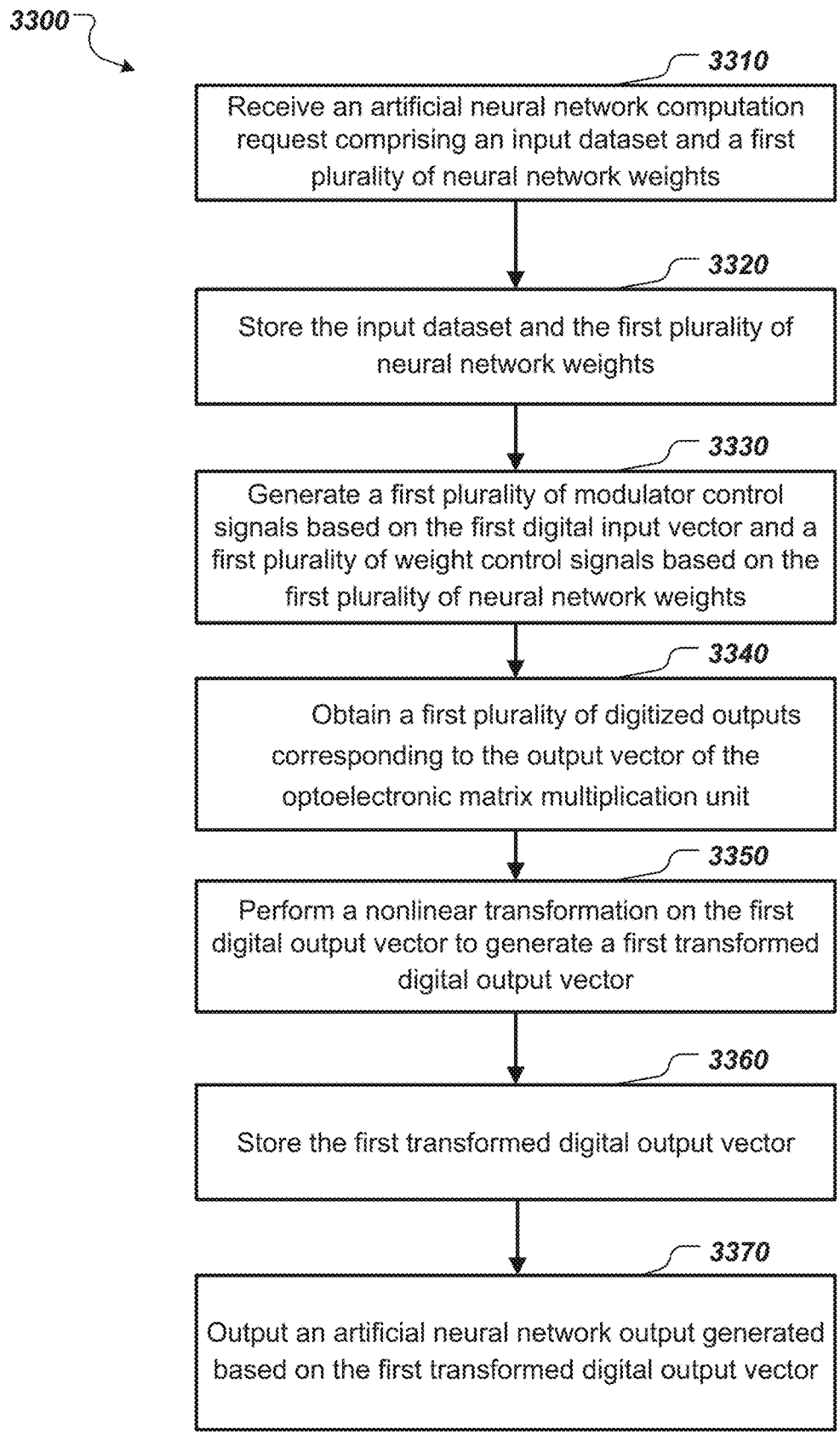
FIG. 33 is a flow diagram showing an example of a method for performing an ANN computation using an optoelectronic processor.

FIG. 33 shows a flowchart of an example of a method 3300 for performing an ANN computation using the ANN computation system 3200 of FIG. 32A. The steps of the process 3300 may be performed by the controller 110 of the system 3200. In some implementations, various steps of the method 3300 can be run in parallel, in combination, in loops, or in any order.

At 3310, an artificial neural network (ANN) computation request comprising an input dataset and a first plurality of neural network weights is received. The input dataset includes a first digital input vector. The first digital input vector is a subset of the input dataset. For example, it may be a sub-region of an image. The ANN computation request may be generated by various entities, such as the computer 102 of FIG. 32A. The computer 102 may include one or more of various types of computing devices, such as a personal computer, a server computer, a vehicle computer, and a flight computer. The ANN computation request generally refers to an electrical signal that notifies or informs the ANN computation system 3300 of an ANN computation to be performed. In some implementations, the ANN computation request may be divided into two or more signals. For example, a first signal may query the ANN computation system 3300 to check whether the system 3300 is ready to receive the input dataset and the first plurality of neural network weights. In response to a positive acknowledgement by the system 3300, the computer 102 may send a second signal that includes the input dataset and the first plurality of neural network weights.

At 3320, the input dataset and the first plurality of neural network weights are stored. The controller 110 may store the input dataset and the first plurality of neural network weights in the memory unit 120. Storing of the input dataset and the first plurality of neural network weights in the memory unit 120 may allow flexibilities in the operation of the ANN computation system 3300 that, for example, can improve the overall performance of the system. For example, the input dataset can be divided into digital input vectors of a set size and format by retrieving desired portions of the input dataset from the memory unit 120. Different portions of the input dataset can be processed in various order, or be shuffled, to allow various types of ANN computations to be performed. For example, shuffling may allow matrix multiplication by block matrix multiplication technique in cases where the input and output matrix sizes are different. As another example, storing of the input dataset and the first plurality of neural network weights in the memory unit 120 may allow queuing of multiple ANN computation requests by the ANN computation system 3300, which may allow the system 3300 to sustain operation at its full speed without periods of inactivity.

In some implementations, the input dataset may be stored in the first memory subunit, and the first plurality of neural network weights may be stored in the second memory subunit.

At 3330, a first plurality of modulator control signals is generated based on the first digital input vector and a first plurality of weight control signals is generated based on the first plurality of neural network weights. The controller 110 may send a first DAC control signal to the DAC unit 130 for generating the first plurality of modulator control signals. The DAC unit 130 generates the first plurality of modulator control signals based on the first DAC control signal, and the modulator array 144 generates the optical input vector representing the first digital input vector.

The first DAC control signal may include multiple digital values to be converted by the DAC unit 130 into the first plurality of modulator control signals. The multiple digital values are generally in correspondence with the first digital input vector, and may be related through various mathematical relationships or look-up tables. For example, the multiple digital values may be linearly proportional to the values of the elements of the first digital input vector. As another example, the multiple digital values may be related to the elements of the first digital input vector through a look-up table configured to maintain a linear relationship between the digital input vector and the optical input vector generated by the modulator array 144.

The controller 110 may send a second DAC control signal to the DAC unit 130 for generating the first plurality of weight control signals. The DAC unit 130 generates the first plurality of weight control signals based on the second DAC control signal, and the optoelectronic matrix multiplication unit 3220 is reconfigured according to the first plurality of weight control signals, implementing a matrix corresponding to the first plurality of neural network weights.

The second DAC control signal may include multiple digital values to be converted by the DAC unit 130 into the first plurality of weight control signals. The multiple digital values are generally in correspondence with the first plurality of neural network weights, and may be related through various mathematical relationships or look-up tables. For example, the multiple digital values may be linearly proportional to the first plurality of neural network weights. As another example, the multiple digital values may be calculated by performing various mathematical operations on the first plurality of neural network weights to generate weight control signals that can configure the optoelectronic matrix multiplication unit 3220 to perform a matrix multiplication corresponding to the first plurality of neural network weights.

At 3340, a first plurality of digitized outputs corresponding to the electronic output vector of the optoelectronic matrix multiplication unit 3220 is obtained. The optical input vector generated by the modulator array 144 is processed by the optoelectronic matrix multiplication unit 3220 and transformed into an electrical output vector. The electrical output vector is converted into digitized values by the ADC unit 160. The controller 110 may, for example, send a conversion request to the ADC unit 160 to begin a conversion of the voltages output by the optoelectronic matrix multiplication unit 3220 into digitized outputs. Once the conversion is complete, the ADC unit 160 may send the conversion result to the controller 110. Alternatively, the controller 110 may retrieve the conversion result from the ADC unit 160. The controller 110 may form, from the digitized outputs, a digital output vector that corresponds to the result of the matrix multiplication of the input digital vector. For example, the digitized outputs may be organized, or concatenated, to have a vector format.

In some implementations, the ADC unit 160 may be set or controlled to perform an ADC conversion based on a DAC control signal issued to the DAC unit 130 by the controller 110. For example, the ADC conversion may be set to begin at a preset time following the generation of the modulation control signal by the DAC unit 130. Such control of the ADC conversion may simplify the operation of the controller 110 and reduce the number of necessary control operations.

At 3350, a nonlinear transformation is performed on the first digital output vector to generate a first transformed digital output vector. A node, or an artificial neuron, of an ANN operates by first performing a weighted sum of the signals received from nodes of a previous layer, then performing a nonlinear transformation ("activation") of the weighted sum to generate an output. Various types of ANN may implement various types of differentiable, nonlinear transformations. Examples of nonlinear transformation functions include a rectified linear unit (RELU) function, a Sigmoid function, a hyperbolic tangent function, an $X^{\wedge}2$ function, and a $|X|$ function. Such nonlinear transformations are performed on the first digital output by the controller 110 to generate the first transformed digital output vector. In some implementations, the nonlinear transformations may be performed by a specialized digital integrated circuitry within the controller 110. For example, the controller 110 may include one or more modules or circuit blocks that are specifically adapted to accelerate the computation of one or more types of nonlinear transformations.

At 3360, the first transformed digital output vector is stored. The controller 110 may store the first transformed digital output vector in the memory unit 120. In cases where the input dataset is divided into multiple digital input vectors, the first transformed digital output vector corresponds to a result of the ANN computation of a portion of the input dataset, such as the first digital input vector. As such, storing of the first transformed digital output vector allows the ANN computation system 3200 to perform and store additional computations on other digital input vectors of the input dataset to later be aggregated into a single ANN output.

At 3370, an artificial neural network output generated based on the first transformed digital output vector is output. The controller 110 generates an ANN output, which is a result of processing the input dataset through the ANN defined by the first plurality of neural network weights. In cases where the input dataset is divided into multiple digital input vectors, the generated ANN output is an aggregated output that includes the first transformed digital output, but may further include additional transformed digital outputs that correspond to other portions of the input dataset. Once the ANN output is generated, the generated output is sent to a computer, such as the computer 102, that originated the ANN computation request.

Various performance metrics can be defined for the ANN computation system 3200 implementing the method 3300. Defining performance metrics may allow a comparison of performance of the ANN computation system 3200 that implements the optoelectronic processor 3210 with other systems for ANN computation that instead implement electronic matrix multiplication units. In one aspect, the rate at which an ANN computation can be performed may be indicated in part by a first loop period defined as a time elapsed between the step 3320 of storing, in the memory unit, the input dataset and the first plurality of neural network weights, and the step 3360 of storing, in the memory unit, the first transformed digital output vector. This first loop period therefore includes the time taken in converting the electrical signals into optical signals (e.g., step 3330), and performing the matrix multiplication in the optical and electrical domains (e.g., step 3340). Steps 3320 and 3360 both involves storing of data into the memory unit 120, which are steps shared between the ANN computation system 3200 and conventional ANN computation system systems without the optoelectronic processor 3210. As such, the first loop period measuring the memory-to-memory transaction time may allow a realistic or fair comparison of ANN computation throughput to be made between the ANN computation system 3200 and ANN computation systems without the optoelectronic processor 3210, such as systems implementing electronic matrix multiplication units.

Due to the rate at which the optical input vectors can be generated by the modulator array 144 (e.g., at 25 GHz) and the processing rate of the optoelectronic matrix multiplication unit 3220 (e.g., >25 GHz), the first loop period of the ANN computation system 3300 for performing a single ANN computation of a single digital input vector may approach the reciprocal of the speed of the modulator array 144, e.g., 40 ps. After accounting for latencies associated with the signal generation by the DAC unit 130 and the ADC conversion by the ADC unit 160, the first loop period may, for example, be less than or equal to 100 ps, less than or equal to 200 ps, less than or equal to 500 ps, less than or equal to 1 ns, less than or equal to 2 ns, less than or equal to 5 ns, or less than or equal to 10 ns.

As a comparison, execution time of a multiplication of an M×1 vector and an M×M matrix by an electronic matrix multiplication unit is typically proportional to $M/\sqrt{2}-1$ processor clock cycles. For M=32, such multiplication would take approximately 1024 cycles, which at 3 GHz clock speed results in an execution time exceeding 300 ns, which is orders of magnitude slower than the first loop period of the ANN computation system 3300.

In some implementations, the method 3300 further includes a step of generating a second plurality of modulator control signals based on the first transformed digital output vector. In some types of ANN computations, a single digital input vector may be repeatedly propagated through, or processed by, the same ANN. As previously discussed, an ANN that implements multi-pass processing may be referred to as a recurrent neural network (RNN). A RNN is a neural network in which the output of the network during a (k)th pass through the neural network is recirculated back to the input of the neural network and used as the input during the (k+1)th pass. RNNs may have various applications in pattern recognition tasks, such as speech or handwriting recognition. Once the second plurality of modulator control signals are generated, the method 3300 may proceed from step 3340 through step 3360 to complete a second pass of the first digital input vector through the ANN. In general, the recirculation of the transformed digital output to be the digital input vector may be repeated for a preset number of cycles depending of the characteristics of the RNN received in the ANN computation request.

In some implementations, the method 3300 further includes a step of generating a second plurality of weight control signals based on a second plurality of neural network weights. In some cases, the artificial neural network computation request further includes a second plurality of neural network weights. As previously discussed, in general, an ANN has one or more hidden layers in addition to the input and output layers. For ANN with two hidden layers, the second plurality of neural network weights may correspond, for example, to the connectivity between the first layer of the ANN and the second layer of the ANN. To process the first digital input vector through the two hidden layers of the ANN, the first digital input vector may first be processed according to the method 3300 up to step 3360, at which the result of processing the first digital input vector through the first hidden layer of the ANN is stored in the memory unit 120. The controller 110 then reconfigures the optoelectronic matrix multiplication unit 3220 to perform the matrix multiplication corresponding to the second plurality of neural network weights associated with the second hidden layer of the ANN. Once the optoelectronic matrix multiplication unit 3220 is reconfigured, the method 3300 may generate the plurality of modulator control signals based on the first transformed digital output vector, which generates an updated optical input vector corresponding to the output of the first hidden layer. The updated optical input vector is then processed by the reconfigured optoelectronic matrix multiplication unit 3220 which corresponds to the second hidden layer of the ANN. In general, the described steps can be repeated until the digital input vector has been processed through all hidden layers of the ANN.

In some implementations of the optoelectronic matrix multiplication unit 3220, the reconfiguration rate of the optoelectronic matrix multiplication unit 3220 may be significantly slower than the modulation rate of the modulator array 144. In such cases, the throughput of the ANN computation system 3200 may be adversely impacted by the amount of time spent in reconfiguring the optoelectronic matrix multiplication unit 3220 during which ANN computations cannot be performed. To mitigate the impact of the relatively slow reconfiguration time of the optoelectronic matrix multiplication unit 3220, batch processing techniques may be utilized in which two or more digital input vectors are propagated through the optoelectronic matrix multiplication unit 3220 without a configuration change to amortize the reconfiguration time over a larger number of digital input vectors.

Figure 34:
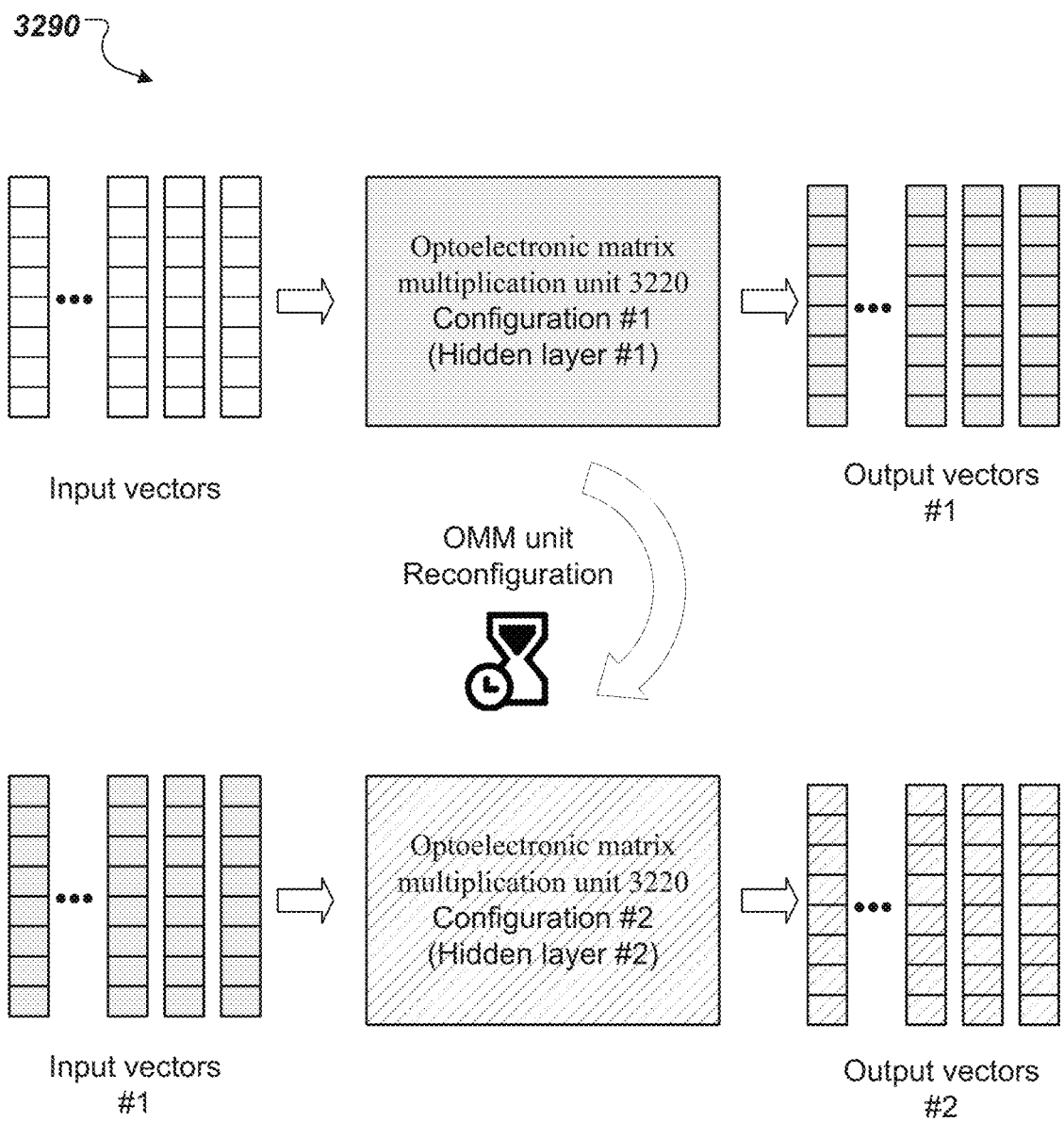
FIG. 34 is a diagram illustrating an aspect of the method of FIG. 33.

FIG. 34 shows a diagram 3290 illustrating an aspect of the method 3300 of FIG. 33. For an ANN with two hidden layers, instead of processing the first digital input vector through the first hidden layer, reconfiguring the optoelectronic matrix multiplication unit 3220 for the second hidden layer, processing the first digital input vector through the reconfigured optoelectronic matrix multiplication unit 3220, and repeating the same for the remaining digital input vectors, all digital input vectors of the input dataset can be first processed through the optoelectronic matrix multiplication unit 3220 configured for the first hidden layer (configuration #1) as shown in the upper portion of the diagram 3290. Once all digital input vectors have been processed by the optoelectronic matrix multiplication unit 3220 having configuration #1, the optoelectronic matrix multiplication unit 3220 is reconfigured into configuration #2, which correspond to the second hidden layer of the ANN. This reconfiguration can be significantly slower than the rate at which the input vectors can be processed by the optoelectronic matrix multiplication unit 3220. Once the optoelectronic matrix multiplication unit 3220 is reconfigured for the second hidden layer, the output vectors from the previous hidden layer can be processed by the optoelectronic matrix multiplication unit 3220 in a batch. For large input datasets having tens or hundreds of thousands of digital input vectors, the impact of the reconfiguration time may be reduced by approximately the same factor, which may substantially reduce the portion of the time spent by the ANN computation system 3200 in reconfiguration.

To implement batch processing, in some implementations, the method 3300 further includes steps of generating, through the DAC unit, a second plurality of modulator control signals based on the second digital input vector;

obtaining, from the ADC unit, a second plurality of digitized outputs corresponding to the output vector of the optoelectronic matrix multiplication unit, the second plurality of digitized outputs forming a second digital output vector; performing a nonlinear transformation on the second digital output vector to generate a second transformed digital output vector; and storing, in the memory unit, the second transformed digital output vector. The generating of the second plurality of modulator control signals may follow the step 3360, for example. Further, the ANN output of step 3370 in this case is now based on both the first transformed digital output vector and the second transformed digital output vector. The obtaining, performing, and storing steps are analogous to the steps 3340 through 3360.

The batch processing technique is one of several techniques for improving the throughput of the ANN computation system 3200. Another technique for improving the throughput of the ANN computation system 3200 is through parallel processing of multiple digital input vectors by utilizing wavelength division multiplexing (WDM). As previously discussed, WDM is a technique of simultaneously propagating multiple optical signals of different wavelengths through a common propagation channel, such as a waveguide of the optoelectronic matrix multiplication unit 3220. Unlike electrical signals, optical signals of different wavelengths can propagate through a common channel without affecting other optical signals of different wavelengths on the same channel. Further, optical signals can be added (multiplexed) or dropped (demultiplexed) from a common propagation channel using well-known structures such as optical multiplexers and demultiplexers.

In context of the ANN computation system 3200, multiple optical input vectors of different wavelengths can be independently generated, simultaneously propagated through the optical paths and optical processing components (e.g., optical amplitude modulators) of the optoelectronic matrix multiplication unit 3220, and independently processed by the electronic processing components (e.g., detectors and/or summation modules) to enhance the throughput of the ANN computation system 3200.

Figure 35A:
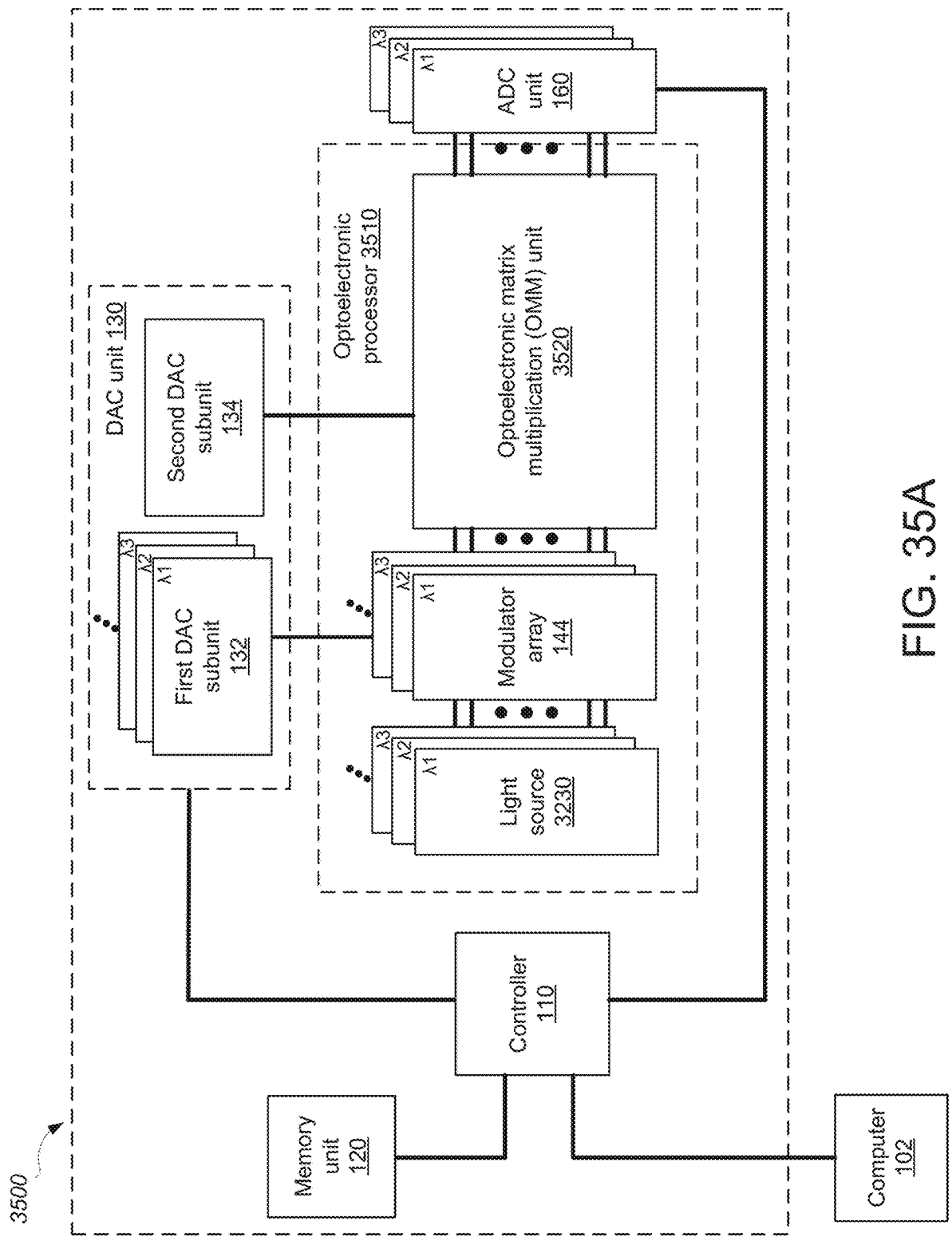
FIG. 35A is a schematic diagram of an example of a wavelength division multiplexed ANN computation system that uses an optoelectronic processor.

Referring to FIG. 35A, in some implementations, a wavelength division multiplexed (WDM) artificial neural network (ANN) computation system 3500 includes an optoelectronic processor 3510 that includes an optoelectronic matrix multiplication unit 3520 that has, e.g., the copying modules, multiplication modules, and summation modules shown in FIGS. 18 to 24D to enable processing non-coherent or low-coherent optical signals in performing matrix computations, in which the optical signals are encoded in multiple wavelengths. The WDM ANN computation system 3500 is similar to the ANN computation system 3200 except that the WDM technique is used in which, for some implementations of the ANN computation system 3500, the light source 3230 is configured to generate multiple wavelengths, such as λ1, λ2, and λ3, similar to the system 104 of FIG. 1F.

The multiple wavelengths may preferably be separated by a wavelength spacing that is sufficiently large to allow easy multiplexing and demultiplexing onto a common propagation channel. For example, the wavelength spacing greater than 0.5 nm, 1.0 nm, 2.0 nm, 3.0 nm, or 5.0 nm may allow simple multiplexing and demultiplexing. On the other hand, the range between the shortest wavelength and the longest wavelength of the multiple wavelengths ("WDM bandwidth") may preferably be sufficiently small such that the characteristics or performance of the optoelectronic matrix multiplication unit 3520 remain substantially the same across the multiple wavelengths. Optical components are typically dispersive, meaning that their optical characteristics change as a function of wavelength. For example, a power splitting ratio of an MZI may change over wavelength. However, by designing the optoelectronic matrix multiplication unit 3520 to have a sufficiently large operating wavelength window, and by limiting the wavelengths to be within that operating wavelength window, the output electronic vector output by the optoelectronic matrix multiplication unit 3520 corresponding to each wavelength may be a sufficiently accurate result of the matrix multiplication implemented by the optoelectronic matrix multiplication unit 3520. The operating wavelength window may be, for example, 1 nm, 2 nm, 3 nm, 4 nm, 5 nm, 10 nm, or 20 nm.

The modulator array 144 of the WDM ANN computation system 3500 includes banks of optical modulators configured to generate a plurality of optical input vectors, each of the banks corresponding to one of the multiple wavelengths and generating respective optical input vector having respective wavelength. For example, for a system with an optical input vector of length 32 and 3 wavelengths (e.g., λ1, λ2, and λ3), the modulator array 144 may have 3 banks of 32 modulators each. Further, the modulator array 144 also includes an optical multiplexer configured to combine the plurality of optical input vectors into a combined optical input vector including the plurality of wavelengths. For example, the optical multiplexer may combine the outputs of the three banks of modulators at three different wavelengths into a single propagation channel, such as a waveguide, for each element of the optical input vector. As such, returning to the example above, the combined optical input vector would have 32 optical signals, each signal containing 3 wavelengths.

Figure 35B:
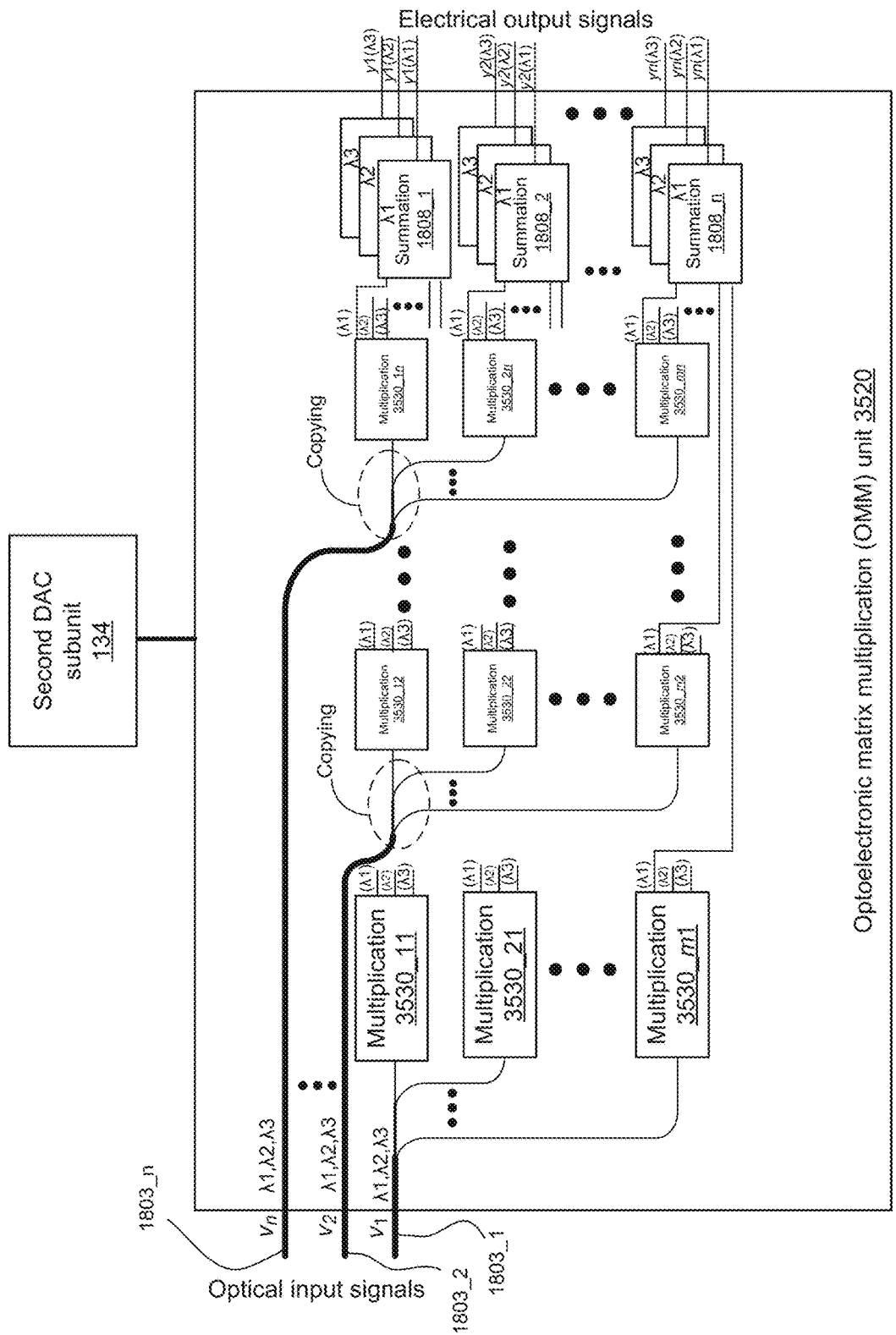
FIGS. 35B and 35C are schematic diagrams of examples of wavelength division multiplexed optoelectronic matrix multiplication units.

The optoelectronic processing components of the WDM ANN computation system 3500 are further configured to demultiplex the multiple wavelengths and to generate a plurality of demultiplexed output electric signals. Referring to FIG. 35B, the optoelectronic matrix multiplication unit 3520 includes optical paths 1803 configured to receive from the modulator array 144 the combined optical input vector including the plurality of wavelengths. For example, the optical path 1803_1 receives the combined optical input vector element $v_1$ at the wavelengths λ1, λ2, and λ3. Copies of the optical input vector element $v_1$ at the wavelengths λ1, λ2, and λ3 are provided to the multiplication modules 3530_11, 3530_21, . . . , and 3530_$m$1. In some implementations in which the multiplication modules 3530 output electrical signals, the multiplication module 3530_11 outputs three electrical signals representing $M_{11} \cdot v_1$ that correspond to the input vector element $v_1$ at the wavelengths λ1, λ2, and λ3. The output electrical signals of the multiplication module 3530_11 that correspond to the input vector element $v_1$ at the wavelengths λ1, λ2, and λ3 are shown as (λ1), (λ2), and (λ3), respectively. Similar notations apply to the outputs of the other multiplication modules. The multiplication module 3530_21 outputs three electrical signals representing $M_{21} \cdot v_1$ that correspond to the input vector element $v_1$ at the wavelengths λ1, λ2, and λ3, respectively. The multiplication module 3530_$m$1 outputs three electrical signals representing $M_{m1} \cdot v_1$ that correspond to the input vector element $v_1$ at the wavelengths λ1, λ2, and λ3.

Copies of the optical input vector element $v_2$ at the wavelengths λ1, λ2, and λ3 are provided to the multiplication module 3530_12, 3530_22, . . . , and 3530_$m$2. The multiplication module 3530_12 outputs three electrical signals representing $M_{12} \cdot v_2$ that correspond to the input vector element $v_2$ at the wavelengths λ1, λ2, and λ3. The multiplication module 3530_22 outputs three electrical signals representing $M_{22} \cdot v_2$ that correspond to the input vector element $v_2$ at the wavelengths λ1, λ2, and λ3. The multiplication module 3530_m2 outputs three electrical signals representing $M_{m2} \cdot v_2$ that correspond to the input vector element $v_m$ at the wavelengths λ1, λ2, and λ3.

Copies of the optical input vector element $v_n$ including the wavelengths λ1, λ2, and λ3 are provided to the multiplication module 3530_1n, 3530_2n, . . . , and 3530_mn. The multiplication module 3530_1n outputs three electrical signals representing $M_{2n} \cdot v_n$ that correspond to the input vector element $v_n$ at the wavelengths λ1, λ2, and λ3. The multiplication module 3530_2n outputs three electrical signals representing $M_{2n} \cdot v_n$ that correspond to the input vector element $v_n$ at the wavelengths λ1, λ2, and λ3. The multiplication module 3530_mn outputs three electrical signals representing $M_{mn} \cdot v_n$ that correspond to the input vector element $v_n$ at the wavelengths λ1, λ2, and λ3, and so forth.

For example, each of the multiplication module 3530 may include a demultiplexer configured to demultiplex the three wavelengths contained in each of the 32 signals of the multi-wavelength optical vector, and route the 3 single-wavelength optical output vectors to three banks of photodetectors (e.g., photodetectors 2012, 2016 (FIG. 20B) or 2042, 2046 (FIG. 20C)) coupled to three banks of op-amps or transimpedance amplifiers (e.g., op-amps 2030 (FIG. 20B) or 2050 (FIG. 20C)).

Three banks of summation modules 1808 receive outputs from the multiplication modules 3530 and generate sums y that correspond to the input vector at the various wavelengths, For example, three summation modules 1808_1 receive the outputs of the multiplication modules 3530_11, 3530_12, . . . , 3530_1n and generate sums $y_1(\lambda 1)$, $y_1(\lambda 2)$, $y_1(\lambda 2)$ that correspond to the input vector element $v_1$ at the wavelengths λ1, λ2, and λ3, respectively, in which at each wavelength the sum $y_1$ is equal to $M_{11}v_1 + M_{12}v_2 + \ldots + M_{1n}v_n$. Three summation modules 1808_2 receive the outputs of the multiplication modules 3530_21, 3530_22, . . . , 3530_2n, and generates sums $y_2(\lambda 1)$, $y_2(\lambda 2)$, $y_2(\lambda 3)$ that correspond to the input vector element $v_2$ at the wavelengths λ1, λ2, and λ3, respectively, in which at each wavelength the sum $y_2$ is equal to $M_{21}v_1 + M_{22}v_2 + \ldots + M_{2n}v_n$. Three summation modules 1808_n receive the outputs of the multiplication modules 1806_m1, 1806_m2, . . . , 1806_mn, and generates sums $y_n(\lambda 1)$, $y_n(\lambda 2)$, $y_n(\lambda 3)$ that correspond to the input vector element $v_n$ at the wavelengths λ1, λ2, and λ3, respectively, in which at each wavelength the sum $y_n$ is equal to $M_{m1}v_1 M_{m2}v_2 + \ldots + M_{mn}v_n$.

Referring back to FIG. 35A, the ADC unit 160 of the WDM ANN computation system 3500 includes banks of ADCs configured to convert the plurality of demultiplexed output voltages of the optoelectronic matrix multiplication unit 3520. Each of the banks corresponds to one of the multiple wavelengths, and generates respective digitized demultiplexed outputs. For example, the banks of ADCs 160 may be coupled to the banks of the summation modules 1808.

The controller 110 may implement a method analogous to the method 3300 (FIG. 33) but expanded to support the multi-wavelength operation. For example, the method may include the steps of obtaining, from the ADC unit 160, a plurality of digitized demultiplexed outputs, the plurality of digitized demultiplexed outputs forming a plurality of first digital output vectors, in which each of the plurality of first digital output vectors corresponds to one of the plurality of wavelengths; performing a nonlinear transformation on each of the plurality of first digital output vectors to generate a plurality of transformed first digital output vectors; and storing, in the memory unit, the plurality of transformed first digital output vectors.

In some cases, the ANN may be specifically designed, and the digital input vectors may be specifically formed such that the multi-wavelength products of the multiplication module 3530 can be added without demultiplexing. In such cases, the multiplication module 3530 may be a wavelength-insensitive multiplication module that does not demultiplex the multiple wavelengths of the multi-wavelength products. As such, each of the photodetectors of the multiplication module 3530 effectively sums the multiple wavelengths of an optical signal into a single photocurrent, and each of the voltages output by the multiplication module 3530 corresponds to a sum of the product of a vector element and a matrix element for the multiple wavelengths. The summation module 1808 (only one bank is needed) outputs an element-by-element sum of the matrix multiplication results of the multiple digital input vectors.

Figure 35C:
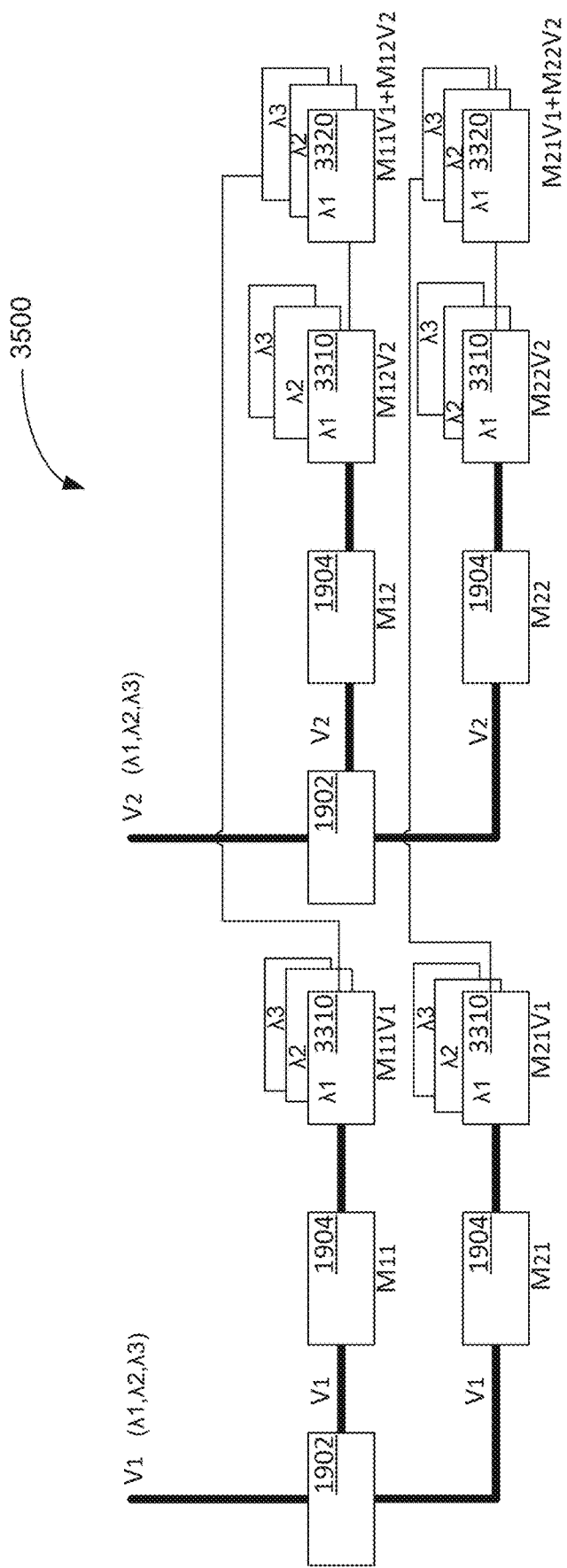

FIG. 35C shows an example of a system configuration 3500 for an implementation of the wave division multiplexed optoelectronic matrix multiplication unit 3520 for performing vector-matrix multiplication using a 2×2-element matrix, with the summation operation performed in the electrical domain. In this example, the input vector is $$v = \begin{bmatrix} v_1 \\ v_2 \end{bmatrix},$$

and the matrix is $$\overline{\overline{M}} = \begin{bmatrix} M_{11} & M_{12} \\ M_{21} & M_{22} \end{bmatrix}.$$

In this example, the input vector has multiple wavelengths λ1, λ2, and λ3, and each of the elements of the input vector is encoded on a different optical signal. Two different copying modules 1902 perform an optical copying operation to split the computation over different paths (e.g., an "upper" path and a "lower" path). There are four multiplication modules 1904 that each multiply by a different matrix element using optical amplitude modulation. The output of each multiplication module 1904 is provided to a demultiplexer and a bank of optical detection modules 3310 that convert a wavelength division multiplexed optical signal to electrical signals in the form of electrical currents associated with the wavelengths λ1, λ2, and λ3. Both upper paths of the different input vector elements are combined using a bank of summation modules 3320 associated with the wavelengths λ1, λ2, and λ3, and both lower paths of the different input vector elements are combined using a bank of summation modules 3320 associated with the wavelengths λ1, λ2, and λ3, in which the summation modules 3320 perform summation in the electrical domain. Thus, each of the elements of the output vector for each wavelength is encoded on a different electrical signal. As shown in FIG. 35C, as the computation progresses, each component of an output vector is incrementally generated to yield the following results for the upper and lower paths, respectively, for each wavelength.

$M_{11}v_1 + M_{12}v_2$ $M_{21}v_1 + M_{22}v_2$

The system configuration 3500 can be implemented using any of a variety of optoelectronic technologies. In some implementations, there is a common substrate (e.g., a semiconductor such as silicon), which may be able to support both integrated optics components and electronic components. The optical paths can be implemented in waveguide structures that have a material with a higher optical index surrounded by a material with a lower optical index defining a waveguide for propagating an optical wave that carries an optical signal. The electrical paths can be implemented by a conducting material for propagating an electrical current that carries an electrical signal. (In FIG. 35C, the thicknesses of the lines representing paths are used to differentiate between optical paths, represented by thicker lines, and electrical paths, represented by thinner lines or dashed lines.) Optical devices such as splitters and optical amplitude modulators, and electrical devices such as photodetectors and operational amplifiers (op-amps) can be fabricated on the common substrate. Alternatively, different devices having different substrates can be used to implement different portions of the system, and those devices can be in communication over communication channels. For example, optical fibers can be used to provide communication channels to send optical signals among multiple devices used to implement the overall system. Those optical signals may represent different subsets of an input vector that is provided when performing vector-matrix multiplication, and/or different subsets of intermediate results that are computed when performing vector-matrix multiplication, as described in more detail below.

So far, the nonlinear transformations of the weighted sums performed as part of the ANN computation was performed in the digital domain by the controller 110. In some cases, the nonlinear transformations may be computationally intensive or power hungry, add significantly to the complexity of the controller 110, or otherwise limit the performance of the ANN computation system 3200 (FIG. 32A) in terms of throughput or power efficiency. As such, in some implementations of the ANN computation system, the nonlinear transformation may be performed in the analog domain through analog electronics.

Figure 36:
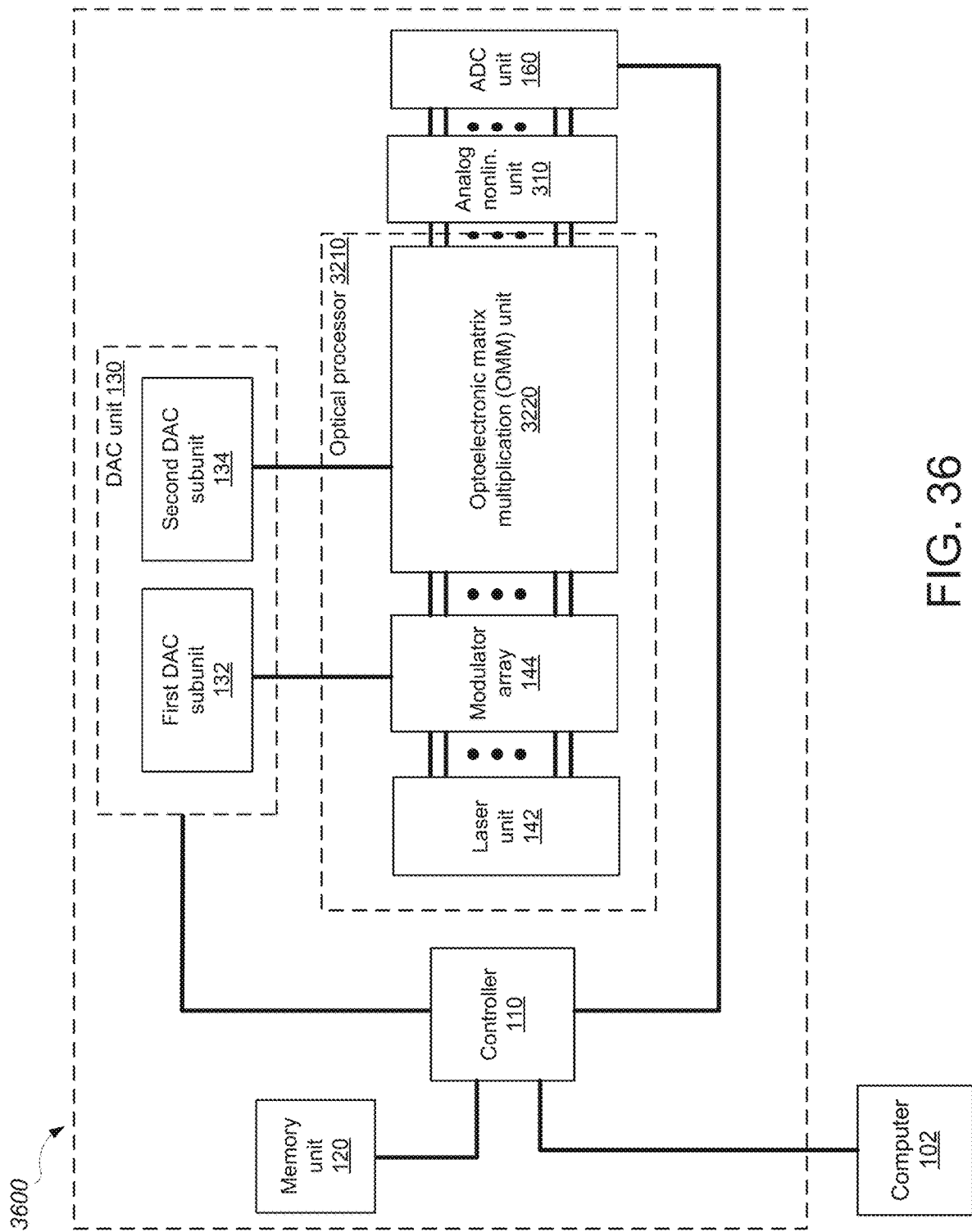
FIGS. 36 and 37 are schematic diagrams of examples of ANN computation systems that use optoelectronic matrix multiplication units.

FIG. 36 shows a schematic diagram of an example of an ANN computation system 3600. The ANN computation system 3600 is similar to the ANN computation system 3200, but differs in that an analog nonlinearity unit 310 has been added. The analog nonlinearity unit 310 is arranged between the optoelectronic matrix multiplication unit 3220 and the ADC unit 160. The analog nonlinearity unit 310 is configured to receive the output voltages from the optoelectronic matrix multiplication unit 3220, apply a nonlinear transfer function, and output transformed output voltages to the ADC unit 160.

As the ADC unit 160 receives voltages that have been nonlinearly transformed by the analog nonlinearity unit 310, the controller 110 may obtain, from the ADC unit 160, transformed digitized output voltages corresponding to the transformed output voltages. Because the digitized output voltages obtained from the ADC unit 160 have already been nonlinearly transformed ("activated"), the nonlinear transformation step by the controller 110 can be omitted, reducing the computation burden by the controller 110. The first transformed voltages obtained directly from the ADC unit 160 may then be stored as the first transformed digital output vector in the memory unit 120.

The analog nonlinearity unit 310 may be implemented in various ways, as discussed above for the analog nonlinearity unit 310 of FIG. 3A. Use of the analog nonlinearity unit 310 may improve the performance, such as throughput or power efficiency, of the ANN computation system 3600 by reducing a step to be performed in the digital domain. The moving of the nonlinear transformation step out of the digital domain may allow additional flexibility and improvements in the operation of the ANN computation systems. For example, in a recurrent neural network, the output of the optoelectronic matrix multiplication unit 3220 is activated, and recirculated back to the input of the optoelectronic matrix multiplication unit 3220. The activation is performed by the controller 110 in the ANN computation system 3200, which necessitates digitizing the output voltages of the optoelectronic matrix multiplication unit 3220 at every pass through the optoelectronic matrix multiplication unit 3220. However, because the activation is now performed prior to digitization by the ADC unit 160, it may be possible to reduce the number of ADC conversions needed in performing recurrent neural network computations.

In some implementations, the analog nonlinearity unit 310 may be integrated into the ADC unit 160 as a nonlinear ADC unit. For example, the nonlinear ADC unit can be a linear ADC unit with a nonlinear lookup table that maps the linear digitized outputs of the linear ADC unit into desired nonlinearly transformed digitized outputs.

Figure 37:
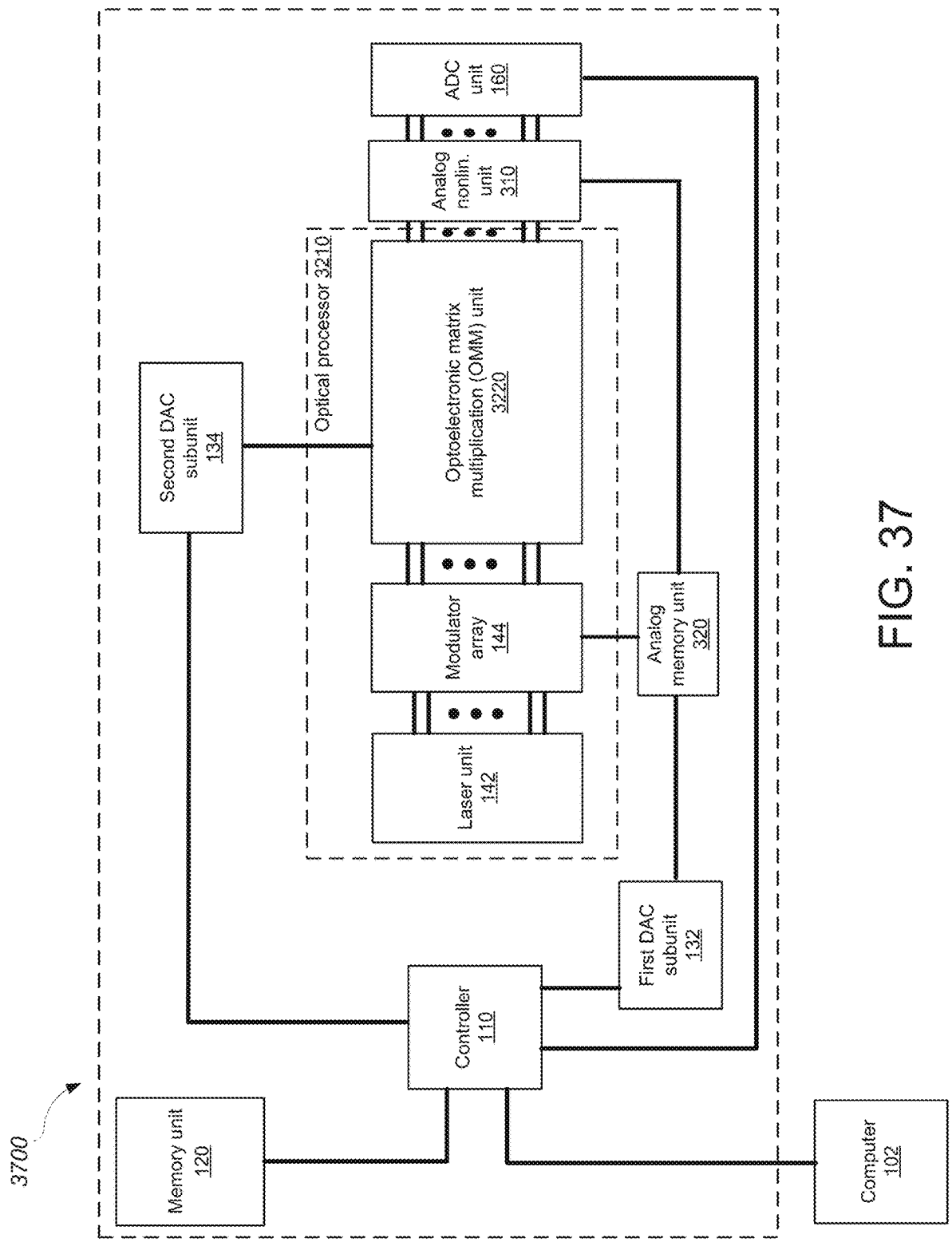

FIG. 37 shows a schematic diagram of an example of an ANN computation system 3700. The ANN computation system 3700 is similar to the system 3600 of FIG. 36, but differs in that it further includes an analog memory unit 320. The analog memory unit 320 is coupled to the DAC unit 130 (e.g., through the first DAC subunit 132), the modulator array 144, and the analog nonlinearity unit 310. The analog memory unit 320 includes a multiplexer that has a first input coupled to the first DAC subunit 132 and a second input coupled to the analog nonlinearity unit 310. This allows the analog memory unit 320 to receive signals from either the first DAC subunit 132 or the analog nonlinearity unit 310. The analog memory unit 320 is configured to store analog voltages and to output the stored analog voltages. The analog memory unit 320 may be implemented in various ways, as discussed above for the analog memory unit 320 of FIG. 3B.

The operation of the ANN computation system 3700 will now be described. The first plurality of modulator control signals output by the DAC unit 130 (e.g., by the first DAC subunit 132) is first input to the modulator array 144 through the analog memory unit 320. At this step, the analog memory unit 320 may simply pass on or buffer the first plurality of modulator control signals. The modulator array 144 generates an optical input vector based on the first plurality of modulator control signals, which propagates through the optoelectronic matrix multiplication unit 3220. The output voltages of the optoelectronic matrix multiplication unit 3220 are nonlinearly transformed by the analog nonlinearity unit 310. At this point, instead of being digitized by the ADC unit 160, the output voltages of the analog nonlinearity unit 310 are stored by the analog memory unit 320, which are then output to the modulator array 144 to be converted into the next optical input vector to be propagated through the optoelectronic matrix multiplication unit 3220. This recurrent processing can be performed for a preset amount of time or a preset number of cycles, under the control of the controller 110. Once the recurrent processing is complete for a given digital input vector, the transformed output voltages of the analog nonlinearity unit 310 are converted by the ADC unit 160.

The advantages of using the analog memory unit 320 in the system 3700 are similar to those of using the analog memory unit 320 in the system 302 of FIG. 3B. Similarly, the execution of the recurrent neural network computation using the system 3700 can be similar to that of the system 302 of FIG. 3B.

Figure 38:
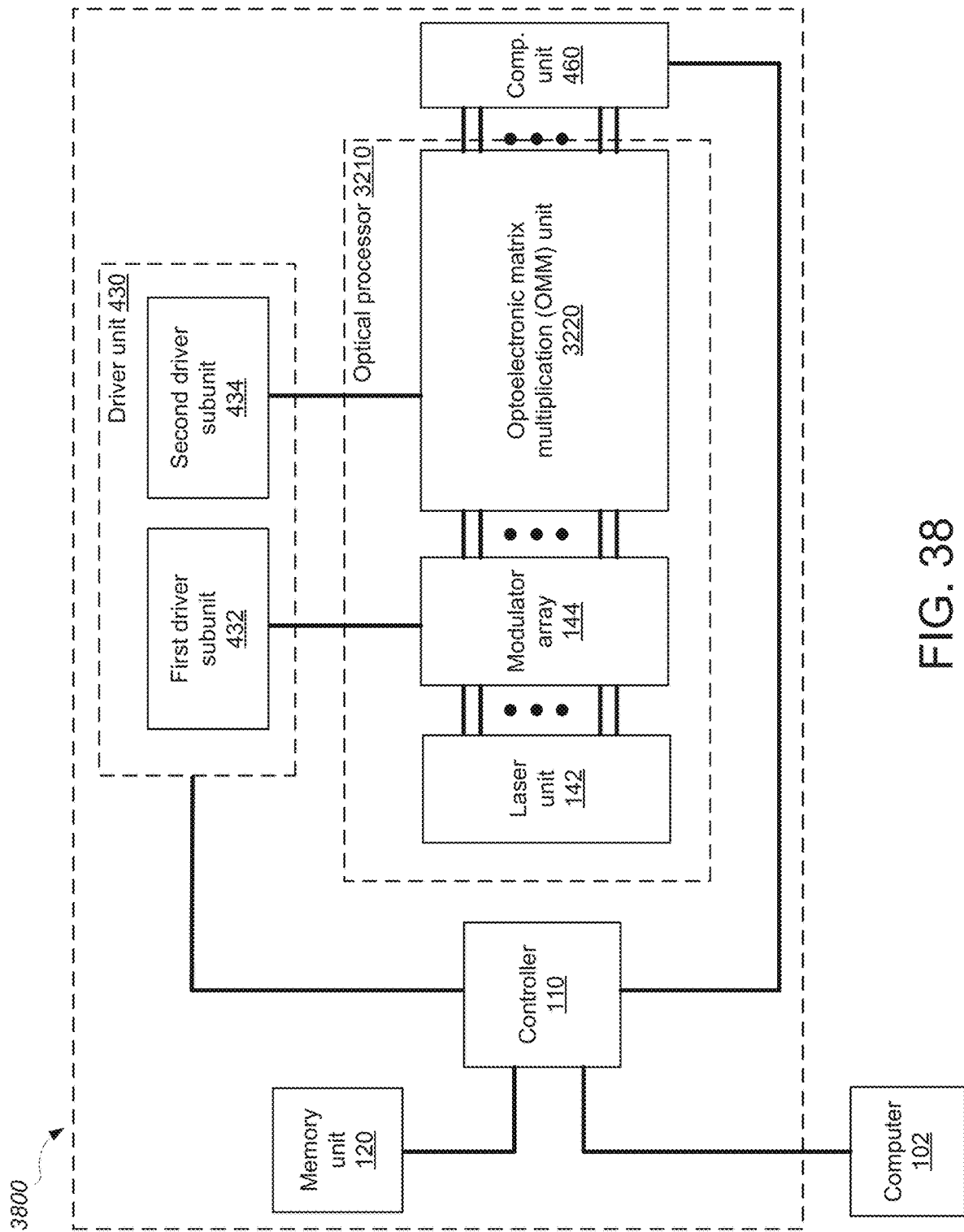
FIG. 38 is a schematic diagram of an example of an artificial neural network computation system with 1-bit internal resolution, in which the system uses an optoelectronic matrix multiplication unit.

As discussed above for the system 400 of FIG. 4A, there are advantages (e.g., reduced power consumption) by using an ANN computation system that internally operates at a bit resolution lower than the resolution of the input dataset while maintaining the resolution of the ANN computation output. Referring to FIG. 38, a schematic diagram of an example of an artificial neural network (ANN) computation system 3800 with 1-bit internal resolution is shown. The ANN computation system 3800 is similar to the ANN computation system 3200 (FIG. 32A), but differs in that the DAC unit 130 is now replaced by a driver unit 430, and the ADC unit 160 is now replaced by a comparator unit 460.

The driver unit 430 and the comparator unit 460 in the system 3800 of FIG. 38 operate in a manner similar to the driver unit 430 and the comparator 460 in the system 400 of FIG. 4A. A mathematical representation of the operation of the ANN computation system 3800 in FIG. 38 is similar to mathematical representation of the operation of the ANN computation system 400 shown in FIG. 4A.

The ANN computation system 3800 performs ANN computations by performing a series of matrix multiplication of 1-bit vectors followed by summation of the individual matrix multiplication result. Using the example shown in FIG. 4A, each of the decomposed input vectors $V_{bit0}$ through $V_{bit3}$ may be multiplied with the matrix U by generating, through the driver unit 430, a sequence of 4 1-bit modulator control signals corresponding to the 4 1-bit input vectors. This in turn generates a sequence of 4 1-bit optical input vectors, which is processed by the optoelectronic matrix multiplication unit 3220 configured through the driver unit 430 to implement matrix multiplication of matrix U. The controller 110 may then obtain, from the comparator unit 460, a sequence of 4 digitized 1-bit optical outputs corresponding to the sequence of the 4 1-bit modulator control signals.

In this case where a 4-bit vector is decomposed into 4 1-bit vectors, each vector should be processed by the ANN computation system 3800 at four times the speed at which a single 4-bit vector can be processed by other ANN computation systems, such as the system 3200 (FIG. 32A), to maintain the same effective ANN computation throughput. Such increased internal processing speed may be viewed as time-division multiplexing of the 4 1-bit vectors into a single timeslot for processing a 4-bit vector. The needed increase in the processing speed may be achieved at least in part by the increased operating speeds of the driver unit 430 and the comparator unit 460 relative to the DAC unit 130 and the ADC unit 160, as a decrease in the resolution of a signal conversion process typically leads to an increase in the rate of signal conversion that can be achieved.

In this example, although the signal conversion rates are increased by a factor of four in 1-bit operations, the resulting power consumption may be significantly reduced relative to 4-bit operations. As previously described, power consumption of signal conversion processes typically scale exponentially with the bit resolution, while scaling linearly with the conversion rate. As such, a 16 fold reduction in power per conversion may result from the 4 fold reduction in the bit resolution, followed by a 4 fold increase in power from the increased conversion rate. Overall, a 4 fold reduction in operating power may be achieved by the ANN computation system 3800 over, for example, the ANN computation system 3200 while maintaining the same effective ANN computation throughput.

The controller 110 may then construct a 4-bit digital output vector from the 4 digitized 1-bit optical outputs by multiplying each of the digitized 1-bit optical outputs with respective weights of $2^{\wedge}0$ through $2^{\wedge}3$. Once the 4-bit digital output vector is constructed, the ANN computation may proceed by performing a nonlinear transformation on the constructed 4-bit digital output vector to generate a transformed 4-bit digital output vector; and storing, in the memory unit 120, the transformed 4-bit digital output vector.

Alternatively, or additionally, in some implementations, each of the 4 digitized 1-bit optical outputs may be nonlinearly transformed. For example, a step-function nonlinear function may be used for the nonlinear transformation. Transformed 4-bit digital output vector may then be constructed from the nonlinearly transformed digitized 1-bit optical outputs.

While a separate ANN computation system 3800 has been illustrated and described, in general, the ANN computation system 3200 of FIG. 32A may be designed to implement functionalities analogous to that of the ANN computation system 3800. For example, the DAC unit 130 may include a 1-bit DAC subunit configured to generate 1-bit modulator control signals, and the ADC unit 160 may be designed to have a resolution of 1-bit. Such a 1-bit ADC may be analogous to, or effectively equivalent to, a comparator.

Further, while operation of an ANN computation system with 1-bit internal resolution has been described, in general, the internal resolution of an ANN computation system may be reduced to an intermediate level lower than the N-bit resolution of the input dataset. For example, the internal resolution may be reduced to $2^{\wedge}Y$ bits, where Y is an integer greater than or equal to 0.

A variety of alternative system configurations or signal processing techniques can be used with various implementations of the different systems, subsystems, and modules described herein.

In some embodiments, it may be useful for some or all of the VMM subsystems to be replaceable with alternative subsystems, including subsystems that use different implementations of the various copying modules, multiplication modules, and/or summation modules. For example, a VMM subsystem can include the optical copying modules described herein and the electrical summation modules described herein, but the multiplication modules can be replaced with a subsystem that performs the multiplication operations in the electrical domain instead of the optoelectronic domain. In such examples, the array of optical amplitude modulators can be replaced by an array of detectors to convert optical signals to electrical signals, followed by an electronic subsystem (e.g., an ASIC, processor, or SoC). Optionally, if optical signal routing is to be used to the summation modules that are configured to detect optical signals, the electronic subsystem can include electrical to optical conversion, for example, using an array of electrically-modulated optical sources.

In some embodiments, it may be useful to be able to use a single wavelength for some or all of the optical signals being used for some or all of the VMM computations. Alternatively, in some embodiments, to help reduce the number of optical input ports that may be required, an input port can receive a multiplexed optical signal that has different values encoded on different optical waves at different wavelengths. Those optical waves can then be separated at an appropriate location in the system, depending on whether any of the copying modules, multiplication modules, and/or summation modules are configured to operate on multiple wavelengths. But, even in the multi-wavelength embodiments, it may be useful to use the same wavelength for different subsets of optical signals, for example, used in the same VMM subsystem.

In some embodiments, an accumulator can be used to enable a time domain encoding of the optical and electrical signals received by the various modules, alleviating the need for the electronic circuitry to operate effectively over a large number of different power levels. For example, a signal that is encoded using binary (on-off) amplitude modulation with a particular duty cycle over N time slots per symbol, can be converted into a signal that has N amplitude levels per symbol after that signal is passed through the accumulator (an analog electronic accumulator that integrates the current or voltage of an electrical signal). So, if the optical devices (e.g., the phase modulators in the optical amplitude modulators) are capable of operating at a symbol bandwidth B, they can be operated instead at a symbol bandwidth B/100, where each symbol value uses N=100 time slots. An integrated amplitude of 50% has a 50% duty cycle (e.g., the first 50 time slots at the non-zero "on" level, followed by 50 time slots at the zero, or near zero, "off" level), whereas an integrated amplitude of 10% has a 10% duty cycle (e.g., the first 10 time slots at the non-zero "on" level, followed by 90 time slots at zero "off" level). In the examples described herein, such an accumulator can be positioned on the path of each electrical signal at any location within the VMM subsystem that is consistent for each electrical signal, such as for example, before the summation modules for all electrical signals in that VMM subsystem or after the summation modules for all electrical signals in that VMM subsystem. The VMM subsystem may also be configured such that there are no significant relative time shifts between different electrical signals preserving alignment of the different symbols.

Figure 40:
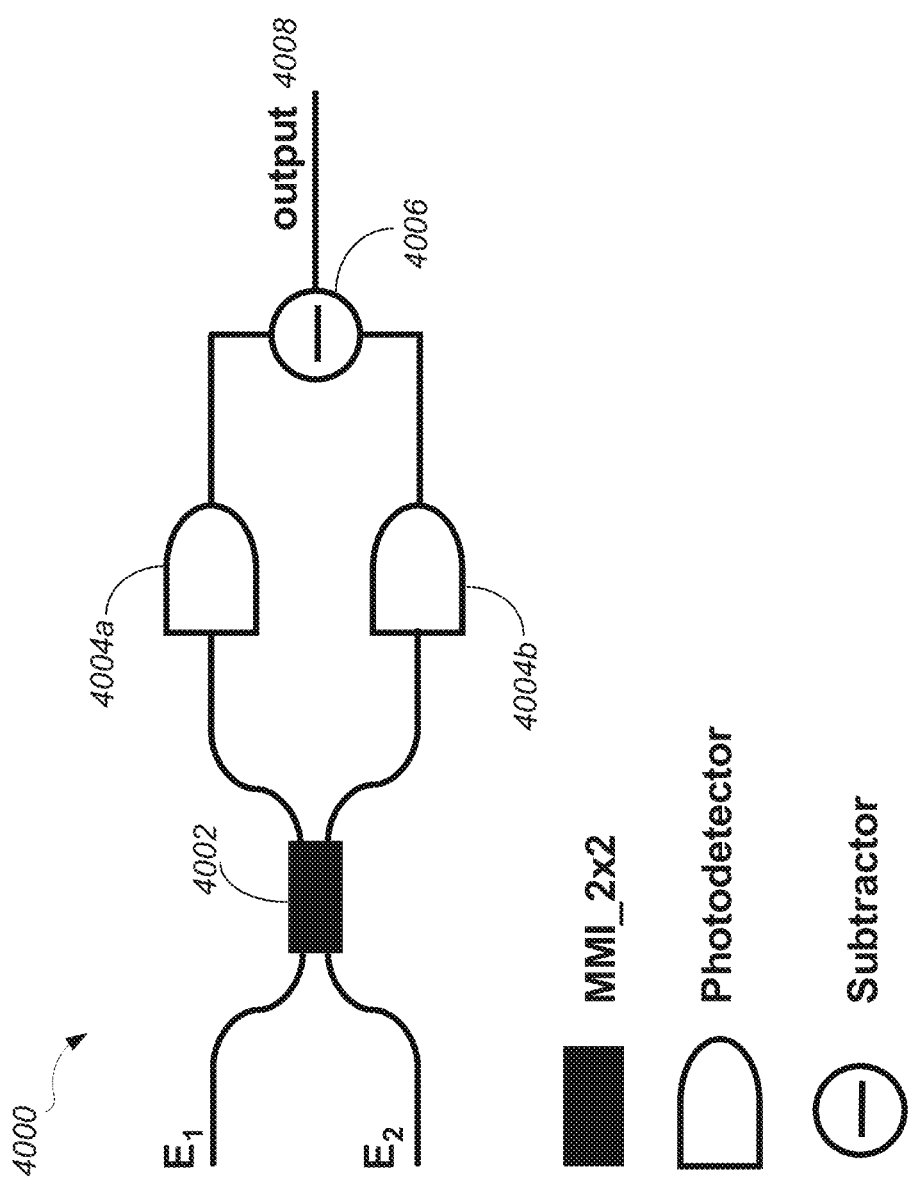
FIG. 40 is a schematic diagram of a homodyne detector.

Referring to FIG. 40, in some implementations, homodyne detection can be used to obtain the phase and the amplitude of the modulated signal. A homodyne detector 4000 includes a beam splitter 4002 that includes a 2×2 multi-mode interference (MMI) coupler, two photodetectors 4004a and 4004b, and a subtractor 4006. The beam splitter 4002 receives input signals E1 and E2, the outputs of the beam splitter 4002 are detected by the photodetectors 4004a and 4004b. For example, the input signal E1 can be the signal to be detected, and the input signal E2 can be generated by a local oscillator that has a constant laser power. The local oscillator signal E2 is mixed with the input signal E1 by the beam splitter 4002 before the signals are detected by the photodetectors 4004a and 4004b. The subtractor 4006 outputs the difference between the outputs of the photodetectors 4004a and 4004b. The output 4008 of the subtractor 4006 is proportional to $|E_1||E_2|\sin(\theta)$, in which $|E_1|$ and $|E_2|$ are the amplitudes of two input optical fields, $\theta$ is their relative phase. Since the output is related to the product of two optical fields, it can detect an extremely weak optical signal, even in single-photon level.

For example, the homodyne detector 4000 can be used in the systems shown in FIGS. 1A, 1F, 3A-4A, 5, 7, 9, 18-24E, 26-32B, and 35A-38. The homodyne detector 4000 provides gain on the signal and hence better signal noise ratio. For coherent systems, the homodyne detector 4000 provides the added benefit of revealing the phase information of the signal via the polarity of the detection result.

In the example of FIG. 19B, the system 1920 includes a 2×2-element matrix, in which two input vector elements are encoded on two optical signals using two different respective wavelengths $\lambda_1$ and $\lambda_2$. The two optical signals can be provided to the system 1920 using, e.g., two optical fibers. For example, a system that performs matrix processing on 4×4 matrices can receive four input optical signals carried on four optical fibers. Although more optical fibers may be used to carry more input optical signals for systems that process larger matrices, because the coupling between an optical fiber and an optoelectronics chip takes up considerable space, it is difficult to couple a large number of optical fibers to an optoelectronics chip.

A way to reduce the number of optical fibers required to carry optical signals to an optoelectronics chip is to use wavelength division multiplexing. Multiple optical signals having different wavelengths can be multiplexed and transmitted using a single optical fiber. For example, referring to FIG. 41, in a computation system 4100, a first light signal 4102 having a wavelength $\lambda_1$ is modulated by a first modulator 4104 to produce a first modulated optical signal 4120 representing a first input vector element V1. A second light signal 4106 having a wavelength $\lambda_2$ is modulated by a second modulator 4108 to produce a second modulated optical signal 4122 representing a second input vector element V2. The first and second modulated optical signals are combined by a multiplexer 4110 to produce a wavelength division multiplexed signal that is transmitted via an optical fiber 4112 to an optoelectronics chip 4114 that includes a plurality of matrix multiplication modules, e.g., 4116a, 4116b, 4116c, and 4116d (collectively referenced as 4116), and 4118a, 4118b, 4118c, and 4118d (collectively referenced as 4118).

Inside the optoelectronics chip 4114, the wavelength division multiplexed signal is demultiplexed by a demultiplexer 4118 to separate the optical signals 4120 and 4122. In this example, the optical signal 4120 is copied by a copying module 4124 to produce copies of optical signals that are sent to the matrix multiplication modules 4116a and 4118a. The optical signal 4122 is copied by a copying module 4126 to produce copies of optical signals that are sent to the matrix multiplication modules 4116b and 4118b. The outputs of the matrix multiplication units 4116a and 4116b are combined using an optical coupler 4120a, and the combined signal is detected by a photodetector 4122a.

A third light signal 4124 having a wavelength $\lambda_1$ is modulated by a third modulator 4128 to produce a third modulated optical signal 4132 representing a third input vector element V3. A fourth light signal 4126 having a wavelength $\lambda_2$ is modulated by a fourth modulator 4130 to produce a fourth modulated optical signal 4134 representing a fourth input vector element V4. The third and fourth modulated optical signals are combined by a multiplexer 4136 to produce a wavelength division multiplexed signal that is transmitted via an optical fiber 4138 to the optoelectronics chip 4114.

Inside the optoelectronics chip 4114, the wavelength division multiplexed signal provided by the optical fiber 4138 is demultiplexed by a demultiplexer 4140 to separate the optical signals 4132 and 4134. In this example, the optical signal 4132 is copied by a copying module 4142 to produce copies of optical signals that are sent to the matrix multiplication modules 4116c and 4118c. The optical signal 4134 is copied by a copying module 4144 to produce copies of optical signals that are sent to the matrix multiplication modules 4116d and 4118d. The outputs of the matrix multiplication units 4116c and 4116d are combined using an optical coupler 4120b, and the combined signal is detected by a photodetector 4122b. The outputs of the matrix multiplication units 4118*a* and 4118*b* are combined using an optical coupler, and the combined signal is detected by a photodetector. The outputs of the matrix multiplication units 4118*c* and 4118*d* are combined using an optical coupler, and the combined signal is detected by a photodetector.

In some examples, a multiplexer can multiplex optical signals having three or more (e.g., 10, or 100) wavelengths to produce a wavelength division multiplexed signal that is transported by a single optical fiber, and a demultiplexer inside the optoelectronics chip can demultiplex the wavelength division multiplexed signal to separate the signals having different wavelengths. This allows more optical signals be transmitted to the optoelectronics chip in parallel through the optical fibers, increasing the data processing throughput of the optoelectronics chip.

The digital controller (e.g., for controlling the components shown in FIG. 24E) and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Although the present invention is defined in the attached claims, it should be understood that the present invention can also be defined in accordance with the following embodiments:

Embodiment 1: A system, comprising:
a memory unit configured to store a dataset and a plurality of neural network weights;
a digital-to-analog converter (DAC) unit configured to generate a plurality of modulator control signals and to generate a plurality of weight control signals;
an optical processor comprising:
a laser unit configured to generate a plurality of light outputs;
a plurality of optical modulators coupled to the laser unit and the DAC unit, the plurality of optical modulators being configured to generate an optical input vector by modulating the plurality of light outputs generated by the laser unit based on the plurality of modulator control signals;
an optical matrix multiplication unit coupled to the plurality of optical modulators and the DAC unit, the optical matrix multiplication unit being configured to transform the optical input vector into an optical output vector based on the plurality of weight control signals; and
a photodetection unit coupled to the optical matrix multiplication unit and configured to generate a plurality of output voltages corresponding to the optical output vector;
an analog-to-digital conversion (ADC) unit coupled to the photodetection unit and configured to convert the plurality of output voltages into a plurality of digitized optical outputs;
a controller comprising integrated circuitry configured to perform operations comprising:
receiving, from a computer, an artificial neural network computation request comprising an input dataset and a first plurality of neural network weights, wherein the input dataset comprises a first digital input vector;
storing, in the memory unit, the input dataset and the first plurality of neural network weights; and
generating, through the DAC unit, a first plurality of modulator control signals based on the first digital input vector and a first plurality of weight control signals based on the first plurality of neural network weights.

Embodiment 2: The system of embodiment 1, wherein the operations further comprise:
obtaining, from the ADC unit, a first plurality of digitized optical outputs corresponding to the optical output vector of the optical matrix multiplication unit, the first plurality of digitized optical outputs forming a first digital output vector;
performing a nonlinear transformation on the first digital output vector to generate a first transformed digital output vector; and
storing, in the memory unit, the first transformed digital output vector.

Embodiment 3: The system of embodiment 2, wherein the system has a first loop period defined as a time elapsed between the step of storing, in the memory unit, the input dataset and the first plurality of neural network weights, and the step of storing, in the memory unit, the first transformed digital output vector, and wherein the first loop period is less than or equal to 1 ns.

Embodiment 4: The system of embodiment 2, wherein the operations further comprise:

outputting an artificial neural network output generated based on the first transformed digital output vector.

Embodiment 5: The system of embodiment 2, wherein the operations further comprise:

generating, through the DAC unit, a second plurality of modulator control signals based on the first transformed digital output vector.

Embodiment 6: The system of embodiment 2, wherein the artificial neural network computation request further comprises a second plurality of neural network weights, and wherein the operations further comprise:

based on the obtaining of the first plurality of digitized optical outputs, generating, through the DAC unit, a second plurality of weight control signals based on the second plurality of neural network weights.

Embodiment 7: The system of embodiment 6, wherein the first and second pluralities of neural network weights correspond to different layers of an artificial neural network.

Embodiment 8: The system of embodiment 2, wherein the input dataset further comprises a second digital input vector, and wherein the operations further comprise:

generating, through the DAC unit, a second plurality of modulator control signals based on the second digital input vector;

obtaining, from the ADC unit, a second plurality of digitized optical outputs corresponding to the optical output vector of the optical matrix multiplication unit, the second plurality of digitized optical outputs forming a second digital output vector;

performing a nonlinear transformation on the second digital output vector to generate a second transformed digital output vector;

storing, in the memory unit, the second transformed digital output vector; and outputting an artificial neural network output generated based on the first transformed digital output vector and the second transformed digital output vector, wherein the optical output vector of the optical matrix multiplication unit results from a second optical input vector generated based on the second plurality of modulator control signals that is transformed by the optical matrix multiplication unit based on the first-mentioned plurality of weight control signals.

Embodiment 9: The system of embodiment 1, further comprising:

an analog nonlinearity unit arranged between the photodetection unit and the ADC unit, the analog nonlinearity unit being configured to receive the plurality of output voltages from the photodetection unit, apply a nonlinear transfer function, and output a plurality of transformed output voltages to the ADC unit, wherein the operations further comprise:

obtaining, from the ADC unit, a first plurality of transformed digitized output voltages corresponding to the plurality of transformed output voltages, first plurality of transformed digitized output voltages forming a first transformed digital output vector; and storing, in the memory unit, the first transformed digital output vector.

Embodiment 10: The system of embodiment 1, wherein the integrated circuitry of the controller is configured to generate the first plurality of modulator control signals at a rate greater than or equal to 8 GHz.

Embodiment 11: The system of embodiment 1, further comprising:

an analog memory unit arranged between the DAC unit and the plurality of optical modulators, the analog memory unit being configured to store analog voltages and to output the stored analog voltages; and an analog nonlinearity unit arranged between the photodetection unit and the ADC unit, the analog nonlinearity unit being configured to receive the plurality of output voltages from the photodetection unit, apply a nonlinear transfer function, and output a plurality of transformed output voltages.

Embodiment 12: The system of embodiment 11, wherein the analog memory unit comprises a plurality of capacitors.

Embodiment 13: The system of embodiment 11, wherein the analog memory unit is configured to receive and store the plurality of transformed output voltages of the analog nonlinearity unit, and to output the stored plurality of transformed output voltages to the plurality of optical modulators, and wherein the operations further comprise:

based on generating the first plurality of modulator control signals and the first plurality of weight control signals, storing, in the analog memory unit, the plurality of transformed output voltages of the analog nonlinearity unit;

outputting, through the analog memory unit, the stored transformed output voltages;

obtaining, from the ADC unit, a second plurality of transformed digitized output voltages, the second plurality of transformed digitized output voltages forming a second transformed digital output vector; and storing, in the memory unit, the second transformed digital output vector.

Embodiment 14: The system of embodiment 1, wherein the input dataset of the artificial neural network computation request comprises a plurality of digital input vectors, wherein the laser unit is configured to generate a plurality of wavelengths, wherein the plurality of optical modulators comprise:

banks of optical modulators configured to generate a plurality of optical input vectors, each of the banks corresponding to one of the plurality of wavelengths and generating a respective optical input vector having a respective wavelength; and an optical multiplexer configured to combine the plurality of optical input vectors into a combined optical input vector comprising the plurality of wavelengths, wherein the photodetection unit is further configured to demultiplex the plurality of wavelengths and to generate a plurality of demultiplexed output voltages, and wherein the operations comprise:

obtaining, from the ADC unit, a plurality of digitized demultiplexed optical outputs, the plurality of digitized demultiplexed optical outputs forming a plurality of first digital output vectors, wherein each of the plurality of first digital output vectors corresponds to one of the plurality of wavelengths;

performing a nonlinear transformation on each of the plurality of first digital output vectors to generate a plurality of transformed first digital output vectors; and storing, in the memory unit, the plurality of transformed first digital output vectors, wherein each of the plurality of digital input vectors corresponds to one of the plurality of optical input vectors.

Embodiment 15: The system of embodiment 1, wherein the artificial neural network computation request comprises a plurality of digital input vectors, wherein the laser unit is configured to generate a plurality of wavelengths, wherein the plurality of optical modulators comprise:

banks of optical modulators configured to generate a plurality of optical input vectors, each of the banks corresponding to one of the plurality of wavelengths and generating a respective optical input vector having a respective wavelength; and an optical multiplexer configured to combine the plurality of optical input vectors into a combined optical input vector comprising the plurality of wavelengths, and wherein the operations comprise:

obtaining, from the ADC unit, a first plurality of digitized optical outputs corresponding to the optical output vector comprising the plurality of wavelengths, the first plurality of digitized optical outputs forming a first digital output vector;

performing a nonlinear transformation on the first digital output vector to generate a first transformed digital output vector; and storing, in the memory unit, the first transformed digital output vector.

Embodiment 16: The system of embodiment 1, wherein the DAC unit comprises:

a 1-bit DAC subunit configured to generate a plurality of 1-bit modulator control signals, wherein a resolution of the ADC unit is 1 bit, wherein a resolution of the first digital input vector is N bits, and wherein the operations comprise:

decomposing the first digital input vector into N 1-bit input vectors, each of the N 1-bit input vectors corresponding to one of the N bits of the first digital input vector;

generating, through the 1-bit DAC subunit, a sequence of N 1-bit modulator control signals corresponding to the N 1-bit input vectors;

obtaining, from the ADC unit, a sequence of N digitized 1-bit optical outputs corresponding to the sequence of the N 1-bit modulator control signals;

constructing an N-bit digital output vector from the sequence of the N digitized 1-bit optical outputs;

performing a nonlinear transformation on the constructed N-bit digital output vector to generate a transformed N-bit digital output vector; and storing, in the memory unit, the transformed N-bit digital output vector.

Embodiment 17: The system of embodiment 1, wherein the memory unit comprises:

a digital input vector memory configured to store the digital input vector and comprising at least one SRAM; and a neural network weights memory configured to store the plurality of neural network weights and comprising at least one DRAM.

Embodiment 18: The system of embodiment 1, wherein the DAC unit comprises:

a first DAC subunit configured to generate the plurality of modulator control signals; and a second DAC subunit configured to generate the plurality of weight control signals, wherein the first and second DAC subunits are different.

Embodiment 19: The system of embodiment 1, wherein the laser unit comprises:

a laser source configured to generate light; and an optical power splitter configured to split the light generated by the laser source into the plurality of light outputs, wherein each of the plurality of light outputs have substantially equal powers.

Embodiment 20: The system of embodiment 1, wherein the plurality of optical modulators comprises one of MZI modulators, ring resonator modulators, or electro-absorption modulators.

Embodiment 21: The system of embodiment 1, wherein the photodetection unit comprise:

a plurality of photodetectors; and a plurality of amplifiers configured to convert photocurrents generated by the photodetectors into the plurality of output voltages.

Embodiment 22: The system of embodiment 1, wherein the integrated circuitry is an application specific integrated circuit.

Embodiment 23: The system of embodiment 1, wherein the optical matrix multiplication unit comprises:

an array of input waveguides to receive the optical input vector;

an optical interference unit, in optical communication with the array of input waveguides, to perform a linear transformation of the optical input vector into a second array of optical signals; and an array of output waveguides, in optical communication with the optical interference unit, to guide the second array of optical signals, wherein at least one input waveguide in the array of input waveguides is in optical communication with each output waveguide in the array of output waveguides via the optical interference unit.

Embodiment 24: The system of embodiment 23, wherein the optical interference unit comprises:

a plurality of interconnected Mach-Zehnder interferometers (MZIs), each MZI in the plurality of interconnected MZIs comprising:

a first phase shifter configured to change a splitting ratio of the MZI; and a second phase shifter configured to shift a phase of one output of the MZI, wherein the first phase shifters and the second phase shifters are coupled to the plurality of weight control signals.

Embodiment 25: A system, comprising:

a memory unit configured to store a dataset and a plurality of neural network weights;

a driver unit configured to generate a plurality of modulator control signals and to generate a plurality of weight control signals;

an optical processor comprising:

a laser unit configured to generate a plurality of light outputs;

a plurality of optical modulators coupled to the laser unit and the driver unit, the plurality of optical modulators being configured to generate an optical input vector by modulating the plurality of light outputs generated by the laser unit based on the plurality of modulator control signals;

an optical matrix multiplication unit coupled to the plurality of optical modulators and the driver unit, the optical matrix multiplication unit being configured to transform the optical input vector into an optical output vector based on the plurality of weight control signals; and a photodetection unit coupled to the optical matrix multiplication unit and configured to generate a plurality of output voltages corresponding to the optical output vector;

a comparator unit coupled to the photodetection unit and configured to convert the plurality of output voltages into a plurality of digitized 1-bit optical outputs; and a controller comprising integrated circuitry configured to perform operations comprising:

receiving, from a computer, an artificial neural network computation request comprising an input dataset and a first plurality of neural network weights, wherein the input dataset comprises a first digital input vector having a resolution of N bits;

storing, in the memory unit, the input dataset and the first plurality of neural network weights;

decomposing the first digital input vector into N 1-bit input vectors, each of the N 1-bit input vectors corresponding to one of the N bits of the first digital input vector;

generating, through the driver unit, a sequence of N 1-bit modulator control signals corresponding to the N 1-bit input vectors;

obtaining, from the comparator unit, a sequence of N digitized 1-bit optical outputs corresponding to the sequence of the N 1-bit modulator control signals;

constructing an N-bit digital output vector from the sequence of the N digitized 1-bit optical outputs;

performing a nonlinear transformation on the constructed N-bit digital output vector to generate a transformed N-bit digital output vector; and storing, in the memory unit, the transformed N-bit digital output vector.

Embodiment 26: A method for performing artificial neural network computations in a system having an optical matrix multiplication unit configured to transform an optical input vector into an optical output vector based on a plurality of weight control signals, the method comprising:

receiving, from a computer, an artificial neural network computation request comprising an input dataset and a first plurality of neural network weights, wherein the input dataset comprises a first digital input vector;

storing, in a memory unit, the input dataset and the first plurality of neural network weights;

generating, through a digital-to-analog converter (DAC) unit, a first plurality of modulator control signals based on the first digital input vector and a first plurality of weight control signals based on the first plurality of neural network weights;

obtaining, from an analog-to-digital conversion (ADC) unit, a first plurality of digitized optical outputs corresponding to an optical output vector of the optical matrix multiplication unit, the first plurality of digitized optical outputs forming a first digital output vector;

performing, by a controller, a nonlinear transformation on the first digital output vector to generate a first transformed digital output vector;

storing, in the memory unit, the first transformed digital output vector; and outputting, by the controller, an artificial neural network output generated based on the first transformed digital output vector.

Embodiment 27: A method comprising:

providing input information in an electronic format;

converting at least a part of the electronic input information into an optical input vector;

optically transforming the optical input vector into an optical output vector based on an optical matrix multiplication;

converting the optical output vector into an electronic format; and electronically applying a non-linear transformation to the electronically converted optical output vector to provide output information in an electronic format.

Embodiment 28: The method of embodiment 27, further comprising:

repeating the electronic-to-optical converting, the optical transforming, the optical-to-electronic converting, and the electronically applied non-linear transforming with respect to new electronic input information corresponding to the provided output information in electronic format.

Embodiment 29: The method of embodiment 28, wherein the optical matrix multiplication for the initial optical transforming and the optical matrix multiplication of the repeated optical transforming are the same and correspond to the same layer of an artificial neural network.

Embodiment 30: The method of embodiment 28, wherein the optical matrix multiplication for the initial optical transforming and the optical matrix multiplication of the repeated optical transforming are different and correspond to different layers of an artificial neural network.

Embodiment 31: The method of embodiment 27, further comprising:

repeating the electronic-to-optical converting, the optical transforming, the optical-to-electronic converting, and the electronically applied non-linear transforming with respect to a different part of the electronic input information, wherein the optical matrix multiplication for the initial optical transforming and the optical matrix multiplication of the repeated optical transforming are the same and correspond to a first layer of an artificial neural network.

Embodiment 32: The method of embodiment 31, further comprising:

providing intermediate information in an electronic format based on the electronic output information produced for the multiple parts of the electronic input information by the first layer of the artificial neural network; and repeating the electronic-to-optical converting, the optical transforming, the optical-to-electronic converting, and the electronically applied non-linear transforming with respect to each of different parts of the electronic intermediate information, wherein the optical matrix multiplication for the initial optical transforming and the optical matrix multiplication of the repeated optical transforming related to the different parts of the electronic intermediate information are the same and correspond to a second layer of the artificial neural network.

Embodiment 33: A system comprising:

an optical processor comprising passive diffractive optical elements, in which the passive diffractive optical elements are configured to transform an optical input vector or matrix to an optical output vector or matrix that represents a result of a matrix processing applied to the optical input vector or matrix and a predetermined vector defined by the arrangement of the diffractive optical elements.

Embodiment 34: The system of embodiment 33 in which the matrix processing comprises a matrix multiplication between the optical input vector or matrix and the predetermined vector defined by the arrangement of the diffractive optical elements.

Embodiment 35: The system of embodiment 33 in which the optical processor comprises an optical matrix processing unit that comprises:
an array of input waveguides to receive the optical input vector,
an optical interference unit comprising the passive diffractive optical elements, in which the optical interference unit is in optical communication with the array of input waveguides and configured to perform a linear transformation of the optical input vector into a second array of optical signals; and
an array of output waveguides, in optical communication with the optical interference unit, to guide the second array of optical signals, wherein at least one input waveguide in the array of input waveguides is in optical communication with each output waveguide in the array of output waveguides via the optical interference unit.

Embodiment 36: The system of embodiment 35 in which the optical interference unit comprises a substrate having at least one of holes or stripes, the holes have dimensions in a range from 100 nm to 10 µm, and the widths of the stripes are in a range from 100 nm to 10 µm.

Embodiment 37: The system of embodiment 35 in which the optical interference unit comprises a substrate having the passive diffractive optical elements that are arranged in a two-dimensional configuration, and the substrate comprises at least one of a planar substrate or a curved substrate.

Embodiment 38: The system of embodiment 37 in which the substrate comprises a planar substrate that is parallel to a direction of light propagation from the array of input waveguides to the array of output waveguides.

Embodiment 39: The system of embodiment 33 in which the optical processor comprises an optical matrix processing unit that comprises:
a matrix of input waveguides to receive the optical input matrix,
an optical interference unit comprising the passive diffractive optical elements, in which the optical interference unit is in optical communication with the matrix of input waveguides and configured to perform a linear transformation of the optical input matrix into a second matrix of optical signals; and
a matrix of output waveguides, in optical communication with the optical interference unit, to guide the second matrix of optical signals, wherein at least one input waveguide in the matrix of input waveguides is in optical communication with each output waveguide in the matrix of output waveguides via the optical interference unit.

Embodiment 40: The system of embodiment 39 in which the optical interference unit comprises a substrate having at least one of holes or stripes, the holes have dimensions in a range from 100 nm to 10 µm, and the widths of the stripes are in a range from 100 nm to 10 µm.

Embodiment 41: The system of embodiment 39 in which the optical interference unit comprises a substrate having the passive diffractive optical elements that are arranged in a three-dimensional configuration.

Embodiment 42: The system of embodiment 41 in which the substrate has the shape of at least one of a cube, a column, a prism, or an irregular volume.

Embodiment 43: The system of embodiment 39 in which the optical processor comprises an optical interference unit that includes a hologram that has the passive diffractive optical elements, the optical processor is configured to receive modulated light representing the optical input matrix and continuously transform the light as the light passes through the hologram until the light emerges from the hologram as the optical output matrix.

Embodiment 44: The system of embodiment 35 or 39 in which the optical interference unit comprises a substrate having the passive diffractive optical elements, and the substrate comprises at least one of silicon, silicon oxide, silicon nitride, quartz, lithium niobate, a phase-change material, or a polymer.

Embodiment 45: The system of embodiment 35 or 39 in which the optical interference unit comprises a substrate having the passive diffractive optical elements, and the substrate comprises at least one of a glass substrate or an acrylic substrate.

Embodiment 46: The system of embodiment 33 in which the passive diffractive optical elements are partly formed by dopants.

Embodiment 47: The system of embodiment 33 in which the matrix processing represents processing of input data represented by the optical input vector by a neural network.

Embodiment 48: The system of embodiment 33 in which the optical processor comprises:
a laser unit configured to generate a plurality of light outputs,
a plurality of optical modulators coupled to the laser unit and configured to generate the optical input vector by modulating the plurality of light outputs generated by the laser unit based on a plurality of modulator control signals,
an optical matrix processing unit coupled to the plurality of optical modulators, the optical matrix processing unit comprising passive diffractive optical elements that are configured to transform the optical input vector into an optical output vector based on a plurality of weights defined by the passive diffractive optical elements; and
a photodetection unit coupled to the optical matrix processing unit and configured to generate a plurality of output electric signals corresponding to the optical output vector.

Embodiment 49: The system of embodiment 48 in which the passive diffractive optical elements are arranged in a three-dimensional configuration, the plurality of optical modulators comprise a two-dimensional array of optical modulators, and the photodetection unit comprises a two-dimensional array of photodetectors.

Embodiment 50: The system of embodiment 48 in which the optical matrix processing unit comprises a housing module to support and protect the array of input waveguides, the optical interference unit, and the array of output waveguides, and
the optical processor comprises a receiving module configured to receive the optical matrix processing unit, the receiving module comprising a first interface to enable the optical matrix processing unit to receive the optical input vector from the plurality of optical modulators, and a second interface to enable the optical matrix processing unit to transmit the optical output vector to the photodetection unit.

Embodiment 51: The system of embodiment 48 in which the plurality of output electric signals comprise at least one of a plurality of voltage signals or a plurality of current signals.

Embodiment 52: The system of embodiment 48, comprising:
a memory unit;
a digital-to-analog converter (DAC) unit configured to generate the plurality of modulator control signals;

an analog-to-digital conversion (ADC) unit coupled to the photodetection unit and configured to convert the plurality of output electric signals into a plurality of digitized outputs;

a controller comprising integrated circuitry configured to perform operations comprising:

receiving, from a computer, an artificial neural network computation request comprising an input dataset, in which the input dataset comprises a first digital input vector;

storing, in the memory unit, the input dataset; and generating, through the DAC unit, a first plurality of modulator control signals based on the first digital input vector.

Embodiment 53: A method comprising:

3D printing an optical matrix processing unit comprising passive diffractive optical elements, in which the passive diffractive optical elements are configured to transform an optical input vector or matrix to an optical output vector or matrix that represents a result of a matrix processing applied to an optical input vector or matrix and a predetermined vector defined by the arrangement of the diffractive optical elements.

Embodiment 54: A method comprising:

generating, using one or more laser beams, a hologram comprising passive diffractive optical elements, in which the passive diffractive optical elements are configured to transform an optical input vector or matrix to an optical output vector or matrix that represents a result of a matrix processing applied to an optical input vector or matrix and a predetermined vector defined by the arrangement of the diffractive optical elements.

Embodiment 55: A system comprising:

an optical processor comprising passive diffractive optical elements arranged in a one-dimensional manner, in which the passive diffractive optical elements are configured to transform an optical input to an optical output that represents a result of a matrix processing applied to the optical input and a predetermined vector defined by the arrangement of the diffractive optical elements.

Embodiment 56: The system of embodiment 55 in which the matrix processing comprises a matrix multiplication between the optical input and the predetermined vector defined by the arrangement of the diffractive optical elements.

Embodiment 57: The system of embodiment 55 in which the optical processor comprises an optical matrix processing unit that comprises:

an input waveguide to receive the optical input, an optical interference unit comprising the passive diffractive optical elements, in which the optical interference unit is in optical communication with the input waveguide and configured to perform a linear transformation of the optical input; and an output waveguide, in optical communication with the optical interference unit, to guide the optical output.

Embodiment 58: The system of embodiment 57 in which the optical interference unit comprises a substrate having at least one of holes or gratings, and the holes or grating elements have dimensions in a range from 100 nm to 10 µm.

Embodiment 59: A system, comprising:

a memory unit;

a digital-to-analog converter (DAC) unit configured to generate a plurality of modulator control signals;

an optical processor comprising:

a laser unit configured to generate a plurality of light outputs;

a plurality of optical modulators coupled to the laser unit and the DAC unit, the plurality of optical modulators being configured to generate an optical input vector by modulating the plurality of light outputs generated by the laser unit based on the plurality of modulator control signals;

an optical matrix processing unit coupled to the plurality of optical modulators, the optical matrix processing unit comprising passive diffractive optical elements that are configured to transform the optical input vector into an optical output vector based on a plurality of weights defined by the passive diffractive optical elements; and a photodetection unit coupled to the optical matrix processing unit and configured to generate a plurality of output electric signals corresponding to the optical output vector;

an analog-to-digital conversion (ADC) unit coupled to the photodetection unit and configured to convert the plurality of output electric signals into a plurality of digitized optical outputs;

a controller comprising integrated circuitry configured to perform operations comprising:

receiving, from a computer, an artificial neural network computation request comprising an input dataset, wherein the input dataset comprises a first digital input vector;

storing, in the memory unit, the input dataset; and generating, through the DAC unit, a first plurality of modulator control signals based on the first digital input vector.

Embodiment 60: The system of embodiment 59 in which the matrix processing unit comprises passive diffractive optical elements that are configured to transform the optical input vector into an optical output vector that represents a product of a matrix multiplication between the digital input vector and a predetermined vector defined by the passive diffractive optical elements.

Embodiment 61: The system of embodiment 59, wherein the operations further comprise:

obtaining, from the ADC unit, a first plurality of digitized optical outputs corresponding to the optical output vector of the optical matrix processing unit, the first plurality of digitized optical outputs forming a first digital output vector;

performing a nonlinear transformation on the first digital output vector to generate a first transformed digital output vector; and storing, in the memory unit, the first transformed digital output vector.

Embodiment 62: The system of embodiment 61, wherein the system has a first loop period defined as a time elapsed between the step of storing, in the memory unit, the input dataset, and the step of storing, in the memory unit, the first transformed digital output vector, and wherein the first loop period is less than or equal to 1 ns.

Embodiment 63: The system of embodiment 61, wherein the operations further comprise:

outputting an artificial neural network output generated based on the first transformed digital output vector.

Embodiment 64: The system of embodiment 61, wherein the operations further comprise:

generating, through the DAC unit, a second plurality of modulator control signals based on the first transformed digital output vector.

Embodiment 65: The system of embodiment 61, wherein the input dataset further comprises a second digital input vector, and wherein the operations further comprise:

generating, through the DAC unit, a second plurality of modulator control signals based on the second digital input vector;

obtaining, from the ADC unit, a second plurality of digitized optical outputs corresponding to the optical output vector of the optical matrix processing unit, the second plurality of digitized optical outputs forming a second digital output vector;

performing a nonlinear transformation on the second digital output vector to generate a second transformed digital output vector;

storing, in the memory unit, the second transformed digital output vector; and outputting an artificial neural network output generated based on the first transformed digital output vector and the second transformed digital output vector, wherein the optical output vector of the optical matrix processing unit results from a second optical input vector generated based on the second plurality of modulator control signals that is transformed by the optical matrix processing unit based on the plurality of weights defined by the passive diffractive optical elements.

Embodiment 66: The system of embodiment 59, further comprising:

an analog nonlinearity unit arranged between the photodetection unit and the ADC unit, the analog nonlinearity unit being configured to receive the plurality of output electric signals from the photodetection unit, apply a nonlinear transfer function, and output a plurality of transformed output electric signals to the ADC unit, wherein the operations further comprise:

obtaining, from the ADC unit, a first plurality of transformed digitized output electric signals corresponding to the plurality of transformed output electric signals, the first plurality of transformed digitized output electric signals forming a first transformed digital output vector; and storing, in the memory unit, the first transformed digital output vector.

Embodiment 67: The system of embodiment 59, wherein the integrated circuitry of the controller is configured to generate the first plurality of modulator control signals at a rate greater than or equal to 8 GHz.

Embodiment 68: The system of embodiment 59, further comprising:

an analog memory unit arranged between the DAC unit and the plurality of optical modulators, the analog memory unit being configured to store analog voltages and to output the stored analog voltages; and an analog nonlinearity unit arranged between the photodetection unit and the ADC unit, the analog nonlinearity unit being configured to receive the plurality of output electric signals from the photodetection unit, apply a nonlinear transfer function, and output a plurality of transformed output electric signals.

Embodiment 69: The system of embodiment 68, wherein the analog memory unit comprises a plurality of capacitors.

Embodiment 70: The system of embodiment 68, wherein the analog memory unit is configured to receive and store the plurality of transformed output electric signals of the analog nonlinearity unit, and to output the stored plurality of transformed output electric signals to the plurality of optical modulators, and wherein the operations further comprise:

based on generating the first plurality of modulator control signals, storing, in the analog memory unit, the plurality of transformed output electric signals of the analog nonlinearity unit;

outputting, through the analog memory unit, the stored transformed output electric signals;

obtaining, from the ADC unit, a second plurality of transformed digitized output electric signals, the second plurality of transformed digitized output electric signals forming a second transformed digital output vector; and storing, in the memory unit, the second transformed digital output vector.

Embodiment 71: The system of embodiment 59, wherein the input dataset of the artificial neural network computation request comprises a plurality of digital input vectors, wherein the laser unit is configured to generate a plurality of wavelengths, wherein the plurality of optical modulators comprise:

banks of optical modulators configured to generate a plurality of optical input vectors, each of the banks corresponding to one of the plurality of wavelengths and generating a respective optical input vector having a respective wavelength; and an optical multiplexer configured to combine the plurality of optical input vectors into a combined optical input vector comprising the plurality of wavelengths, wherein the photodetection unit is further configured to demultiplex the plurality of wavelengths and to generate a plurality of demultiplexed output electric signals, and wherein the operations comprise:

obtaining, from the ADC unit, a plurality of digitized demultiplexed optical outputs, the plurality of digitized demultiplexed optical outputs forming a plurality of first digital output vectors, wherein each of the plurality of first digital output vectors corresponds to one of the plurality of wavelengths;

performing a nonlinear transformation on each of the plurality of first digital output vectors to generate a plurality of transformed first digital output vectors; and storing, in the memory unit, the plurality of transformed first digital output vectors, wherein each of the plurality of digital input vectors corresponds to one of the plurality of optical input vectors.

Embodiment 72: The system of embodiment 59, wherein the artificial neural network computation request comprises a plurality of digital input vectors, wherein the laser unit is configured to generate a plurality of wavelengths, wherein the plurality of optical modulators comprise:

banks of optical modulators configured to generate a plurality of optical input vectors, each of the banks corresponding to one of the plurality of wavelengths and generating a respective optical input vector having a respective wavelength; and an optical multiplexer configured to combine the plurality of optical input vectors into a combined optical input vector comprising the plurality of wavelengths, and wherein the operations comprise:

obtaining, from the ADC unit, a first plurality of digitized optical outputs corresponding to the optical output vector comprising the plurality of wavelengths, the first plurality of digitized optical outputs forming a first digital output vector;

performing a nonlinear transformation on the first digital output vector to generate a first transformed digital output vector; and storing, in the memory unit, the first transformed digital output vector.

Embodiment 73: The system of embodiment 59, wherein the DAC unit comprises:

a 1-bit DAC unit configured to generate a plurality of 1-bit modulator control signals, wherein a resolution of the ADC unit is 1 bit, wherein a resolution of the first digital input vector is N bits, and wherein the operations comprise:

decomposing the first digital input vector into N 1-bit input vectors, each of the N 1-bit input vectors corresponding to one of the N bits of the first digital input vector;

generating, through the 1-bit DAC unit, a sequence of N 1-bit modulator control signals corresponding to the N 1-bit input vectors;

obtaining, from the ADC unit, a sequence of N digitized 1-bit optical outputs corresponding to the sequence of the N 1-bit modulator control signals;

constructing an N-bit digital output vector from the sequence of the N digitized 1-bit optical outputs;

performing a nonlinear transformation on the constructed N-bit digital output vector to generate a transformed N-bit digital output vector; and storing, in the memory unit, the transformed N-bit digital output vector.

Embodiment 74: The system of embodiment 59, wherein the memory unit comprises a digital input vector memory configured to store the digital input vector and comprising at least one SRAM.

Embodiment 75: The system of embodiment 59, wherein the laser unit comprises:

a laser source configured to generate light; and an optical power splitter configured to split the light generated by the laser source into the plurality of light outputs, wherein each of the plurality of light outputs have substantially equal powers.

Embodiment 76: The system of embodiment 59, wherein the plurality of optical modulators comprises one of MZI modulators, ring resonator modulators, or electro-absorption modulators.

Embodiment 77: The system of embodiment 59, wherein the photodetection unit comprise:

a plurality of photodetectors; and a plurality of amplifiers configured to convert photocurrents generated by the photodetectors into the plurality of output electric signals.

Embodiment 78: The system of embodiment 59, wherein the integrated circuitry comprises an application specific integrated circuit.

Embodiment 79: The system of embodiment 59, wherein the optical matrix processing unit comprises:

an array of input waveguides to receive the optical input vector;

an optical interference unit, in optical communication with the array of input waveguides, to perform a linear transformation of the optical input vector into a second array of optical signals, wherein the optical interference unit comprises the passive diffractive optical elements; and an array of output waveguides, in optical communication with the optical interference unit, to guide the second array of optical signals, wherein at least one input waveguide in the array of input waveguides is in optical communication with each output waveguide in the array of output waveguides via the optical interference unit.

Embodiment 80: A system, comprising:

a memory unit;

a driver unit configured to generate a plurality of modulator control signals;

an optical processor comprising:

a laser unit configured to generate a plurality of light outputs;

a plurality of optical modulators coupled to the laser unit and the driver unit, the plurality of optical modulators being configured to generate an optical input vector by modulating the plurality of light outputs generated by the laser unit based on the plurality of modulator control signals;

an optical matrix processing unit coupled to the plurality of optical modulators and the driver unit, the optical matrix processing unit comprising passive diffractive optical elements configured to transform the optical input vector into an optical output vector based on a plurality of weight control signals defined by the passive diffractive optical elements; and a photodetection unit coupled to the optical matrix processing unit and configured to generate a plurality of output electric signals corresponding to the optical output vector;

a comparator unit coupled to the photodetection unit and configured to convert the plurality of output electric signals into a plurality of digitized 1-bit optical outputs; and a controller comprising integrated circuitry configured to perform operations comprising:

receiving, from a computer, an artificial neural network computation request comprising an input dataset, wherein the input dataset comprises a first digital input vector having a resolution of N bits;

storing, in the memory unit, the input dataset;

decomposing the first digital input vector into N 1-bit input vectors, each of the N 1-bit input vectors corresponding to one of the N bits of the first digital input vector;

generating, through the driver unit, a sequence of N 1-bit modulator control signals corresponding to the N 1-bit input vectors;

obtaining, from the comparator unit, a sequence of N digitized 1-bit optical outputs corresponding to the sequence of the N 1-bit modulator control signals;

constructing an N-bit digital output vector from the sequence of the N digitized 1-bit optical outputs;

performing a nonlinear transformation on the constructed N-bit digital output vector to generate a transformed N-bit digital output vector; and storing, in the memory unit, the transformed N-bit digital output vector.

Embodiment 81: The system of embodiment 80 in which the optical matrix processing unit comprises an optical matrix multiplication unit configured to transform the optical input vector into an optical output vector that represents a product of a matrix multiplication between an input vector represented by the optical input vector and a predetermined vector defined by the diffractive optical elements.

Embodiment 82: A method for performing artificial neural network computations in a system having an optical matrix processing unit, the method comprising:

receiving, from a computer, an artificial neural network computation request comprising an input dataset comprising a first digital input vector;

storing, in a memory unit, the input dataset;

generating, through a digital-to-analog converter (DAC) unit, a first plurality of modulator control signals based on the first digital input vector;

transforming, by using the optical matrix processing unit comprising an arrangement of diffractive optical elements, an optical input vector into an optical output vector, in which the optical output vector represents a result of a matrix processing applied to the optical input vector and a predetermined vector defined by the arrangement of the diffractive optical elements;

obtaining, from an analog-to-digital conversion (ADC) unit, a first plurality of digitized optical outputs corresponding to the optical output vector of the optical matrix processing unit, the first plurality of digitized optical outputs forming a first digital output vector;

performing, by a controller, a nonlinear transformation on the first digital output vector to generate a first transformed digital output vector;

storing, in the memory unit, the first transformed digital output vector; and outputting, by the controller, an artificial neural network output generated based on the first transformed digital output vector.

Embodiment 83: The method of embodiment 82 in which transforming the optical input vector into the optical output vector comprises transforming the optical input vector into an optical output vector that represents a product of a matrix multiplication between the digital input vector and the predetermined vector defined by the arrangement of diffractive optical elements.

Embodiment 84: A method comprising:

providing input information in an electronic format;

converting at least a part of the electronic input information into an optical input vector;

optically transforming the optical input vector into an optical output vector based on an optical matrix processing by an optical processor comprising passive diffractive optical elements;

converting the optical output vector into an electronic format; and electronically applying a non-linear transformation to the electronically converted optical output vector to provide output information in an electronic format.

Embodiment 85: The method of embodiment 84 in which optically transforming the optical input vector into an optical output vector comprises optically transforming the optical input vector into an optical output vector based on an optical matrix multiplication between a digital input vector represented by the optical input vector and a predetermined vector defined by the passive diffractive optical elements.

Embodiment 86: The method of embodiment 84, further comprising:

repeating the electronic-to-optical converting, the optical transforming, the optical-to-electronic converting, and the electronically applied non-linear transforming with respect to new electronic input information corresponding to the provided output information in electronic format.

Embodiment 87: The method of embodiment 86, wherein the optical matrix processing for the initial optical transforming and the optical matrix processing of the repeated optical transforming are the same and correspond to the same layer of an artificial neural network.

Embodiment 88: The method of embodiment 84, further comprising:

repeating the electronic-to-optical converting, the optical transforming, the optical-to-electronic converting, and the electronically applied non-linear transforming with respect to a different part of the electronic input information, wherein the optical matrix processing for the initial optical transforming and the optical matrix processing of the repeated optical transforming are the same and correspond to a layer of an artificial neural network.

Embodiment 89: A system comprising:

an optical matrix processing unit configured to process an input vector of length N, in which the optical matrix processing unit comprises N+2 layers of directional couplers and N layers of phase shifters, and N is a positive integer.

Embodiment 90: The system of embodiment 89 in which the optical matrix processing unit comprises no more than N+2 layers of directional couplers.

Embodiment 91: The system of embodiment 89 in which the optical matrix processing unit comprises an optical matrix multiplication unit.

Embodiment 92: The system of embodiment 89 in which the optical matrix processing unit comprises:

a substrate, and interconnected interferometers disposed on the substrate, in which each interferometer comprises optical waveguides disposed on the substrate, and the directional couplers and the phase shifters are part of the interconnected interferometers.

Embodiment 93: The system of embodiment 89 in which the optical matrix processing unit comprises a layer of attenuators following the last layer of directional couplers.

Embodiment 94: The system of embodiment 93 in which the layer of attenuators comprises N attenuators.

Embodiment 95: The system of embodiment 93, comprising one or more homodyne detectors to detect outputs from the attenuators.

Embodiment 96: The system of embodiment 89 in which N=3, and the optical matrix processing unit comprises:

input terminals configured to receive the input vector;

a first layer of directional couplers coupled to the input terminals;

a first layer of phase shifters coupled to the first layer of directional couplers;

a second layer of directional couplers coupled to the first layer of phase shifters;

a second layer of phase shifters coupled to the second layer of directional couplers;

a third layer of directional couplers coupled to the second layer of phase shifters;

a third layer of phase shifters coupled to the third layer of directional couplers;

a fourth layer of directional couplers coupled to the third layer of phase shifters; and a fifth layer of directional couplers coupled to the fourth layer of directional couplers.

Embodiment 97: The system of embodiment 89 in which N=4, and the optical matrix processing unit comprises:

input terminals configured to receive the input vector;

a first layer, a second layer, a third layer, and a fourth layer of directional couplers each followed by a layer of phase shifters, in which the first layer of directional couplers is coupled to the input terminals;

a second-to-last layer of directional couplers coupled to the fourth layer of phase shifters; and a final layer of directional couplers coupled to the second-to-last layer of directional couplers.

Embodiment 98: The system of embodiment 89 in which N=8, and the optical matrix processing unit comprises:
input terminals configured to receive the input vector;
eight layers of directional couplers each followed by a layer of phase shifters, in which the first layer of directional couplers is coupled to the input terminals;
a second-to-last layer of directional couplers coupled to the eighth layer of phase shifters; and
a final layer of directional couplers coupled to the second-to-last layer of directional couplers.

Embodiment 99: The system of embodiment 89 in which the optical matrix multiplier unit comprises:
input terminals configured to receive the input vector;
N layers of directional couplers each followed by a layer of phase shifters, in which the first layer of directional couplers is coupled to the input terminals;
a second-to-last layer of directional couplers coupled to the N-th layer of phase shifters; and
a final layer of directional couplers coupled to the second-to-last layer of directional couplers.

Embodiment 100: The system of embodiment 99 in which N is an even number.

Embodiment 101: The system of embodiment 100 in which each of the i-th layer of directional couplers includes N/2 directional couplers, in which i is an odd number, and each of the j-th layer of directional couplers includes N/2−1 directional couplers, in which j is an even number.

Embodiment 102: The system of embodiment 100 in which for each of the i-th layer of directional couplers for which i is an odd number, the k-th directional coupler is coupled to the (2k−1)-th and 2k-th output of the previous layer, and k is an integer from 1 to N/2.

Embodiment 103: The system of embodiment 100 in which for each of the j-th layer of directional couplers in which j is an even number, the m-th directional coupler is coupled to the (2m)-th and (2m+1)-th output of the previous layer, and m is an integer from 1 to N/2−1.

Embodiment 104: The system of embodiment 100 in which each of the i-th layer of phase shifters includes N phase shifters for which i is an odd number, and each of the j-th layer of phase shifters includes N−2 phase shifters for which j is an even number.

Embodiment 105: The system of embodiment 99 in which N is an odd number.

Embodiment 106: The system of embodiment 105 in which each layer of directional couplers includes (N−1)*2 directional couplers.

Embodiment 107: The system of embodiment 105 in which each layer of phase shifters includes N−1 phase shifters.

Embodiment 108: A system comprising:
a generator configured to generate a first dataset, in which the generator comprises an optical matrix processing unit; and
a discriminator configured to receive a second dataset comprising data from the first dataset and data from a third dataset, the data in the first dataset having characteristics similar to those of the data in the third dataset, and classify data in the second dataset as data from the first dataset or data from the third dataset.

Embodiment 109: The system of embodiment 108 in which the optical matrix processing unit comprises at least one of (i) the optical matrix multiplication unit of any of embodiments 1 to 25, (ii) the passive diffractive optical elements of any of embodiments 32 to 52, 55 to 81, or (iii) the optical matrix processing unit of any of embodiments 89 to 107.

Embodiment 110: The system of embodiment 108 in which the third dataset comprises real data, the generator is configured to generate synthesized data that resemble the real data, and the discriminator is configured to classify data as real data or synthesized data.

Embodiment 111: The system of embodiment 108 in which the generator is configured to generate datasets for training at least one of autonomous vehicles, medical diagnosis systems, fraud detection systems, weather prediction systems, financial forecast systems, facial recognition systems, speech recognition systems, or product defect detection systems.

Embodiment 112: The system of embodiment 108 in which the generator is configured to generate images resembling images of at least one of real objects or real scenes, and the discriminator is configured to classify a received image as (i) an image of a real object or real scene, or (ii) a synthesized image generated by the generator.

Embodiment 113: The system of embodiment 112 in which the real objects comprise at least one of people, animals, cells, tissues, or products, and the real scenes comprise scenes encountered by vehicles.

Embodiment 114: The system of embodiment 113 in which the discriminator is configured to classify whether a received image is (i) an image of real people, real animals, real cells, real tissues, real products, or real scenes encountered by vehicles, or (ii) a synthesized image generated by the generator.

Embodiment 115: The system of embodiment 113 in which the vehicles comprise at least one of motorcycles, cars, trucks, trains, helicopters, airplanes, submarines, ships, or drones.

Embodiment 116: The system of embodiment 113 in which the generator is configured to generate images of tissues or cells associated with at least one of diseases of humans, diseases of animals, or diseases of plants.

Embodiment 117: The system of embodiment 116 in which the generator is configured to generate images of tissues or cells associated with diseases of humans, and the diseases comprise at least one of cancer, Parkinson's disease, sickle cell anemia, heart disease, cardiovascular disease, diabetes, chest disease, or skin disease.

Embodiment 118: The system of embodiment 116 in which the generator is configured to generate images of tissues or cells associated with cancer, and the cancer comprises at least one of skin cancer, breast cancer, lung cancer, liver cancer, prostate cancer, or brain cancer.

Embodiment 119: The system of embodiment 108, further comprising a random noise generator configured to generate random noise that is provided as input to the generator, and the generator is configured to generate the first dataset based on the random noise.

Embodiment 120: A system comprising:
a random noise generator configured to generate random noise; and
a generator configured to generate data based on the random noise, in which the generator comprises an optical matrix processing unit.

Embodiment 121: The system of embodiment 120 in which the optical matrix processing unit comprises at least one of (i) the optical matrix multiplication unit of any of embodiments 1 to 25, (ii) the passive diffractive optical elements of any of embodiments 33 to 52, and 55 to 81, or (iii) the optical matrix processing unit of any of embodiments 89 to 107.

Embodiment 122: A system comprising:
a photonic circuit configured to perform a logic function on two input signals, the photonic circuit comprising:
- a first directional coupler having two input terminals and two output terminals, the two input terminals configured to receive the two input signals,
- a first pair of phase shifters configured to modify phases of the signals at the two output terminals of the first directional coupler,
- a second directional coupler having two input terminals and two output terminals, the two input terminals configured to receive signals from the first pair of phase shifters, and
- a second pair of phase shifters configured to modify phases of the signals at the two output terminals of the second directional coupler.

Embodiment 123: The system of embodiment 122 in which the phase shifters are configured to cause the photonic circuit to implement a rotation:

$$M = \frac{1}{\sqrt{2}}\begin{pmatrix} 1 & -1 \\ 1 & 1 \end{pmatrix} = \begin{pmatrix} \cos\pi/4 & -\sin\pi/4 \\ \sin\pi/4 & \cos\pi/4 \end{pmatrix}.$$

Embodiment 124: The system of embodiment 122 in which when input signals x1 and x2 are provided to the two input terminals of the first directional coupler, the phase shifters are configured to cause the photonic circuit to implement an operation:

$$M \cdot \begin{pmatrix} x_1 \\ x_2 \end{pmatrix} = \begin{pmatrix} \frac{1}{\sqrt{2}}(x_1 - x_2) \\ \frac{1}{\sqrt{2}}(x_1 + x_2) \end{pmatrix}.$$

Embodiment 125: The system of embodiment 124 in which the photonic circuit comprises first photodetectors configured to generate absolute values of the signals from the second pair of phase shifters to cause the photonic circuit to implement an operation:

$$\left| M \cdot \begin{pmatrix} x_1 \\ x_2 \end{pmatrix} \right| = \begin{pmatrix} \frac{1}{\sqrt{2}}|x_1 - x_2| \\ \frac{1}{\sqrt{2}}|x_1 + x_2| \end{pmatrix}.$$

Embodiment 126: The system of embodiment 125 in which the photonic circuit comprises comparators configured to compare the output signals of the first photodetectors with threshold values to generate binary values to cause the photonic circuit to generate outputs:

$$\begin{pmatrix} XOR(x_1, x_2) \\ OR(x_1, x_2) \end{pmatrix}.$$

Embodiment 127: The system of embodiment 125 in which the photonic circuit comprises a feedback mechanism configured such that output signals of the photodetectors are fed back to the input terminals of the first directional coupler and passed through the first directional coupler, the first pair of phase shifters, the second directional coupler, and the second pair of phase shifters, and detected by the photodetectors to cause the photonic circuit to implement an operation:

$$\left| M \cdot \left| M \cdot \begin{pmatrix} x_1 \\ x_2 \end{pmatrix} \right| \right|,$$

which produces outputs AND(x1, x2) and OR(x1, x2).

Embodiment 128: The system of embodiment 125 in which the photonic circuit comprises:
- a third directional coupler having two input terminals and two output terminals, the two input terminals configured to receive the signals from the second pair of phase shifters,
- a third pair of phase shifters configured to modify phases of the signals at the two output terminals of the third directional coupler,
- a fourth directional coupler having two input terminals and two output terminals, the two input terminals configured to receive signals from the third pair of phase shifters,
- a fourth pair of phase shifters configured to modify phases of the signals at the two output terminals of the fourth directional coupler, and
- second photodetectors configured to generate absolute values of signals from the fourth pair of phase shifters to cause the photonic circuit to implement an operation:

$$\left| M \cdot \left| M \cdot \begin{pmatrix} x_1 \\ x_2 \end{pmatrix} \right| \right|,$$

which produces outputs AND(x1, x2) and OR(x1, x2).

Embodiment 129: The system of embodiment 122, comprising a Bitonic sorter configured such that a sorting function of the Bitonic sorter is performed using the photonic circuit.

Embodiment 130: The system of embodiment 122, comprising a device configured to perform a hashing function using the photonic circuit.

Embodiment 131: The system of embodiment 130 in which the hashing function comprises secure hash algorithm 2 (SHA-2).

Embodiment 132: An apparatus comprising:
- a plurality of optical waveguides, wherein a set of multiple input values are encoded on respective optical signals carried by the optical waveguides;
- a plurality of copying modules, and for each of at least two subsets of one or more optical signals, a corresponding set of one or more of the copying modules is configured to split the subset of one or more optical signals into two or more copies of the optical signals;
- a plurality of multiplication modules, and for each of at least two copies of a first subset of one or more optical signals, a corresponding multiplication module configured to multiply the one or more optical signals of the first subset by one or more matrix element values using optical amplitude modulation, where at least one of the multiplication modules includes an optical amplitude modulator including an input port and two output ports, and a pair of related optical signals is provided from the two output ports such that a difference between amplitudes of the related optical signals corresponds to a result of multiplying an input value by a signed matrix element value; and one or more summation modules, and for results of two or more of the multiplication modules, a corresponding one of the summation modules is configured to produce an electrical signal that represents a sum of the results of the two or more of the multiplication modules.

Embodiment 133: The apparatus of embodiment 132, wherein the input values in the set of multiple input values encoded on the respective optical signals represent elements of an input vector that is being multiplied by a matrix that includes the one or more matrix element values.

Embodiment 134: The apparatus of embodiment 132 or 133, wherein a set of multiple output values are encoded on respective electrical signals produced by the one or more summation modules, and the output values in the set of multiple output values represent elements of an output vector that results from the input vector being multiplied by the matrix.

Embodiment 135: The apparatus of any of embodiments 132 to 134, wherein each of the optical signals carried by an optical waveguide comprises an optical wave having a common wavelength that is substantially identical for all of the optical signals.

Embodiment 136: The apparatus of any of embodiments 132 to 135, wherein the copying modules include at least one copying module comprising an optical splitter that sends a predetermined fraction of the power of an optical wave at an input port to a first output port, and sends the remaining fraction of the power of the optical wave at the input port to a second output port.

Embodiment 137: The apparatus of embodiment 136, wherein the optical splitter comprises a waveguide optical splitter that sends a predetermined fraction of the power of an optical wave guided by an input optical waveguide to a first output optical waveguide, and sends the remaining fraction of the power of the optical wave guided by the input optical waveguide to a second output optical waveguide.

Embodiment 138: The apparatus of embodiment 137, wherein a guided mode of the input optical waveguide is adiabatically coupled to guided modes of each of the first and second output optical waveguides.

Embodiment 139: The apparatus of any of embodiments 136 to 138, wherein the optical splitter comprises a beam splitter that includes at least one surface that transmits the predetermined fraction of the power of the optical wave at the input port and reflects the remaining fraction of the power of the optical wave at the input port.

Embodiment 140: The apparatus of embodiment 139, wherein at least one of the plurality of optical waveguides comprises an optical fiber that is coupled to an optical coupler that couples a guided mode of the optical fiber to a free-space propagation mode.

Embodiment 141: The apparatus of any of embodiments 132 to 140, wherein the multiplication modules include at least one coherence-sensitive multiplication module configured to multiply the one or more optical signals of the first subset by one or more matrix element values using optical amplitude modulation based on interference between optical waves that have a coherence length at least as long as a propagation distance through the coherence-sensitive multiplication module.

Embodiment 142: The apparatus of embodiment 141, wherein the coherence-sensitive multiplication module comprises a Mach-Zehnder Interferometer (MZI) that splits an optical wave guided by an input optical waveguide into a first optical waveguide arm of the MZI and a second optical waveguide arm of the MZI, the first optical waveguide arm includes a phase shifter that imparts a relative phase shift with respect to a phase delay of the second optical waveguide arm, and the MZI combines optical waves from the first optical waveguide arm and the second optical waveguide arm into at least one output optical waveguide.

Embodiment 143: The apparatus of embodiment 142, wherein the MZI combines optical waves from the first optical waveguide arm and the second optical waveguide arm into each of a first output optical waveguide and a second output optical waveguide, a first photodetector receives an optical wave from the first output optical waveguide to generate a first photocurrent, a second photodetector receives an optical wave from the second output optical waveguide to generate a second photocurrent, and a result of the coherence-sensitive multiplication module comprises a difference between the first photocurrent and the second photocurrent.

Embodiment 144: The apparatus of any of embodiments 141 to 143, wherein the coherence-sensitive multiplication module comprises one or more ring resonators, including at least one ring resonator coupled to a first optical waveguide and at least one ring resonator coupled to a second optical waveguide.

Embodiment 145: The apparatus of embodiment 144, wherein a first photodetector receives an optical wave from the first optical waveguide to generate a first photocurrent, a second photodetector receives an optical wave from the second optical waveguide to generate a second photocurrent, and a result of the coherence-sensitive multiplication module comprises a difference between the first photocurrent and the second photocurrent.

Embodiment 146: The apparatus of any of embodiments 132 to 145, wherein the multiplication modules include at least one coherence-insensitive multiplication module configured to multiply the one or more optical signals of the first subset by one or more matrix element values using optical amplitude modulation based on absorption of energy within an optical wave.

Embodiment 147: The apparatus of embodiment 146, wherein the coherence-insensitive multiplication module comprises an electro-absorption modulator.

Embodiment 148: The apparatus of any of embodiments 132 to 147, wherein the one or more summation modules include at least one summation module comprising: (1) two or more input conductors that each carries an electrical signal in the form of an input current whose amplitude represents a respective result of a respective one of the multiplication modules, and (2) at least one output conductor that carries the electrical signal that represents the sum of the respective results in the form of an output current that is proportional to the sum of the input currents.

Embodiment 149: The apparatus of embodiment 148, wherein the two or more input conductors and the output conductor comprise wires that meet at one or more junctions among the wires, and the output current is substantially equal to the sum of the input currents.

Embodiment 150: The apparatus of embodiment 148 or 149, wherein at least a first input current of the input currents is provided in the form of at least one photocurrent generated by at least one photodetector that receives an optical signal generated by a first multiplication module of the multiplication modules.

Embodiment 151: The apparatus of embodiment 150, wherein the first input current is provided in the form of a difference between two photocurrents generated by different respective photodetectors that receive different respective optical signals both generated by the first multiplication module.

Embodiment 152: The apparatus of any of embodiments 132 to 151, wherein one of the copies of the first subset of one or more optical signals consists of a single optical signal on which one of the input values is encoded.

Embodiment 153: The apparatus of embodiment 152, wherein the multiplication module corresponding to the copy of the first subset multiplies the encoded input value by a single matrix element value.

Embodiment 154: The apparatus of any of embodiments 132 to 153, wherein one of the copies of the first subset of one or more optical signals includes more than one of the optical signals, and fewer than all of the optical signals, on which multiple input values are encoded.

Embodiment 155: The apparatus of embodiment 154, wherein the multiplication module corresponding to the copy of the first subset multiplies the encoded input values by different respective matrix element values.

Embodiment 156: The apparatus of embodiment 155, wherein different multiplication modules corresponding to different respective copies of the first subset of one or more optical signals are contained by different devices that are in optical communication to transmit one of the copies of the first subset of one or more optical signals between the different devices.

Embodiment 157: The apparatus of any of embodiments 132 to 156, wherein two or more of the plurality of optical waveguides, two or more of the plurality of copying modules, two or more of the plurality of multiplication modules, and at least one of the one or more summation modules are arranged on a substrate of a common device.

Embodiment 158: The apparatus of embodiment 157, wherein the device performs vector-matrix multiplication, wherein an input vector is provided as a set of optical signals, and an output vector is provided as a set of electrical signals.

Embodiment 159: The apparatus of any of embodiments 132 to 158, further comprising an accumulator that integrates an input electrical signal corresponding to an output of a multiplication module or a summation module, wherein the input electrical signal is encoded using a time domain encoding that uses on-off amplitude modulation within each of multiple time slots, and the accumulator produces an output electrical signal that is encoded with more than two amplitude levels corresponding to different duty cycles of the time domain encoding over the multiple time slots.

Embodiment 160: The apparatus of any of embodiments 132 to 159, wherein the two or more of the multiplication modules each correspond to a different subset of one or more optical signals.

Embodiment 161: The apparatus of any of embodiments 132 to 160, further comprising, for each copy of a second subset of one or more optical signals, different from the optical signals in the first subset of one or more optical signals, a multiplication module configured to multiply the one or more optical signals of the second subset by one or more matrix element values using optical amplitude modulation.

Embodiment 162: A method comprising:
encoding a set of multiple input values on respective optical signals;
for each of at least two subsets of one or more optical signals, using a corresponding set of one or more copying modules to split the subset of one or more optical signals into two or more copies of the optical signals;
for each of at least two copies of a first subset of one or more optical signals, using a corresponding multiplication module to multiply the one or more optical signals of the first subset by one or more matrix element values using optical amplitude modulation, where at least one of the multiplication modules includes an optical amplitude modulator including an input port and two output ports, and a pair of related optical signals is provided from the two output ports such that a difference between amplitudes of the related optical signals corresponds to a result of multiplying an input value by a signed matrix element value; and
for results of two or more of the multiplication modules, using a summation module configured to produce an electrical signal that represents a sum of the results of the two or more of the multiplication modules.

Embodiment 163: A method comprising:
encoding a set of input values representing elements of an input vector on respective optical signals;
encoding a set of coefficients representing elements of a matrix as amplitude modulation levels of a set of optical amplitude modulators coupled to the optical signals, where at least one of the optical amplitude modulators including an input port and two output ports provides a pair of related optical signals from the two output ports such that a difference between amplitudes of the related optical signals corresponds to a result of multiplying an input value by a signed matrix element value; and
encoding a set of output values representing elements of an output vector on respective electrical signals, where at least one of the electrical signals is in the form of a current whose amplitude corresponds to a sum of respective elements of the input vector multiplied by respective elements of a row of the matrix.

Embodiment 164: The method of embodiment 163, wherein at least one of the optical signals is provided by a first optical waveguide, and the first optical waveguide is coupled to an optical splitter that sends a predetermined fraction of the power of an optical wave guided by the first optical waveguide to a second output optical waveguide, and sends the remaining fraction of the power of the optical wave guided by the first optical waveguide to a third optical waveguide.

Embodiment 165: An apparatus comprising:
a plurality of optical waveguides encoding a set of input values representing elements of an input vector on respective optical signals carried by the optical waveguides;
a set of optical amplitude modulators coupled to the optical signals encoding a set of coefficients representing elements of a matrix as amplitude modulation levels, where at least one of the optical amplitude modulators including an input port and two output ports provides a pair of related optical signals from the two output ports such that a difference between amplitudes of the related optical signals corresponds to a result of multiplying an input value by a signed matrix element value; and
a plurality of summation modules encoding a set of output values representing elements of an output vector on respective electrical signals, where at least one of the electrical signals is in the form of a current whose amplitude corresponds to a sum of respective elements of the input vector multiplied by respective elements of a row of the matrix.

Embodiment 166: A method for multiplying an input vector by a given matrix comprising:
  encoding a set of input values representing elements the input vector on respective optical signals of a set of optical signals;
  coupling a first set of one or more devices to a first set of one or more waveguides providing a first subset of the set of optical signals, and generating a result of a first submatrix of the given matrix multiplied by values encoded on the first subset of the set of optical signals;
  coupling a second set of one or more devices to a second set of one or more waveguides providing a second subset of the set of optical signals, and generating a result of a second submatrix of the given matrix multiplied by values encoded on the second subset of the set of optical signals;
  coupling a third set of one or more devices to a third set of one or more waveguides providing a copy of the first subset of the set of optical signals generated by a first optical splitter, and generating a result of a third submatrix of the given matrix multiplied by values encoded on the first subset of the set of optical signals; and
  coupling a fourth set of one or more devices to a fourth set of one or more waveguides providing a copy of the second subset of the set of optical signals generated by a second optical splitter, and generating a result of a fourth submatrix of the given matrix multiplied by values encoded on the second subset of the set of optical signals;
  wherein the first, second, third, and fourth submatrices concatenated together form the given matrix; and
  wherein at least one output value representing an element of an output vector corresponding to the input vector multiplied by the given matrix is encoded on electrical signals generated by a device in communication with the first set of one or more devices and the second set of one or more devices.

Embodiment 167: The method of embodiment 166, wherein each pair of sets of the first set of one or more devices, the second set of one or more devices, the third set of one or more devices, and the fourth set of one or more devices are mutually exclusive.

Embodiment 168: An apparatus, the apparatus comprising:
  a first set of one or more devices configured to receive a first set of optical signals, and to generate a result of a first matrix multiplied by values encoded on the first set of optical signals;
  a second set of one or more devices configured to receive a second set of optical signals, and to generate a result of a second matrix multiplied by values encoded on the second set of optical signals;
  a third set of one or more devices configured to receive a third set of optical signals, and to generate a result of a third matrix multiplied by values encoded on the third set of optical signals;
  a fourth set of one or more devices configured to receive a fourth set of optical signals, and to generate a result of a fourth matrix multiplied by values encoded on the fourth set of optical signals; and
  configurable connection pathways between two or more of the first set of one or more devices, the second set of one or more devices, the third set of one or more devices, or the fourth set of one or more devices,
  wherein a first configuration of the configurable connection pathways is configured to: (1) provide a copy of the first set of optical signals as at least one of the second set of optical signals, the third set of optical signals, or the fourth set of optical signals, and (2) provide one or more signals from the first set of one or more device and one or more signals from the second set of one or more devices to a summation module configured to produce an electrical signal that represents a sum of values encoded on signals received by the summation module.

Embodiment 169: An apparatus comprising:
  a first set of one or more devices configured to receive a first set of optical signals, and to generate a result based on optical amplitude modulation of one or more of the optical signals of the first set of optical signals;
  a second set of one or more devices configured to receive a second set of optical signals, and to generate a result based on optical amplitude modulation of one or more of the optical signals of the second set of optical signals;
  a third set of one or more devices configured to receive a third set of optical signals, and to generate a result based on optical amplitude modulation of one or more of the optical signals of the third set of optical signals;
  a fourth set of one or more devices configured to receive a fourth set of optical signals, and to generate a result based on optical amplitude modulation of one or more of the optical signals of the fourth set of optical signals; and
  configurable connection pathways between two or more of the first set of one or more devices, the second set of one or more devices, the third set of one or more devices, or the fourth set of one or more devices,
  wherein a first configuration of the configurable connection pathways is configured to: (1) provide a copy of the first set of optical signals as the third set of optical signals, or (2) provide one or more signals from the first set of one or more device and one or more signals from the second set of one or more devices to a summation module configured to produce an electrical signal that represents a sum of values encoded on signals received by the summation module.

Embodiment 170: The apparatus of embodiment 169, wherein each pair of sets of the first set of one or more devices, the second set of one or more devices, the third set of one or more devices, and the fourth set of one or more devices are mutually exclusive.

Embodiment 171: The apparatus of embodiment 169 or 170, wherein the first configuration of the configurable connection pathways is configured to: (1) provide a copy of the first set of optical signals as the third set of optical signals, and (2) provide one or more signals from the first set of one or more device and one or more signals from the second set of one or more devices to the summation module configured to produce an electrical signal that represents a sum of values encoded on at least two different signals received by the summation module.

Embodiment 172: The apparatus of any of embodiments 169 to 171, wherein the first configuration of the configurable connection pathways is configured to provide a copy of the first set of optical signals as the third set of optical signals, and a second configuration of the configurable connection pathways is configured to provide one or more signals from the first set of one or more device and one or more signals from the second set of one or more devices to the summation module configured to produce an electrical signal that represents a sum of values encoded on signals received by the summation module.

Embodiment 173: An apparatus comprising:
a plurality of optical waveguides, wherein a set of multiple input values are encoded on respective optical signals carried by the optical waveguides;
a plurality of copying modules, including for each of at least two subsets of one or more optical signals, a corresponding set of one or more copying modules configured to split the subset of one or more optical signals into two or more copies of the optical signals;
a plurality of multiplication modules, including for each of at least two copies of a first subset of one or more optical signals, a corresponding multiplication module configured to multiply the one or more optical signals of the first subset by one or more values using optical amplitude modulation; and
one or more summation modules, including for results of two or more of the multiplication modules, a summation module configured to produce an electrical signal that represents a sum of the results of the two or more of the multiplication modules, where the results include at least one result that is encoded on an electrical signal and was derived from one of the copies of the optical signals that propagated through no more than a single optical amplitude modulator before being converted to an electrical signal.

Embodiment 174: A system, comprising:
a first unit configured to generate a plurality of modulator control signals;
a processor unit comprising:
  a light source configured to provide a plurality of light outputs;
  a plurality of optical modulators coupled to the light source and the first unit, the plurality of optical modulators being configured to generate an optical input vector by modulating the plurality of light outputs provided by the light source based on the plurality of modulator control signals, the optical input vector comprising a plurality of optical signals; and
  a matrix multiplication unit coupled to the plurality of optical modulators and the first unit, the matrix multiplication unit being configured to transform the optical input vector into an analog output vector based on a plurality of weight control signals;
a second unit coupled to the matrix multiplication unit and configured to convert the analog output vector into a digitized output vector; and
a controller comprising integrated circuitry configured to perform operations comprising:
  receiving an artificial neural network computation request comprising an input dataset that comprises a first digital input vector;
  receiving a first plurality of neural network weights; and
  generating, through the first unit, a first plurality of modulator control signals based on the first digital input vector and a first plurality of weight control signals based on the first plurality of neural network weights.

Embodiment 175: The system of embodiment 174 in which the first unit comprises a digital to analog converter (DAC).

Embodiment 176: The system of embodiment 174 or 175 in which the second unit comprises an analog to digital converter (ADC).

Embodiment 177: The system of any of embodiments 174 to 176, comprising a memory unit configured to store a dataset and a plurality of neural network weights.

Embodiment 178: The system of embodiment 177 in which the integrated circuitry of the controller is further configured to perform operations comprising storing, in the memory unit, the input dataset and the first plurality of neural network weights.

Embodiment 179: The system of any of embodiments 174 to 178 in which the first unit is configured to generate the plurality of weight control signals.

Embodiment 180: The system of any of embodiments 174 to 178 in which the controller comprises an application specific integrated circuit (ASIC), and
receiving an artificial neural network computation request comprises receiving, from a general purpose data processor, an artificial neural network computation request.

Embodiment 181: The system of any of embodiments 174 to 178 in which the first unit, the processing unit, the second unit, and the controller are disposed on at least one of a multi-chip module or an integrated circuit, and
receiving an artificial neural network computation request comprises receiving, from a second data processor, an artificial neural network computation request, wherein the second data processor is external to the multi-chip module or the integrated circuit, the second data processor is coupled to the multi-chip module or the integrated circuit through a communication channel, and the processor unit can process data at a data rate that is at least an order of magnitude greater than a data rate of the communication channel.

Embodiment 182: The system of embodiment 174 in which the first unit, the processor unit, the second unit, and the controller are used in an optoelectronical processing loop that is repeated for a plurality of iterations, and the optoelectronical processing loop includes:
(1) at least a first optical modulation operation based on at least one of the plurality of modulator control signals, and at least a second optical modulation operation based on at least one of the weight control signals, and
(2) at least one of (a) an electrical summation operation or (b) an electrical storage operation.

Embodiment 183: The system of embodiment 182 in which the optoelectronical processing loop includes the electrical storage operation, and the electrical storage operation is performed using a memory unit coupled to the controller,
wherein the operations performed by the controller further comprise storing, in the memory unit, the input dataset and the first plurality of neural network weights.

Embodiment 184: The system of embodiment 182 in which the optoelectronical processing loop includes the electrical summation operation, and the electrical summation operation is performed using an electrical summation module within the matrix multiplication unit,
wherein the electrical summation module is configured to generate an electrical current corresponding to an element of the analog output vector that represents a sum of respective elements of the optical input vector multiplied by respective neural network weights.

Embodiment 185: The system of embodiment 182 in which the optoelectronical processing loop includes at least one signal path on which there is no more than one first optical modulation operation based on at least one of the plurality of modulator control signals, and no more than one second optical modulation operation based on at least one of the weight control signals performed in a single loop iteration.

Embodiment 186: The system of embodiment 185 in which the first optical modulation operation is performed by one of the plurality of optical modulators coupled to the source of the light outputs and to the matrix multiplication unit, and the second optical modulation operation is performed by an optical modulator included in the matrix multiplication unit.

Embodiment 187: The system of embodiment 182 in which the optoelectronical processing loop includes at least one signal path on which there is no more than one electrical storage performed in a single loop iteration.

Embodiment 188: The system of embodiment 174 in which the source includes a laser unit configured to generate the plurality of light outputs.

Embodiment 189: The system of embodiment 174 in which the matrix multiplication unit comprises:
an array of input waveguides to receive the optical input vector, and the optical input vector comprises a first array of optical signals;
an optical interference unit, in optical communication with the array of input waveguides, to perform a linear transformation of the optical input vector into a second array of optical signals; and
an array of output waveguides, in optical communication with the optical interference unit, to guide the second array of optical signals, wherein at least one input waveguide in the array of input waveguides is in optical communication with each output waveguide in the array of output waveguides via the optical interference unit.

Embodiment 190: The system of embodiment 189 in which the optical interference unit comprises:
a plurality of interconnected Mach-Zehnder interferometers (MZIs), each MZI in the plurality of interconnected MZIs comprising:
a first phase shifter configured to change a splitting ratio of the MZI; and
a second phase shifter configured to shift a phase of one output of the MZI,
wherein the first phase shifters and the second phase shifters are coupled to the plurality of weight control signals.

Embodiment 191: The system of embodiment 174 in which the matrix multiplication unit comprises:
a plurality of copying modules, wherein each of the copying modules corresponds to a subset of one or more optical signals of the optical input vector and is configured to split the subset of one or more optical signals into two or more copies of the optical signals;
a plurality of multiplication modules, wherein each of the multiplication modules corresponds to a subset of one or more optical signals configured to multiply the one or more optical signals of the subset by one or more matrix element values using optical amplitude modulation; and
one or more summation modules, wherein each summation module is configured to produce an electrical signal that represents a sum of the results of two or more of the multiplication modules.

Embodiment 192: The system of embodiment 191 in which at least one of the multiplication modules includes an optical amplitude modulator including an input port and two output ports, and a pair of related optical signals is provided from the two output ports such that a difference between amplitudes of the related optical signals corresponds to a result of multiplying an input value by a signed matrix element value.

Embodiment 193: The system of embodiment 191 or 192 in which the matrix multiplication unit is configured to multiply the input vector by a matrix that includes the one or more matrix element values.

Embodiment 194: The system of embodiment 193 in which a set of multiple output values are encoded on respective electrical signals produced by the one or more summation modules, and the output values in the set of multiple output values represent elements of an output vector that results from the input vector being multiplied by the matrix.

Embodiment 195: The system of any of embodiments 174 to 194 in which the system comprises a memory unit configured to store the input dataset and the neural network weights, the second unit comprises an analog to digital converter (ADC) unit, and the operations further comprise:
obtaining, from the ADC unit, a first plurality of digitized outputs corresponding to the analog output vector of the matrix multiplication unit, the first plurality of digitized outputs forming a first digital output vector;
performing a nonlinear transformation on the first digital output vector to generate a first transformed digital output vector; and
storing, in the memory unit, the first transformed digital output vector.

Embodiment 196: The system of embodiment 195 in which the system has a first loop period defined as a time elapsed between the step of storing, in the memory unit, the input dataset and the first plurality of neural network weights, and the step of storing, in the memory unit, the first transformed digital output vector, and
wherein the first loop period is less than or equal to 1 ns.

Embodiment 197: The system of embodiment 195 or 196 in which the operations further comprise:
outputting an artificial neural network output generated based on the first transformed digital output vector.

Embodiment 198: The system of any of embodiments 195 to 197 in which the first unit comprises a digital to analog converter (DAC) unit, and the operations further comprise:
generating, through the DAC unit, a second plurality of modulator control signals based on the first transformed digital output vector.

Embodiment 199: The system of any of embodiments 195 to 198 in which the first unit comprises a digital to analog converter (DAC) unit, the artificial neural network computation request further comprises a second plurality of neural network weights, and wherein the operations further comprise:
based on the obtaining of the first plurality of digitized outputs, generating, through the DAC unit, a second plurality of weight control signals based on the second plurality of neural network weights.

Embodiment 200: The system of embodiment 199 in which the first and second pluralities of neural network weights correspond to different layers of an artificial neural network.

Embodiment 201: The system of any of embodiments 195 to 200 in which the first unit comprises a digital to analog converter (DAC) unit, the input dataset further comprises a second digital input vector, and
wherein the operations further comprise:
generating, through the DAC unit, a second plurality of modulator control signals based on the second digital input vector;
obtaining, from the ADC unit, a second plurality of digitized outputs corresponding to the output vector of the matrix multiplication unit, the second plurality of digitized outputs forming a second digital output vector;

performing a nonlinear transformation on the second digital output vector to generate a second transformed digital output vector;

storing, in the memory unit, the second transformed digital output vector; and outputting an artificial neural network output generated based on the first transformed digital output vector and the second transformed digital output vector, wherein the output vector of the matrix multiplication unit results from a second optical input vector generated based on the second plurality of modulator control signals that is transformed by the matrix multiplication unit based on the first-mentioned plurality of weight control signals.

Embodiment 202: The system of any of embodiments 174 to 201 in which the system comprises a memory unit configured to store the input dataset and the neural network weights, the second unit comprises an analog to digital converter (ADC) unit, and the system further comprises:

an analog nonlinearity unit arranged between the matrix multiplication unit and the ADC unit, the analog nonlinearity unit being configured to receive the plurality of output voltages from the matrix multiplication unit, apply a nonlinear transfer function, and output a plurality of transformed output voltages to the ADC unit, wherein the operations performed by the integrated circuitry of the controller further comprise:

obtaining, from the ADC unit, a first plurality of transformed digitized output voltages corresponding to the plurality of transformed output voltages, first plurality of transformed digitized output voltages forming a first transformed digital output vector; and storing, in the memory unit, the first transformed digital output vector.

Embodiment 203: The system of any of embodiments 174 to 202 in which the integrated circuitry of the controller is configured to generate the first plurality of modulator control signals at a rate greater than or equal to 8 GHz.

Embodiment 204: The system of any of embodiments 174 to 190 in which the first unit comprises a digital to analog converter (DAC) unit, the second unit comprises an analog to digital converter (ADC) unit, the matrix multiplication unit comprises:

an optical matrix multiplication unit coupled to the plurality of optical modulators and the DAC unit, the optical matrix multiplication unit being configured to transform the optical input vector into an optical output vector based on the plurality of weight control signals; and a photodetection unit coupled to the optical matrix multiplication unit and configured to generate a plurality of output voltages corresponding to the optical output vector.

Embodiment 205: The system of embodiment 204, further comprising:

an analog memory unit arranged between the DAC unit and the plurality of optical modulators, the analog memory unit being configured to store analog voltages and to output the stored analog voltages; and an analog nonlinearity unit arranged between the photodetection unit and the ADC unit, the analog nonlinearity unit being configured to receive the plurality of output voltages from the photodetection unit, apply a nonlinear transfer function, and output a plurality of transformed output voltages.

Embodiment 206: The system of embodiment 205 in which the analog memory unit comprises a plurality of capacitors.

Embodiment 207: The system of embodiment 205 or 206 in which the analog memory unit is configured to receive and store the plurality of transformed output voltages of the analog nonlinearity unit, and to output the stored plurality of transformed output voltages to the plurality of optical modulators, and wherein the operations further comprise:

based on generating the first plurality of modulator control signals and the first plurality of weight control signals, storing, in the analog memory unit, the plurality of transformed output voltages of the analog nonlinearity unit;

outputting, through the analog memory unit, the stored transformed output voltages;

obtaining, from the ADC unit, a second plurality of transformed digitized output voltages, the second plurality of transformed digitized output voltages forming a second transformed digital output vector; and storing, in the memory unit, the second transformed digital output vector.

Embodiment 208: The system of embodiment 204 in which the system comprises a memory unit configured to store the input dataset and the neural network weights, the input dataset of the artificial neural network computation request comprises a plurality of digital input vectors, wherein the source is configured to generate a plurality of wavelengths, wherein the plurality of optical modulators comprise:

banks of optical modulators configured to generate a plurality of optical input vectors, each of the banks corresponding to one of the plurality of wavelengths and generating a respective optical input vector having a respective wavelength; and an optical multiplexer configured to combine the plurality of optical input vectors into a combined optical input vector comprising the plurality of wavelengths, wherein the photodetection unit is further configured to demultiplex the plurality of wavelengths and to generate a plurality of demultiplexed output voltages, and wherein the operations comprise:

obtaining, from the ADC unit, a plurality of digitized demultiplexed optical outputs, the plurality of digitized demultiplexed optical outputs forming a plurality of first digital output vectors, wherein each of the plurality of first digital output vectors corresponds to one of the plurality of wavelengths;

performing a nonlinear transformation on each of the plurality of first digital output vectors to generate a plurality of transformed first digital output vectors; and storing, in the memory unit, the plurality of transformed first digital output vectors, wherein each of the plurality of digital input vectors corresponds to one of the plurality of optical input vectors.

Embodiment 209: The system of embodiment 174 in which the system comprises a memory unit configured to store the input dataset and the neural network weights, the second unit comprises an analog to digital converter (ADC) unit, and the artificial neural network computation request comprises a plurality of digital input vectors, wherein the source is configured to generate a plurality of wavelengths, wherein the plurality of optical modulators comprise:

banks of optical modulators configured to generate a plurality of optical input vectors, each of the banks corresponding to one of the plurality of wavelengths and generating a respective optical input vector having a respective wavelength; and an optical multiplexer configured to combine the plurality of optical input vectors into a combined optical input vector comprising the plurality of wavelengths, and wherein the operations comprise:

obtaining, from the ADC unit, a first plurality of digitized optical outputs corresponding to the optical output vector comprising the plurality of wavelengths, the first plurality of digitized optical outputs forming a first digital output vector;

performing a nonlinear transformation on the first digital output vector to generate a first transformed digital output vector; and storing, in the memory unit, the first transformed digital output vector.

Embodiment 210: The system of any of embodiments 174 to 209 in which the first unit comprises a digital to analog converter (DAC) unit, the second unit comprises an analog to digital converter (ADC) unit, and the DAC unit comprises:

a 1-bit DAC subunit configured to generate a plurality of 1-bit modulator control signals, wherein a resolution of the ADC unit is 1 bit, wherein a resolution of the first digital input vector is N bits, and wherein the operations comprise:

decomposing the first digital input vector into N 1-bit input vectors, each of the N 1-bit input vectors corresponding to one of the N bits of the first digital input vector;

generating, through the 1-bit DAC subunit, a sequence of N 1-bit modulator control signals corresponding to the N 1-bit input vectors;

obtaining, from the ADC unit, a sequence of N digitized 1-bit optical outputs corresponding to the sequence of the N 1-bit modulator control signals;

constructing an N-bit digital output vector from the sequence of the N digitized 1-bit optical outputs;

performing a nonlinear transformation on the constructed N-bit digital output vector to generate a transformed N-bit digital output vector; and storing, in the memory unit, the transformed N-bit digital output vector.

Embodiment 211: The system of any of embodiments 174 to 210 in which the system comprises a memory unit configured to store the input dataset and the neural network weights, and the memory unit comprises:

a digital input vector memory configured to store the digital input vector and comprising at least one SRAM; and a neural network weights memory configured to store the plurality of neural network weights and comprising at least one DRAM.

Embodiment 212: The system of any of embodiments 174 to 211 in which the first unit comprises a digital to analog converter (DAC) unit that comprises:

a first DAC subunit configured to generate the plurality of modulator control signals; and a second DAC subunit configured to generate the plurality of weight control signals, wherein the first and second DAC subunits are different.

Embodiment 213: The system of any of embodiments 174 to 212 in which the light source comprises:

a laser source configured to generate light; and an optical power splitter configured to split the light generated by the laser source into the plurality of light outputs, wherein each of the plurality of light outputs have substantially equal powers.

Embodiment 214: The system of any of embodiments 174 to 213 in which the plurality of optical modulators comprises one of MZI modulators, ring resonator modulators, or electro-absorption modulators.

Embodiment 215: The system of embodiment 204, wherein the photodetection unit comprise:

a plurality of photodetectors; and a plurality of amplifiers configured to convert photocurrents generated by the photodetectors into the plurality of output voltages.

Embodiment 216: The system of any of embodiments 174 to 215 in which the integrated circuitry is an application specific integrated circuit.

Embodiment 217: The apparatus of any of embodiments 174 and 191 to 194, comprising a plurality of optical waveguides coupled between the optical modulators and the matrix multiplication unit, in which the optical input vector comprises a set of multiple input values that are encoded on respective optical signals carried by the optical waveguides, and each of the optical signals carried by one of the optical waveguides comprises an optical wave having a common wavelength that is substantially identical for all of the optical signals.

Embodiment 218: The apparatus of any of embodiments 191 to 194 and 217 in which the copying modules include at least one copying module comprising an optical splitter that sends a predetermined fraction of the power of an optical wave at an input port to a first output port, and sends the remaining fraction of the power of the optical wave at the input port to a second output port.

Embodiment 219: The apparatus of embodiment 218 in which the optical splitter comprises a waveguide optical splitter that sends a predetermined fraction of the power of an optical wave guided by an input optical waveguide to a first output optical waveguide, and sends the remaining fraction of the power of the optical wave guided by the input optical waveguide to a second output optical waveguide.

Embodiment 220: The apparatus of embodiment 219 in which a guided mode of the input optical waveguide is adiabatically coupled to guided modes of each of the first and second output optical waveguides.

Embodiment 221: The apparatus of any of embodiments 218 to 220 in which the optical splitter comprises a beam splitter that includes at least one surface that transmits the predetermined fraction of the power of the optical wave at the input port and reflects the remaining fraction of the power of the optical wave at the input port.

Embodiment 222: The apparatus of any of embodiments 217 to 221 in which at least one of the plurality of optical waveguides comprises an optical fiber that is coupled to an optical coupler that couples a guided mode of the optical fiber to a free-space propagation mode.

Embodiment 223: The apparatus of any of embodiments 174, 191 to 194, and 217 to 222 in which the multiplication modules include at least one coherence-sensitive multiplication module configured to multiply the one or more optical signals of the first subset by one or more matrix element values using optical amplitude modulation based on interference between optical waves that have a coherence length at least as long as a propagation distance through the coherence-sensitive multiplication module.

Embodiment 224: The apparatus of embodiment 223 in which the coherence-sensitive multiplication module comprises a Mach-Zehnder Interferometer (MZI) that splits an optical wave guided by an input optical waveguide into a first optical waveguide arm of the MZI and a second optical waveguide arm of the MZI, the first optical waveguide arm includes a phase shifter that imparts a relative phase shift with respect to a phase delay of the second optical waveguide arm, and the MZI combines optical waves from the first optical waveguide arm and the second optical waveguide arm into at least one output optical waveguide.

Embodiment 225: The apparatus of embodiment 224 in which the MZI combines optical waves from the first optical waveguide arm and the second optical waveguide arm into each of a first output optical waveguide and a second output optical waveguide, a first photodetector receives an optical wave from the first output optical waveguide to generate a first photocurrent, a second photodetector receives an optical wave from the second output optical waveguide to generate a second photocurrent, and a result of the coherence-sensitive multiplication module comprises a difference between the first photocurrent and the second photocurrent.

Embodiment 226: The apparatus of any of embodiments 223 to 225 in which the coherence-sensitive multiplication module comprises one or more ring resonators, including at least one ring resonator coupled to a first optical waveguide and at least one ring resonator coupled to a second optical waveguide.

Embodiment 227: The apparatus of embodiment 226 in which a first photodetector receives an optical wave from the first optical waveguide to generate a first photocurrent, a second photodetector receives an optical wave from the second optical waveguide to generate a second photocurrent, and a result of the coherence-sensitive multiplication module comprises a difference between the first photocurrent and the second photocurrent.

Embodiment 228: The apparatus of any of embodiments 174, 191 to 194, and 217 to 227 in which the multiplication modules include at least one coherence-insensitive multiplication module configured to multiply the one or more optical signals of the first subset by one or more matrix element values using optical amplitude modulation based on absorption of energy within an optical wave.

Embodiment 229: The apparatus of embodiment 228, wherein the coherence-insensitive multiplication module comprises an electro-absorption modulator.

Embodiment 230: The apparatus of any of embodiments 174, 191 to 194, and 217 to 229 in which the one or more summation modules include at least one summation module comprising: (1) two or more input conductors that each carries an electrical signal in the form of an input current whose amplitude represents a respective result of a respective one of the multiplication modules, and (2) at least one output conductor that carries the electrical signal that represents the sum of the respective results in the form of an output current that is proportional to the sum of the input currents.

Embodiment 231: The apparatus of embodiment 230, wherein the two or more input conductors and the output conductor comprise wires that meet at one or more junctions among the wires, and the output current is substantially equal to the sum of the input currents.

Embodiment 232: The apparatus of embodiment 230 or 231, wherein at least a first input current of the input currents is provided in the form of at least one photocurrent generated by at least one photodetector that receives an optical signal generated by a first multiplication module of the multiplication modules.

Embodiment 233: The apparatus of embodiment 232, wherein the first input current is provided in the form of a difference between two photocurrents generated by different respective photodetectors that receive different respective optical signals both generated by the first multiplication module.

Embodiment 234: The apparatus of any of embodiments 174 to 233, wherein one of the copies of the first subset of one or more optical signals consists of a single optical signal on which one of the input values is encoded.

Embodiment 235: The apparatus of embodiment 234, wherein the multiplication module corresponding to the copy of the first subset multiplies the encoded input value by a single matrix element value.

Embodiment 236: The apparatus of any of embodiments 174, 191 to 194, and 217 to 235 in which one of the copies of the first subset of one or more optical signals includes more than one of the optical signals, and fewer than all of the optical signals, on which multiple input values are encoded.

Embodiment 237: The apparatus of embodiment 236, wherein the multiplication module corresponding to the copy of the first subset multiplies the encoded input values by different respective matrix element values.

Embodiment 238: The apparatus of embodiment 237, wherein different multiplication modules corresponding to different respective copies of the first subset of one or more optical signals are contained by different devices that are in optical communication to transmit one of the copies of the first subset of one or more optical signals between the different devices.

Embodiment 239: The apparatus of any of embodiments 174, 191 to 194, and 217 to 238 in which two or more of the plurality of optical waveguides, two or more of the plurality of copying modules, two or more of the plurality of multiplication modules, and at least one of the one or more summation modules are arranged on a substrate of a common device.

Embodiment 240: The apparatus of embodiment 239, wherein the device performs vector-matrix multiplication, wherein an input vector is provided as a set of optical signals, and an output vector is provided as a set of electrical signals.

Embodiment 241: The apparatus of any of embodiments 174, 191 to 194, and 217 to 240, further comprising an accumulator that integrates an input electrical signal corresponding to an output of a multiplication module or a summation module, wherein the input electrical signal is encoded using a time domain encoding that uses on-off amplitude modulation within each of multiple time slots, and the accumulator produces an output electrical signal that is encoded with more than two amplitude levels corresponding to different duty cycles of the time domain encoding over the multiple time slots.

Embodiment 242: The apparatus of any of embodiments 174, 191 to 194, and 217 to 241, wherein the two or more of the multiplication modules each correspond to a different subset of one or more optical signals.

Embodiment 243: The apparatus of any of embodiments 174, 191 to 194, and 217 to 242, further comprising, for each copy of a second subset of one or more optical signals, different from the optical signals in the first subset of one or more optical signals, a multiplication module configured to multiply the one or more optical signals of the second subset by one or more matrix element values using optical amplitude modulation.

Embodiment 244: A system, comprising:
  a memory unit configured to store a dataset and a plurality of neural network weights;
  a driver unit configured to generate a plurality of modulator control signals;
  an optoelectronic processor comprising:
    a light source configured to provide a plurality of light outputs;
    a plurality of optical modulators coupled to the light source and the driver unit, the plurality of optical modulators being configured to generate an optical input vector by modulating the plurality of light outputs generated by the light source based on the plurality of modulator control signals;
    a matrix multiplication unit coupled to the plurality of optical modulators and the driver unit, the matrix multiplication unit being configured to transform the optical input vector into an analog output vector based on a plurality of weight control signals; and
    a comparator unit coupled to the matrix multiplication unit and configured to convert the analog output vector into a plurality of digitized 1-bit outputs; and
  a controller comprising integrated circuitry configured to perform operations comprising:
    receiving an artificial neural network computation request comprising an input dataset and a first plurality of neural network weights, wherein the input dataset comprises a first digital input vector having a resolution of N bits;
    storing, in the memory unit, the input dataset and the first plurality of neural network weights;
    decomposing the first digital input vector into N 1-bit input vectors, each of the N 1-bit input vectors corresponding to one of the N bits of the first digital input vector;
    generating, through the driver unit, a sequence of N 1-bit modulator control signals corresponding to the N 1-bit input vectors;
    obtaining, from the comparator unit, a sequence of N digitized 1-bit outputs corresponding to the sequence of the N 1-bit modulator control signals;
    constructing an N-bit digital output vector from the sequence of the N digitized 1-bit outputs;
    performing a nonlinear transformation on the constructed N-bit digital output vector to generate a transformed N-bit digital output vector; and
    storing, in the memory unit, the transformed N-bit digital output vector.

Embodiment 245: The system of embodiment 244 in which receiving an artificial neural network computation request comprises receiving, from a general purpose computer, an artificial neural network computation request.

Embodiment 246: The system of embodiment 244 in which the driver unit is configured to generate the plurality of weight control signals.

Embodiment 247: The system of embodiment 244 in which the matrix multiplication unit comprises:
  an optical matrix multiplication unit coupled to the plurality of optical modulators and the driver unit, the optical matrix multiplication unit being configured to transform the optical input vector into an optical output vector based on the plurality of weight control signals; and
  a photodetection unit coupled to the optical matrix multiplication unit and configured to generate a plurality of output voltages corresponding to the optical output vector.

Embodiment 248: The system of embodiment 244 in which the matrix multiplication unit comprises:
  an array of input waveguides to receive the optical input vector;
  an optical interference unit, in optical communication with the array of input waveguides, to perform a linear transformation of the optical input vector into a second array of optical signals; and
  an array of output waveguides, in optical communication with the optical interference unit, to guide the second array of optical signals, wherein at least one input waveguide in the array of input waveguides is in optical communication with each output waveguide in the array of output waveguides via the optical interference unit.

Embodiment 249: The system of embodiment 248 in which the optical interference unit comprises:
  a plurality of interconnected Mach-Zehnder interferometers (MZIs), each MZI in the plurality of interconnected MZIs comprising:
    a first phase shifter configured to change a splitting ratio of the MZI; and
    a second phase shifter configured to shift a phase of one output of the MZI,
  wherein the first phase shifters and the second phase shifters are coupled to the plurality of weight control signals.

Embodiment 250: The system of embodiment 244 in which the matrix multiplication unit comprises:
  a plurality of copying modules, including for each of at least two subsets of one or more optical signals of the optical input vector, a corresponding set of one or more copying modules configured to split the subset of one or more optical signals into two or more copies of the optical signals;
  a plurality of multiplication modules, including for each of at least two copies of a first subset of one or more optical signals, a corresponding multiplication module configured to multiply the one or more optical signals of the first subset by one or more matrix element values using optical amplitude modulation; and
  one or more summation modules, including for results of two or more of the multiplication modules, a summation module configured to produce an electrical signal that represents a sum of the results of the two or more of the multiplication modules.

Embodiment 251: The system of embodiment 250 in which at least one of the multiplication modules includes an optical amplitude modulator including an input port and two output ports, and a pair of related optical signals is provided from the two output ports such that a difference between amplitudes of the related optical signals corresponds to a result of multiplying an input value by a signed matrix element value.

Embodiment 252: The system of embodiment 250 or 251 in which the matrix multiplication unit is configured to multiply the input vector by a matrix that includes the one or more matrix element values.

Embodiment 253: The system of embodiment 252 in which a set of multiple output values are encoded on respective electrical signals produced by the one or more summation modules, and the output values in the set of multiple output values represent elements of an output vector that results from the input vector being multiplied by the matrix.

Embodiment 254: A method for performing artificial neural network computations in a system having a matrix multiplication unit configured to transform an optical input vector into an analog output vector based on a plurality of weight control signals, the method comprising:

receiving an artificial neural network computation request comprising an input dataset and a first plurality of neural network weights, wherein the input dataset comprises a first digital input vector;

storing, in a memory unit, the input dataset and the first plurality of neural network weights;

generating a first plurality of modulator control signals based on the first digital input vector and a first plurality of weight control signals based on the first plurality of neural network weights;

obtaining a first plurality of digitized outputs corresponding to an output vector of the matrix multiplication unit, the first plurality of digitized outputs forming a first digital output vector;

performing, by a controller, a nonlinear transformation on the first digital output vector to generate a first transformed digital output vector;

storing, in the memory unit, the first transformed digital output vector; and outputting, by the controller, an artificial neural network output generated based on the first transformed digital output vector.

Embodiment 255: The method of embodiment 254 in which receiving an artificial neural network computation request comprises receiving the artificial neural network computation request from a computer through a communication channel.

Embodiment 256: The method of embodiment 254 or 255 in which generating a first plurality of modulator control signals comprises generating, through a digital-to-analog converter (DAC) unit, a first plurality of modulator control signals.

Embodiment 257: The method of any of embodiments 254 to 256 in which obtaining a first plurality of digitized outputs comprises obtaining, from an analog-to-digital conversion (ADC) unit, a first plurality of digitized outputs.

Embodiment 258: The method of embodiment 257, comprising:

applying the first plurality of modulator control signals to a plurality of optical modulators coupled to a light source and the DAC unit, and generating, using the plurality of optical modulators, an optical input vector by modulating the plurality of light outputs generated by the laser unit based on the plurality of modulator control signals.

Embodiment 259: The method of embodiment 258 in which the matrix multiplication unit is coupled to the plurality of optical modulators and the DAC unit, and the method comprises:

transforming, using the matrix multiplication unit, the optical input vector into an analog output vector based on the plurality of weight control signals.

Embodiment 260: The method of embodiment 259 in which the ADC unit is coupled to the matrix multiplication unit, and the method comprises:

converting, using the ADC unit, the analog output vector into the first plurality of digitized outputs.

Embodiment 261: The method of embodiment 259 or 260 in which the matrix multiplication unit comprises an optical matrix multiplication unit coupled to the plurality of optical modulators and the DAC unit, transforming the optical input vector into an analog output vector comprises transforming, using the optical matrix multiplication unit, the optical input vector into an optical output vector based on the plurality of weight control signals, and the method comprises: generating, using a photodetection unit coupled to the optical matrix multiplication unit, a plurality of output voltages corresponding to the optical output vector.

Embodiment 262: The method of embodiment 254, comprising:

receiving, at an array of input waveguides, the optical input vector;

performing, using an optical interference unit in optical communication with the array of input waveguides, a linear transformation of the optical input vector into a second array of optical signals; and guiding, using an array of output waveguides in optical communication with the optical interference unit, the second array of optical signals, wherein at least one input waveguide in the array of input waveguides is in optical communication with each output waveguide in the array of output waveguides via the optical interference unit.

Embodiment 263: The method of embodiment 262 in which the optical interference unit comprises a plurality of interconnected Mach-Zehnder interferometers (MZIs), each MZI in the plurality of interconnected MZIs comprising a first phase shifter and a second phase shifter, and the first phase shifters and the second phase shifters are coupled to the plurality of weight control signals, wherein the method comprises:

changing a splitting ratio of the MZI using the first phase shifter, and shifting a phase of one output of the MZI using the second phase shifter.

Embodiment 264: The method of embodiment 258, comprising:

for each of at least two subsets of one or more optical signals of the optical input vector, splitting, using a corresponding set of one or more copying modules, the subset of one or more optical signals into two or more copies of the optical signals;

for each of at least two copies of a first subset of one or more optical signals, multiplying, using a corresponding multiplication module, the one or more optical signals of the first subset by one or more matrix element values using optical amplitude modulation; and for results of two or more of the multiplication modules, producing, using a summation module, an electrical signal that represents a sum of the results of the two or more of the multiplication modules.

Embodiment 265: The method of embodiment 264 in which at least one of the multiplication modules includes an optical amplitude modulator including an input port and two output ports, and a pair of related optical signals is provided from the two output ports such that a difference between amplitudes of the related optical signals corresponds to a result of multiplying an input value by a signed matrix element value.

Embodiment 266: The method of embodiment 264 or 265, comprising multiplying, using the matrix multiplication unit, the input vector by a matrix that includes the one or more matrix element values.

Embodiment 267: The method of embodiment 266, comprising encoding a set of multiple output values on respective electrical signals produced by the one or more summation modules, and representing, using the output values in the set of multiple output values, elements of an output vector that results from the input vector being multiplied by the matrix.

Embodiment 268: A method comprising:
providing input information in an electronic format;
converting at least a part of the electronic input information into an optical input vector;
optoelectronically transforming the optical input vector into an analog output vector based on a matrix multiplication; and
electronically applying a non-linear transformation to the analog output vector to provide output information in an electronic format.

Embodiment 269: The method of embodiment 268, further comprising:
repeating the electronic-to-optical converting, the optoelectronical transforming, and the electronically applied non-linear transforming with respect to new electronic input information corresponding to the provided output information in electronic format.

Embodiment 270: The method of embodiment 269, wherein the matrix multiplication for the initial optoelectronical transforming and the matrix multiplication of the repeated optoelectronical transforming are the same and correspond to the same layer of an artificial neural network.

Embodiment 271: The method of embodiment 269, wherein the matrix multiplication for the initial optoelectronical transforming and the matrix multiplication of the repeated optoelectronical transforming are different and correspond to different layers of an artificial neural network.

Embodiment 272: The method of embodiment 268, further comprising:
repeating the electronic-to-optical converting, the optoelectronical transforming, and the electronically applied non-linear transforming with respect to a different part of the electronic input information,
wherein the matrix multiplication for the initial optoelectronical transforming and the matrix multiplication of the repeated optoelectronical transforming are the same and correspond to a first layer of an artificial neural network.

Embodiment 273: The method of embodiment 272, further comprising:
providing intermediate information in an electronic format based on the electronic output information produced for the multiple parts of the electronic input information by the first layer of the artificial neural network; and
repeating the electronic-to-optical converting, the optoelectronical transforming, and the electronically applied non-linear transforming with respect to each of different parts of the electronic intermediate information,
wherein the matrix multiplication for the initial optoelectronical transforming and the matrix multiplication of the repeated optoelectronical transforming related to the different parts of the electronic intermediate information are the same and correspond to a second layer of the artificial neural network.

Embodiment 274: A system for performing artificial neural network computations, the system comprising:
a first unit configured to generate a plurality of vector control signals and to generate a plurality of weight control signals;
a second unit configured to provide an optical input vector based on the plurality of vector control signals;
a matrix multiplication unit coupled to the second unit and the first unit, the matrix multiplication unit being configured to transform the optical input vector into an output vector based on the plurality of weight control signals; and
a controller comprising integrated circuitry configured to perform operations comprising:
receiving an artificial neural network computation request comprising an input dataset and a first plurality of neural network weights, wherein the input dataset comprises a first digital input vector; and
generating, through the first unit, a first plurality of vector control signals based on the first digital input vector and a first plurality of weight control signals based on the first plurality of neural network weights;
wherein the first unit, the second unit, the matrix multiplication unit, and the controller are used in an optoelectronical processing loop that is repeated for a plurality of iterations, and the optoelectronical processing loop includes: (1) at least two optical modulation operations, and (2) at least one of (a) an electrical summation operation or (b) an electrical storage operation.

Embodiment 275: A method for performing artificial neural network computations, the method comprising:
providing input information in an electronic format;
converting at least a part of the electronic input information into an optical input vector; and
transforming the optical input vector into an output vector based on a matrix multiplication using a set of neural network weights;
wherein the providing, converting, and transforming are performed in an optoelectronical processing loop that is repeated for a plurality of iterations using different respective sets of neural network weights and different respective input information, and the optoelectronical processing loop includes: (1) at least two optical modulation operations, and (2) at least one of (a) an electrical summation operation or (b) an electrical storage operation.

What is claimed is:
1. A system, comprising:
a first unit configured to generate a plurality of modulator control signals;
a processor unit comprising:
a light source configured to provide a plurality of light outputs;
a plurality of optical modulators coupled to the light source and the first unit, the plurality of optical modulators being configured to generate an optical input vector by modulating the plurality of light outputs provided by the light source based on the plurality of modulator control signals, the optical input vector comprising a plurality of optical signals; and
a matrix multiplication unit coupled to the plurality of optical modulators and the first unit, the matrix multiplication unit being configured to transform the optical input vector into an analog output vector based on a plurality of weight control signals;
a second unit coupled to the matrix multiplication unit and configured to convert the analog output vector into a digitized output vector;
a controller comprising integrated circuitry configured to perform operations comprising:
receiving an artificial neural network computation request comprising an input dataset that comprises a first digital input vector;
receiving a first plurality of neural network weights; and
generating, through the first unit, a first plurality of modulator control signals based on the first digital input vector and a first plurality of weight control signals based on the first plurality of neural network weights;

wherein the matrix multiplication unit comprises:
- a plurality of copying modules, wherein each of the copying modules corresponds to a subset of one or more optical signals of the optical input vector and is configured to split the subset of one or more optical signals into two or more copies of the optical signals;
- a plurality of multiplication modules, wherein each of the multiplication modules corresponds to a subset of one or more optical signals configured to multiply the one or more optical signals of the subset by one or more matrix element values using optical amplitude modulation; and
- one or more summation modules, wherein each summation module is configured to produce an electrical signal that represents a sum of the results of two or more of the multiplication modules; and an accumulator that integrates an input electrical signal corresponding to an output of a multiplication module or a summation module, wherein the input electrical signal is encoded using a time domain encoding that uses on-off amplitude modulation within each of multiple time slots, and the accumulator produces an output electrical signal that is encoded with more than two amplitude levels corresponding to different duty cycles of the time domain encoding over the multiple time slots.

2. The system of claim 1, wherein the plurality of copying modules comprise a first copying module that is configured to split a first subset of optical signals into at least a first copy of optical signals and a second copy of optical signals, the plurality of multiplication modules comprise a first multiplication module and a second multiplication module, the first multiplication module is configured to multiply the first copy of optical signals by first one or more matrix element values using optical amplitude modulation, and the second multiplication module is configured to multiply the second copy of optical signals by second one or more matrix element values using optical amplitude modulation.

3. The system of claim 1 in which the first unit, the processing unit, the second unit, and the controller are disposed on at least one of a multi-chip module or an integrated circuit, and
- receiving an artificial neural network computation request comprises receiving, from a second data processor, an artificial neural network computation request, wherein the second data processor is external to the multi-chip module or the integrated circuit, the second data processor is coupled to the multi-chip module or the integrated circuit through a communication channel, and the processor unit is configured to process data at a data rate that is at least an order of magnitude greater than a data rate of the communication channel.

4. The system of claim 1 in which the matrix multiplication unit comprises an electrical summation module configured to perform the electrical summation operation,
- wherein the electrical summation module is configured to generate an electrical current corresponding to an element of the analog output vector that represents a sum of respective elements of the optical input vector multiplied by respective neural network weights.

5. The system of claim 1 in which at least one of the multiplication modules includes an optical amplitude modulator including an input port and two output ports, and a pair of related optical signals is provided from the two output ports, wherein the matrix multiplication unit comprises a difference unit configured to output a difference between amplitudes of the related optical signals, in which the difference corresponds to a result of multiplying an input value by a signed matrix element value.

6. The system of claim 1 in which the matrix multiplication unit is configured to multiply the input vector by a matrix that includes the one or more matrix element values,
- wherein a set of multiple output values are encoded on respective electrical signals produced by the one or more summation modules, and the output values in the set of multiple output values represent elements of an output vector that results from the input vector being multiplied by the matrix.

7. The system of claim 1 in which the copying modules include at least one copying module comprising an optical splitter that sends a predetermined fraction of the power of an optical wave at an input port to a first output port, and sends the remaining fraction of the power of the optical wave at the input port to a second output port.

8. The system of claim 1, comprising a memory unit configured to store the input dataset and the neural network weights, in which the second unit comprises an analog to digital converter (ADC) unit, and the operations further comprise:
- obtaining, from the ADC unit, a first plurality of digitized outputs corresponding to the analog output vector of the matrix multiplication unit, the first plurality of digitized outputs forming a first digital output vector;
- performing a nonlinear transformation on the first digital output vector to generate a first transformed digital output vector; and
- storing, in the memory unit, the first transformed digital output vector;
- wherein the system has a first loop period defined as a time elapsed between the step of storing, in the memory unit, the input dataset and the first plurality of neural network weights, and the step of storing, in the memory unit, the first transformed digital output vector, and
- wherein the first loop period is less than or equal to 1 ns.

9. The system of claim 1, comprising a memory unit configured to store the input dataset and the neural network weights, wherein the second unit comprises an analog to digital converter (ADC) unit, and the operations further comprise:
- obtaining, from the ADC unit, a first plurality of digitized outputs corresponding to the analog output vector of the matrix multiplication unit, the first plurality of digitized outputs forming a first digital output vector;
- performing a nonlinear transformation on the first digital output vector to generate a first transformed digital output vector; and
- storing, in the memory unit, the first transformed digital output vector;
- wherein the first unit comprises a digital to analog converter (DAC) unit, the artificial neural network computation request further comprises a second plurality of neural network weights, and the operations further comprise:
- generating, through the DAC unit, a second plurality of modulator control signals based on the first transformed digital output vector,
- based on the first plurality of digitized outputs and the second plurality of neural network weights, generating, through the DAC unit, a second plurality of weight control signals, wherein the first and second pluralities of neural network weights correspond to different layers of an artificial neural network.

10. The system of claim 1 in which the system comprises a memory unit configured to store the input dataset and the neural network weights, the second unit comprises an analog to digital converter (ADC) unit, and the system further comprises:
an analog nonlinearity unit arranged between the matrix multiplication unit and the ADC unit, the analog nonlinearity unit being configured to receive the plurality of output voltages from the matrix multiplication unit, apply a nonlinear transfer function, and output a plurality of transformed output voltages to the ADC unit,
wherein the operations performed by the integrated circuitry of the controller further comprise:
obtaining, from the ADC unit, a first plurality of transformed digitized output voltages corresponding to the plurality of transformed output voltages, first plurality of transformed digitized output voltages forming a first transformed digital output vector; and
storing, in the memory unit, the first transformed digital output vector.

11. The system of claim 1 in which the integrated circuitry of the controller is configured to generate the first plurality of modulator control signals at a rate greater than or equal to 8 GHz.

12. The system of claim 1 in which the first unit comprises a digital to analog converter (DAC) unit, the second unit comprises an analog to digital converter (ADC) unit, the matrix multiplication unit comprises:
an optical matrix multiplication unit coupled to the plurality of optical modulators and the DAC unit, the optical matrix multiplication unit being configured to transform the optical input vector into an optical output vector based on the plurality of weight control signals; and
a photodetection unit coupled to the optical matrix multiplication unit and configured to generate a plurality of output voltages corresponding to the optical output vector,
an analog memory unit arranged between the DAC unit and the plurality of optical modulators, the analog memory unit being configured to store analog voltages and to output the stored analog voltages; and
an analog nonlinearity unit arranged between the photodetection unit and the ADC unit, the analog nonlinearity unit being configured to receive the plurality of output voltages from the photodetection unit, apply a nonlinear transfer function, and output a plurality of transformed output voltages.

13. The system of claim 12 in which the system comprises a memory unit configured to store the input dataset and the neural network weights, the input dataset of the artificial neural network computation request comprises a plurality of digital input vectors,
wherein the source is configured to generate a plurality of wavelengths,
wherein the plurality of optical modulators comprise:
banks of optical modulators configured to generate a plurality of optical input vectors, each of the banks corresponding to one of the plurality of wavelengths and generating a respective optical input vector having a respective wavelength; and
an optical multiplexer configured to combine the plurality of optical input vectors into a combined optical input vector comprising the plurality of wavelengths, wherein the photodetection unit is further configured to demultiplex the plurality of wavelengths and to generate a plurality of demultiplexed output voltages, and
wherein the operations comprise:
obtaining, from the ADC unit, a plurality of digitized demultiplexed optical outputs, the plurality of digitized demultiplexed optical outputs forming a plurality of first digital output vectors, wherein each of the plurality of first digital output vectors corresponds to one of the plurality of wavelengths;
performing a nonlinear transformation on each of the plurality of first digital output vectors to generate a plurality of transformed first digital output vectors; and
storing, in the memory unit, the plurality of transformed first digital output vectors,
wherein each of the plurality of digital input vectors corresponds to one of the plurality of optical input vectors.

14. The system of claim 1 in which the system comprises a memory unit configured to store the input dataset and the neural network weights, the second unit comprises an analog to digital converter (ADC) unit, and the artificial neural network computation request comprises a plurality of digital input vectors,
wherein the source is configured to generate a plurality of wavelengths,
wherein the plurality of optical modulators comprise:
banks of optical modulators configured to generate a plurality of optical input vectors, each of the banks corresponding to one of the plurality of wavelengths and generating a respective optical input vector having a respective wavelength; and
an optical multiplexer configured to combine the plurality of optical input vectors into a combined optical input vector comprising the plurality of wavelengths, and
wherein the operations comprise:
obtaining, from the ADC unit, a first plurality of digitized optical outputs corresponding to the optical output vector comprising the plurality of wavelengths, the first plurality of digitized optical outputs forming a first digital output vector;
performing a nonlinear transformation on the first digital output vector to generate a first transformed digital output vector; and
storing, in the memory unit, the first transformed digital output vector.

15. The system of claim 1 in which the first unit comprises a digital to analog converter (DAC) unit, the second unit comprises an analog to digital converter (ADC) unit, and the DAC unit comprises:
a 1-bit DAC subunit configured to generate a plurality of 1-bit modulator control signals,
wherein a resolution of the ADC unit is 1 bit,
wherein a resolution of the first digital input vector is N bits, and
wherein the operations comprise:
decomposing the first digital input vector into N 1-bit input vectors, each of the N 1-bit input vectors corresponding to one of the N bits of the first digital input vector;
generating, through the 1-bit DAC subunit, a sequence of N 1-bit modulator control signals corresponding to the N 1-bit input vectors;

obtaining, from the ADC unit, a sequence of N digitized 1-bit optical outputs corresponding to the sequence of the N 1-bit modulator control signals;
constructing an N-bit digital output vector from the sequence of the N digitized 1-bit optical outputs;
performing a nonlinear transformation on the constructed N-bit digital output vector to generate a transformed N-bit digital output vector; and
storing, in the memory unit, the transformed N-bit digital output vector.

16. The system of claim 1 in which the multiplication modules include at least one coherence-insensitive multiplication module configured to multiply the one or more optical signals of a first subset of one or more optical signals by one or more matrix element values using optical amplitude modulation based on absorption of energy within an optical wave.

17. The system of claim 16 in which the coherence-insensitive multiplication module comprises an electro-absorption modulator.

18. The system of claim 1 in which the one or more summation modules include at least one summation module comprising:
two or more input conductors that each carries an electrical signal in the form of an input current whose amplitude represents a respective result of a respective one of the multiplication modules, and
at least one output conductor that carries the electrical signal that represents the sum of the respective results in the form of an output current that is proportional to the sum of the input currents.

19. The system of claim 18 in which the two or more input conductors and the output conductor comprise wires that meet at one or more junctions among the wires, and the output current is substantially equal to the sum of the input currents.

20. The system of claim 18 in which at least a first input current of the input currents is provided in the form of at least one photocurrent generated by at least one photodetector that receives an optical signal generated by a first multiplication module of the multiplication modules.

21. The system of claim 1 in which one of the copies of a first subset of one or more optical signals consists of a single optical signal on which one of the input values is encoded.

22. The system of claim 21 in which the multiplication module corresponding to the copy of the first subset is configured to multiply the encoded input value by a single matrix element value.

23. The system of claim 1 in which one of the copies of a first subset of one or more optical signals includes more than one of the optical signals, and fewer than all of the optical signals, on which multiple input values are encoded.

24. The system of claim 23 in which the multiplication module corresponding to the copy of the first subset is configured to multiply the encoded input values by different respective matrix element values.

25. The system of claim 1 in which two or more of the plurality of optical waveguides, two or more of the plurality of copying modules, two or more of the plurality of multiplication modules, and at least one of the one or more summation modules are arranged on a substrate of a common device.

26. The system of claim 25 in which the device is configured to perform vector-matrix multiplications, wherein an input vector is provided as a set of optical signals, and an output vector is provided as a set of electrical signals.

27. The system of claim 25 in which the two or more of the multiplication modules each correspond to a different subset of one or more optical signals.

28. A system, comprising:
a first unit configured to generate a plurality of modulator control signals;
a processor unit comprising:
a light source configured to provide a plurality of light outputs;
a plurality of optical modulators coupled to the light source and the first unit, the plurality of optical modulators being configured to generate an optical input vector by modulating the plurality of light outputs provided by the light source based on the plurality of modulator control signals, the optical input vector comprising a plurality of optical signals; and
a matrix multiplication unit coupled to the plurality of optical modulators and the first unit, the matrix multiplication unit being configured to transform the optical input vector into an analog output vector based on a plurality of weight control signals;
a second unit coupled to the matrix multiplication unit and configured to convert the analog output vector into a digitized output vector; and
a controller comprising integrated circuitry configured to perform operations comprising:
receiving an artificial neural network computation request comprising an input dataset that comprises a first digital input vector;
receiving a first plurality of neural network weights; and
generating, through the first unit, a first plurality of modulator control signals based on the first digital input vector and a first plurality of weight control signals based on the first plurality of neural network weights;
wherein the matrix multiplication unit comprises:
a plurality of copying modules, wherein each of the copying modules corresponds to a subset of one or more optical signals of the optical input vector and is configured to split the subset of one or more optical signals into two or more copies of the optical signals;
a plurality of multiplication modules, wherein each of the multiplication modules corresponds to a subset of one or more optical signals configured to multiply the one or more optical signals of the subset by one or more matrix element values using optical amplitude modulation; and
one or more summation modules, wherein each summation module is configured to produce an electrical signal that represents a sum of the results of two or more of the multiplication modules;
wherein the first unit comprises a digital to analog converter (DAC) unit, the second unit comprises an analog to digital converter (ADC) unit, the matrix multiplication unit comprises:
an optical matrix multiplication unit coupled to the plurality of optical modulators and the DAC unit, the optical matrix multiplication unit being configured to transform the optical input vector into an optical output vector based on the plurality of weight control signals;

a photodetection unit coupled to the optical matrix multiplication unit and configured to generate a plurality of output voltages corresponding to the optical output vector, an analog memory unit arranged between the DAC unit and the plurality of optical modulators, the analog memory unit being configured to store analog voltages and to output the stored analog voltages; and an analog nonlinearity unit arranged between the photodetection unit and the ADC unit, the analog nonlinearity unit being configured to receive the plurality of output voltages from the photodetection unit, apply a nonlinear transfer function, and output a plurality of transformed output voltages;

wherein the analog memory unit is configured to receive and store the plurality of transformed output voltages of the analog nonlinearity unit, and to output the stored plurality of transformed output voltages to the plurality of optical modulators, and wherein the operations further comprise:
based on generating the first plurality of modulator control signals and the first plurality of weight control signals, storing, in the analog memory unit, the plurality of transformed output voltages of the analog nonlinearity unit;

outputting, through the analog memory unit, the stored transformed output voltages;

obtaining, from the ADC unit, a second plurality of transformed digitized output voltages, the second plurality of transformed digitized output voltages forming a second transformed digital output vector; and storing, in the memory unit, the second transformed digital output vector.

29. A system, comprising:
a first unit configured to generate a plurality of modulator control signals;
a processor unit comprising:
  a light source configured to provide a plurality of light outputs;
  a plurality of optical modulators coupled to the light source and the first unit, the plurality of optical modulators being configured to generate an optical input vector by modulating the plurality of light outputs provided by the light source based on the plurality of modulator control signals, the optical input vector comprising a plurality of optical signals; and
  a matrix multiplication unit coupled to the plurality of optical modulators and the first unit, the matrix multiplication unit being configured to transform the optical input vector into an analog output vector based on a plurality of weight control signals;
a second unit coupled to the matrix multiplication unit and configured to convert the analog output vector into a digitized output vector; and
a controller comprising integrated circuitry configured to perform operations comprising:
  receiving an artificial neural network computation request comprising an input dataset that comprises a first digital input vector;
  receiving a first plurality of neural network weights; and
  generating, through the first unit, a first plurality of modulator control signals based on the first digital input vector and a first plurality of weight control signals based on the first plurality of neural network weights;
wherein the matrix multiplication unit comprises:
  a plurality of copying modules, wherein each of the copying modules corresponds to a subset of one or more optical signals of the optical input vector and is configured to split the subset of one or more optical signals into two or more copies of the optical signals;
  a plurality of multiplication modules, wherein each of the multiplication modules corresponds to a subset of one or more optical signals configured to multiply the one or more optical signals of the subset by one or more matrix element values using optical amplitude modulation; and
  one or more summation modules, wherein each summation module is configured to produce an electrical signal that represents a sum of the results of two or more of the multiplication modules;
wherein the one or more summation modules include at least one summation module comprising:
  two or more input conductors that each carries an electrical signal in the form of an input current whose amplitude represents a respective result of a respective one of the multiplication modules, and
  at least one output conductor that carries the electrical signal that represents the sum of the respective results in the form of an output current that is proportional to the sum of the input currents;
wherein at least a first input current of the input currents is provided in the form of at least one photocurrent generated by at least one photodetector that receives an optical signal generated by a first multiplication module of the multiplication modules;
wherein the first input current is provided in the form of a difference between two photocurrents generated by different respective photodetectors that receive different respective optical signals both generated by the first multiplication module.

30. A system, comprising:
a first unit configured to generate a plurality of modulator control signals;
a processor unit comprising:
  a light source configured to provide a plurality of light outputs;
  a plurality of optical modulators coupled to the light source and the first unit, the plurality of optical modulators being configured to generate an optical input vector by modulating the plurality of light outputs provided by the light source based on the plurality of modulator control signals, the optical input vector comprising a plurality of optical signals; and
  a matrix multiplication unit coupled to the plurality of optical modulators and the first unit, the matrix multiplication unit being configured to transform the optical input vector into an analog output vector based on a plurality of weight control signals;
a second unit coupled to the matrix multiplication unit and configured to convert the analog output vector into a digitized output vector; and
a controller comprising integrated circuitry configured to perform operations comprising:
  receiving an artificial neural network computation request comprising an input dataset that comprises a first digital input vector;

receiving a first plurality of neural network weights; and generating, through the first unit, a first plurality of modulator control signals based on the first digital input vector and a first plurality of weight control signals based on the first plurality of neural network weights;

wherein the matrix multiplication unit comprises:

a plurality of copying modules, wherein each of the copying modules corresponds to a subset of one or more optical signals of the optical input vector and is configured to split the subset of one or more optical signals into two or more copies of the optical signals;

a plurality of multiplication modules, wherein each of the multiplication modules corresponds to a subset of one or more optical signals configured to multiply the one or more optical signals of the subset by one or more matrix element values using optical amplitude modulation; and one or more summation modules, wherein each summation module is configured to produce an electrical signal that represents a sum of the results of two or more of the multiplication modules;

wherein one of the copies of a first subset of one or more optical signals includes more than one of the optical signals, and fewer than all of the optical signals, on which multiple input values are encoded;

wherein the multiplication module corresponding to the copy of the first subset is configured to multiply the encoded input values by different respective matrix element values; and wherein different multiplication modules corresponding to different respective copies of the first subset of one or more optical signals are contained by different devices that are in optical communication to transmit one of the copies of the first subset of one or more optical signals between the different devices.

* * * * *